United States Patent [19]
Sellers et al.

[11] Patent Number: 5,311,438
[45] Date of Patent: May 10, 1994

[54] INTEGRATED MANUFACTURING SYSTEM

[75] Inventors: R. Drew Sellers, Chagrin Falls; John C. Hanger, Lakewood; Stephen V. Stair, Columbus, all of Ohio; Ronald A. Ehman; C. Dean Anargyros, both of Chicago, Ill.; Thomas N. Parry, Columbus, Ohio

[73] Assignee: Andersen Consulting, Chicago, Ill.

[21] Appl. No.: 830,201

[22] Filed: Jan. 31, 1992

[51] Int. Cl.⁵ .............................................. G06F 15/46
[52] U.S. Cl. .................................... 364/468; 364/401
[58] Field of Search ............... 364/468, 401, 402, 403, 364/131-134, DIG. 1, DIG. 2; 395/903, 904, 919

[56] References Cited

U.S. PATENT DOCUMENTS

| | | | |
|---|---|---|---|
| 4,383,298 | 5/1983 | Huff et al. | 364/403 X |
| 4,827,423 | 5/1989 | Beasley et al. | 364/468 |
| 4,862,376 | 8/1989 | Ferriter et al. | 364/403 X |
| 4,998,206 | 3/1991 | Jones et al. | 364/468 |
| 5,089,970 | 2/1992 | Lee et al. | 364/468 |
| 5,101,352 | 3/1992 | Rembert | 364/401 |
| 5,191,534 | 3/1993 | Orr et al. | 364/468 |

OTHER PUBLICATIONS

APICS: Process Industry Specific Industry Group Software Requirements Guide (1991).
John C. Hanger, Product Definition for The Process Industry (1991).

Primary Examiner—Joseph Ruggiero
Attorney, Agent, or Firm—Merchant, Gould, Smith, Edell, Welter & Schmidt

[57] ABSTRACT

A manufacturing system utilizes a common database structure and product definition to achieve true integration of multiple systems. The production definition includes an item and specification to define material or resources used in or related to a manufacturing process. The item identifies the material or resources, and the specification describes its performance specifications. Multiple manufacturing systems each utilize the same common database structure and product definition for processing data. These systems may include an Environmental, Health, Safety & Training system to manage environmental and health aspects of the manufacturing process. A New Product Development system may also be integrated with the common database to facilitate and automate the process of developing new products. The true integration of manufacturing systems allows full communication among the systems and automates many functions, such as generating reports and monitoring of hazardous materials and agents.

29 Claims, 66 Drawing Sheets

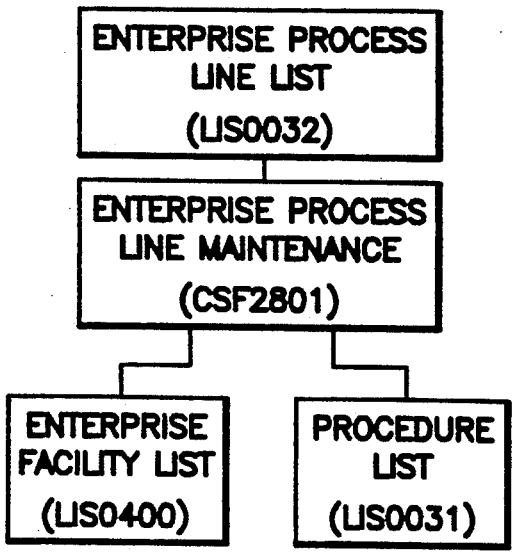
FIG. 17
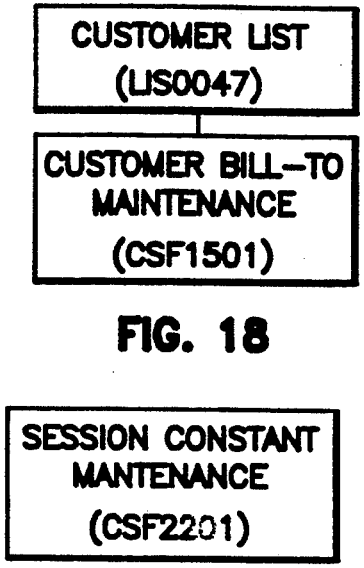
FIG. 18
FIG. 20
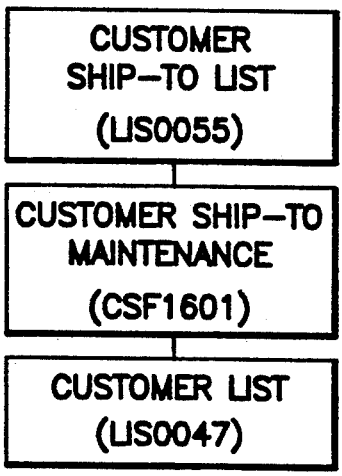
FIG. 19
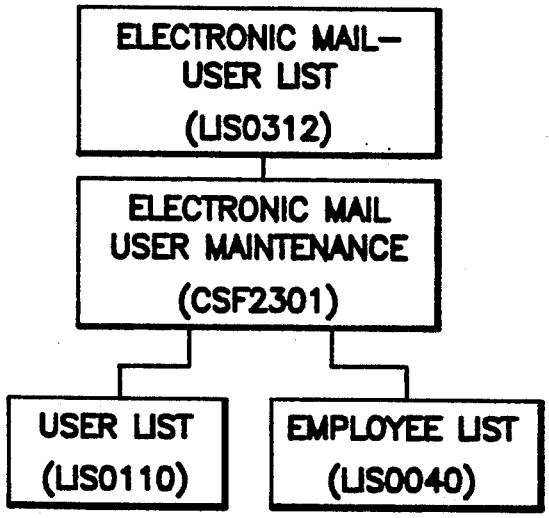
FIG. 21
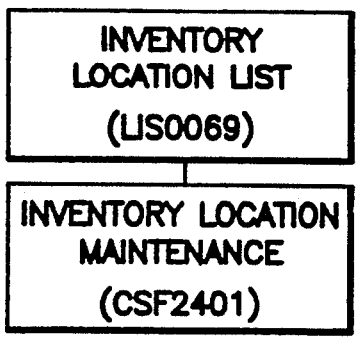
FIG. 22
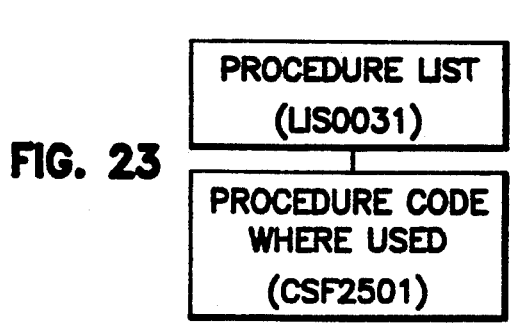
FIG. 23

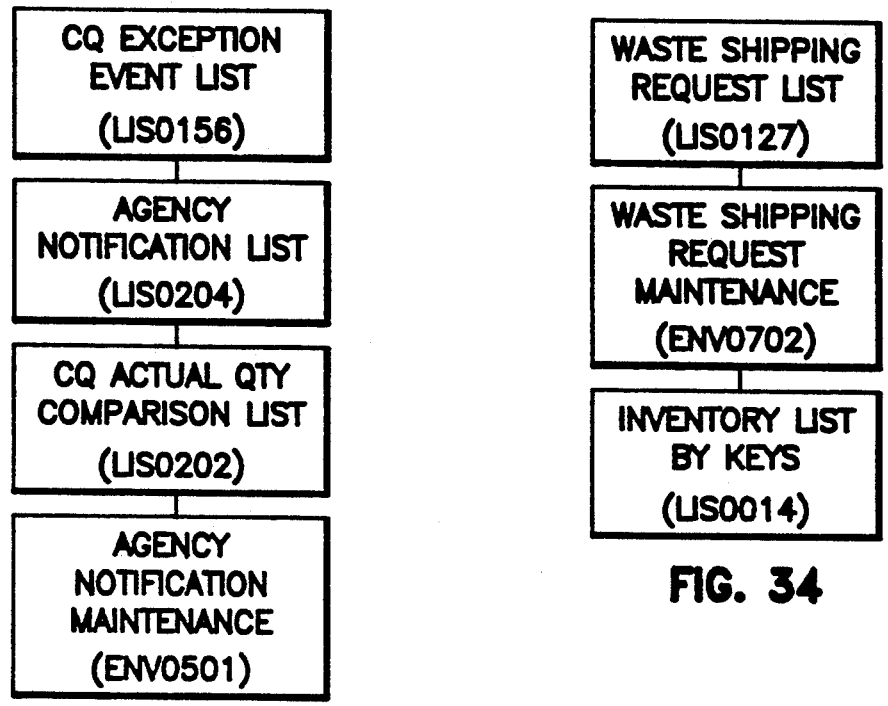
FIG. 33
FIG. 34
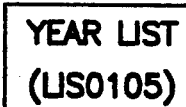
FIG. 36
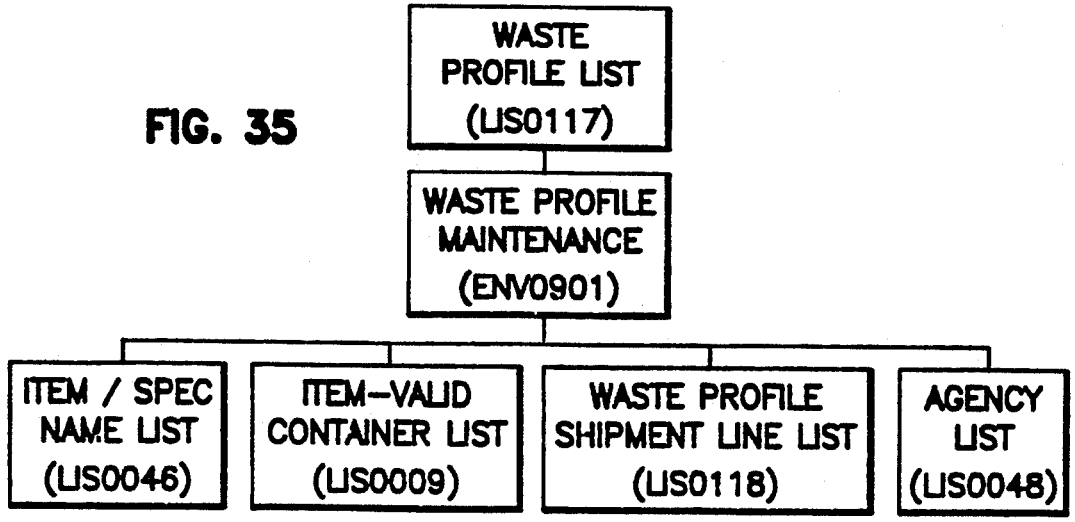
FIG. 35

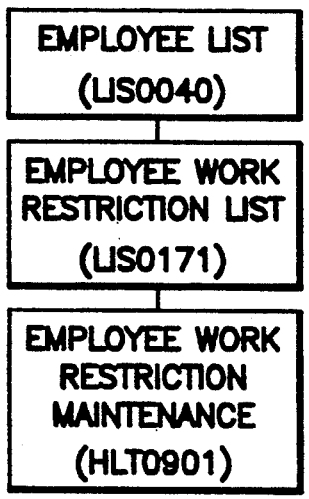
FIG. 46
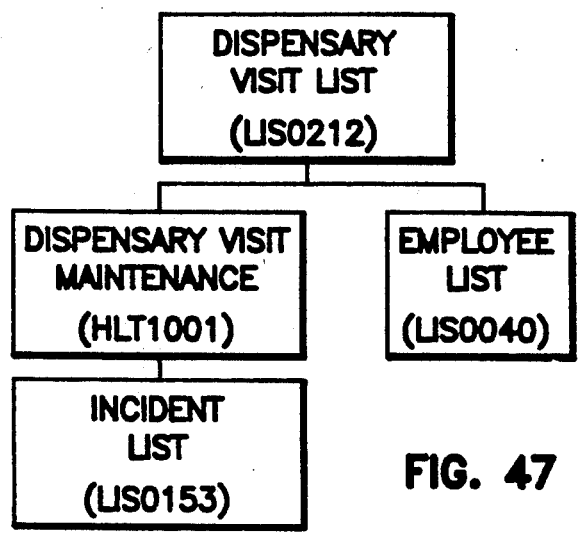
FIG. 47
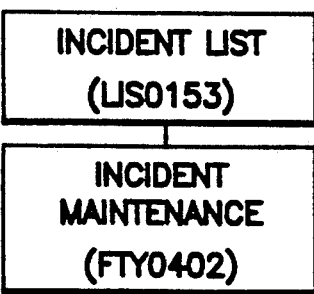
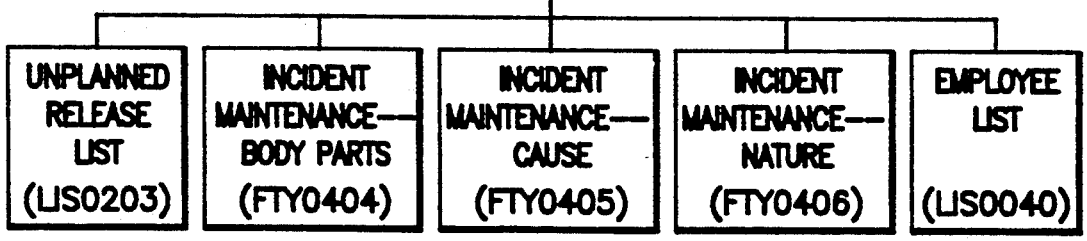
FIG. 48
FIG. 49
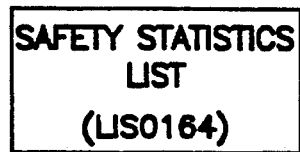
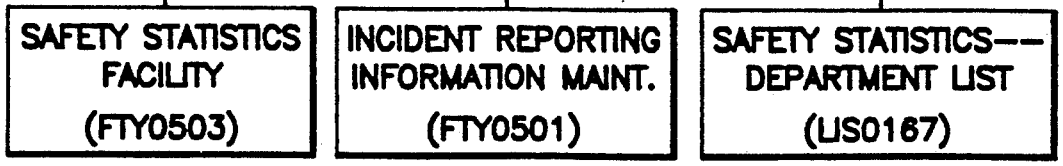

```
┌─────────────────┐   ┌─────────────────┐   ┌─────────────────┐
│   INVENTORY     │   │  CYCLE CLASS    │   │  CYCLE COUNT    │
│ TRANSACTION LIST│   │   ASSIGNMENT    │   │ SCHEDULE MAINT. │
│   (LIS0028)     │   │   (LIS0099)     │   │   (MTL3201)     │
└────────┬────────┘   └────────┬────────┘   └─────────────────┘
         │                     │
┌────────┴────────┐   ┌────────┴────────┐          FIG. 67
│   INVENTORY     │   │   ITEM / SPEC   │
│  TRANSACTION    │   │  PLANNING DATA  │
│   (MTL2501)     │   │   (PRD2001)     │        ┌─────────────┐
└─────────────────┘   └─────────────────┘        │  CUSTOMER   │
                                                  │ RETURN LIST │
     FIG. 64              FIG. 65                 │  (LIS0070)  │
                                                  └─────────────┘
```

CYCLE COUNT SCHEDULE MAINT. (MTL3201)
├── CYCLE COUNT RESULTS (MTL3101)
└── CYCLE COUNT SUMMARY REVIEW (LIS0211)

FIG. 68

EXPECTED DELIVERIES LIST (LIS0076)
├── PURCHASED ITEM RECEIPT (MTL1001)
│   └── RECEIPT INVENTORY RECORDS (MTL1002)
│       ├── INVENTORY LOCATION LIST (LIS0069)
│       └── CONTAINER LIST (LIS0034)
└── PURCHASED ITEM REJECTION (MTL1003)

```
SCHEDULED
CARRIER
SHIPMENT
(LIS0019)
   │
SHIPMENT
HEADER
(MTL5001)
   │
AGENCY
LIST
(LIS0048)
```

```
SHIPMENT
LIST
(LIS0019)
   │
SHIPMENT
LINE LIST
(LIS0035)
   │
CREATE PICK
LIST / REPORT
SHIPMENT
(MTL5301)
```

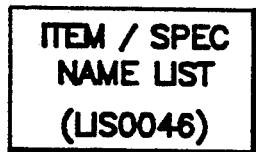
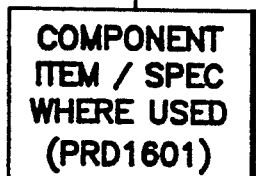
FIG. 122
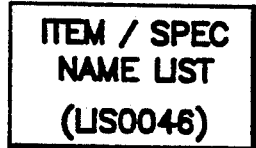
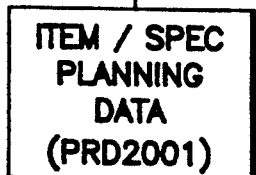
FIG. 123
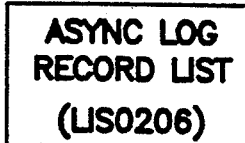
FIG. 125
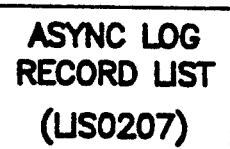
FIG. 126
FIG. 124
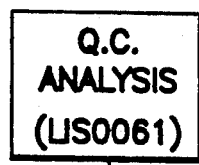
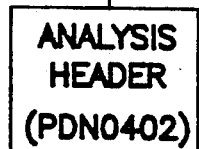
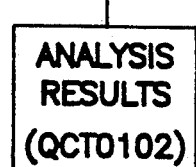
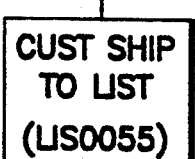
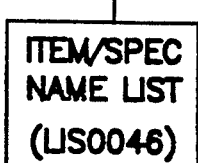
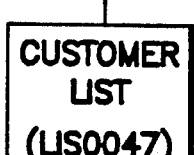

INTEGRATED MANUFACTURING SYSTEM

FIELD OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates to a plant-level system that utilizes a common database and product definition for integrating together various manufacturing systems. The present invention is particularly useful in, but is not limited to, the process industry.

BACKGROUND OF THE INVENTION

Process manufacturers have traditionally used a variety of systems for managing a manufacturing process. These systems may include an enterprise system, which may contain customer service, resource planning systems, and other centralized functions. The typical prior art enterprise systems are at a high level and are relatively removed from the actual manufacturing process. Typical resource planning systems may be accomplished by a material requirements planning system that tracks inventory and facilitates in planning for the inventory required in a particular production run.

Typical prior art environmental systems are often used to generate reports required by the government. By government regulations, manufacturers using hazardous materials must submit reports to the government that include, for example, amounts and types of hazardous material manufactured, processed, or otherwise used in the manufacturing process. Also, under right-to-know laws, employees have a right to know the types of hazardous material, if any, to which they are exposed. Environmental systems assist in managing this type of data and in generating reports.

Prior art health, safety, and training systems are typically used to track exposure of employees to hazardous materials and to determine preventative measures. The system may contain the various exposures and keep track of any employee exams or training. An employee who is exposed to hazardous materials may undergo periodic exams to determine if the exposure has caused any health problems. Employees may also have training regarding how to handle or work with hazardous materials, and the training is designed to minimize the potential for injury or exposure to the material.

Prior art low-level systems used in the manufacturing process may include area/unit control systems that interface and control the actual machinery on a shop floor in a manufacturing process. Workers on the shop floor may use data obtained with the enterprise system to determine inputs to the area/unit control system. For example, the enterprise system may indicate the quantity of a particular resource required in a manufacturing process. On the shop floor, a worker may obtain that quantity information and use it in the area/unit control system to adjust the manufacturing process to accommodate the desired quantity.

Between the prior art enterprise, area/unit control, and other manufacturing systems, there exists an information gap. These prior art systems operate independent of one another and typically use different product definitions in different and incompatible databases. For example, in traditional process manufacturing systems, the environmental and health, safety and training systems are stand-alone systems that operate independent of both one another and any other system used to control the manufacturing process. Accordingly, the systems are unable to efficiently communicate with one another or other manufacturing systems system. In order for these systems to communicate, either data must be manually reentered into one system from another or complex interface programs must be written to transfer data between the incompatible databases.

Another type of stand-alone system that may be used in a manufacturing process is a system for developing new products. When developing new products, particularly in the process industry, time to market can be critical in obtaining a competitive advantage. A company that is late in getting a product to the market may end up obtaining a much smaller portion of the market share, even though the company's product may be in no way inferior to the first product on the market. As a result, maintaining maximum efficiency in the development process is essential.

Traditionally, companies develop new products by shuffling papers or files from one person to another throughout the development process. Each person typically evaluates the product in his or her role within the company and then pass the "new product file" on to the next person. This process can be slow and inefficient due to the large interchange of paper documentation.

Alternatively, there is some availability of commercial product development systems, which provide electronic documentation of the development process and attempt to automate the process. These systems, however, are not integrated with a plant-level manufacturing system, which means that, once the new product is finalized and ready to be commercially produced, the information from the product development system must be entered into a manufacturing control system in order to set up the entire production run. These system, therefore, assist in new product development, but do not necessarily assist in determining parameters to be used in the plant-level system for manufacturing the new product.

Even though the manufacturing systems described above may be crudely interfaced together, they are not truly integrated. As a result, the systems have inefficiency that could only be resolved by true integration.

A need exists, therefore, for a truly integrated manufacturing system that utilizes a common database structure. In particular, a need exists for integrating environmental and health, safety and training systems within plant-level manufacturing system. There is an additional need, particularly in the process industry, for a new product development system that is completely integrated within the plant-level manufacturing system.

SUMMARY OF THE INVENTION

An integrated system provides an efficient solution to the problem of communicating between various manufacturing systems, because the entire integrated system is built around a unique and common product definition within the common database structure. A truly integrated system facilitates data transfer and automates many tasks, such as the generation of environmental reports and scheduling of exams and training for employees. Furthermore, a plant-level system fills the information gap between enterprise-level and process control systems.

The present integrated manufacturing system invention is an integrated manufacturing system invention that utilizes a common product definition as the basis for a truly integrated plant-level manufacturing system. In the present system, all of the integrated manufacturing systems use the same product definition and thus the same data format and data storage location. The product definition provides a link between any of the various manufacturing systems and provides for an efficient and more powerful use of the information contained in the product definition.

An item, specification, and container structure and relationship within a common database forms the unique product definition in the present integrated manufacturing system invention. Items may include the various resources used in a manufacturing process to produce one or more end products. Each item is linked to one or more sets of specifications. The specifications may include performance characteristics of the particular item, and these performance characteristics define the item. Each specification is linked to one or more containers. A container may indicate either the physical location where the particular item is stored or the type of packaging used to contain the material.

The manufacturing systems used in conjunction with the manufacturing process in the present integrated manufacturing system invention are linked to the product definition structure within the database. The data used by all of these systems is thus stored in a common location and in the same format. Data transfer between the systems occurs through the product definitions in the common integrated database. The common database is part of a distributed system that may be on multiple machines.

The present environmental invention utilizes a common database product definition as the basis for integrating an environmental system and a health, safety and training system to a plant-level manufacturing system. The integrated systems use the same product definition and thus the same data format. The product definition provides a link between any of the systems, which automates environmental and health, safety and training functions in the manufacturing process.

The use of a common database to integrate the systems allows information from many parts of the systems to be linked together through the product definition. This is particularly useful with the integrated health, safety and training system. Exposure to items within the product definition are linked to job locations, and job locations are linked to employees. Employees are thus effectively linked to exposure to items due to the jobs they perform. Based on this information, the present invention may automatically schedule exams and training for employees as preventative measures to the risk of exposure.

The present new product development invention utilizes a common product definition as the basis for integrating a new product development system to a plant-level manufacturing system. The new product development system uses the same product definition as the plant-level system and thus the same data format. The product definition provides a link between the new product development system and any of the various manufacturing systems that are also integrated with the plant-level system, which automates and documents the pipelined process of developing new products.

Furthermore, since data is stored in the common database product definition during new product development, the data required for commercially producing the product is automatically linked to the systems required to set up the production run. This feature saves considerable time between the finalization of the new product and the commercial availability of the product.

BRIEF DESCRIPTION OF THE DRAWINGS

FIGS. 2I and 2J is a preferred logical data model of Environmental, Health, Safety & Training modules.

The following drawings are preferred data flow diagrams, organized and identified by module, for a system that implements an integrated manufacturing system.

COMMON SYSTEM FUNCTIONS MODULE (PSCS)

System Support Set-Up (CSSS)

Figure 4:
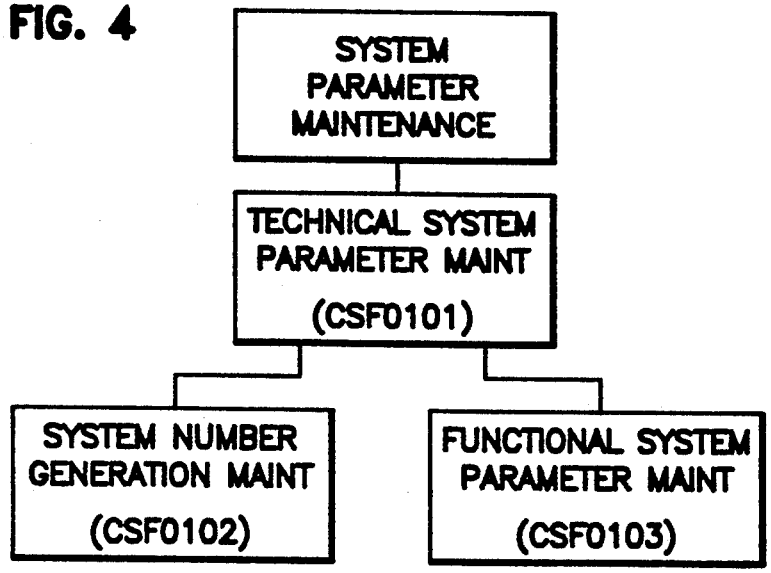
Figure 5:
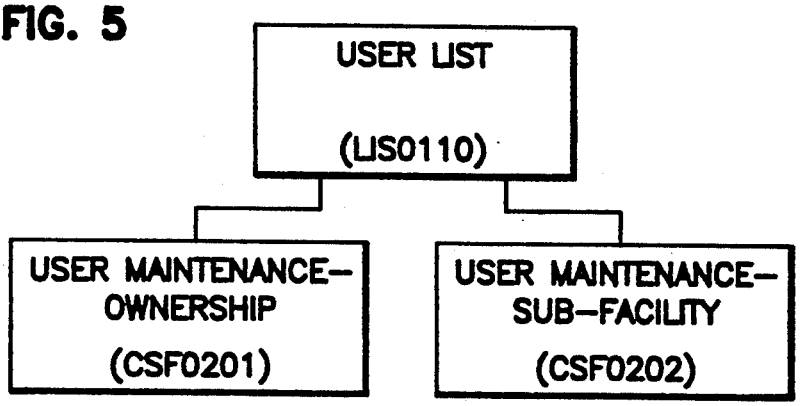
Figure 6:
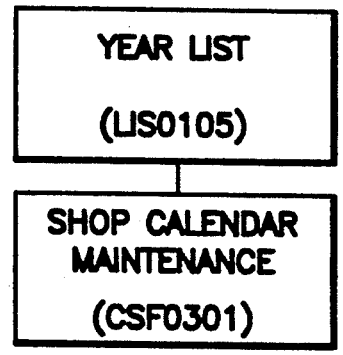
Figure 7:
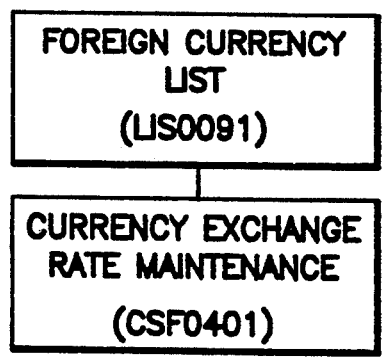
Figure 8:
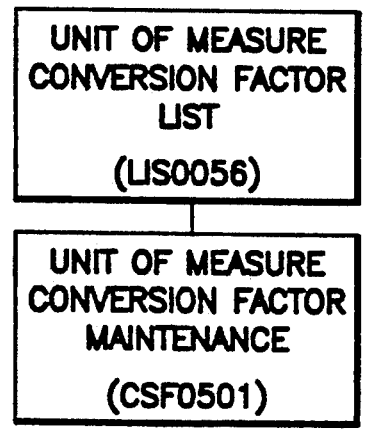

FIG. 4: System Parameter Maintenance (CS01).
FIG. 5: User Maintenance (CS02).
FIG. 6: Shop Calendar Maintenance (CS03).
FIG. 7: Currency Exchange Rate Maintenance (CS04).
FIG. 8: UOM Conversion Factor Maintenance (CS05).

Figure 21:
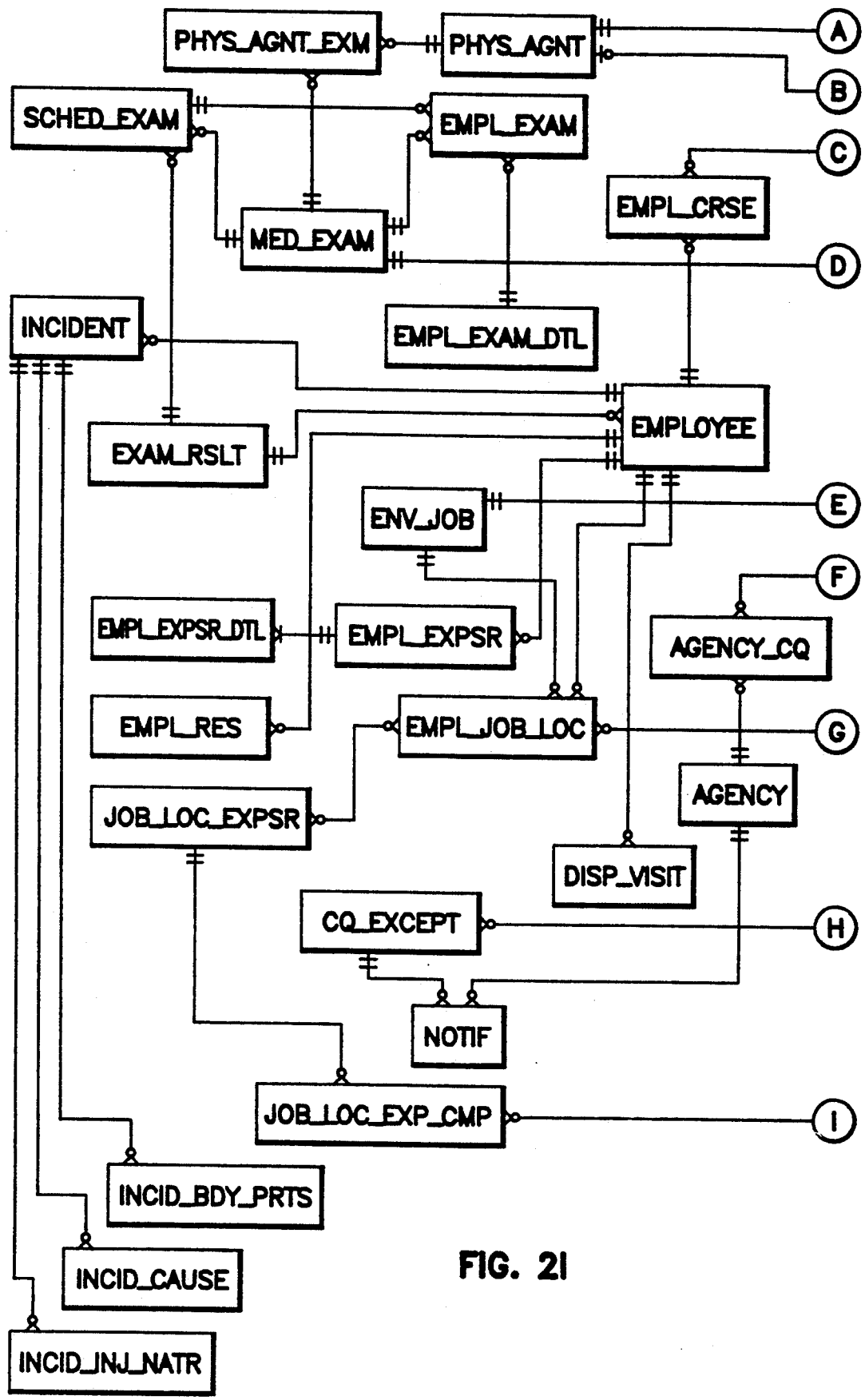
Figure 2J:
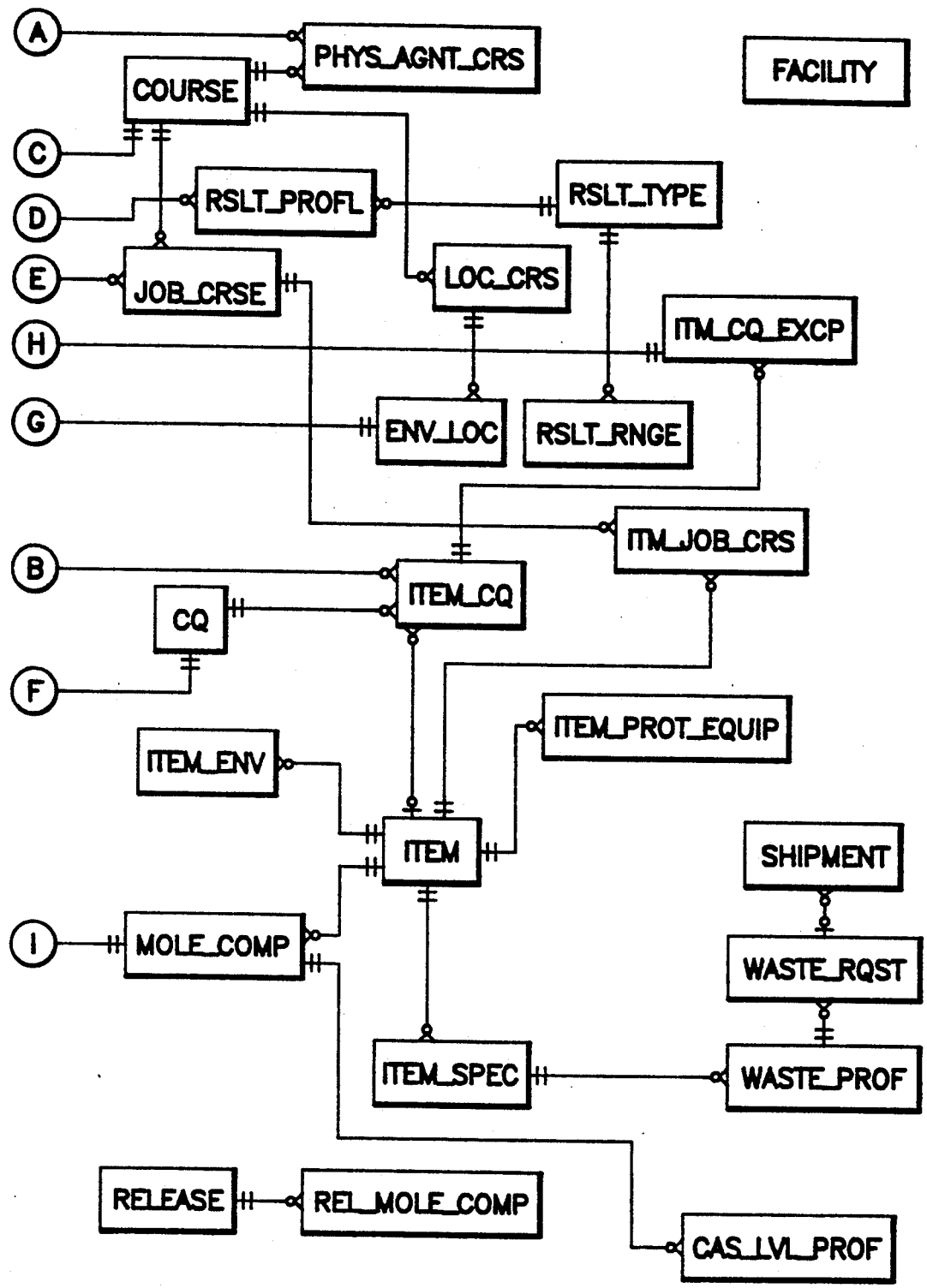
Figure 3A:
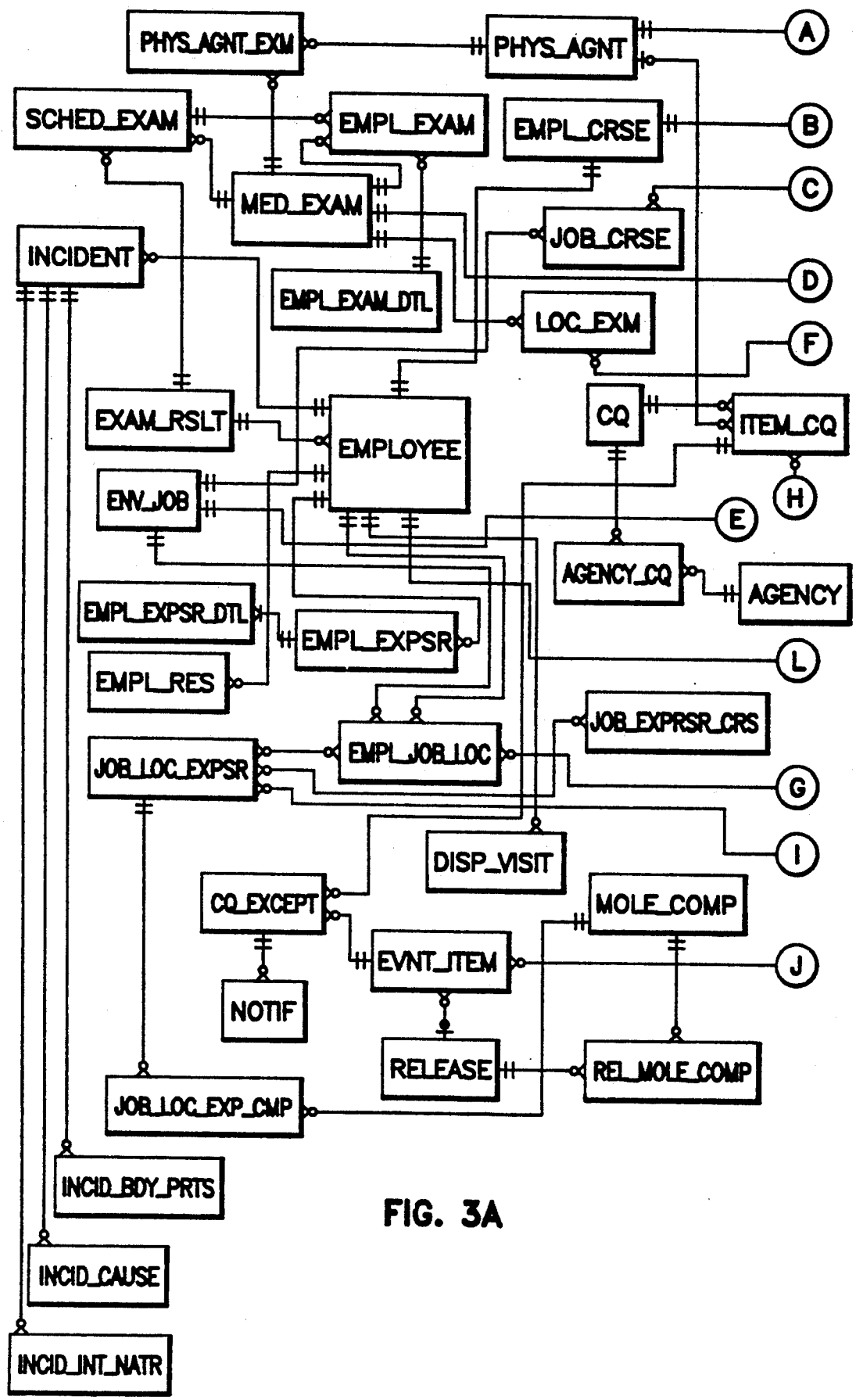
FIGS. 3A–3H represent a preferred database layout structure of an integrated manufacturing system.
Figure 3B:
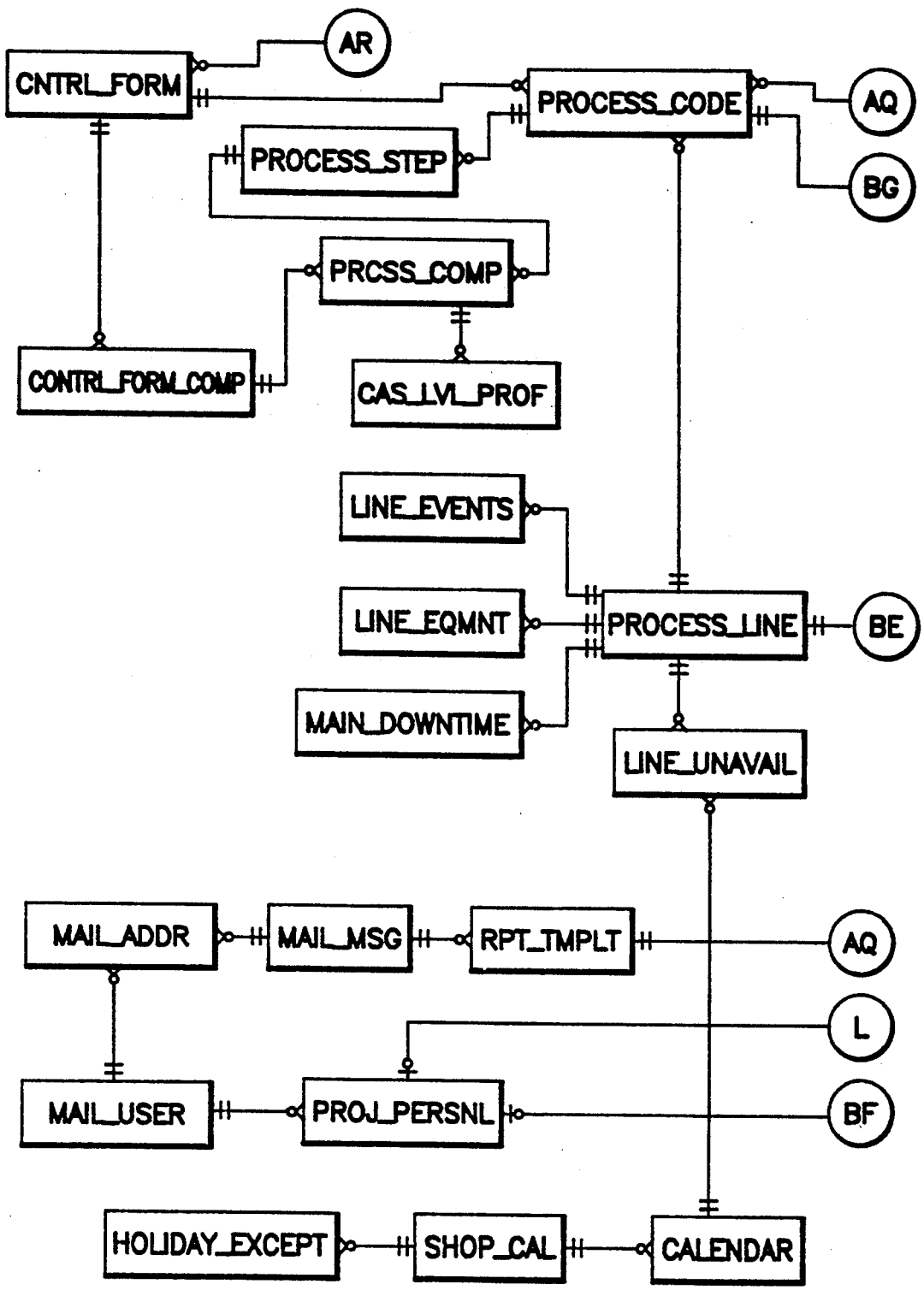
Figure 3C:
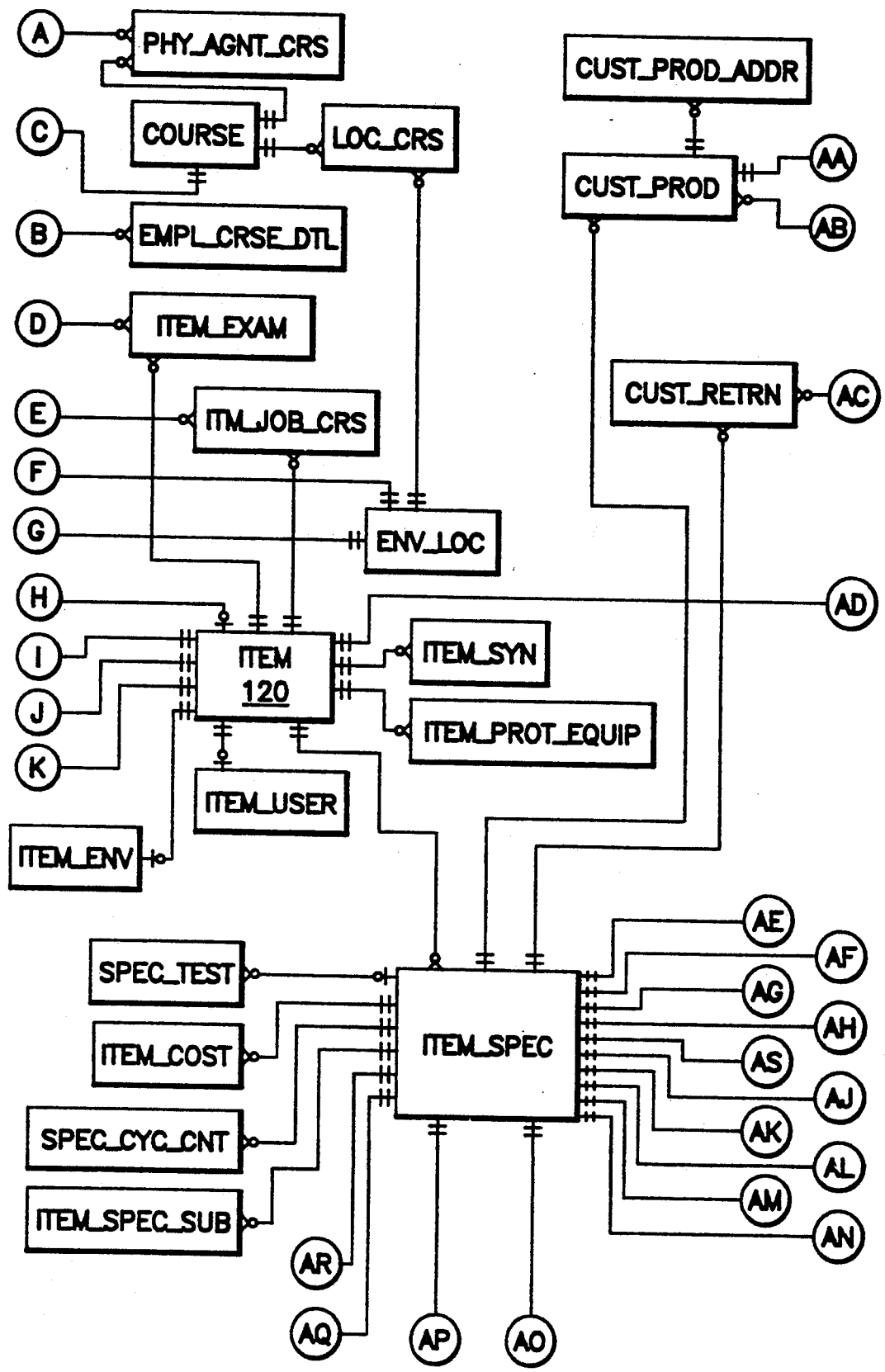
Figure 3D:
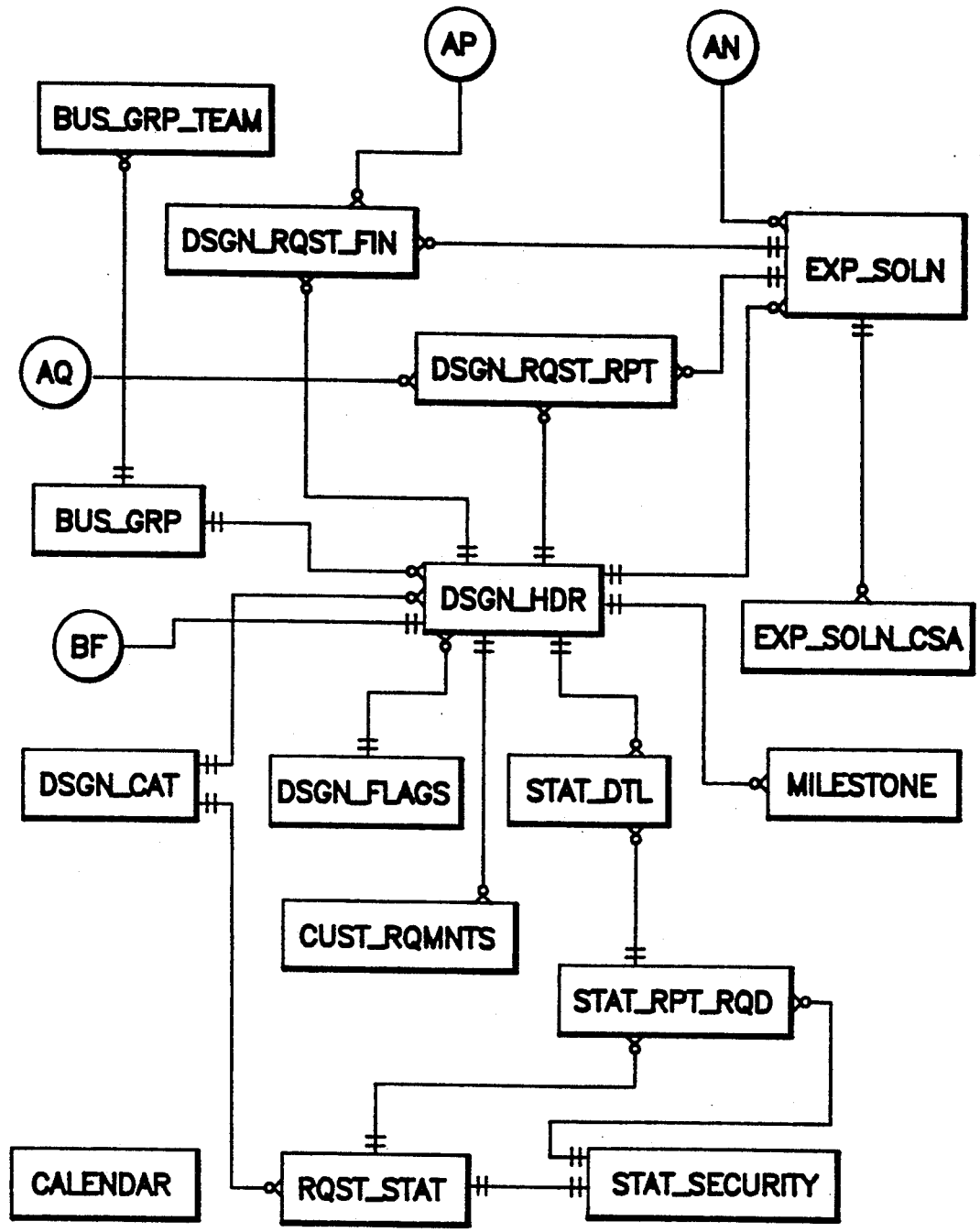
Figure 3E:
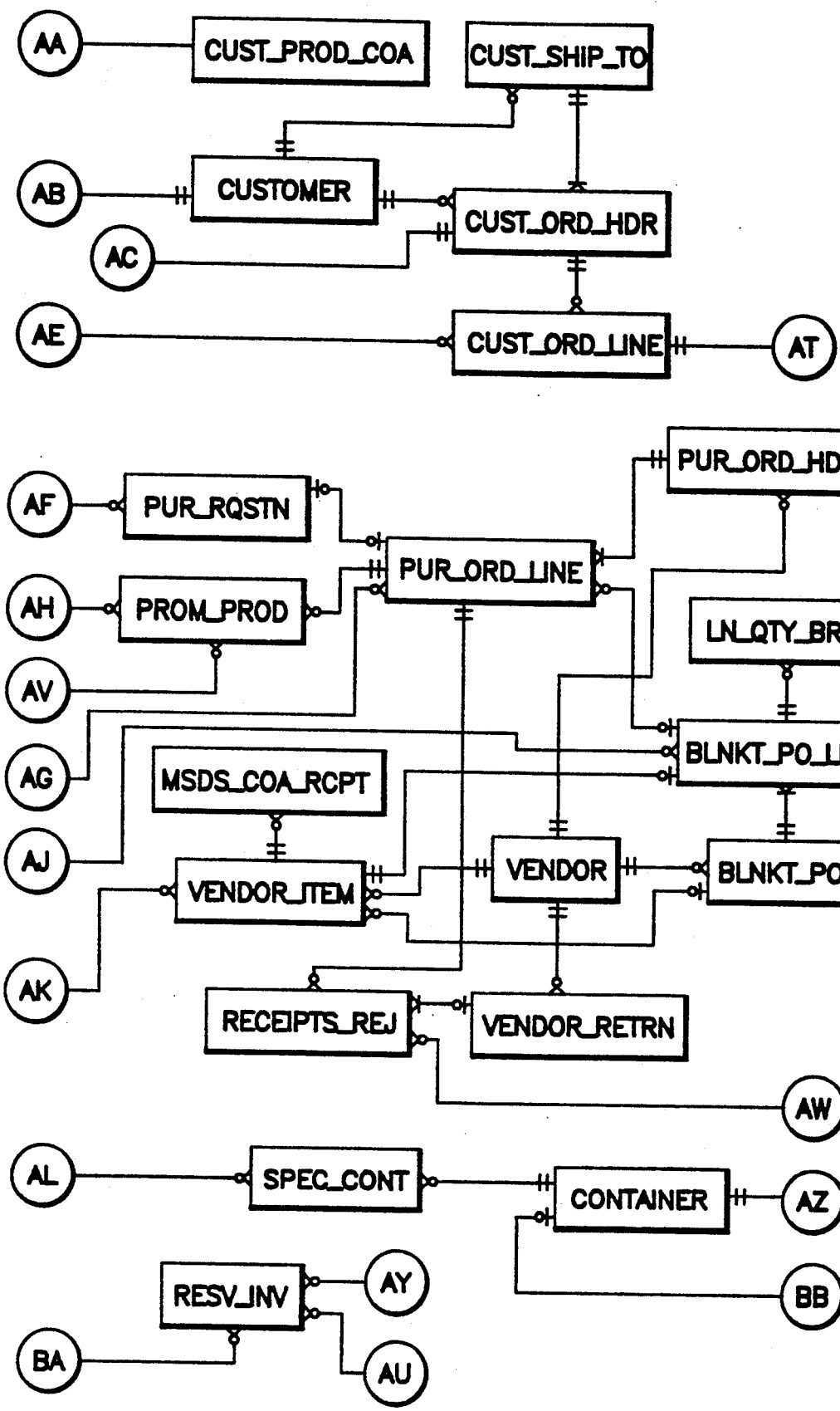
Figure 3F:
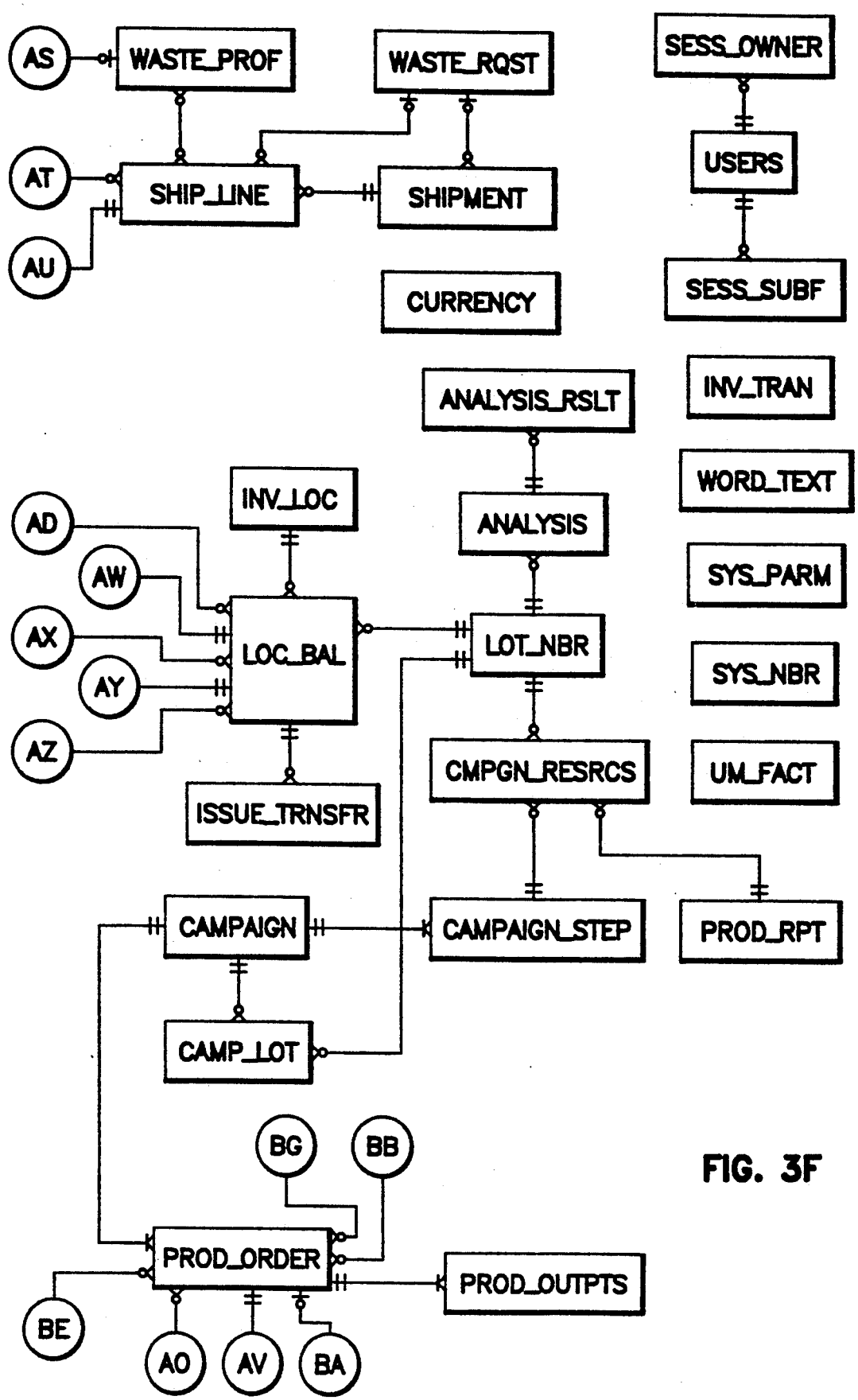
Figure 3G:
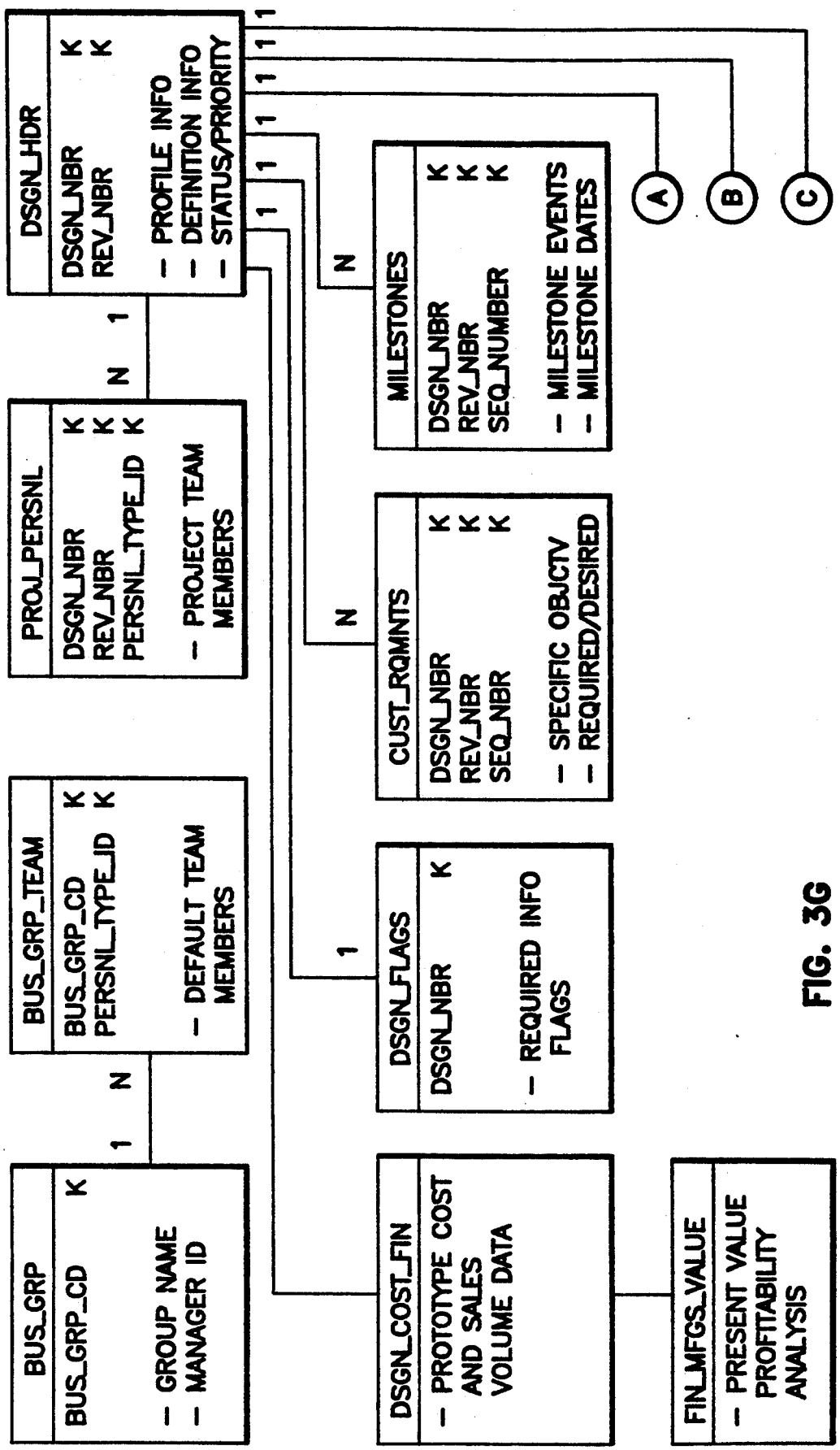
Figure 3H:
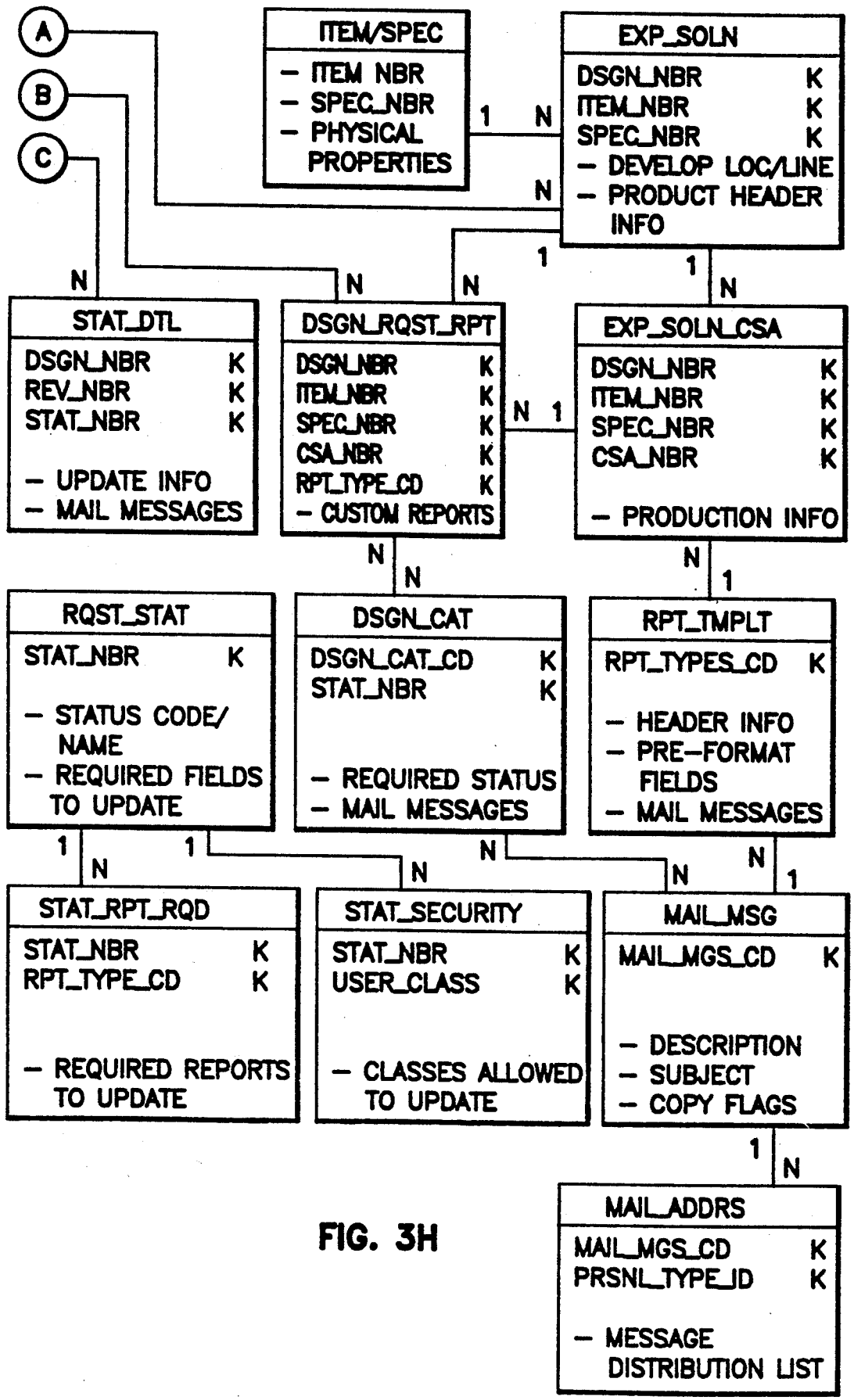
Figure 9:
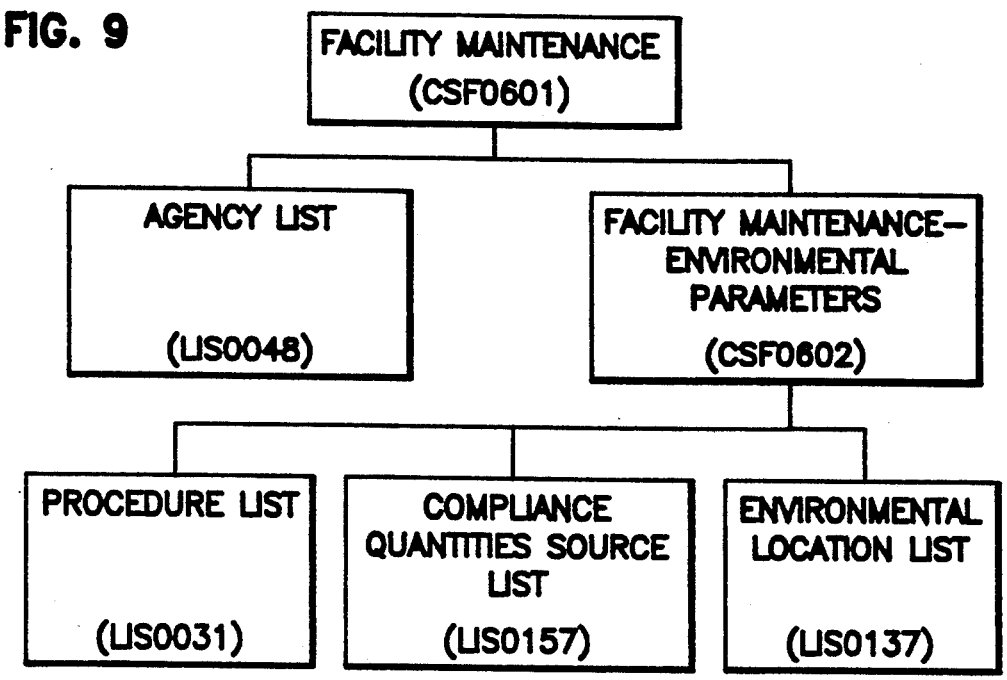
Figure 10:
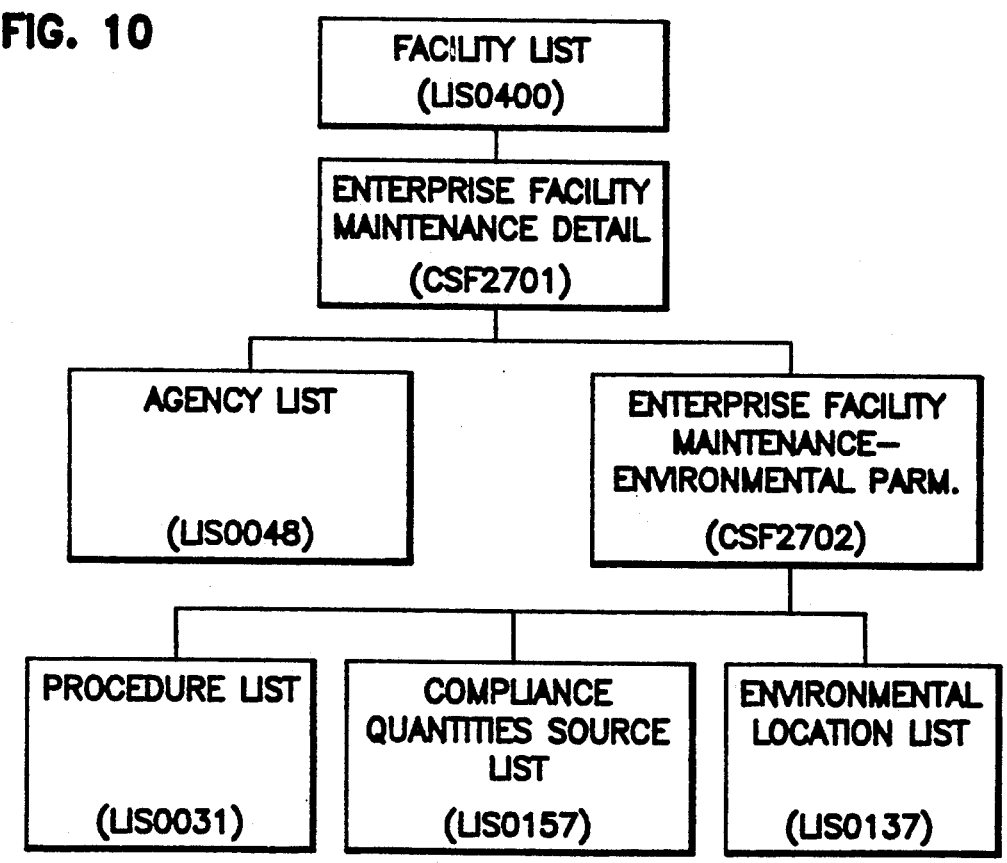
Figure 11:
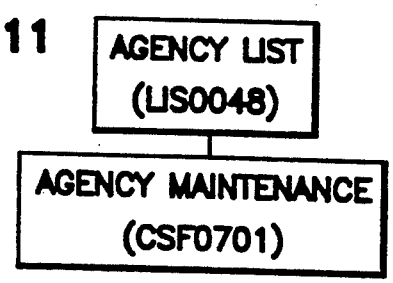
Figure 12:
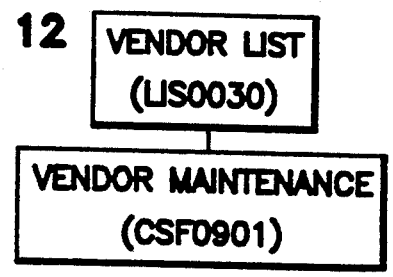
Figure 13:
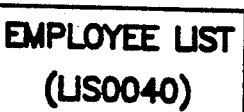
Figure 14:
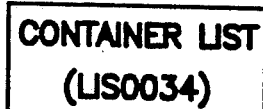
Figure 16:
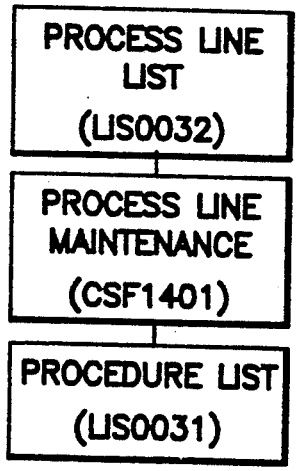
Figure 15:
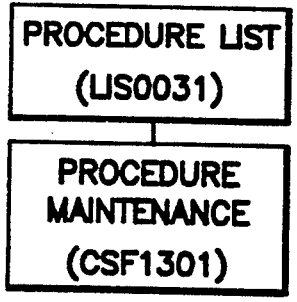

Functions Maintenance (CSFM)
FIG. 9: Facility Maintenance (CS06).
FIG. 10: Enterprise Facility Maintenance (CS27)
FIG. 11: Agency Maintenance (CS07)
FIG. 12: Vendor Maintenance (CS09)
FIG. 13: Employee Maintenance (CS10)
FIG. 14: Container Maintenance (CS12)
FIG. 15: Procedure Maintenance (CS13)
FIG. 16: Process Line Maintenance (CS14)
FIG. 17: Enterprise Process Line Maintenance (CS28)
FIG. 18: Customer Bill-To Maintenance (CS15)
FIG. 19: Customer Ship-To Maintenance (CS16)
FIG. 20: Session Constant Maintenance (CS22)
FIG. 21: Electronic Mail User Maintenance (CS23)
FIG. 22: Inventory Location Maintenance (CS24)

Figure 24:
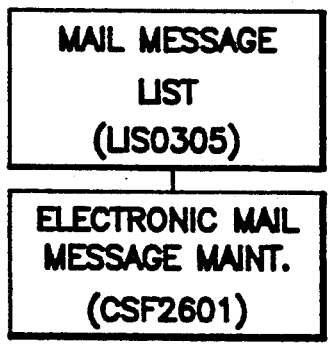
Figure 27:
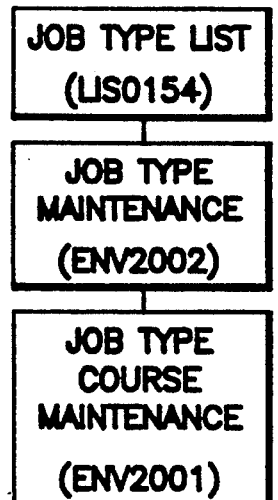
Figure 26:
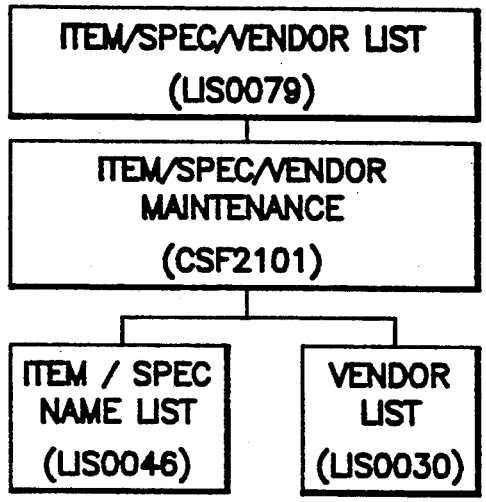
Figure 25:
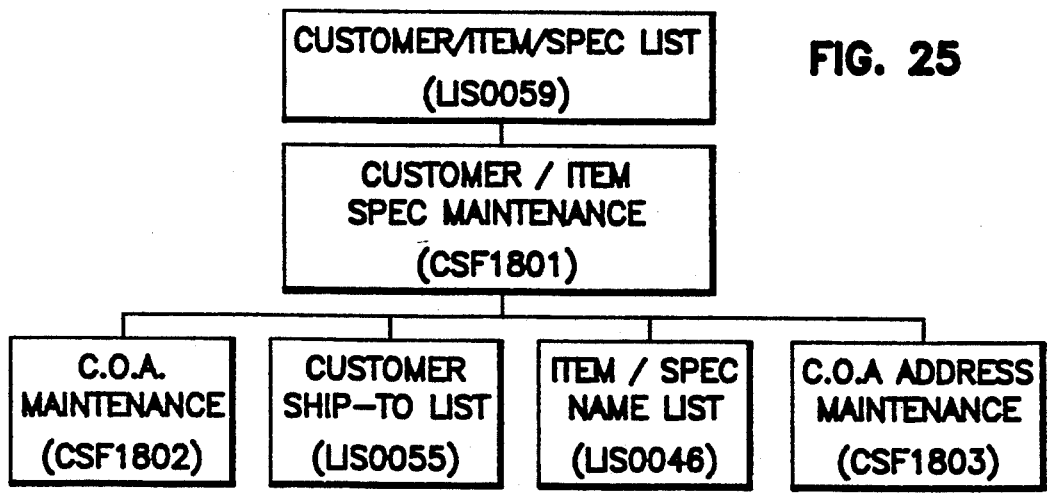
Figure 28:
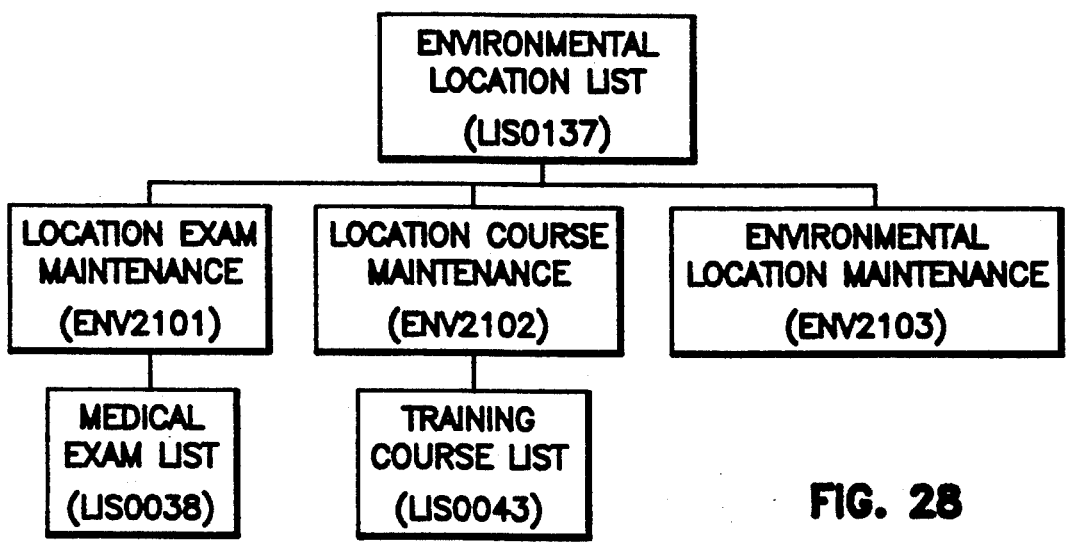
Figure 29:
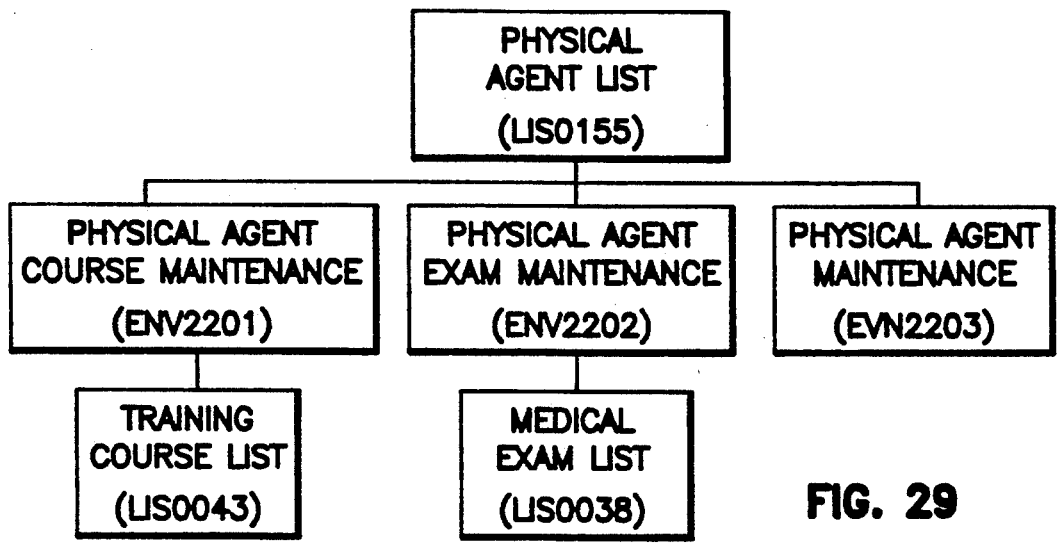
Figure 30:
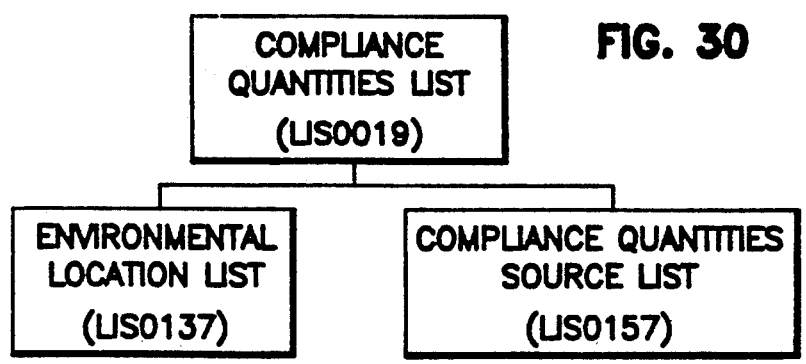
Figure 31:
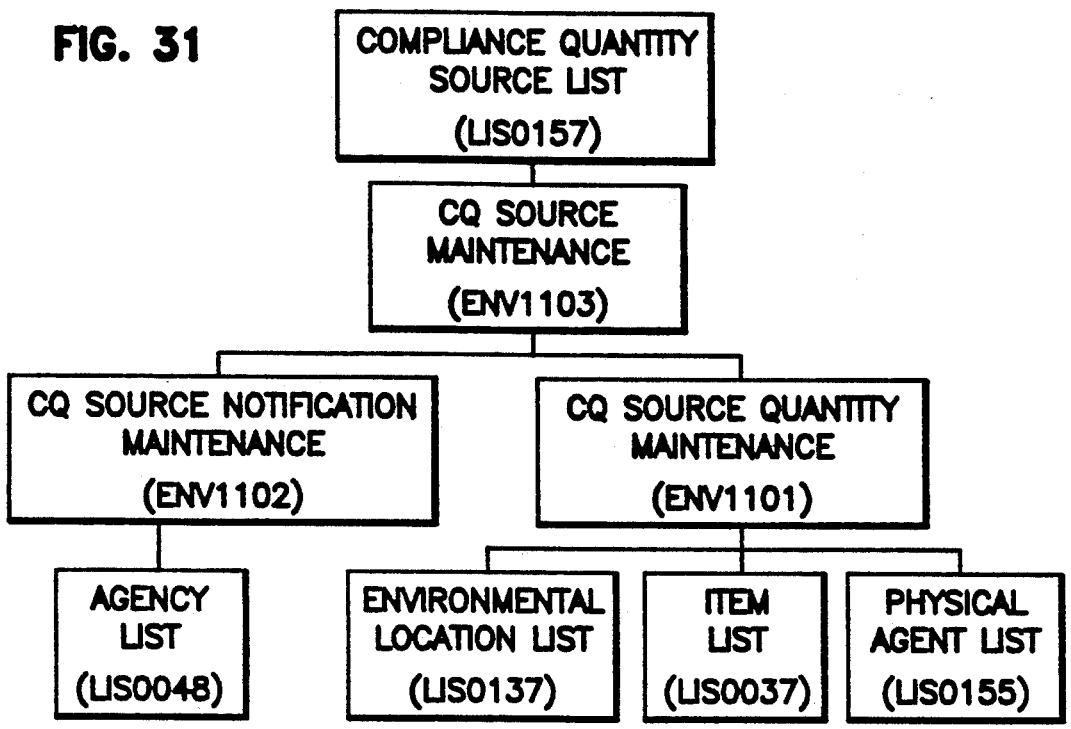
Figure 32:
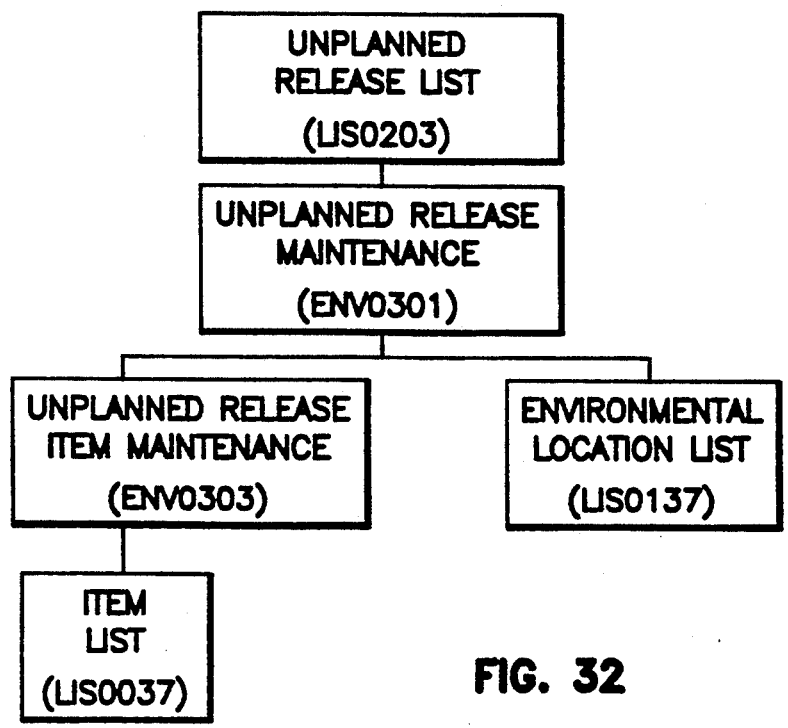
Figure 37:
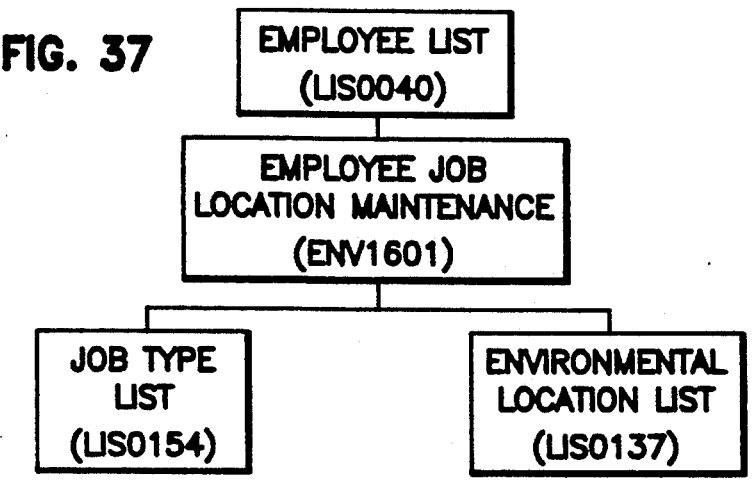
Figure 38:
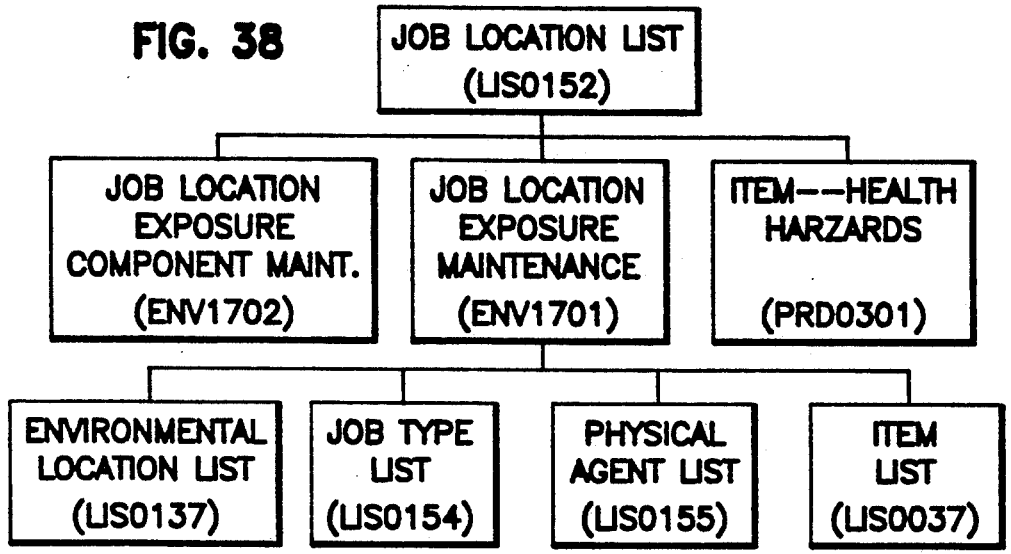
Figure 39:
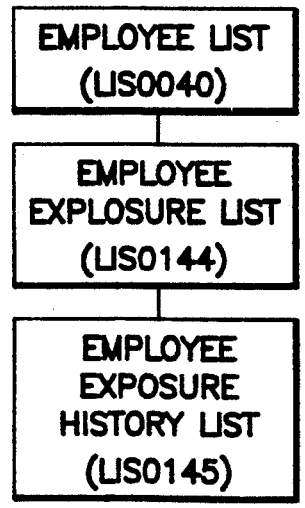
Figure 40:
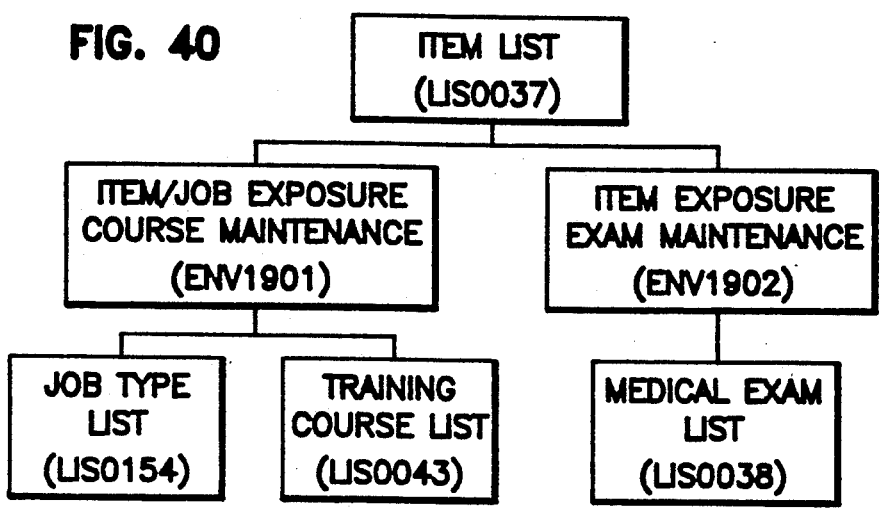
Figure 41:
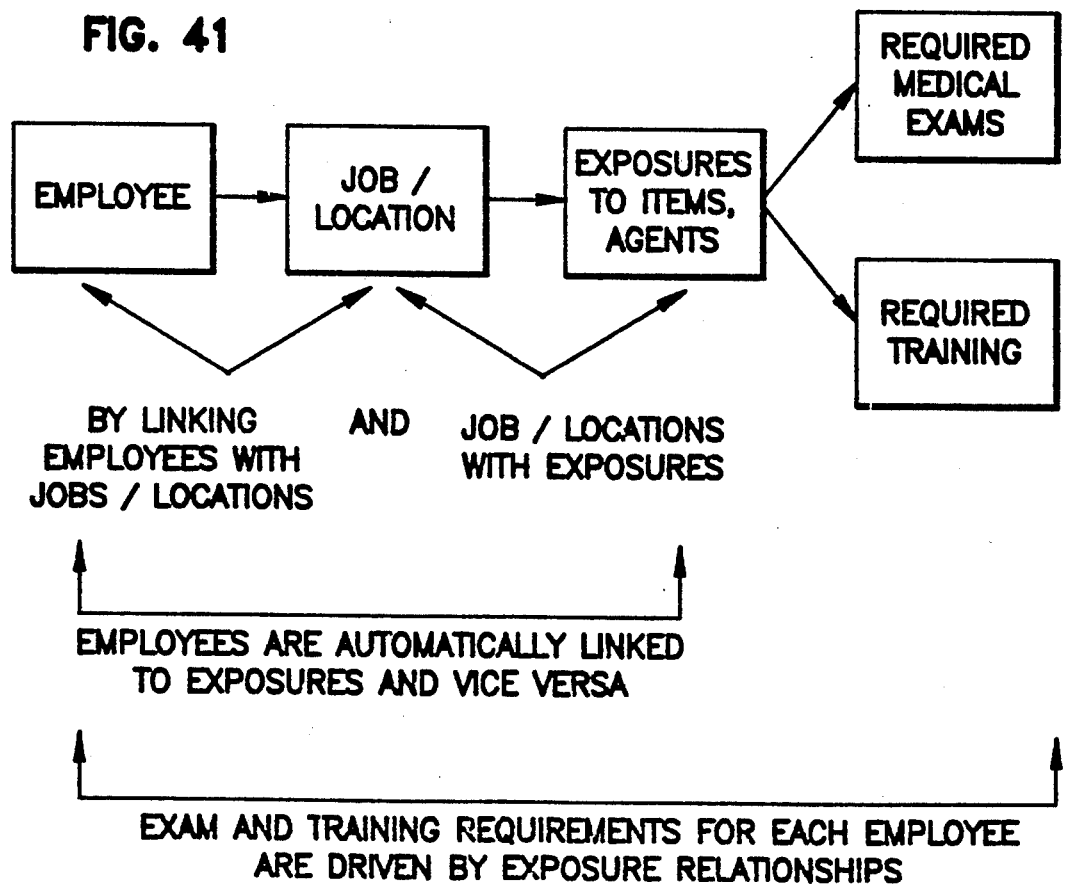
Figure 42:
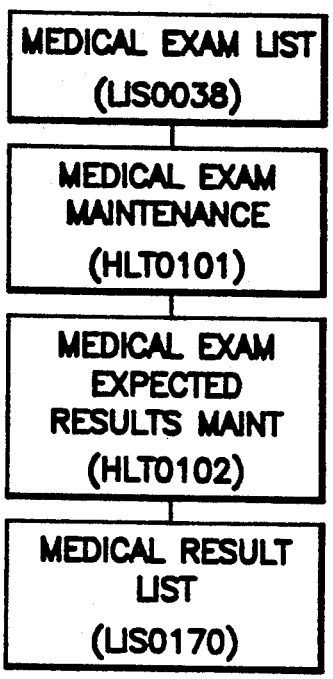
Figure 43:
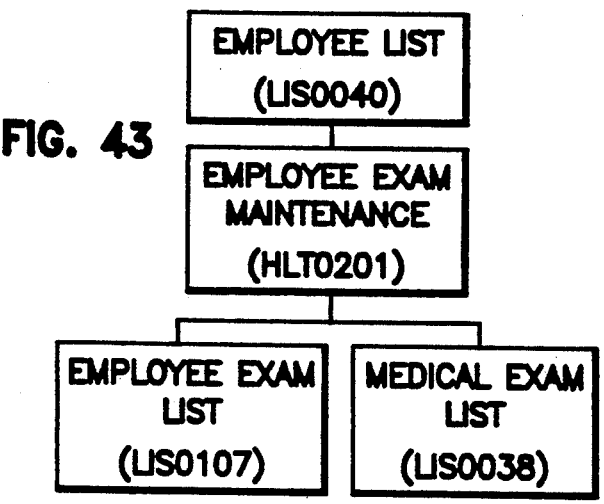
Figure 45:
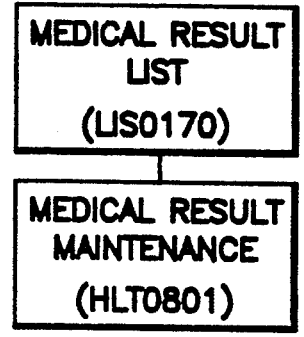
Figure 44:
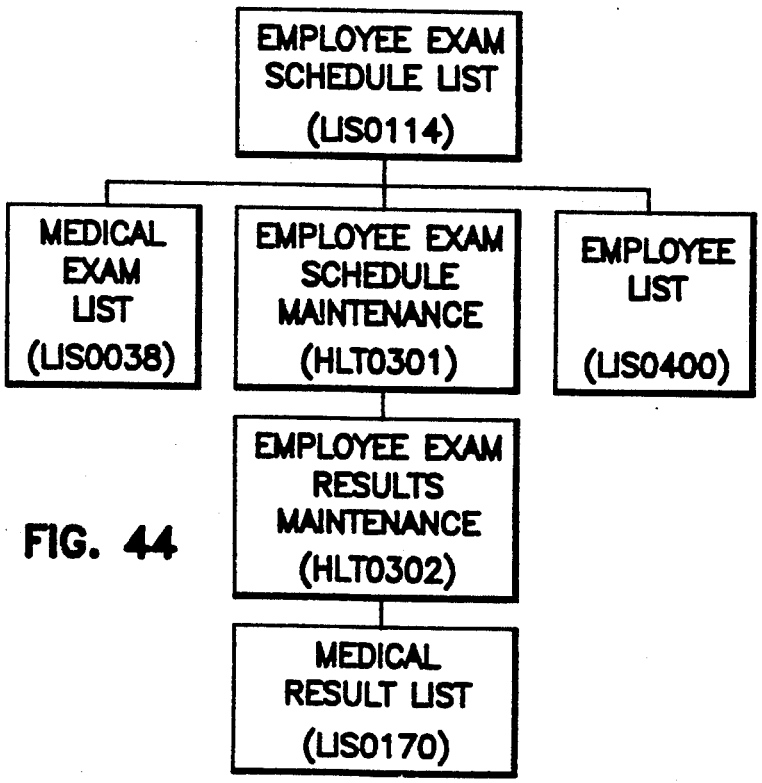
Figure 50:
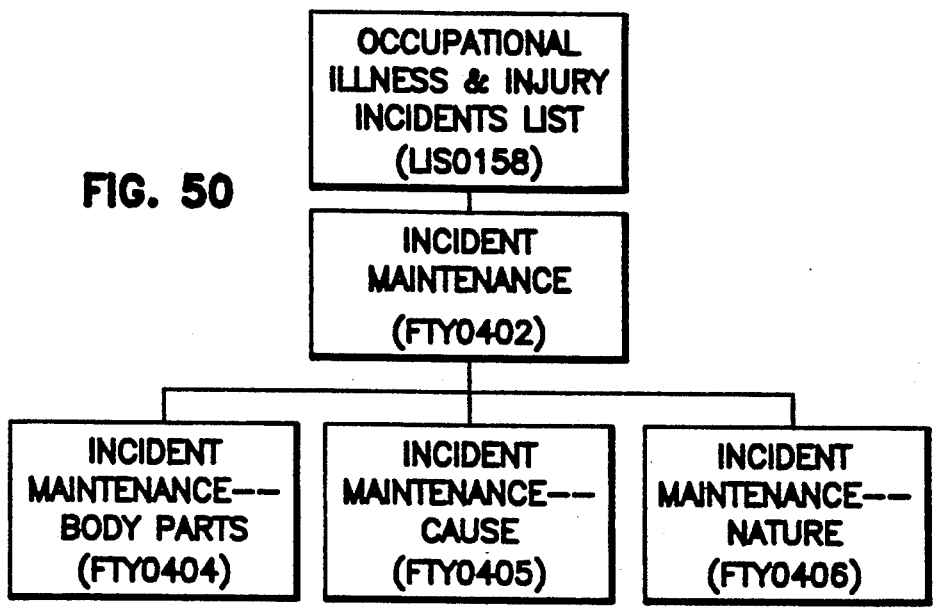
Figure 51:
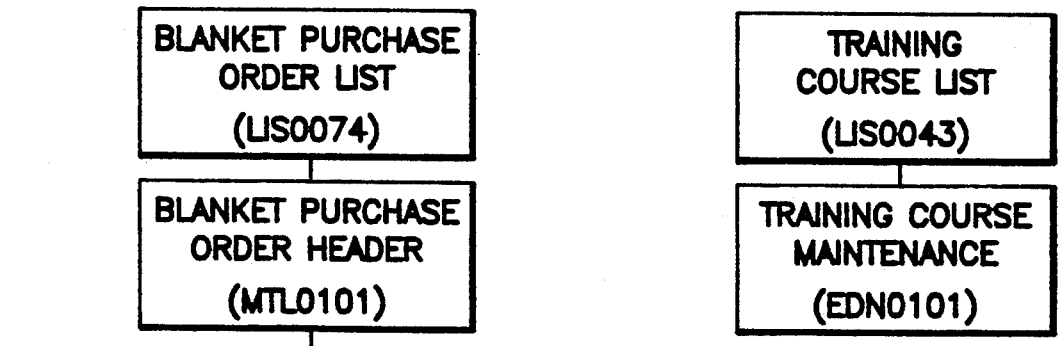
Figure 52:
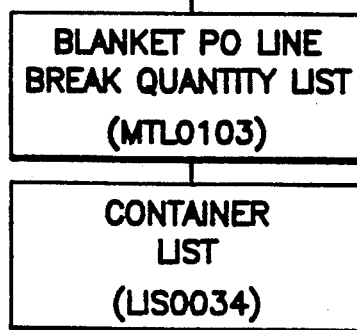
Figure 53:
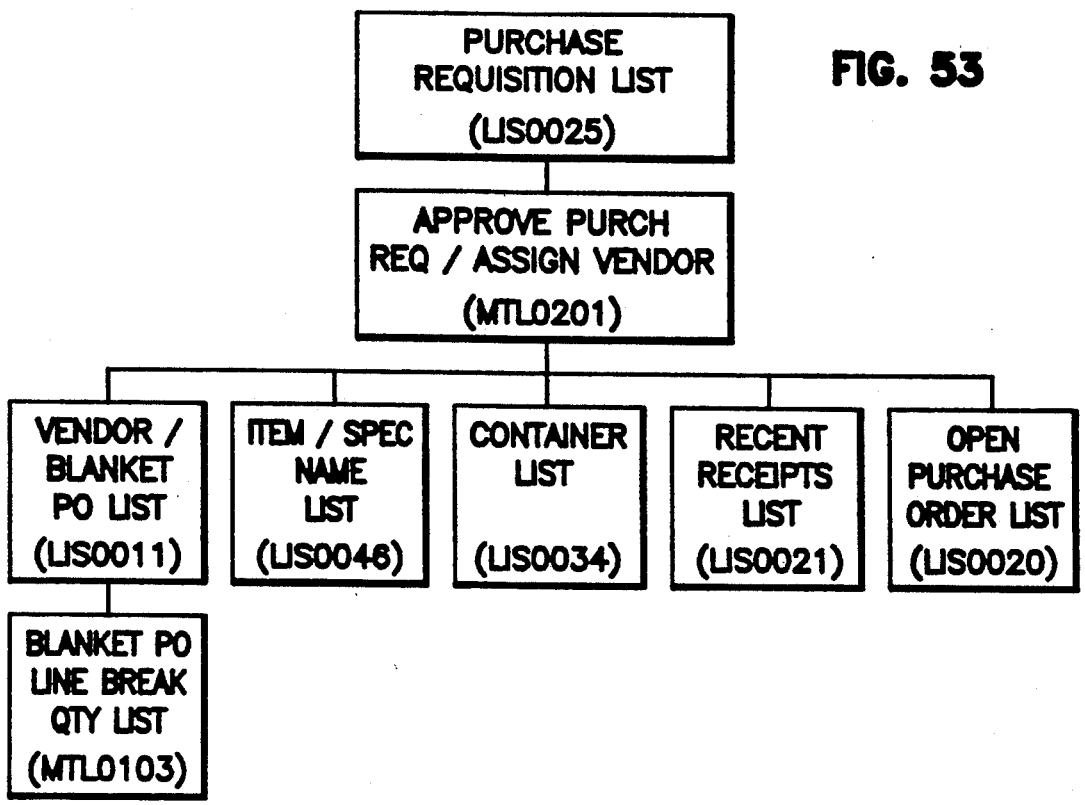
Figure 54:
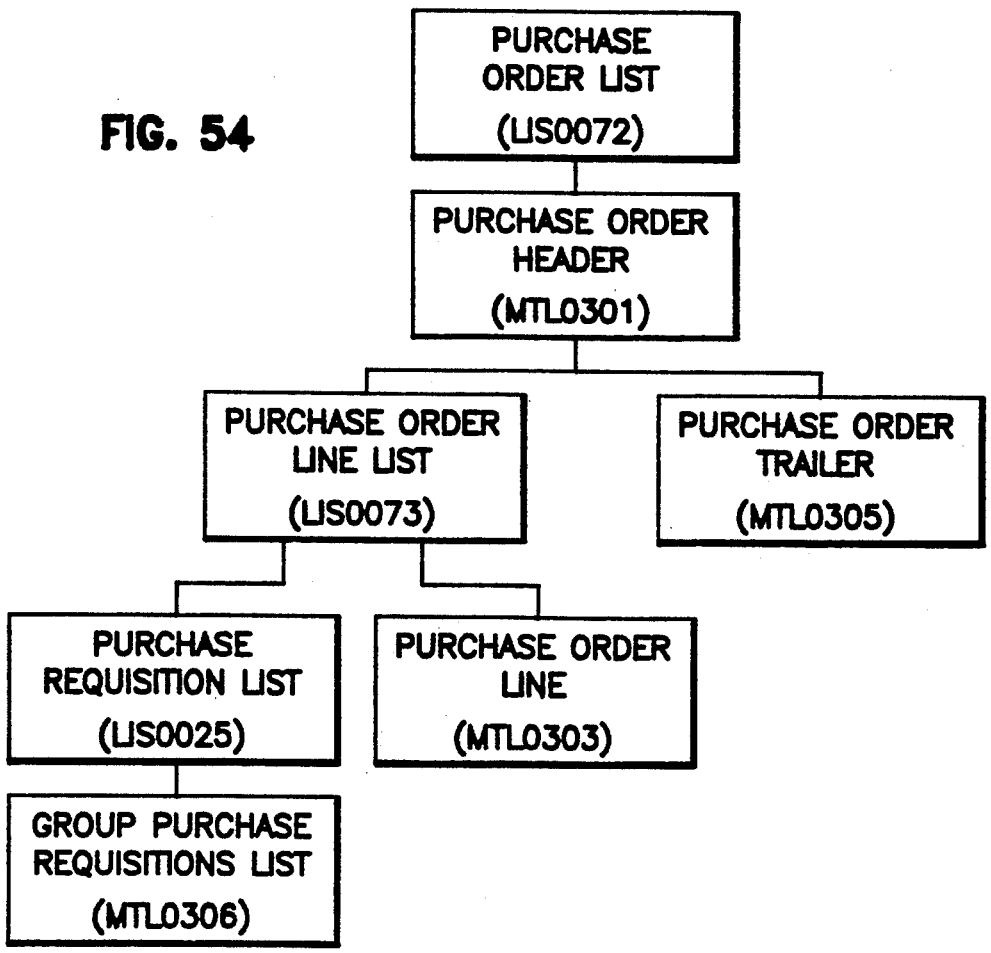
Figure 55:
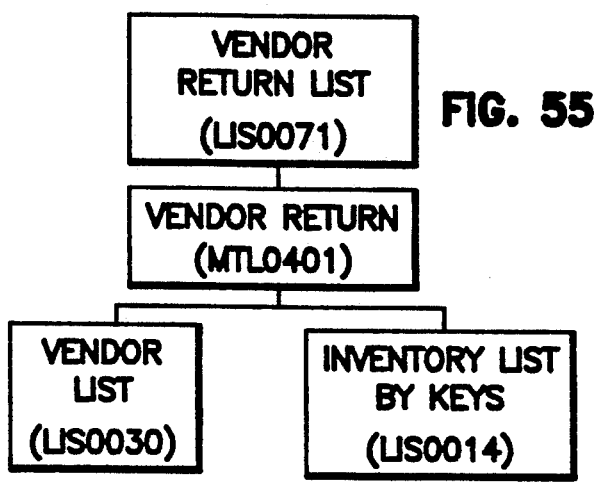
Figure 56:
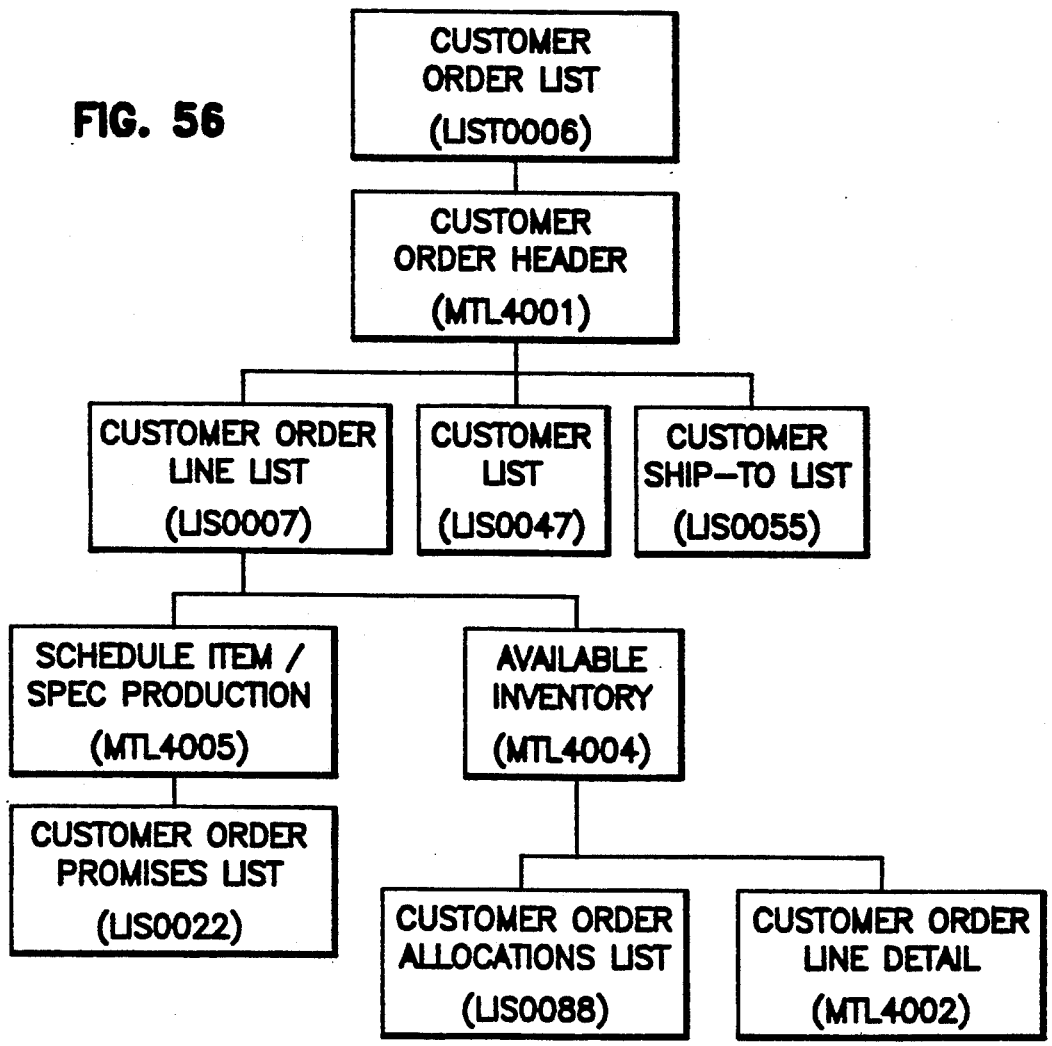
Figure 57:
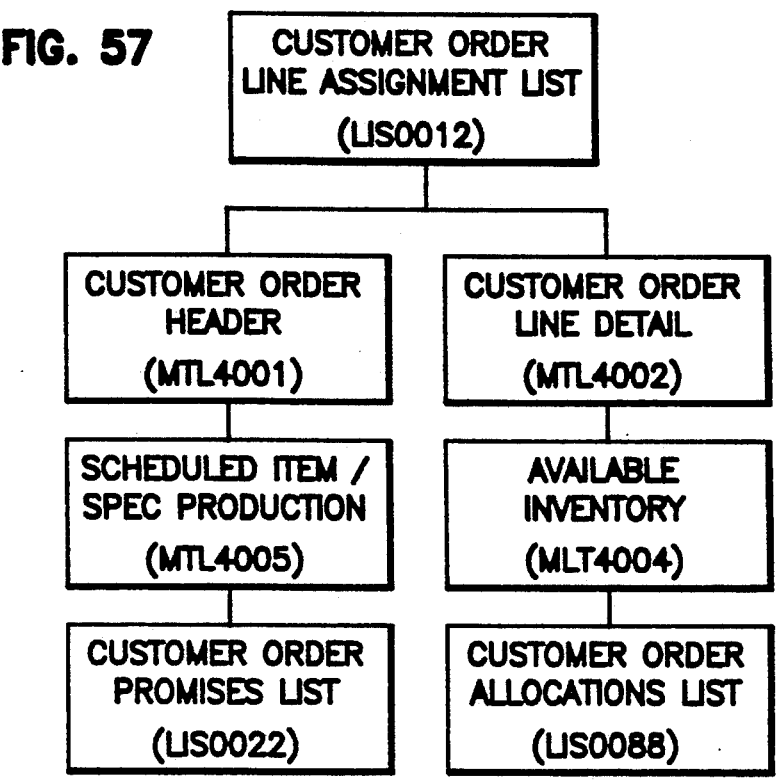
Figure 58:
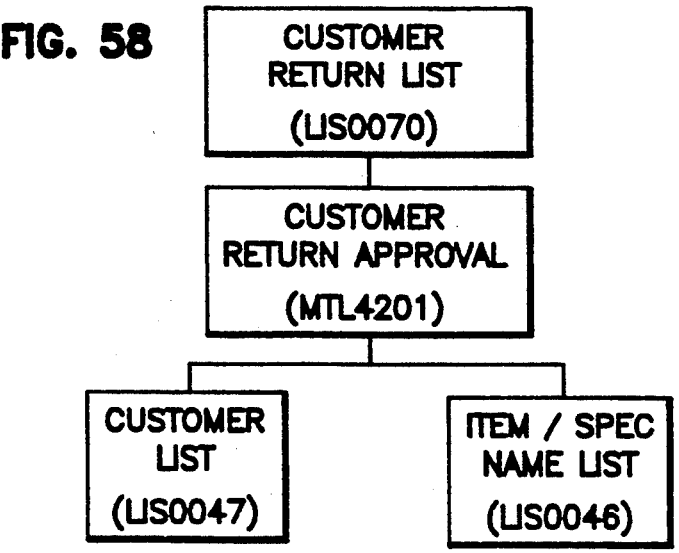
Figure 59:
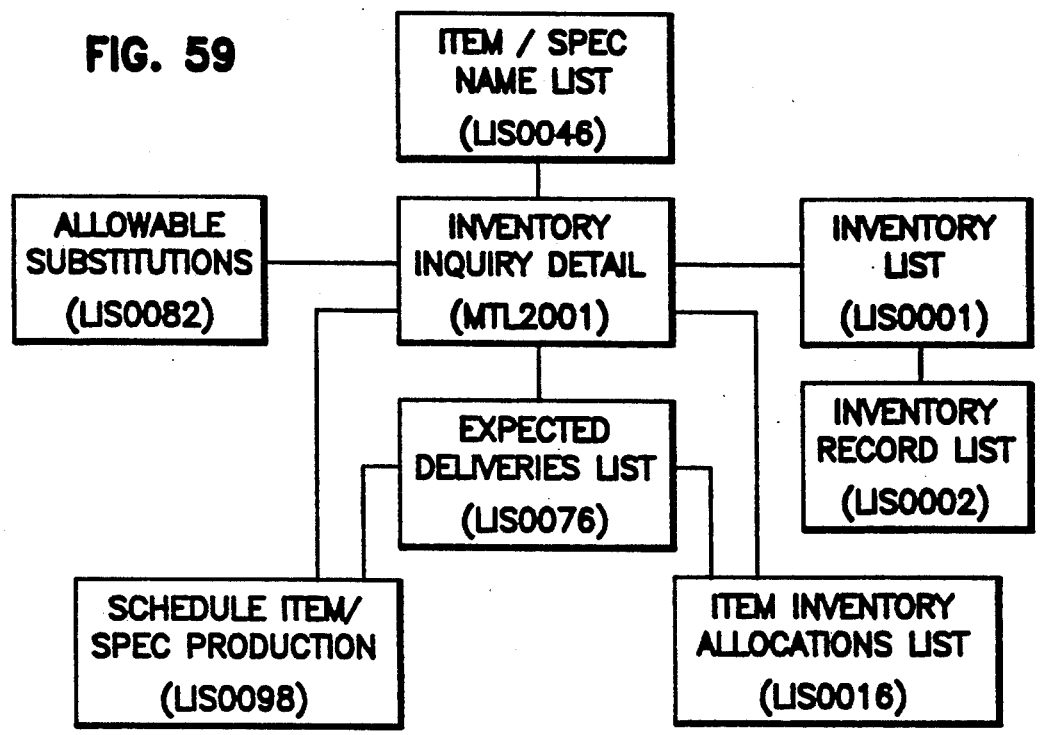
Figure 60:
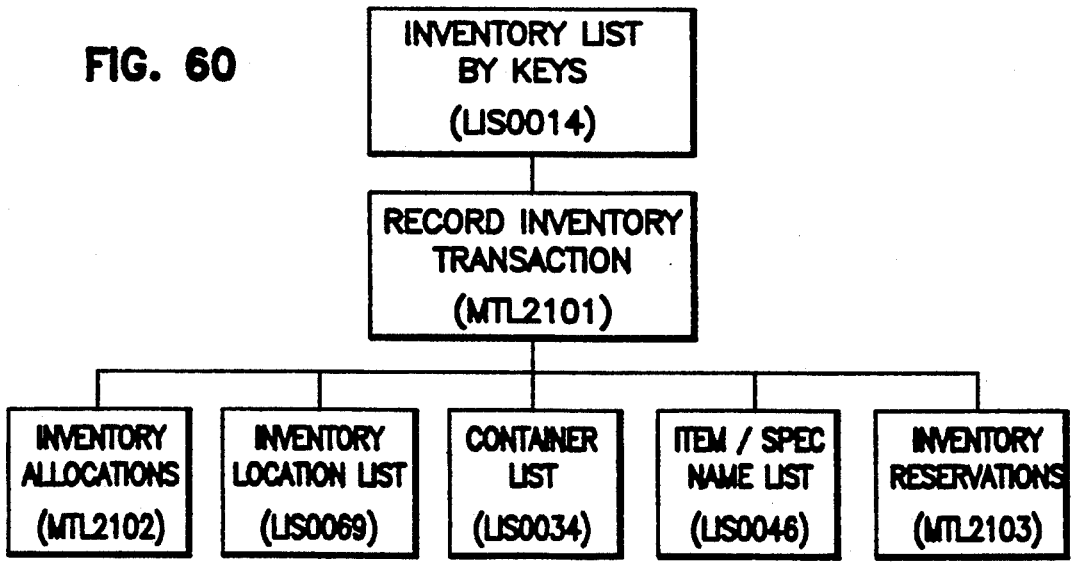
Figure 61:
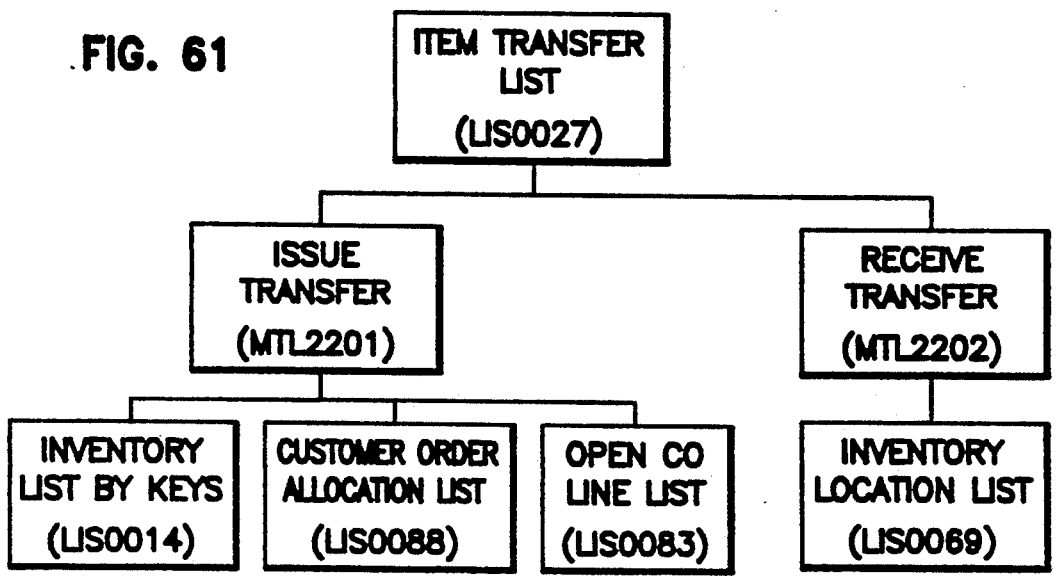
Figure 62:
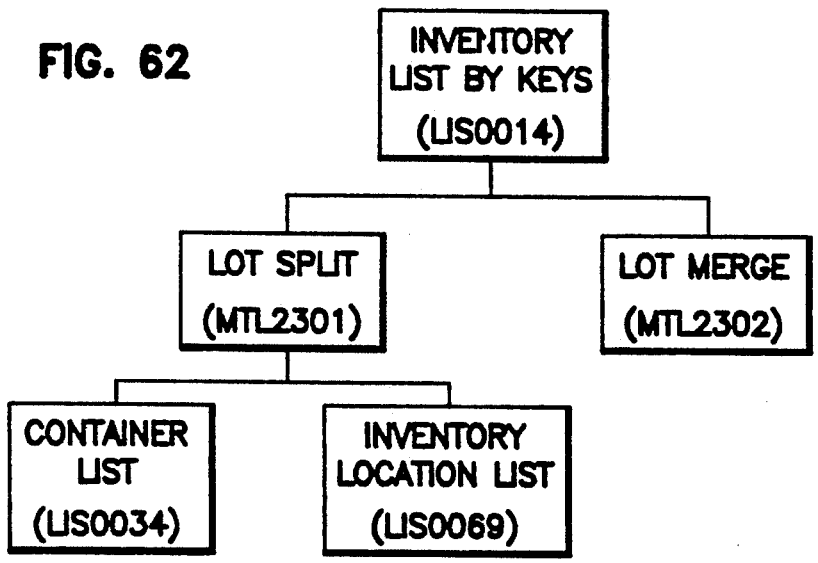
Figure 63:
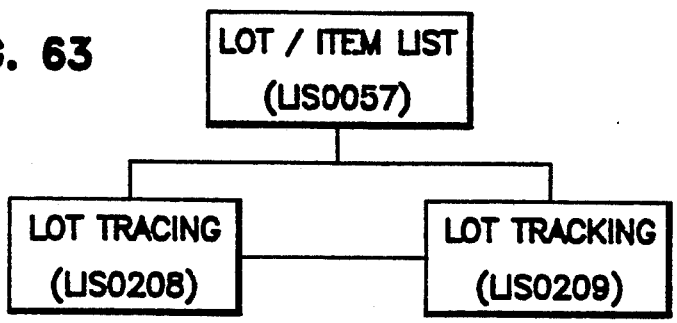
Figure 70:
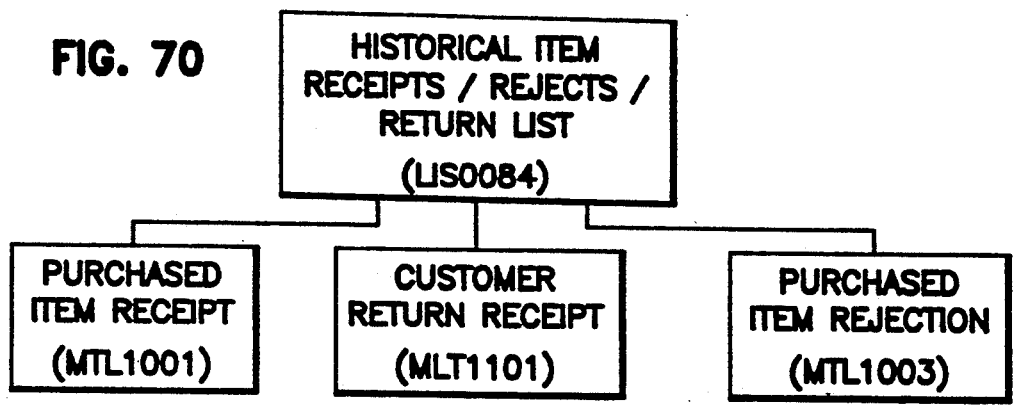
Figure 71:
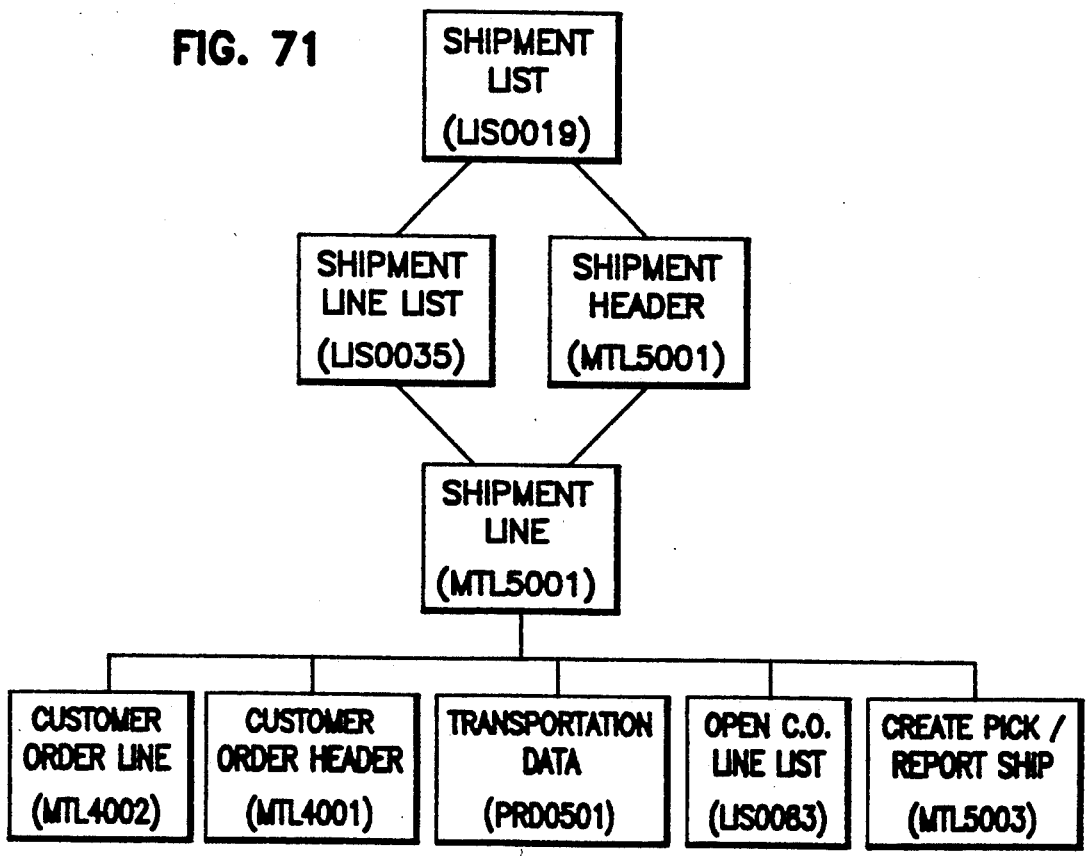
Figures 72, 73, 74:
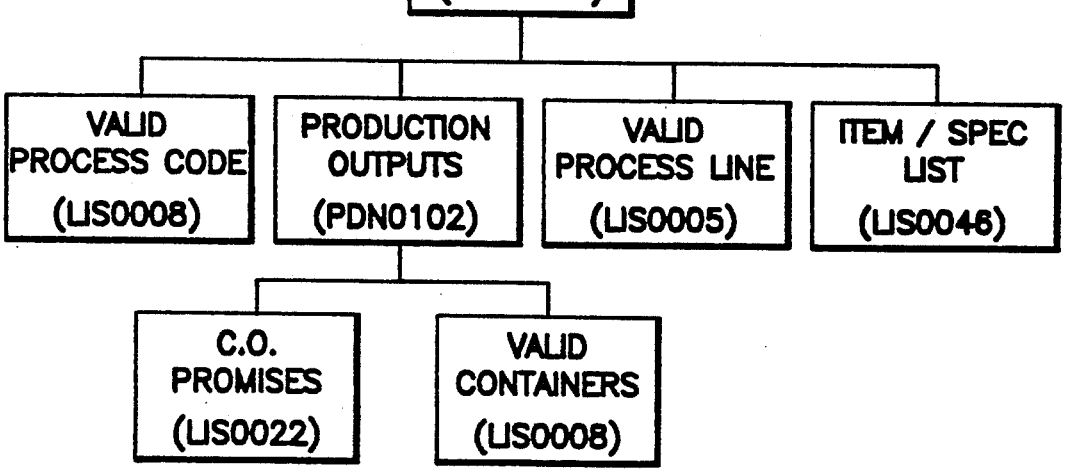
Figure 75:
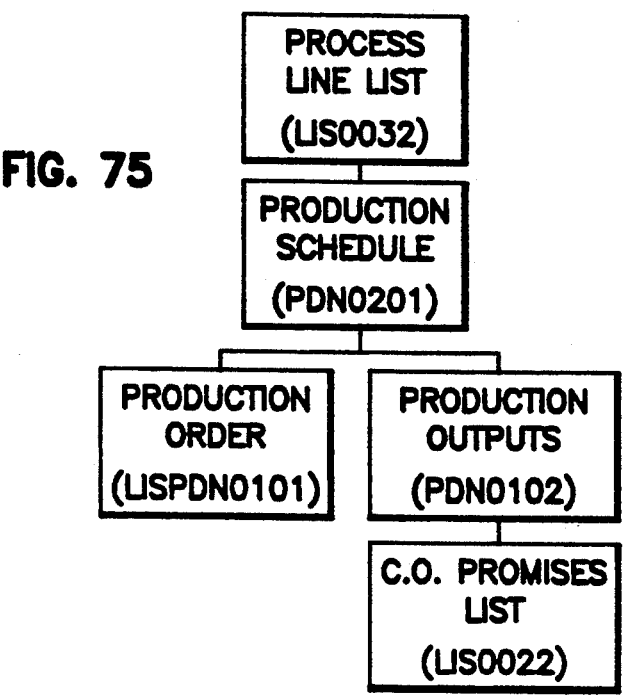
Figure 76:
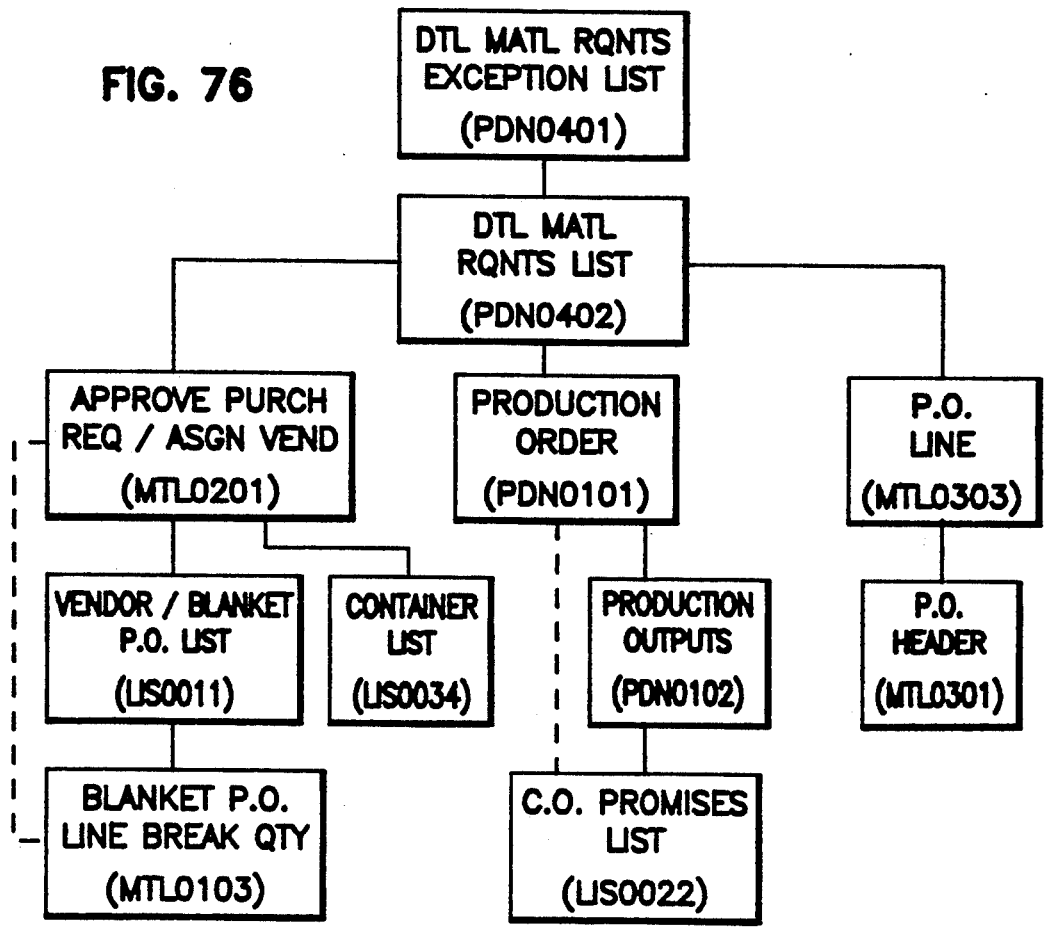
Figure 77:
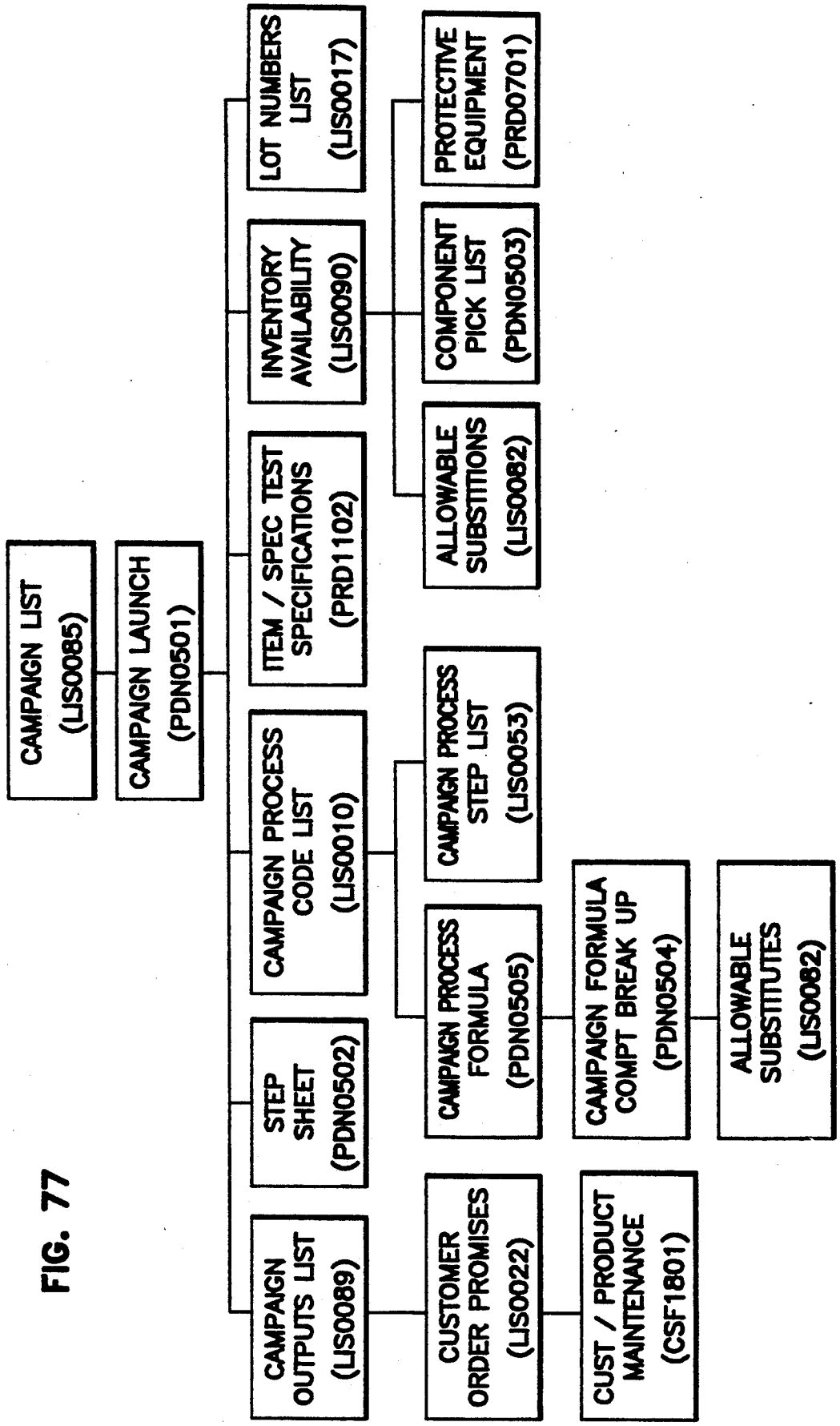
Figure 79:
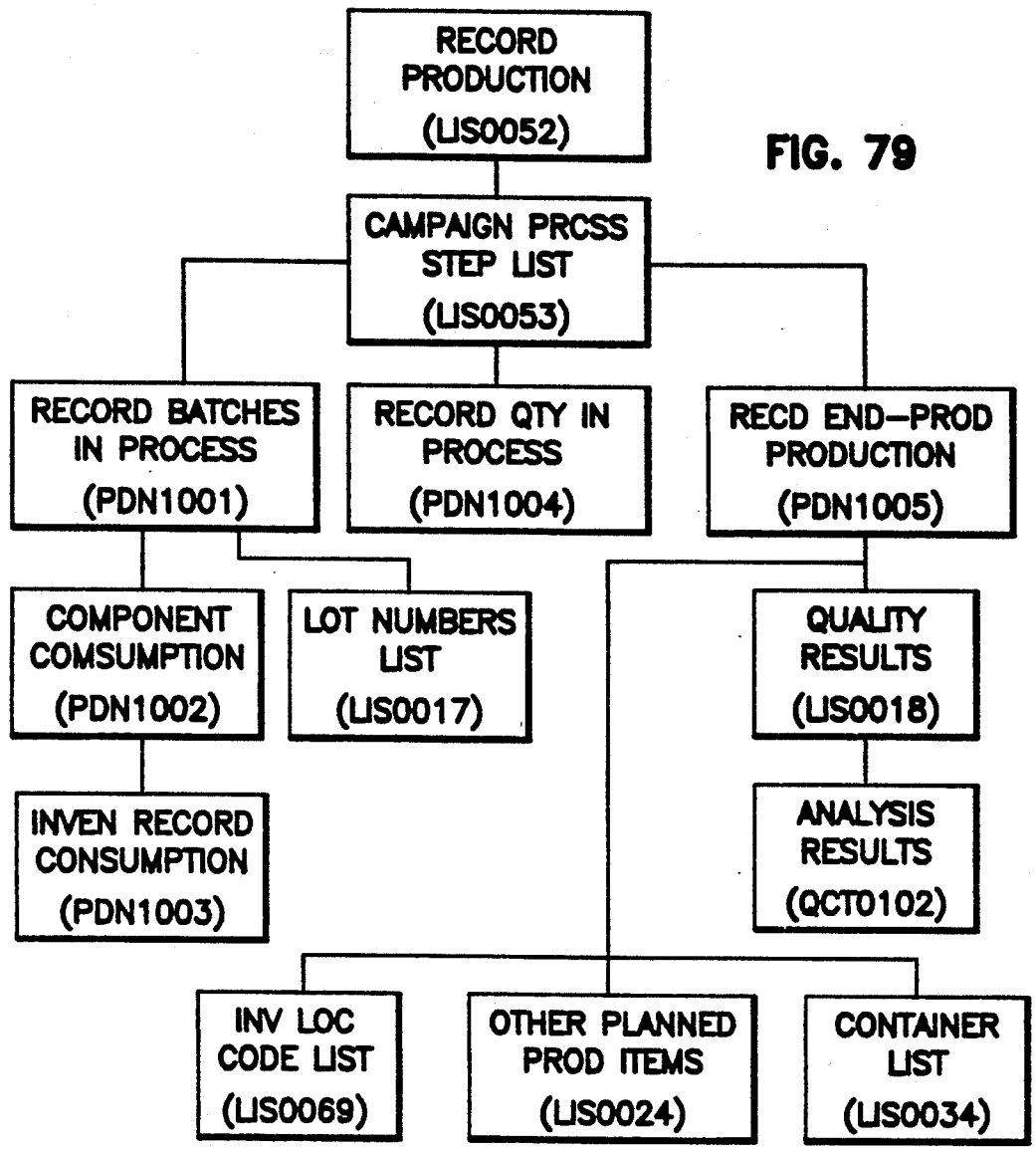
Figure 78:
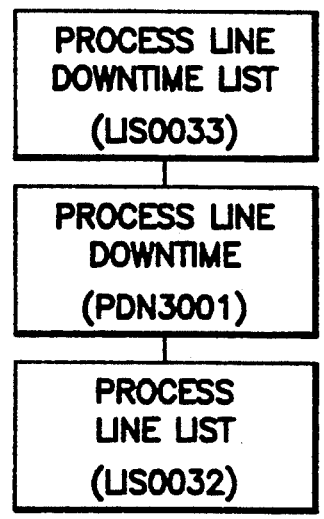
Figure 80:
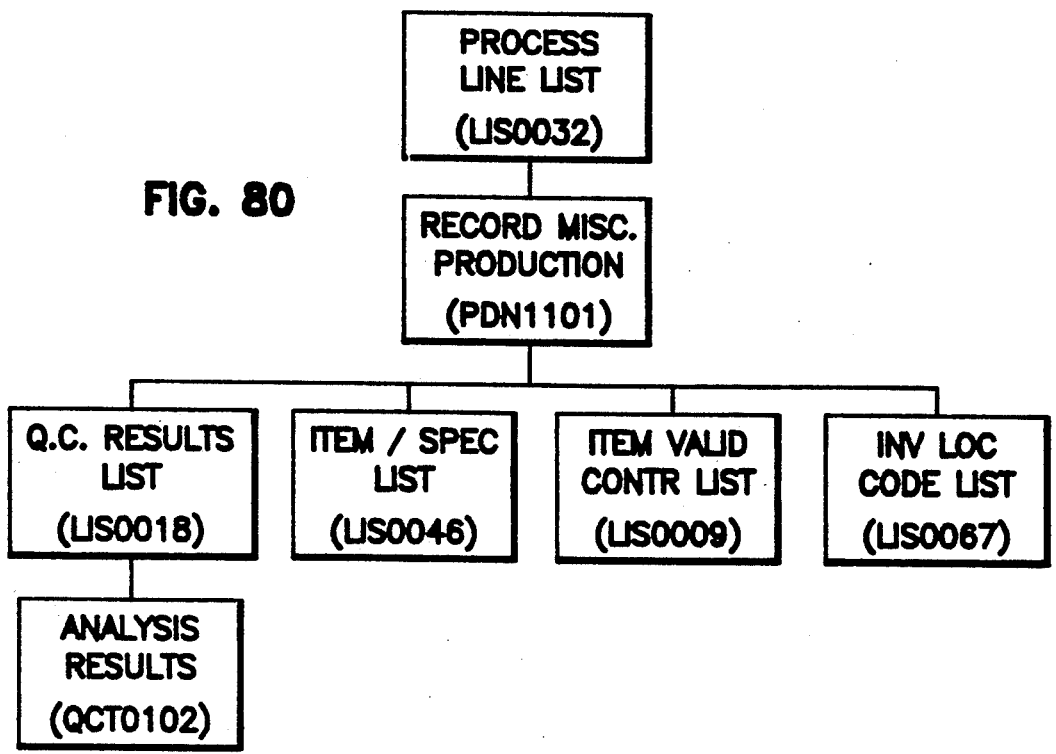
Figure 81:
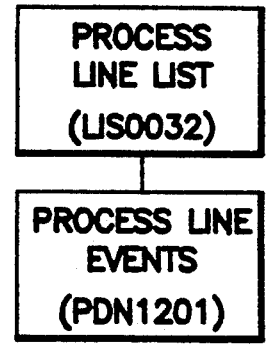
Figure 82:
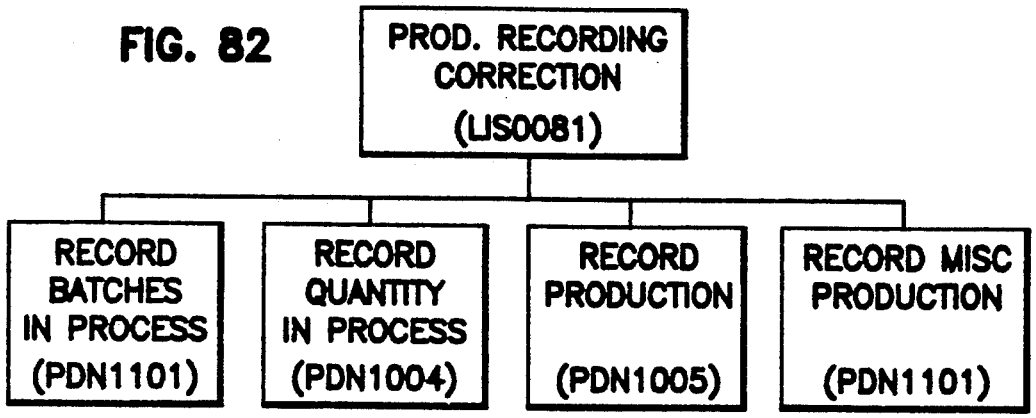
Figure 83:
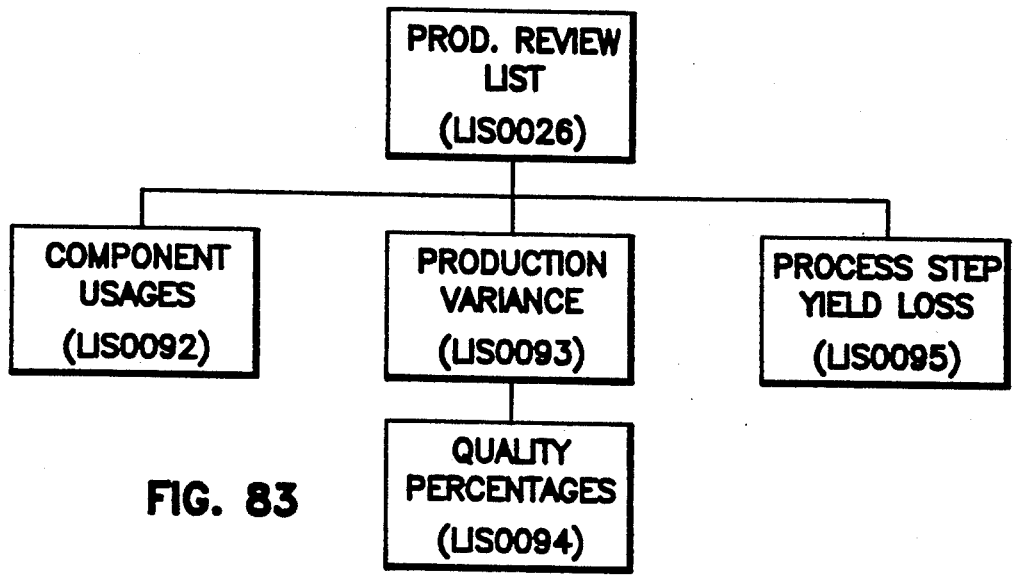
Figure 84:
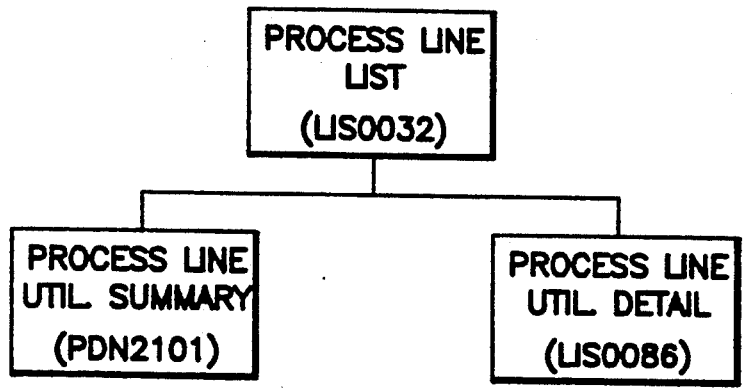
Figure 85A:
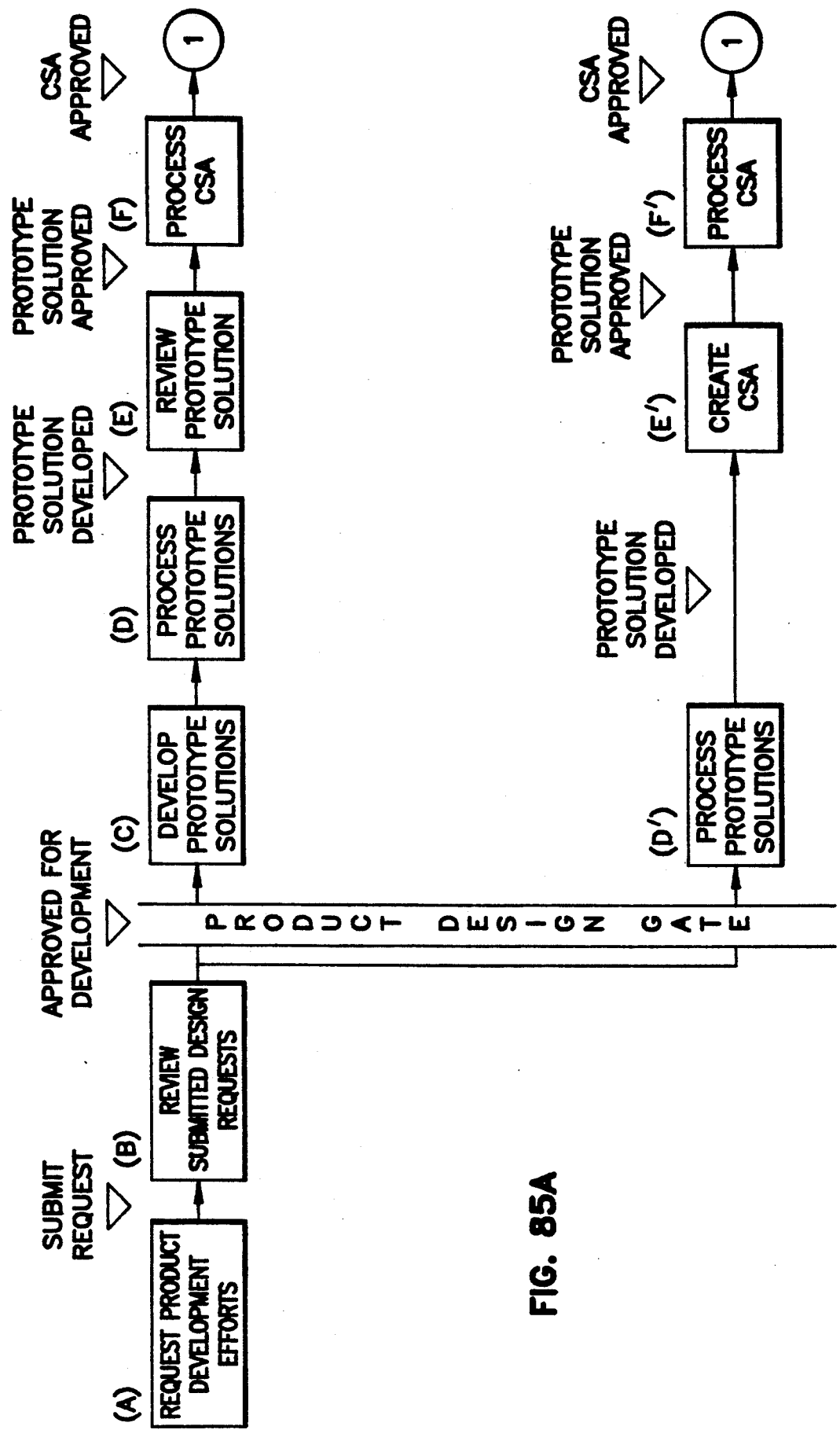
Figure 85B:
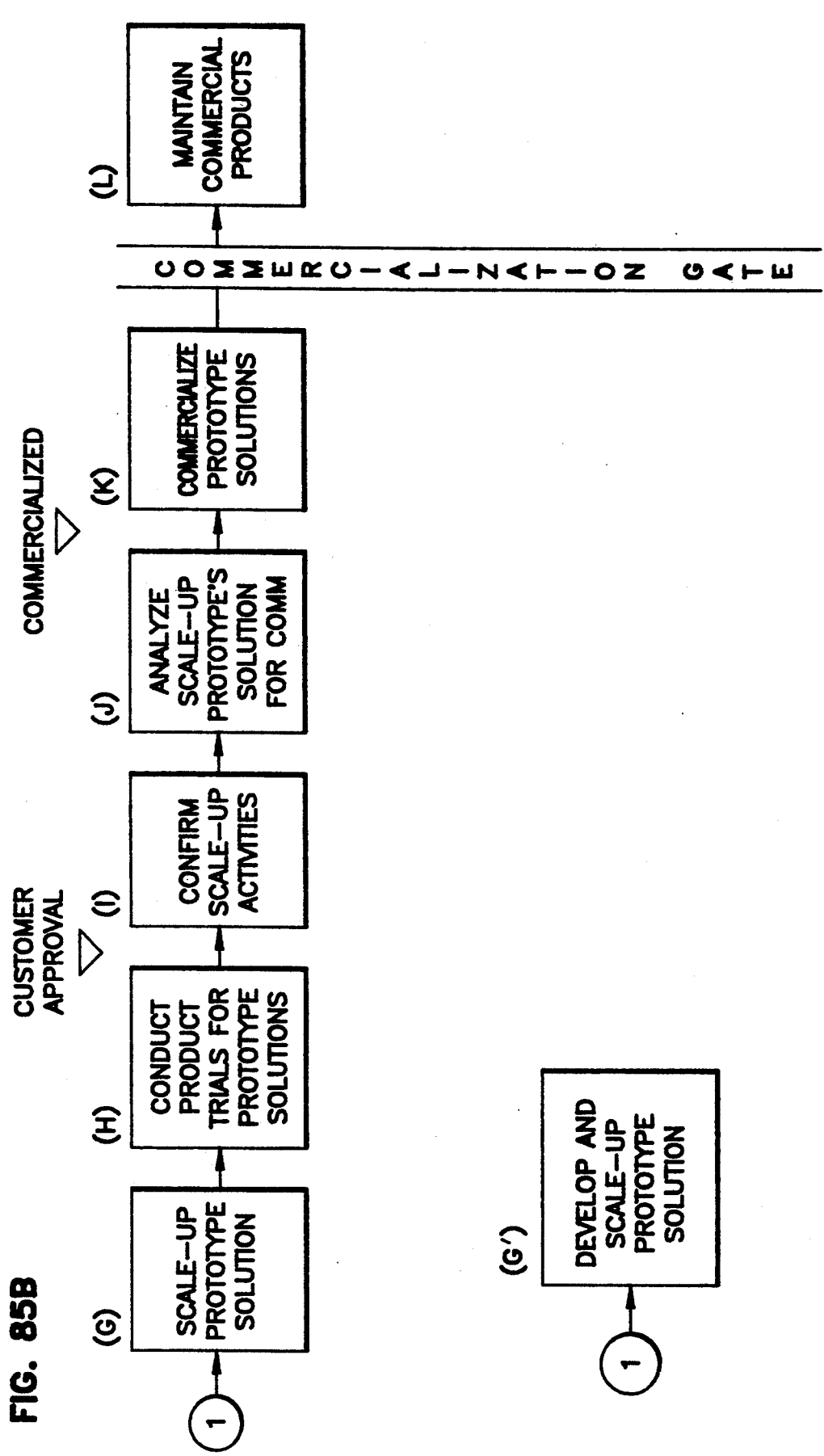
Figure 85C:
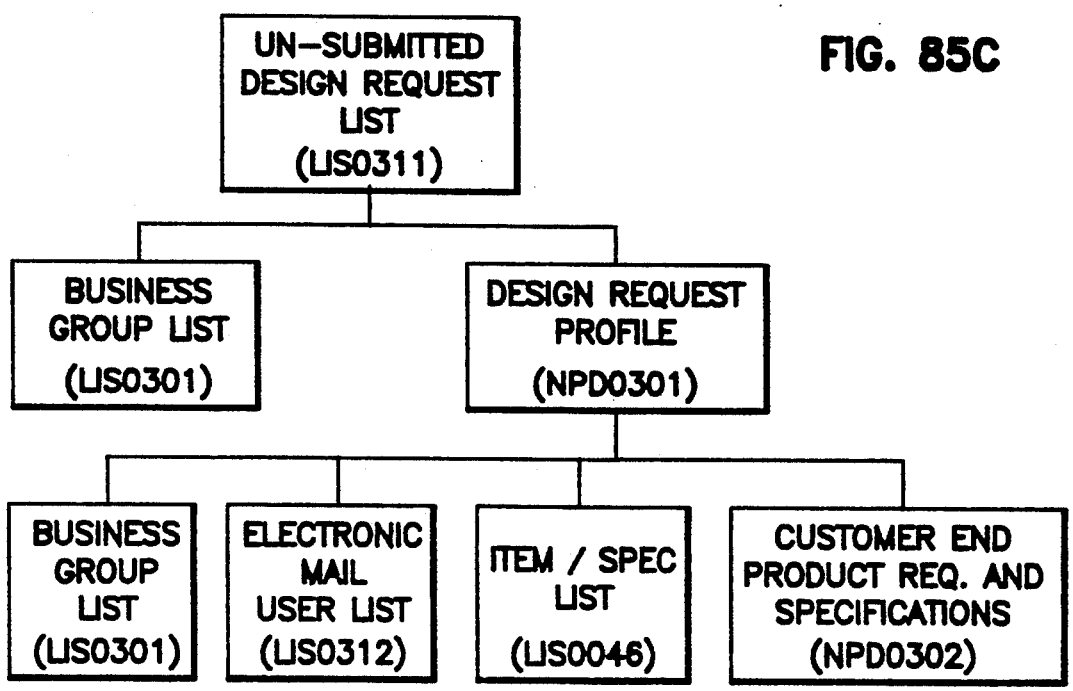
Figure 86:
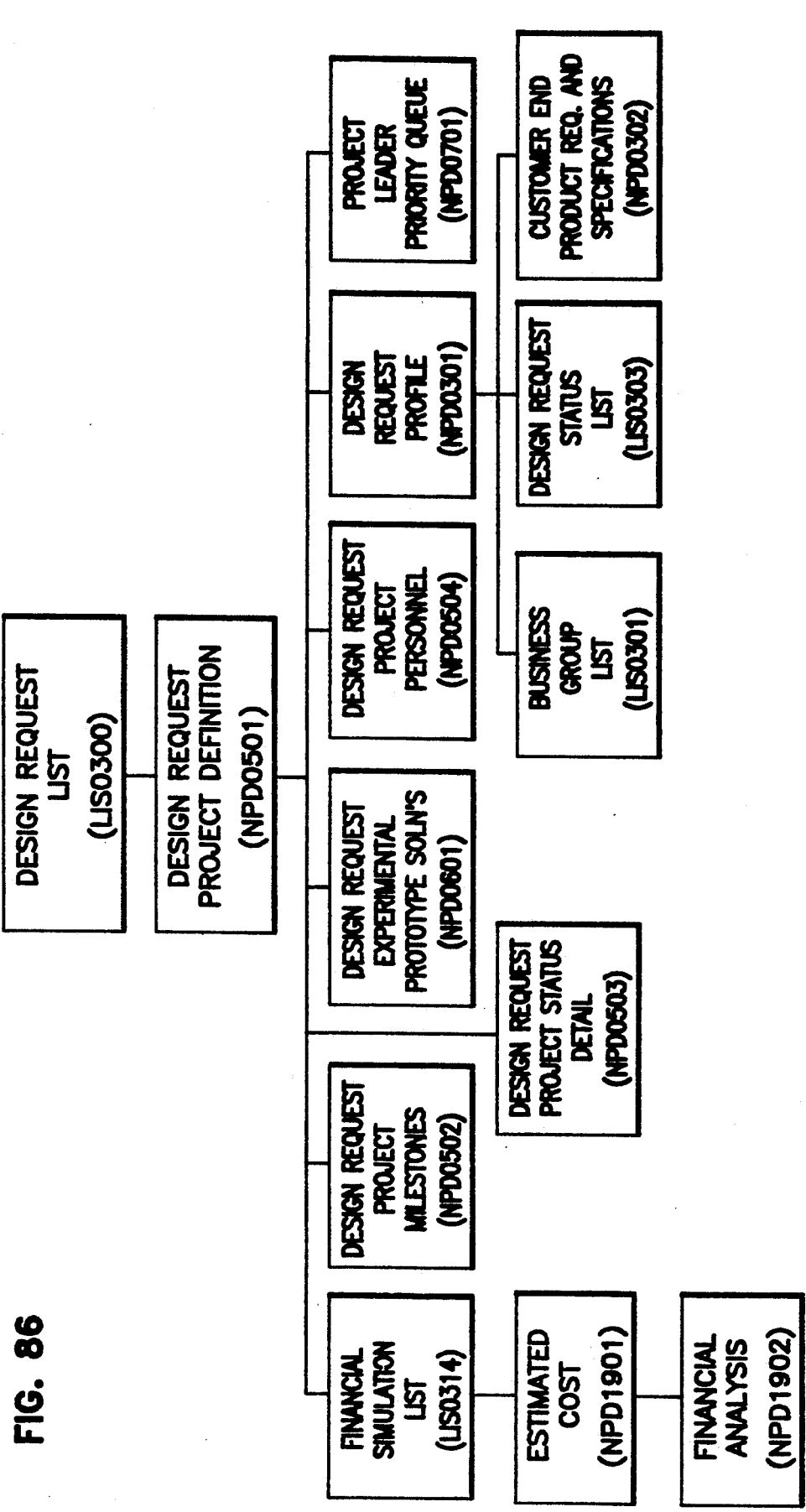
Figure 87:
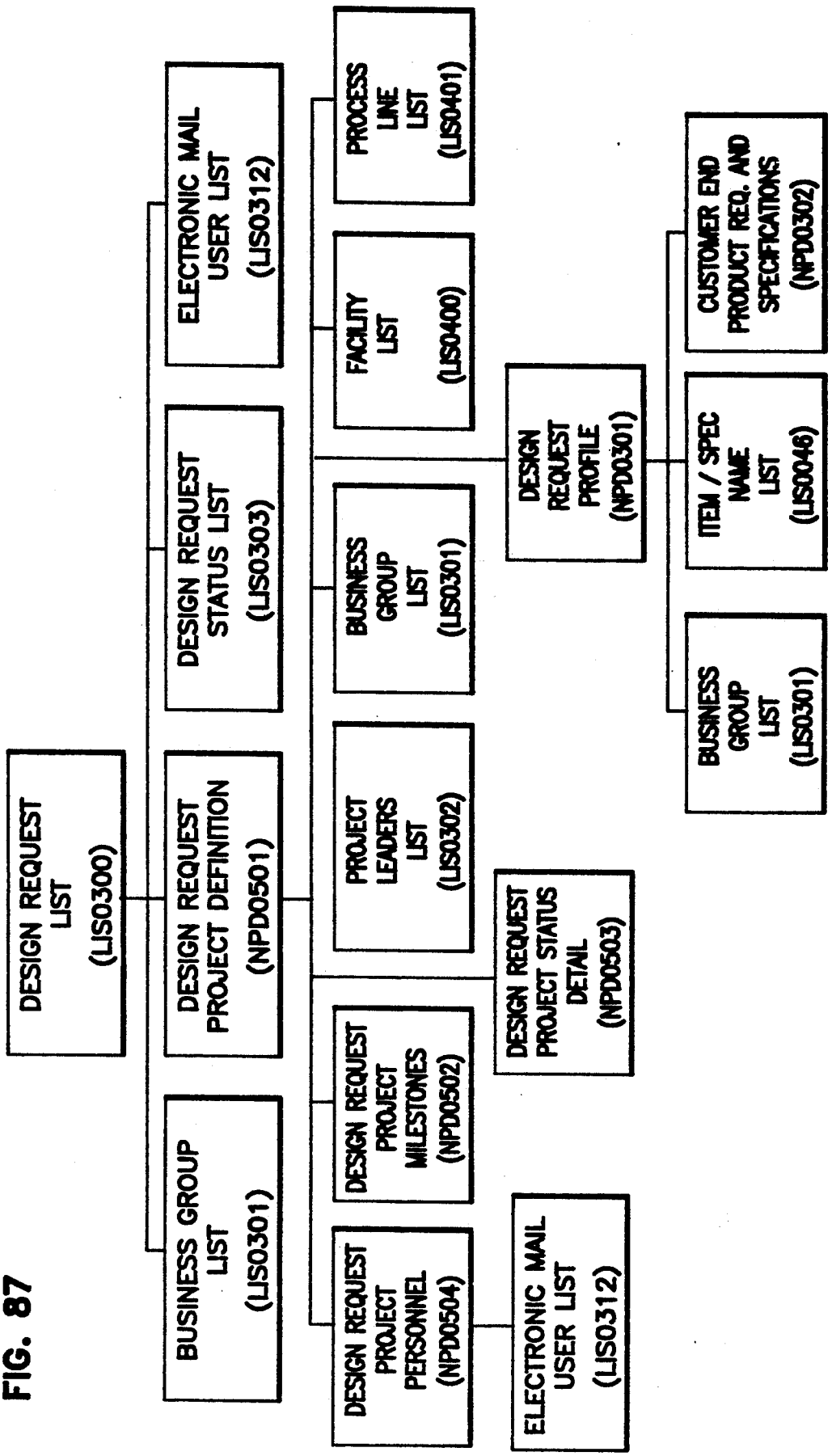
Figure 88:
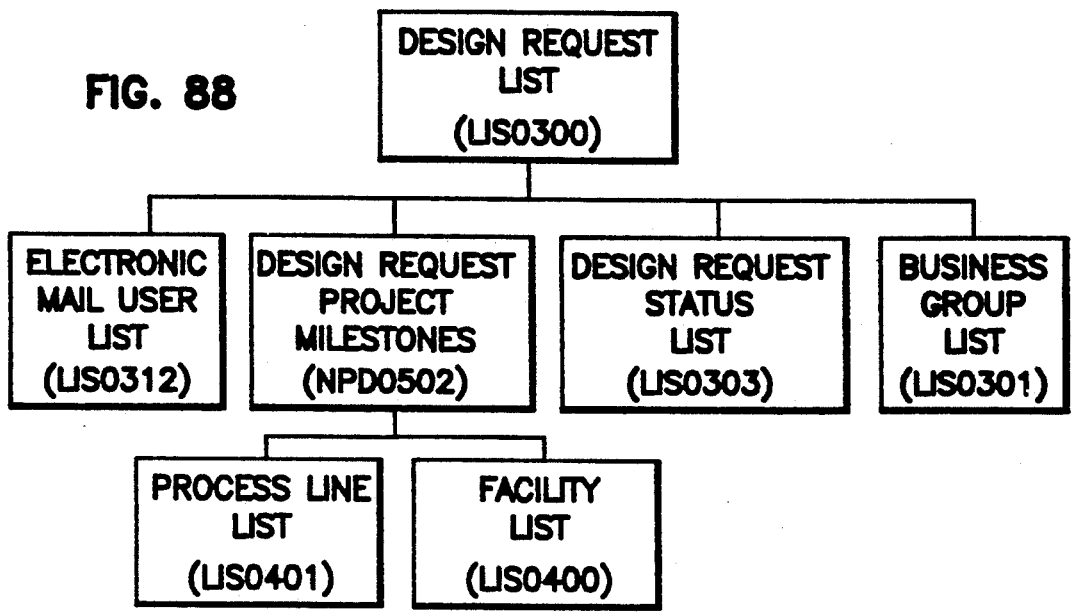
Figure 89:
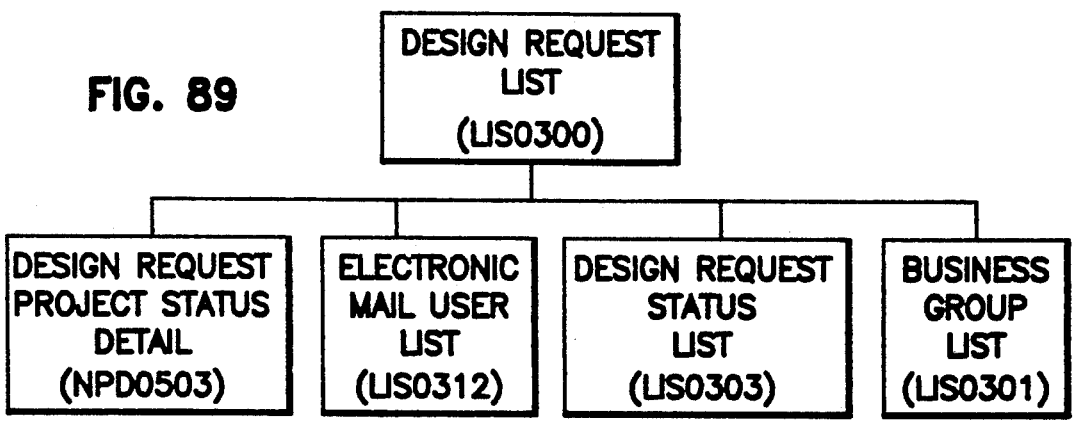
Figure 90:
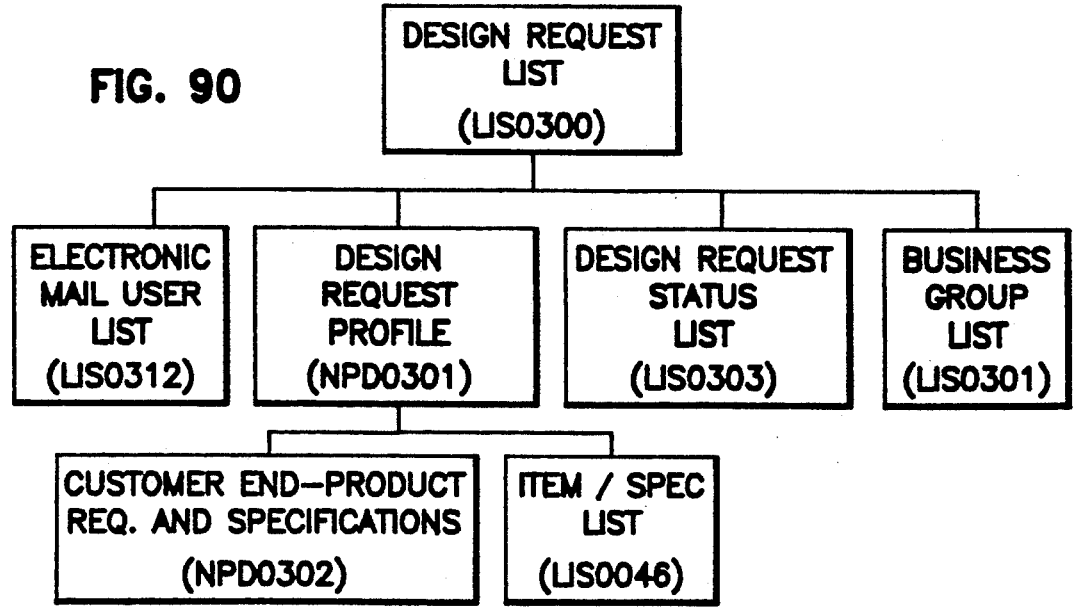
Figure 91:
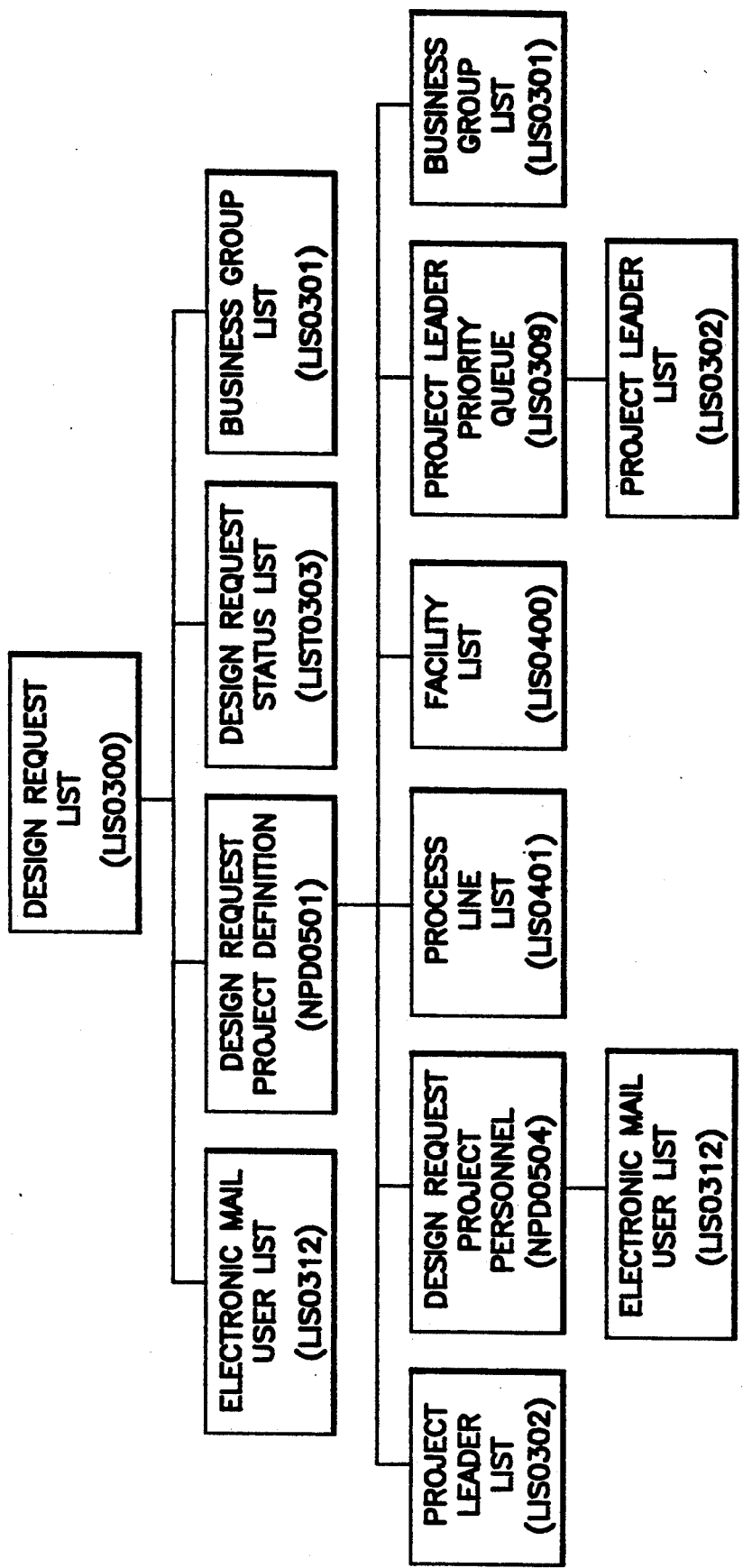
Figure 92:
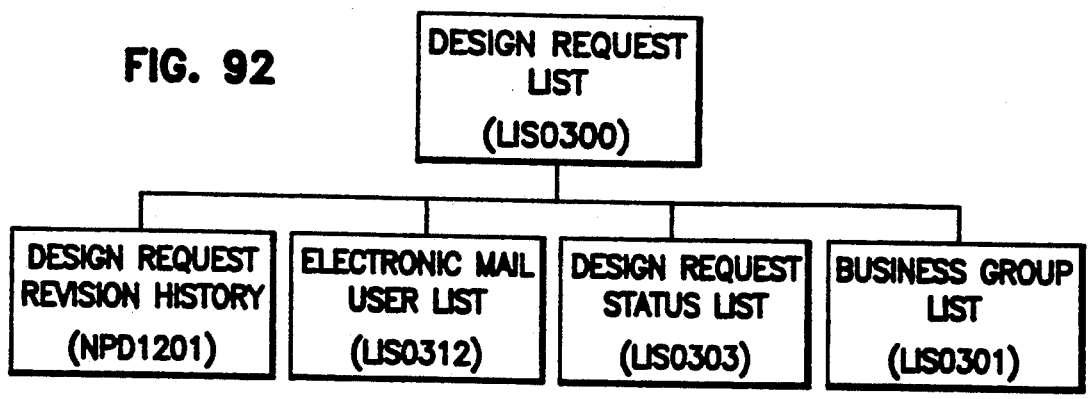
Figure 93:
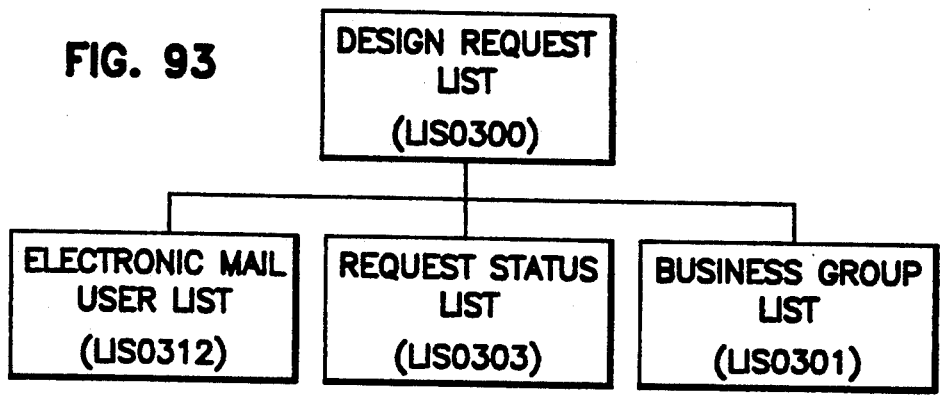
Figure 94:
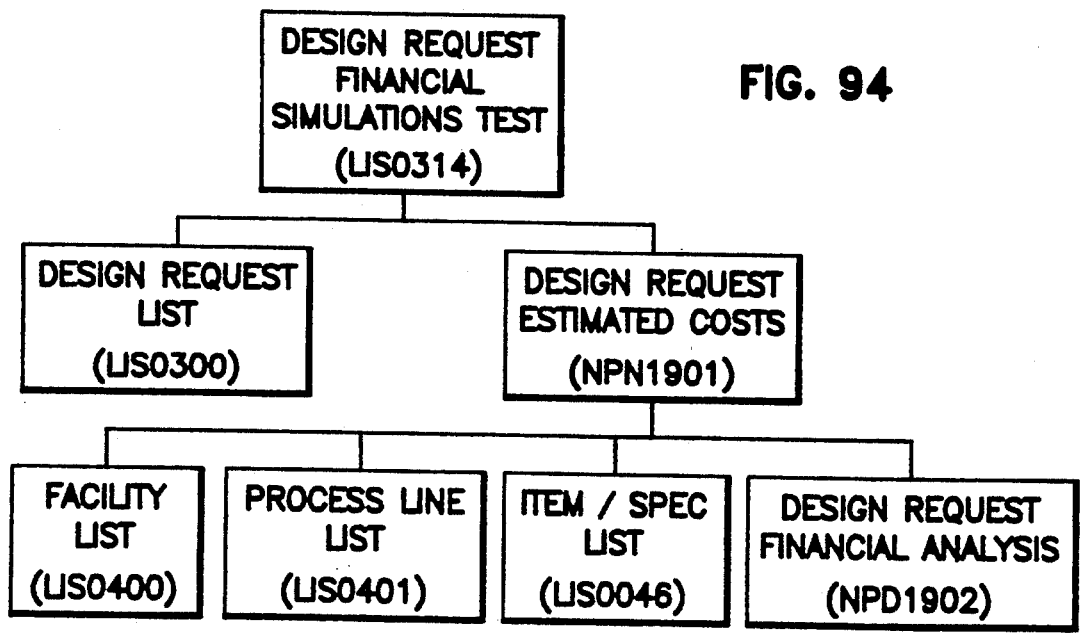
Figure 95:
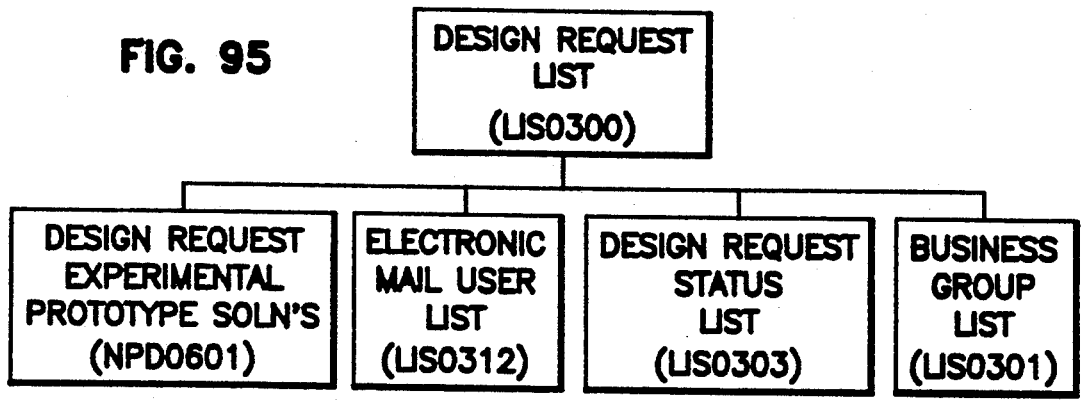
Figure 96:
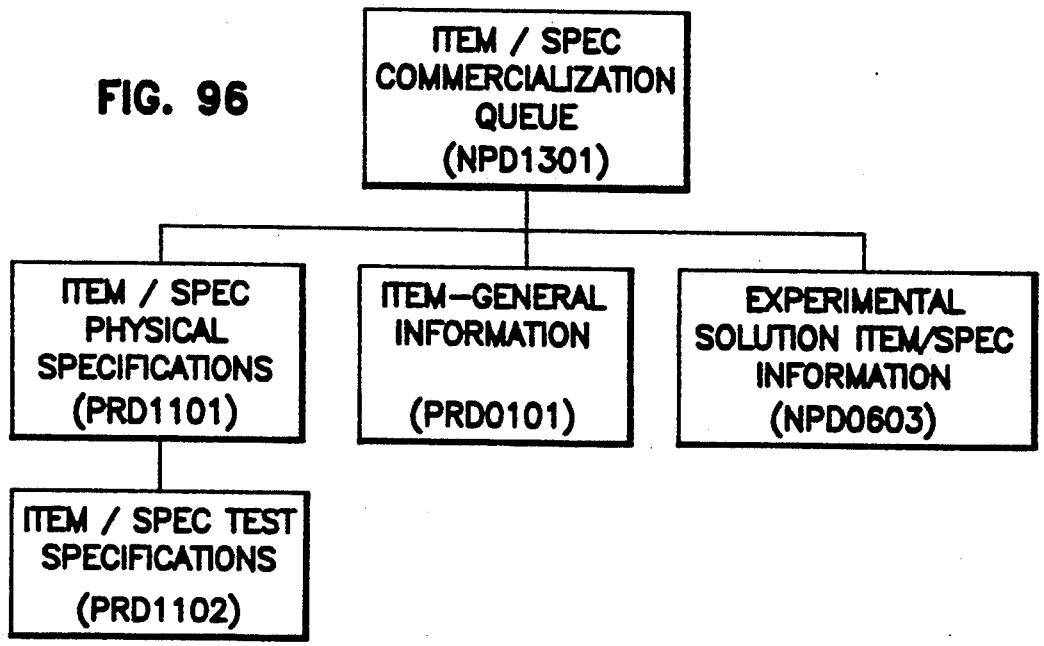
Figure 97:
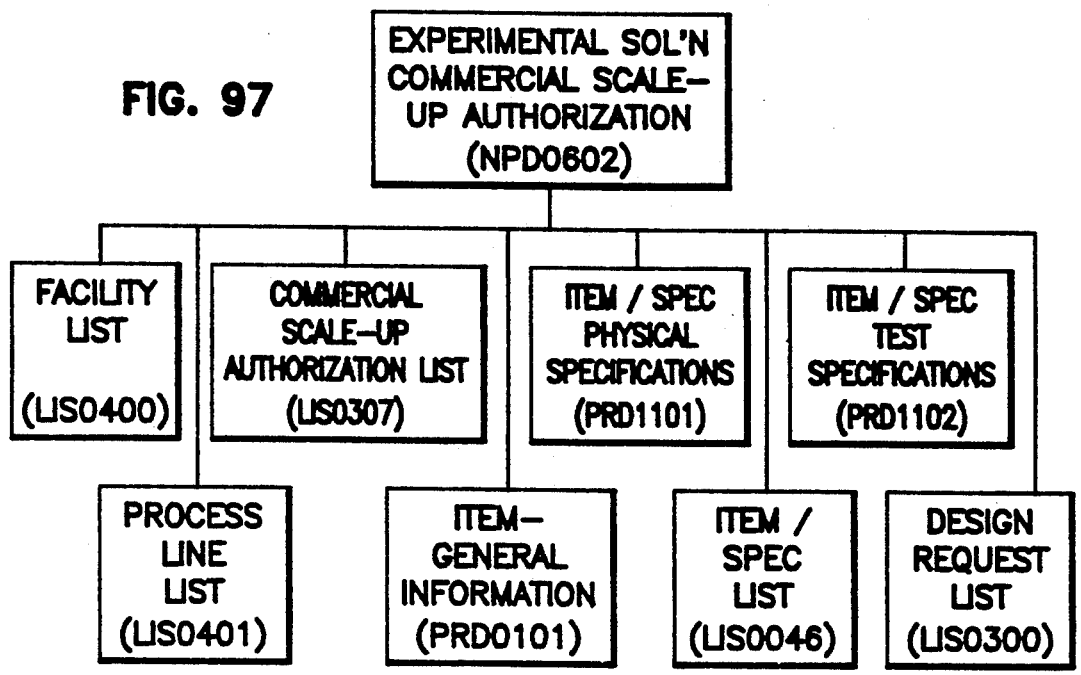
Figure 98:
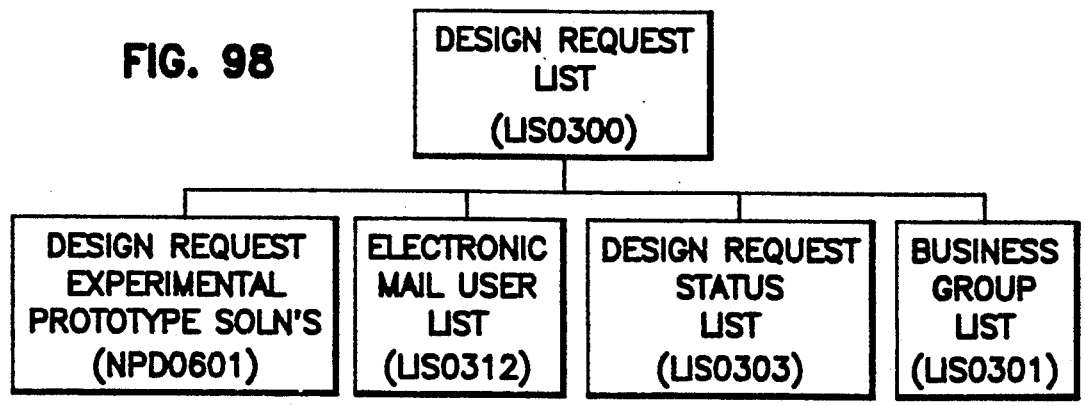
Figure 99:
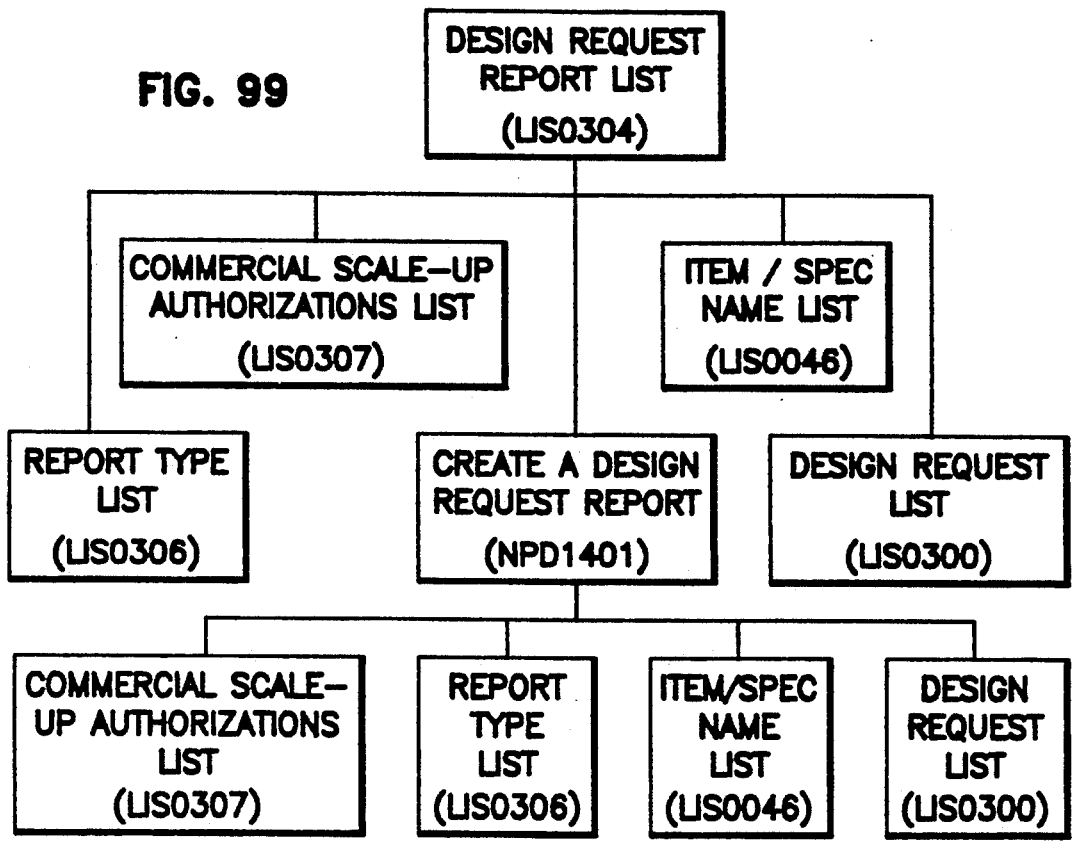
Figure 100:
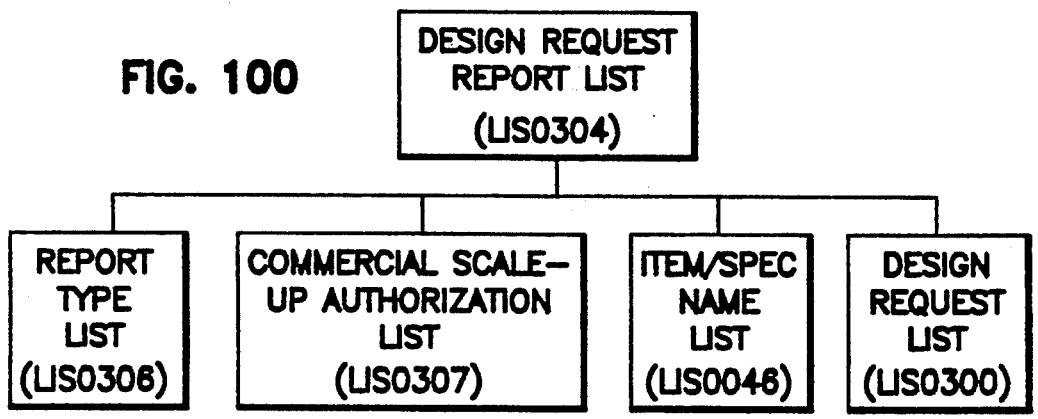
Figure 101:
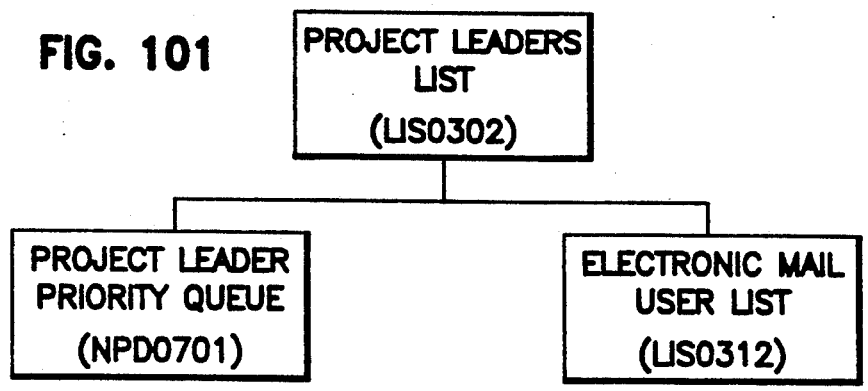
Figure 102:
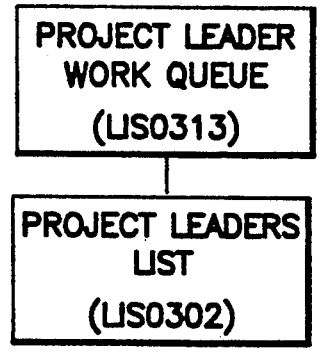
Figure 103:
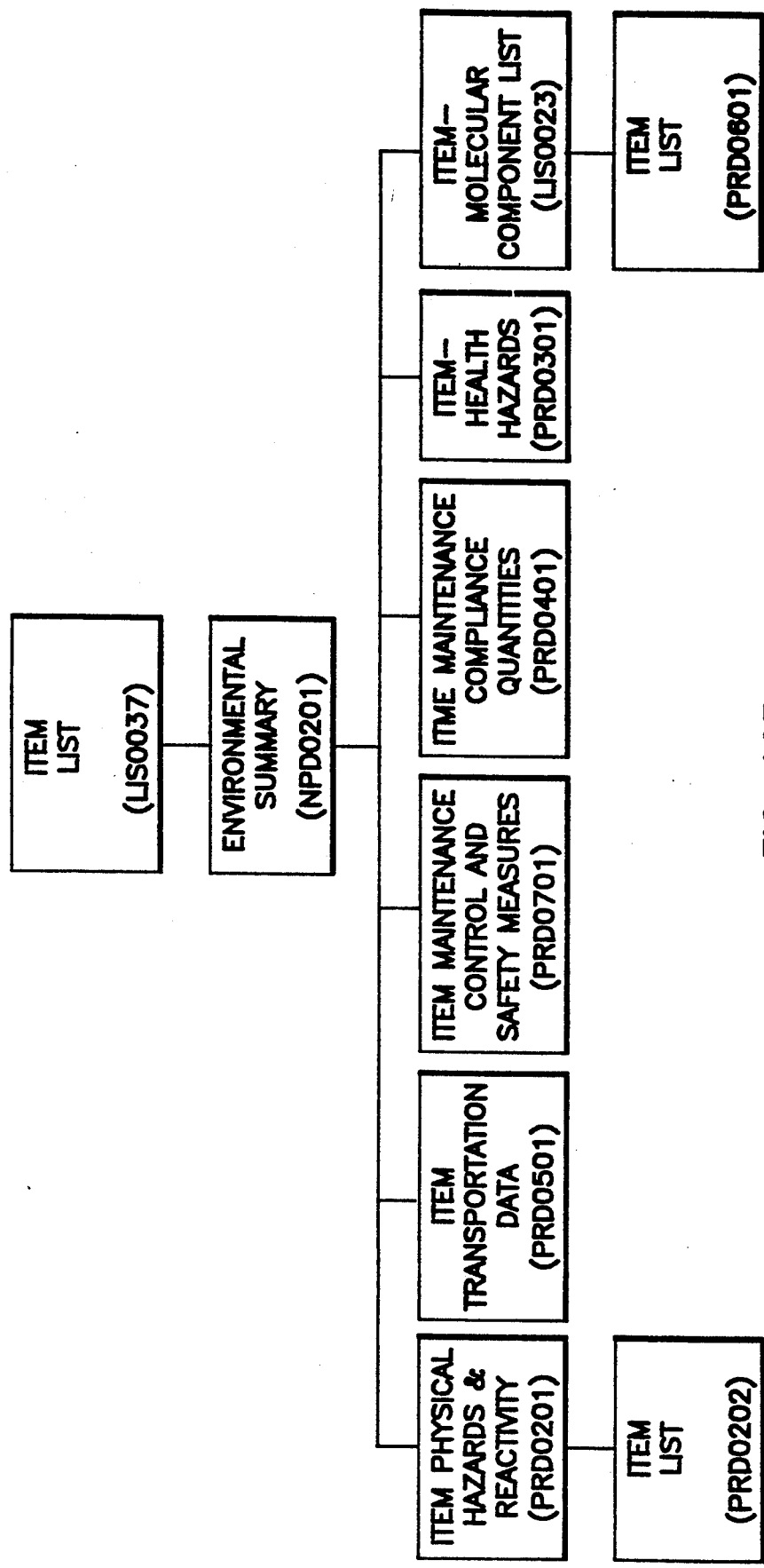
Figure 104:
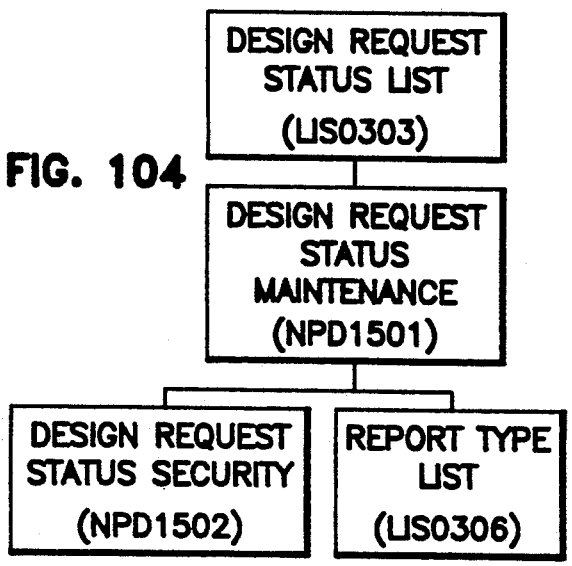
Figure 105:
Figure 106:
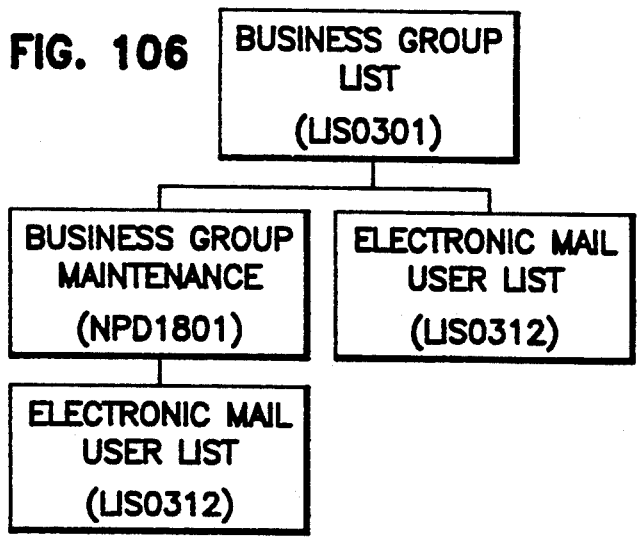
Figure 107:
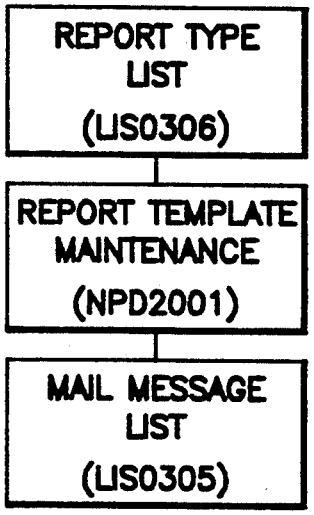
Figure 108:
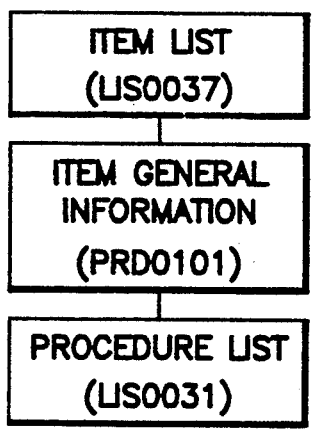

FIG. 23: Procedure Code Where Used (CS25)
FIG. 24: Electronic Mail Message Maintenance (CS26)
Product Relationship (CSPR)
FIG. 25: Customer/Item/Spec Maintenance (CS18)
FIG. 26: Item/Spec/Vendor Maintenance (CS21)
ENVIRONMENTAL MODULE (PSEN)
EHST Setup (ENES)
FIG. 27: Job Type Maintenance (EN20)
FIG. 28: Environmental Location Maintenance (EN21)
FIG. 29: Physical Agent Maintenance (EN22)
Compliance Quantities (ENCQ)
FIG. 30: CQ Inquiry (EN10)
FIG. 31: CQ Source Maintenance (EN11)
Release Management (ENRM)
FIG. 32: Unplanned Release Maintenance (EN03)
FIG. 33: Agency Notification Maintenance (EN05)
Waste Management (ENWM)
FIG. 34: Waste Shipping Request Maintenance (EN07)
FIG. 35: Waste Profile Maintenance (EN09)
FIG. 36: Biennial Summary Maintenance (EN14)
Employee Exposures (ENEE)
FIG. 37: Employee Job/Location Maintenance (EN16)
FIG. 38: Job/Location Exposure Maintenance (EN17)
FIG. 39: Employee Exposure Inquiry (EN18)
FIG. 40: Item Exposure Maintenance (EN19)
HEALTH MODULE (PSHL)
FIG. 41 illustrates the employee-exposure relationship and how a preferred system links employees with required training and medical exams.
Medical Surveillance (HLMS)
FIG. 42: Medical Exam Maintenance (HL01)
FIG. 43: Employee Exam Maintenance (HL02)
FIG. 44: Exam Schedule Maintenance (HL03)
FIG. 45: Medical Result Maintenance (HL08)
FIG. 46: Employee Work Restriction Maintenance (HL09)
FIG. 47: Dispensary Visit Maintenance (HL10)
FIG. 48: Incident Maintenance (FT04)
FIG. 49: Safety Statistics Maintenance (FT05)
FIG. 50: Occupational Illness and Injury Incidents Maintenance (FT06)
Training (TR)
FIG. 51: Training Course Maintenance (TR01)
MATERIALS MANAGEMENT MODULE (PSMM)
Purchasing (MMPR)
FIG. 52: Blanket Purchase Order Maintenance (MM01)
FIG. 53: Purchase Requisition Maintenance (MM02)
FIG. 54: Purchase Order Maintenance (MM03)
FIG. 55: Vendor Return Maintenance (MM04)
Customer Orders (MMCO)
FIG. 56: Customer Order Maintenance (MM40)
FIG. 57: Customer Order Line Assignment (MM41)
FIG. 58: Customer Return Maintenance (MM42)
Inventory (MMIN)
FIG. 59: Inventory Inquiry (MM20)
FIG. 60: Record Inventory Transaction (MM21)
FIG. 61: Item Transfer (MM22)
FIG. 62: Record Lot Split and Merge (MM23)
FIG. 63: Item Lot Tracking and Tracing (MM24)
FIG. 64: Browse Inventory Transaction (MM25)
FIG. 65: Cycle Count Class Assignments (MM30)
FIG. 66: Cycle Count Results (MM31)
FIG. 67: Cycle Count Schedule Maintenance (MM32)
Receiving (MMRC)
FIG. 68: Purchased Item Receipt/Rejection (MM10)
FIG. 69: Customer Return Receipt (MM11)
FIG. 70: Historical Receipts/Corrections (MM13)
Shipping (MMSP)
FIG. 71: Customer Shipment Maintenance (MM50)
FIG. 72: Waste Shipment Maintenance (MM52)
FIG. 73: Report Shipment Pick List (MM53)
PRODUCTION MANAGEMENT MODULE (PSPM)
Production Planning (PMPP)
FIG. 74: Production Order Maintenance (PM01)
FIG. 75: Production Scheduling (PM02)
FIG. 76: Detail Production Resource Netting (PM04)
FIG. 77: Campaign Launch (PM05)
FIG. 78: Process Line Downtime Maintenance (PM30)
Production Execution (PMPE)
FIG. 79: Record Production Results (PM10)
FIG. 80: Record Miscellaneous Production (PM11)
FIG. 81: Record Process Line Events (PM12)
FIG. 82: Correct Production Recording (PM13)
Production History (PMPH)
FIG. 83: Production Statistics (PM20)
FIG. 84: Process Line Utilization (PM21)
NEW PRODUCT DEVELOPMENT MODULE (PSPD)
FIGS. 85A–85B are an example of a customized new product development pipeline that may be constructed by a New Product Development module. Design Request (PDDR)
FIG. 85C: Create/Submit A Request (PD03)
FIG. 86: Browse A Request (PD04)
Request Maintenance (DRMN)
FIG. 87: Update A Request (PD05)
FIG. 88: Project Milestones (PD08)
FIG. 89: Request Status (PD09)
FIG. 90: Maintain Profile (PD10)
FIG. 91: Maintain Definition (PD11)
FIG. 92: Revision History (PD12)
FIG. 93: Design Request Comments (PD17)
FIG. 94: Financial Analysis (PD19)
Experimental Solutions (DRES)
FIG. 95: Experimental Solutions (PD06)
FIG. 96: Commercialize Queue (PD13)
FIG. 97: Commercial Scale Up (PD21)
FIG. 98: Commercialize P-Types (PD22)
Request Custom Reports (DDRP)
FIG. 99: Design Request Reports (PD14)
FIG. 100: Browse Design Request Reports (PD24)
Work Queue Management (DRWQ)
FIG. 101: Priority Detail (PD07)
FIG. 102: Project Leader Work Queue (PD23)
Raw Materials (PDRM)
FIG. 103: Environmental Summary (PD02)
Parameter Maintenance (PDPM)
FIG. 104: Status Maintenance (PD15)
FIG. 105: Design Category Maintenance (PD16)
FIG. 106: Business Group Maintenance (PD18)
FIG. 107: Report Template Maintenance (PD20)
PRODUCT MANAGEMENT MODULE (PSPR)
Item Maintenance (PRIM)
FIG. 108: Item Maintenance—General Information (PR01)

Figure 109:
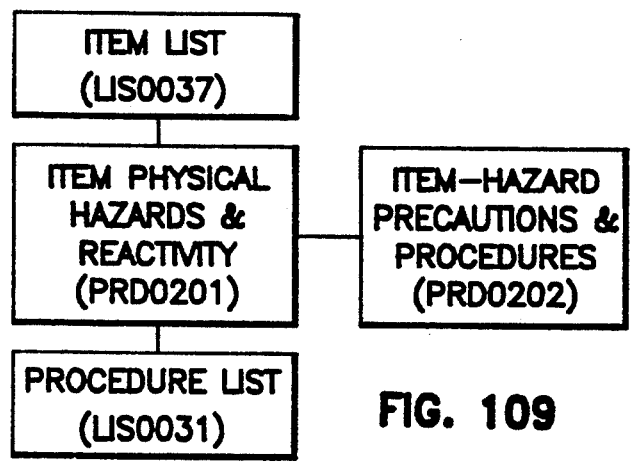
Figure 110:
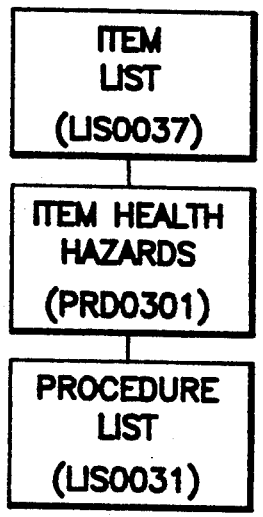
Figure 111:
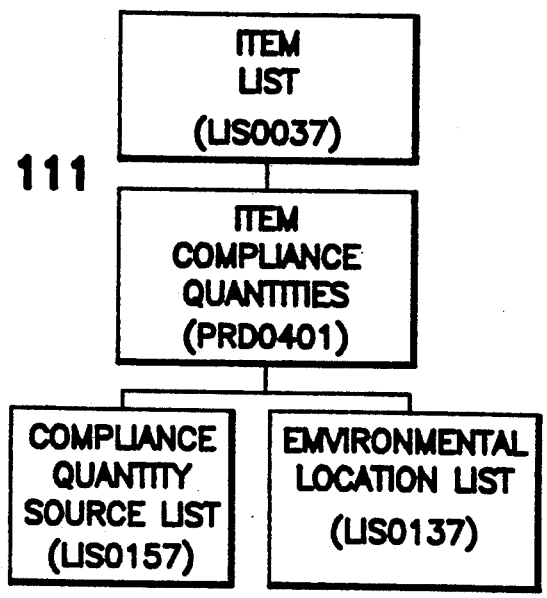
Figure 112:
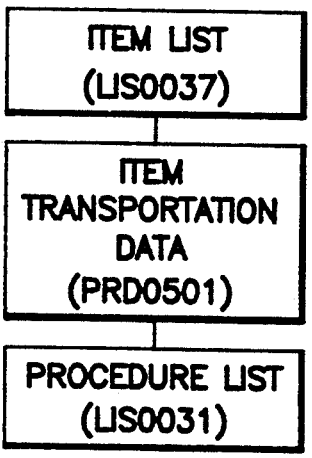
Figure 113:
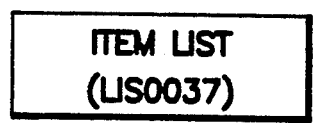
Figure 114:
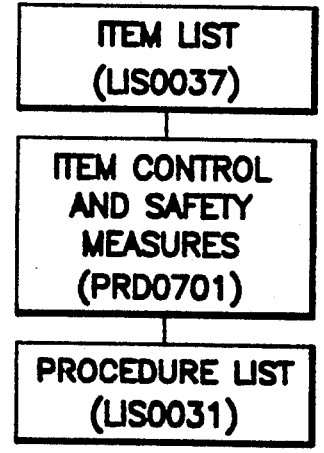
Figure 115:
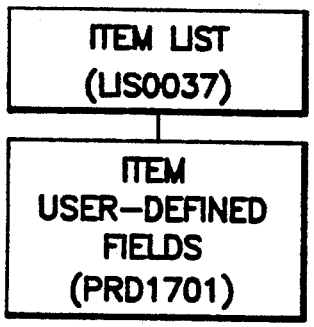
Figure 116:
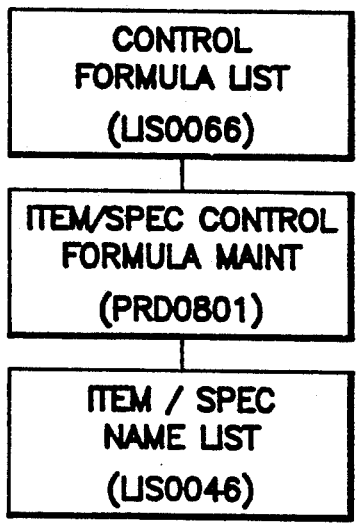
Figure 117:
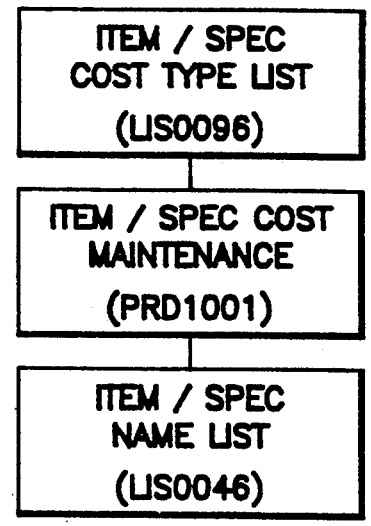
Figure 118:
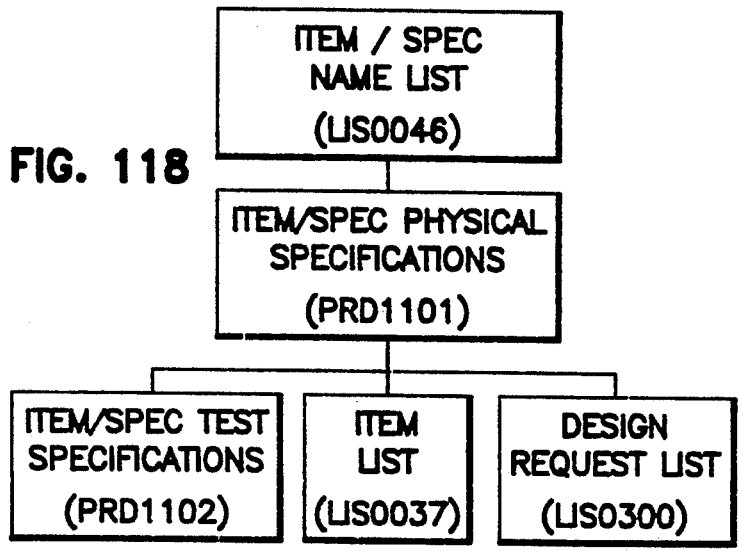
Figure 119:
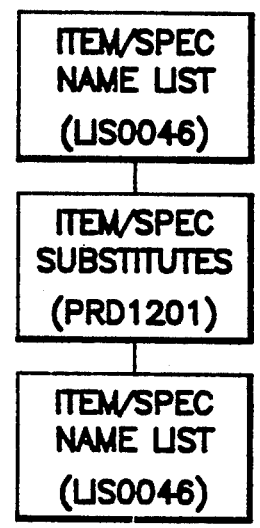
Figure 120:
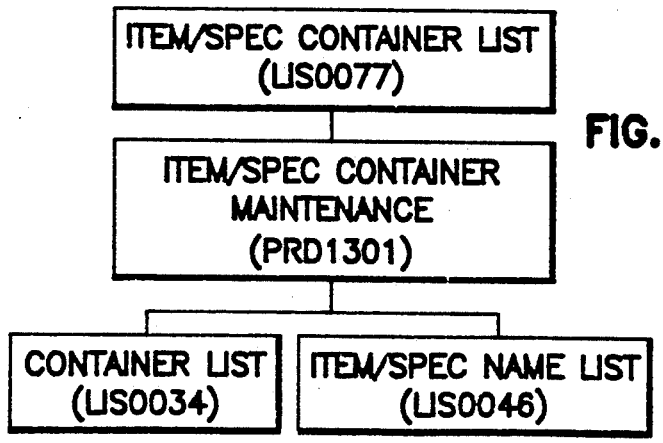
Figure 121:
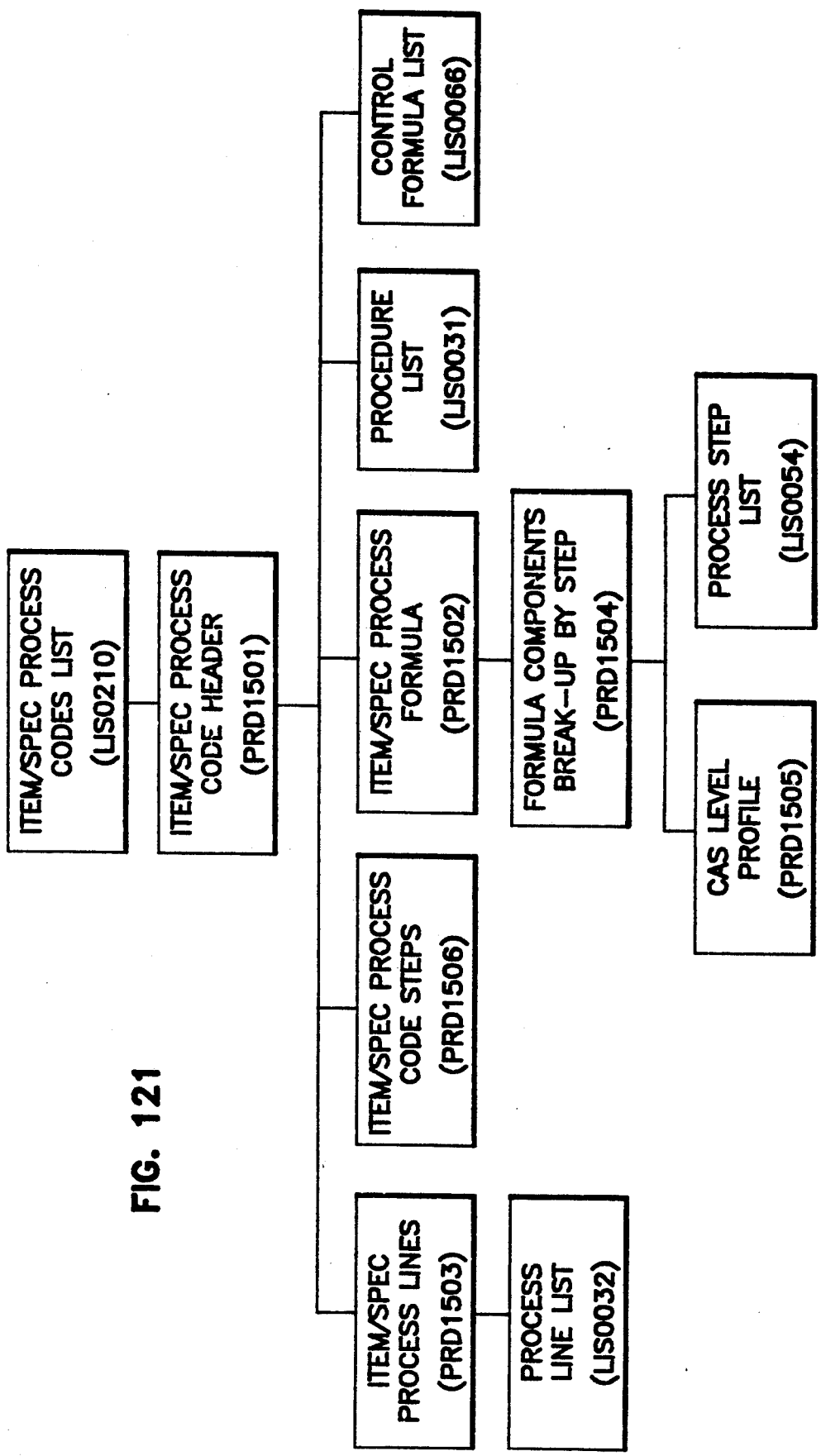

FIG. 109: Item Maintenance—Physical Hazards and Precautions (PR02)
FIG. 110: Item Maintenance—Health Hazards (PR03)
FIG. 111: Item Maintenance—Compliance Quantities (PR04)
FIG. 112: Item Maintenance—Transportation Data (PR05)
FIG. 113: Item Maintenance—Molecular Formulation (PR06)
FIG. 114: Item Maintenance—Control and Safety Measures (PR07)
FIG. 115: Item Maintenance—User Defined Fields (PR17)
Item/Spec Maintenance (PRSM)
FIG. 116: Item/Spec Control Formula Maintenance (PR08)
FIG. 117: Item/Spec Cost Maintenance (PR10)
FIG. 118: Item/Spec Maintenance (PR11)
FIG. 119: Item/Spec Substitute Maintenance (PR12)
FIG. 120: Item/Spec Container Maintenance (PR13)
FIG. 121: Item/Spec Process Code Maintenance (PR15)
FIG. 122: Item/Spec Where Used (PT16)
FIG. 123: Item/Spec Planning Data Maintenance (PR20) QUALITY CERTIFICATION MODULE (PSQC)
FIG. 124: Quality Certification (QC01)
SYSTEM INTERFACE FUNCTIONS MODULE (PSSI)
FIG. 125: Inbound Error Correcting (T010)
FIG. 126: Outbound Error Correcting (T030)

DETAILED DESCRIPTION OF THE PREFERRED EMBODIMENT

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

I. INTRODUCTION

Figure 1A:
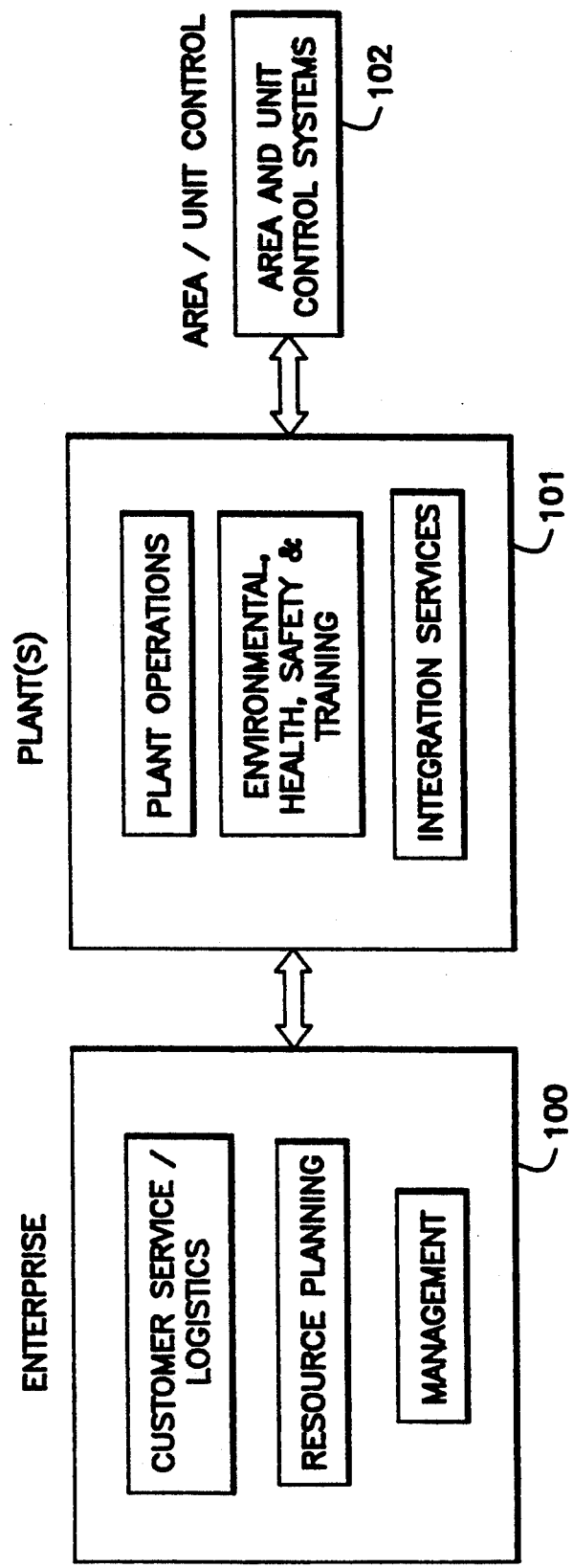
FIG. 1A is a conceptual block diagram showing a plant-level system integrated with an enterprise and area/unit control systems.

FIG. 1A illustrates conceptually the integration of an enterprise-level system 100, a plant-level system 101 and a process control system 102. The enterprise-level system 100 is a high-level system that contains many of the traditional functions performed in a manufacturing system, which may include, for example, material requirements planning. An example of a commercially available enterprise-level system is the MAC-PAC System developed by Andersen Consulting, the assignee of the present invention.

The process control system 102, also referred to as an area/unit control system, is a low-level system that interfaces an actual manufacturing process or system in order to control production. The system further includes a plant-level system 101 which contains various plant-level systems, only a few of which are shown in FIG. 1A. The plant-level system 101 provides the capability to further refine data from the enterprise-level system, facilitates data transfer, and is a communications link between the enterprise-level and process control systems. On the process control side, the plant-level system 101 may summarize data. All three of these systems are integrated together through a common database structure.

Figure 1B:
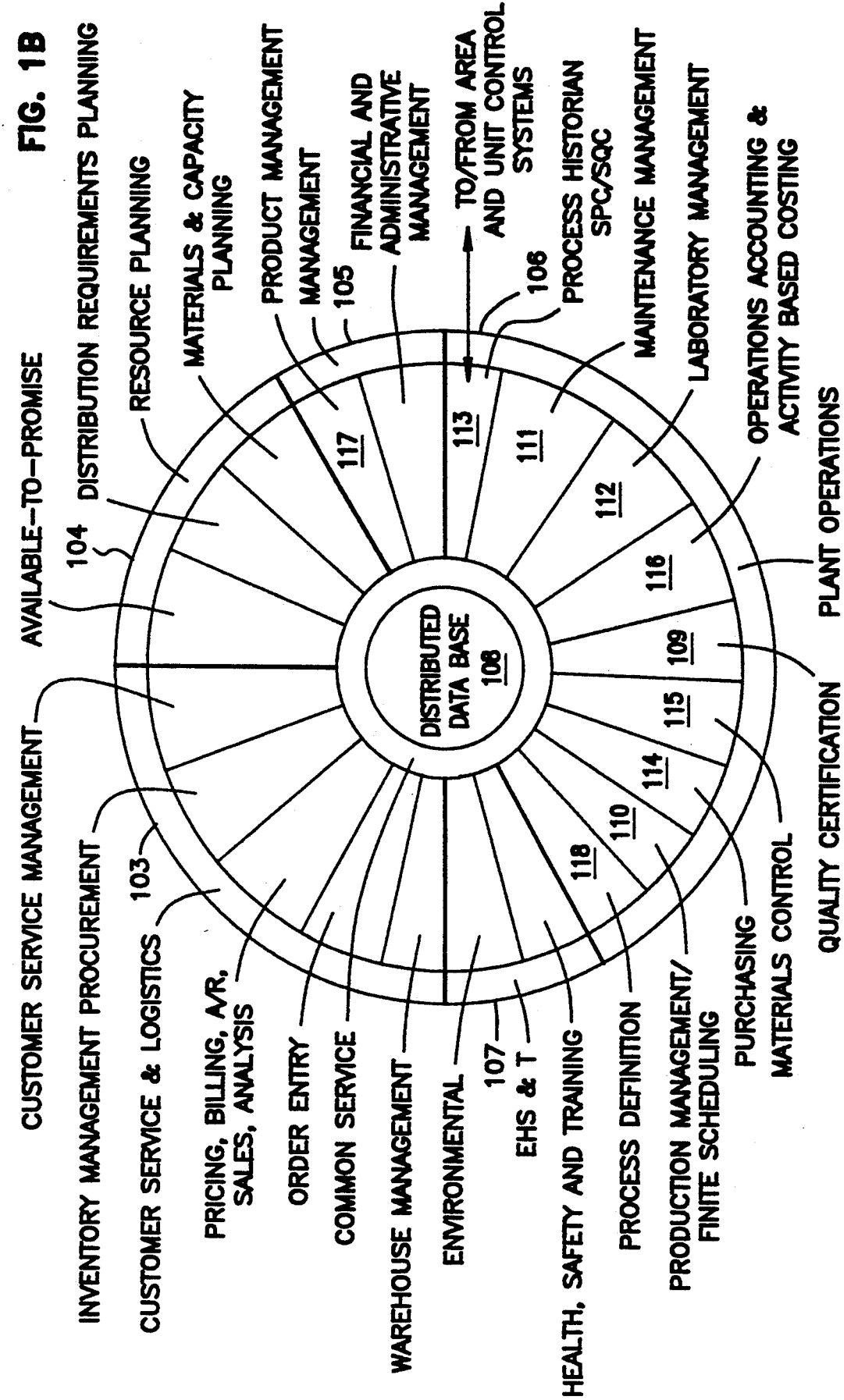
FIG. 1B is a conceptual diagram showing a number of manufacturing systems integrated to a common database.

FIG. 1B further illustrates the system by showing the integration of various manufacturing systems. A common database structure 108 is at the heart of the system and integrates together the various manufacturing systems. Integration of systems is distinct from interfacing and provides for a higher level of communication, versatility, and data processing capability. Integration means that the various manufacturing systems are linked to a common database that uses a uniform structure for storing and processing data. The system preferably stores data in a single database structure that all of the manufacturing systems may access. The common database, or data repository, is part of a distributed system that may be on multiple machines. An interfaced system, in comparison, may have the same data stored in different locations and in different, often incompatible, database structures. By using a common database structure, integration of systems thus solves many data processing problems in the manufacturing industry.

FIG. 1B illustrates manufacturing systems that may be integrated together in the common database 108. The systems shown are either typical or desired systems for manufacturing, and the integration techniques used with these systems may be extended to other systems without departing from the scope of the invention. For example, as described below, a new product development system may also be integrated into the manufacturing system.

Customer service and logistics system 103 is a typical enterprise-level system that performs such functions as tracking and maintaining inventory, accounting, generating purchase orders, processing customer orders, and managing the distribution of goods. Resource planning system 104 performs traditional material requirements planning functions. Management system 105 defines and maintains resources within the system. Product management system 117 includes a new product development system.

Plant operations system 106 may contain the following functions. Quality certification system 109 may set up tests to be performed on resources identified by the system, stores the results of those tests, and may generate a certificate of analysis. Production management system 110 may schedule and report production of materials identified by the system. Maintenance management system 111 may schedule preventative maintenance for equipment used in the manufacturing process. Laboratory information system 112 may coordinate lab tests and results of those tests for materials used in the manufacturing process. Process historian system 113 may gather data from the process control system describing events in the manufacturing process, summarize the events, and store the summary. Purchasing system 114 may generate and organize purchase orders for material used in the manufacturing process. Materials control system 115 may analyze inventory and perform inventory transactions. Financial and administrative management system 116 may perform various accounting functions. Process definition system 118 is used to set up manufacturing formula and process.

Environmental, health, safety & training (EHST) module 107 is also integrated into the system. This module manages and processes data related to environmental and health aspects of the manufacturing process and is particularly useful in process manufacturing that involves hazardous materials or agents. An agent may be a potentially harmful intangible, such as noise. Since this module is integrated with the system, it may automatically track hazardous materials and perform functions such as generating reports of hazardous materials as required by government regulations. The health portion of the module may perform functions such as scheduling of training or medical exams for employees who work with or may otherwise be exposed to hazardous materials. The integration again provides the system with the capability to automatically schedule and track the required training and exams for employees. The integration also enables the use of thresholds and automatic collection of data and reporting of usage of hazardous materials to governmental agencies.

Figure 1C:
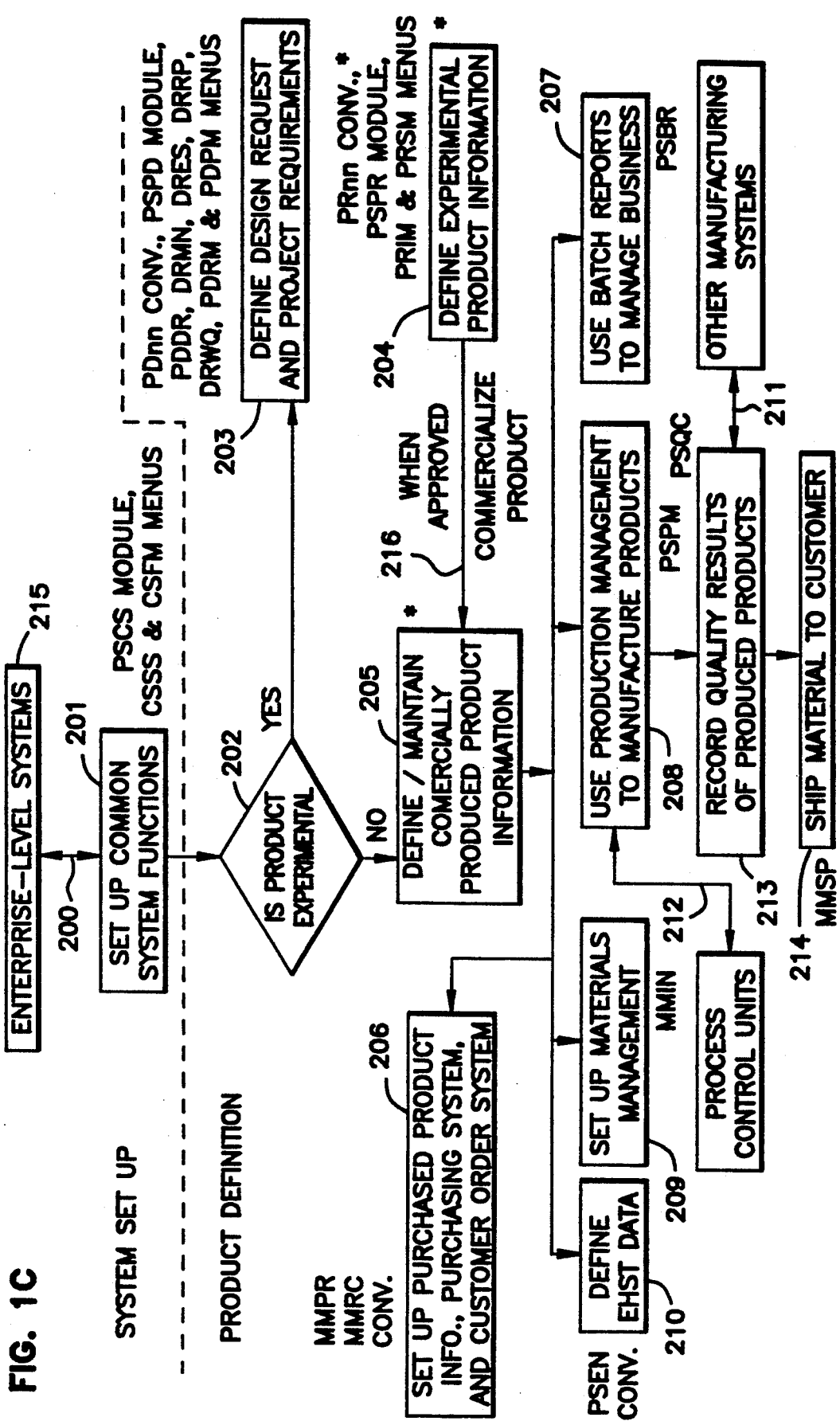
FIG. 1C is a preferred data flow diagram of an integrated manufacturing system.

FIG. 1C is a data flow diagram that represents the preferred operation of a system that achieves integration of multiple manufacturing systems. Each of the steps shown in FIG. 1C may generally represent a complete system module. Since the system is fully integrated, the modules shown utilize the same product definition in the common database. Step 201 involves routines to set up data in the system and also comprises common system functions. The currency exchange rate conversation (CS04) is an example of a common system function, since currency exchanges are used throughout the system modules. Common system functions also interact with the enterprise-level system 215 via communication path 200. At step 202, a user may define a product as either commercial or experimental. The New Product Development (NPD) module manages experimental products. At step 203, the system sets up a design request and project requirements, which may be based on data entered by a user. At step 204, experimental product information is defined, and again the system utilizes the common database and product definition to represent this data.

Due to the integration of the NPD module with the system, data for an experimental product is stored in the same product definition in the common database as the other modules. One advantage of the integration of the NPD module is that, when the experimental product is ready for production, the system may reclassify it at step 216 as commercial and the data required for production is already in the database and ready to be used in producing the product. While the NPD module is particularly useful in the process industry, it may have applications in many other industries as well.

For commercial products, the system proceeds to step 205 to define and maintain commercially produced product information. The unique product definition utilized to maintain this information is further explained below. A number of manufacturing modules may interact with the product definition and operate on the data in the common database. At step 206, the system may set up data for purchasing and customer order information.

At step 210, the system may utilize the Environmental, Health, Safety & Training modules to manage health and environmental aspects of the manufacturing process. The environmental aspects may involve compiling data on any emissions of hazardous materials. Due to the integration of systems, the system may automatically monitor environmental aspects at step 210 and report emissions when they exceed predefined threshold limits. The health aspects may include monitoring and scheduling medical exams and training for employees who are exposed to hazardous materials or agents. The integration again provides the system with the power to automatically monitor these health aspects.

At step 208, the system may utilize the Production Management module to control the manufacture of commercial products. The system may interact with the process control system and units along communication path 212 to manage the production. At step 213, the system records quality results of the products produced at step 208. Other manufacturing systems may interact along communication path 211 with the modules monitoring the produced product. Finally, the system may ship the material or products to customers at step 214.

At step 209, the system may set up materials management functions. At step 207, the system may generate reports based on the data stored in the common database to manage the manufacturing process. The reports may include, for example, emissions of hazardous materials to be submitted to governmental agencies, medical exams and required training for employees, and lists of purchase orders.

II. THE INTEGRATED DATABASE

Figure 1D:
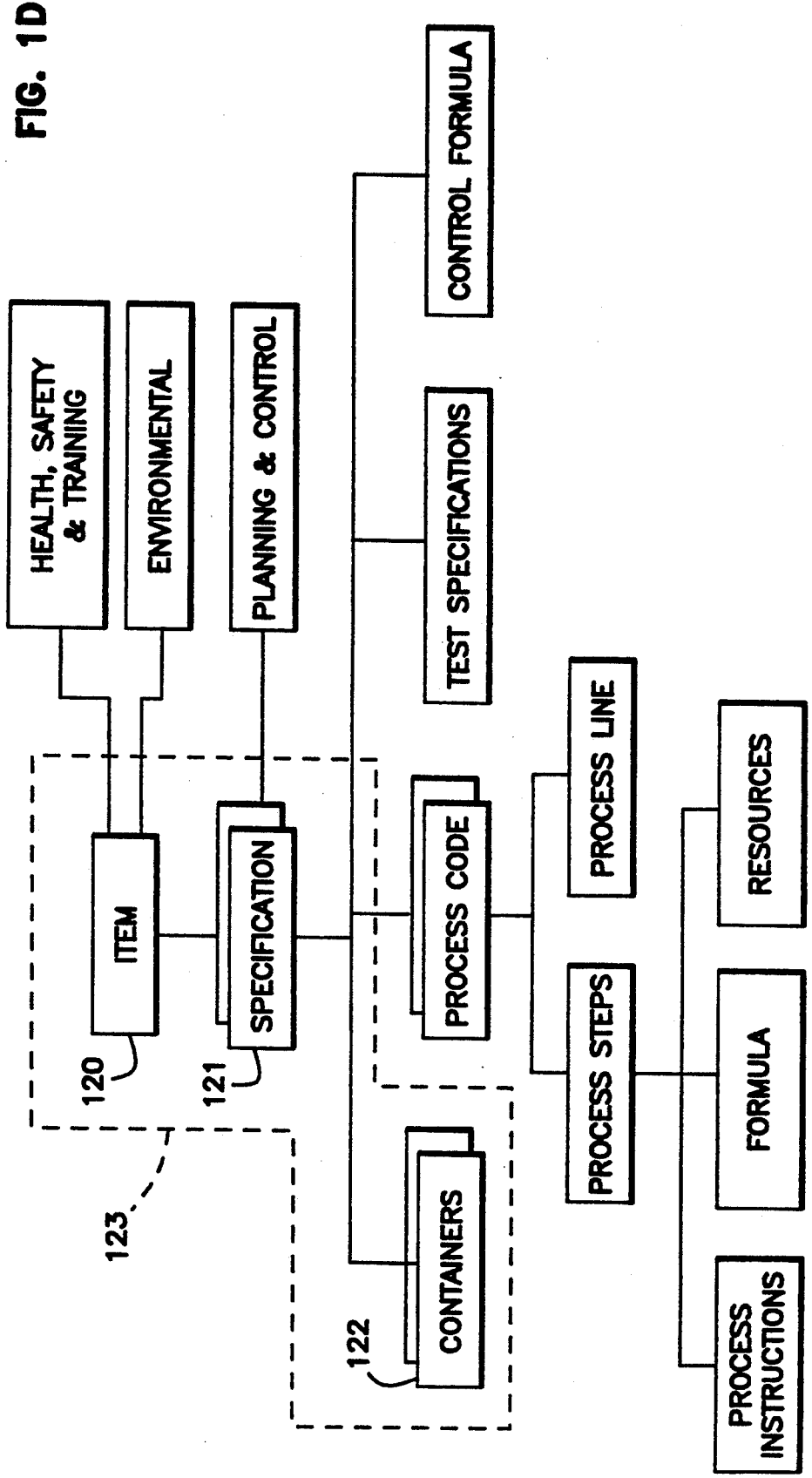
FIG. 1D is a block diagram showing the product definition structure within a common integrated database.

The common database which achieves integration of the manufacturing systems is built around a common database structure. FIG. 1D illustrates a preferred basic database structure and the integration of manufacturing systems to this structure. The basic preferred database structure 123 comprises the elements of an item 120, specification 121, and container 122. Item 120 identifies a material or resource used in, or related to, the manufacturing process. An item may either be a commercial or experimental item. Experimental items are used in conjunction with the New Product Development Module. Each item may by linked to one or more sets of specifications 121. Specification 121 comprises performance characteristics of an item. Each specification 121 may be linked to one or more containers 122. Container 122 specifies either a physical location of the material or a container in which material used in the manufacturing process is to be purchased, manufactured, or sold.

Common database structure 123 thus defines material in terms of its performance characteristics by creating an item/specification/container relationship. An item/specification relationship would be a sufficient structure for integrating manufacturing systems. The container element is included in a preferred database structure for additional processing power.

The implementation of a logical ownership concept in the system is an example of the usefulness of the container element in the preferred database structure. Logical ownership of material identifies the person or entity responsible for a particular amount of material. The integration utilized in the system allows a user to view inventory both by logical ownership and location. Table 1 includes a matrix as an example to illustrate this concept.

TABLE 1

| | | | |
|---|---|---|---|
| tank 1: | 15 gal. | | 10 gal. |
| tank 2: | | 6 lbs. | 3 lbs. |
| tank 3: | | 20 gal. | 2 gal. |
| | owner 1 | owner 2 | owner 3 |

The system allows a user to view inventory by location (tank) across a row. For example, tank 1 contains 25 gallons of material. A user may alternatively view inventory by logical ownership. Owner 2, for example, owns 6 lbs. of material in tank 2 and 20 gallons of material in tank 3.

As indicated in Table 1, the portions of inventory owned by two persons may by included in the same physical storage location. Owners 2 and 3, for example, each own a portion of the material contained in tank 3. The ownership feature also allows the system to regulate the amount of inventory used by a particular owner. When owner 3 has used the 2 gallons in tank 3, the system will not allow owner 3 to use any more material from tank 3, even though another 20 gallons of material, owned by owner 2, may still exist in the tank.

A. DATA MODELS

FIGS. 2C-2J are preferred data models for an integrated manufacturing system. FIGS. 2A and 2B illustrate the meaning of symbols used in the interconnections between elements of the data model.

Figure 2A:
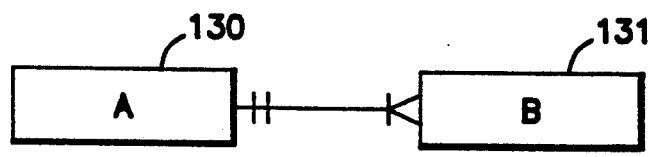
FIGS. 2A–2B is an interconnected block diagram used to illustrate the meaning of the symbols in the data model and data structure diagrams.
Figure 2B:
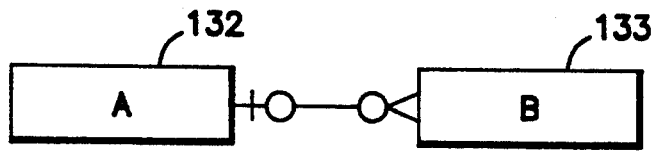
Figure 2C:
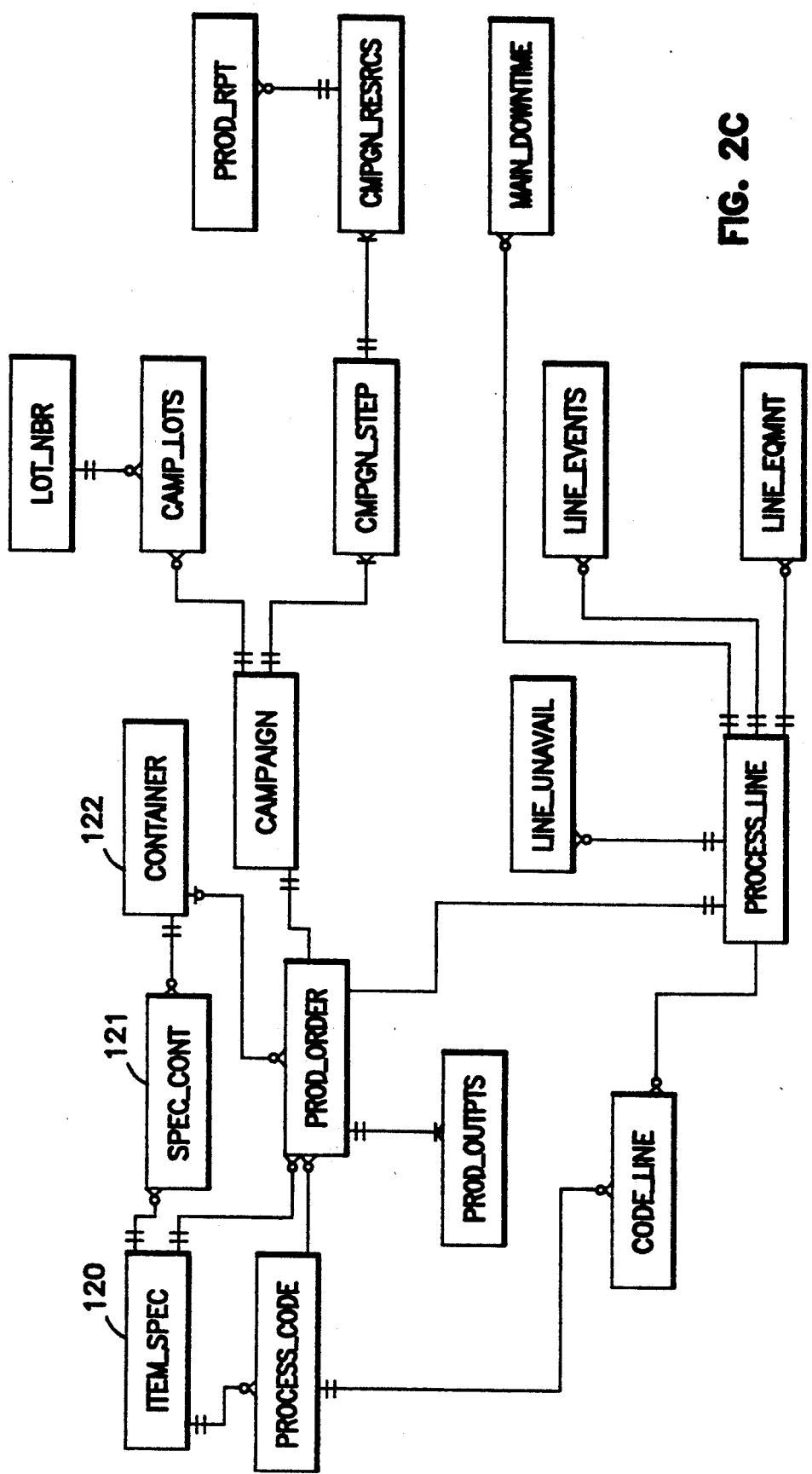
FIG. 2C is a preferred data model of a Production Management module.
Figure 2D:
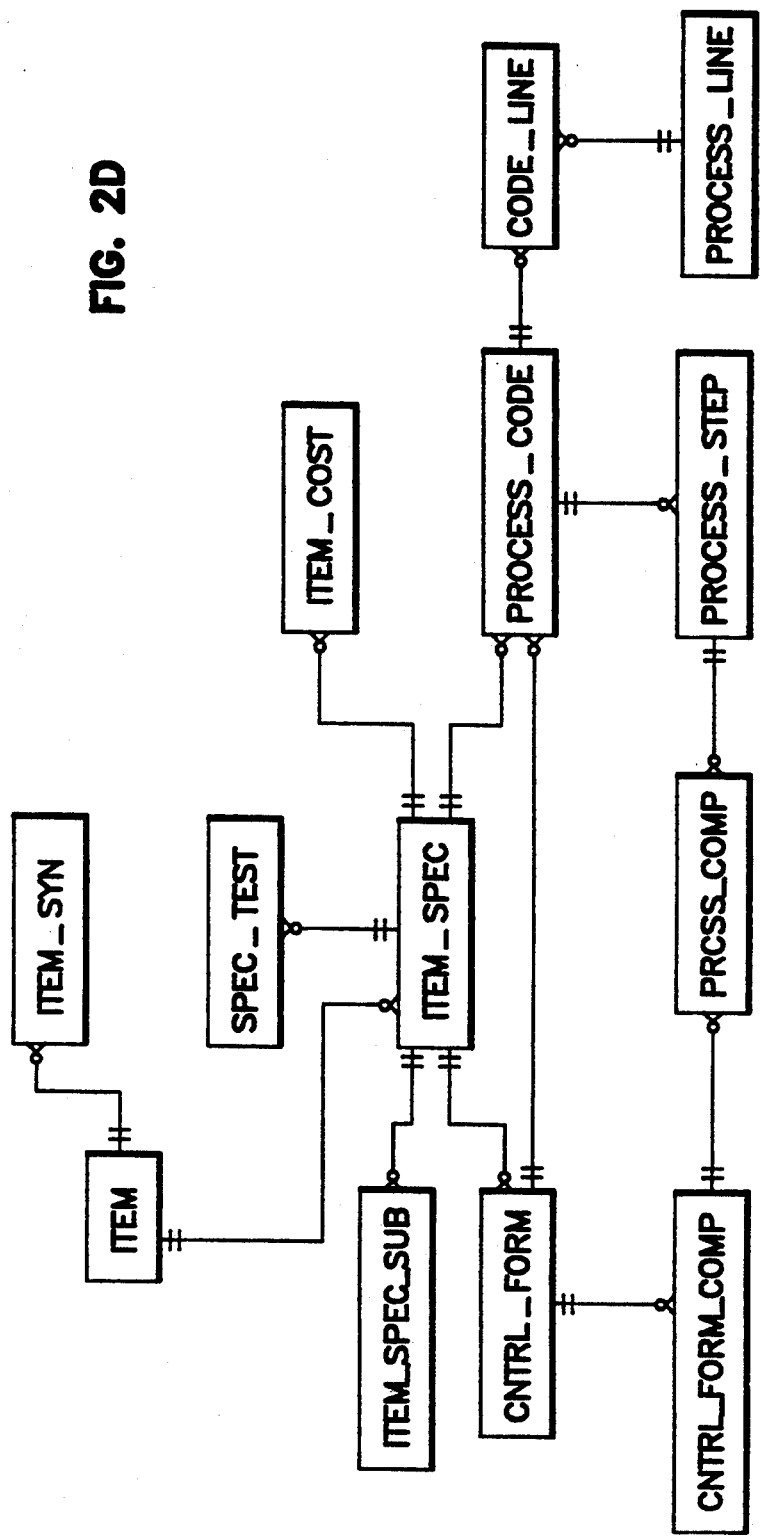
FIG. 2D is a preferred logical data model of a Product Process Definition module.
Figure 2E:
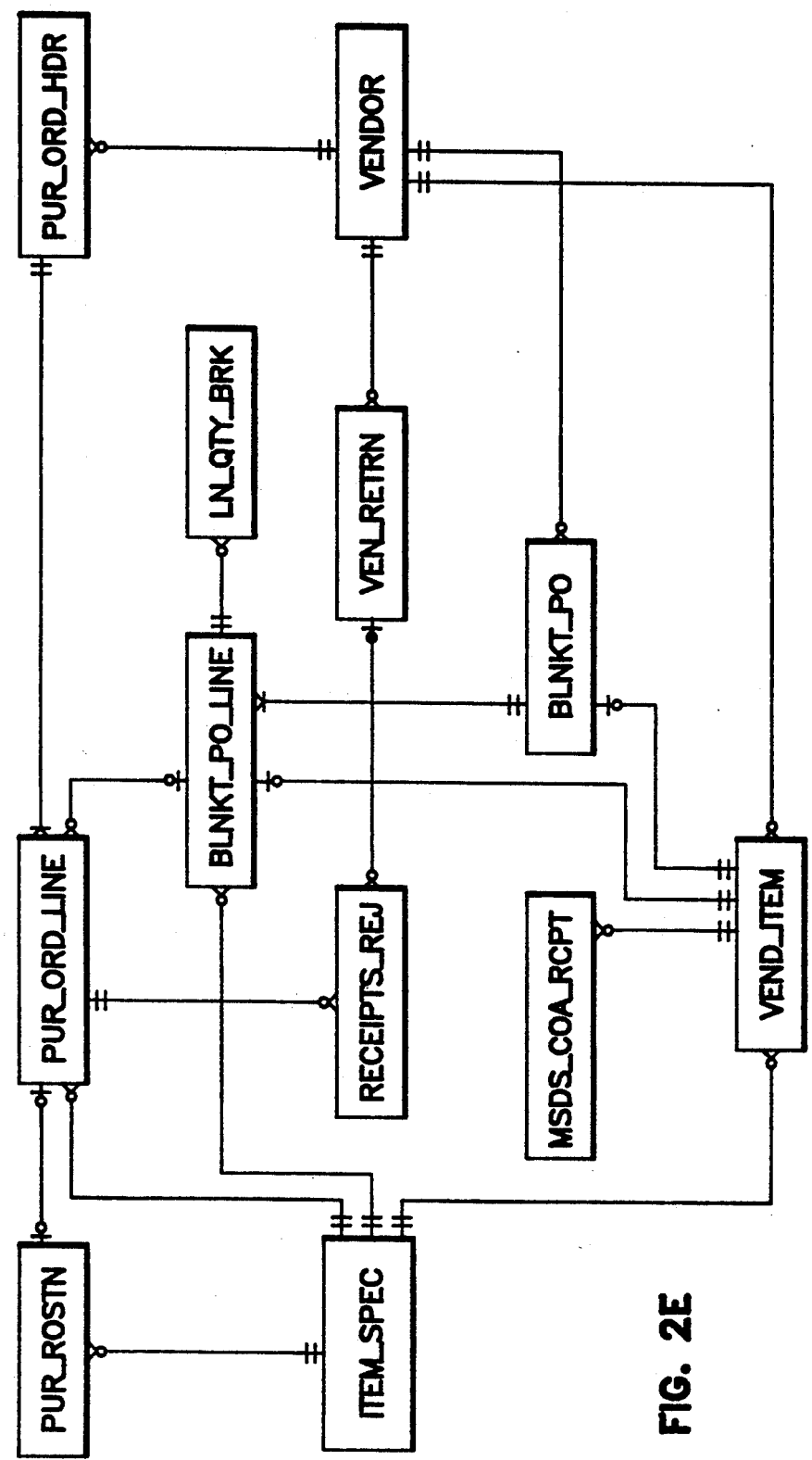
FIG. 2E is a preferred logical data model of a Purchasing module.
Figure 2F:
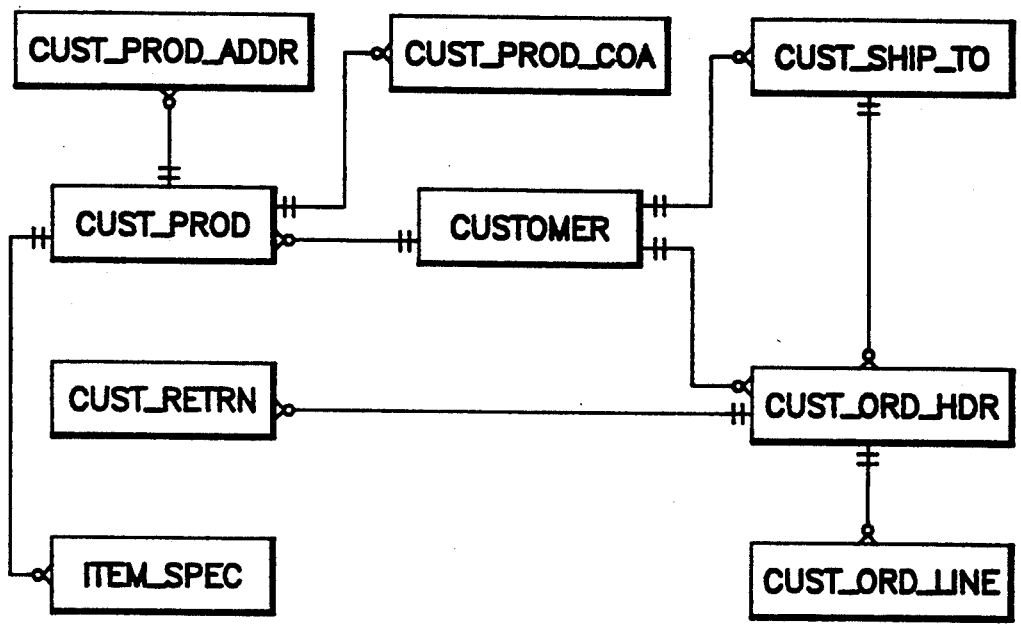
FIG. 2F is a preferred logical data model of a Customer Order module.
Figure 2G:
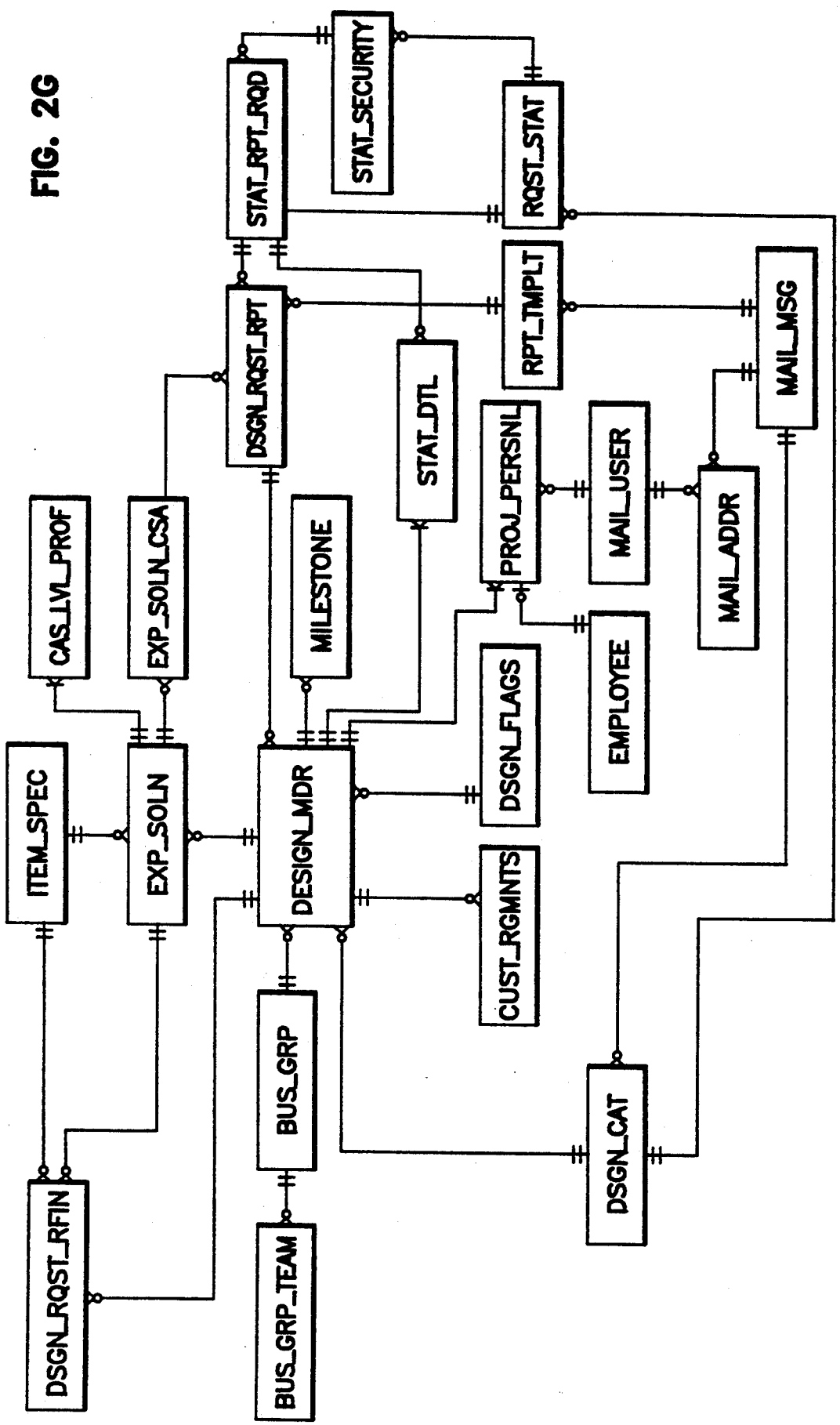
FIG. 2G is a preferred logical data model of a New Product Development (NPD) data model.
Figure 2H:
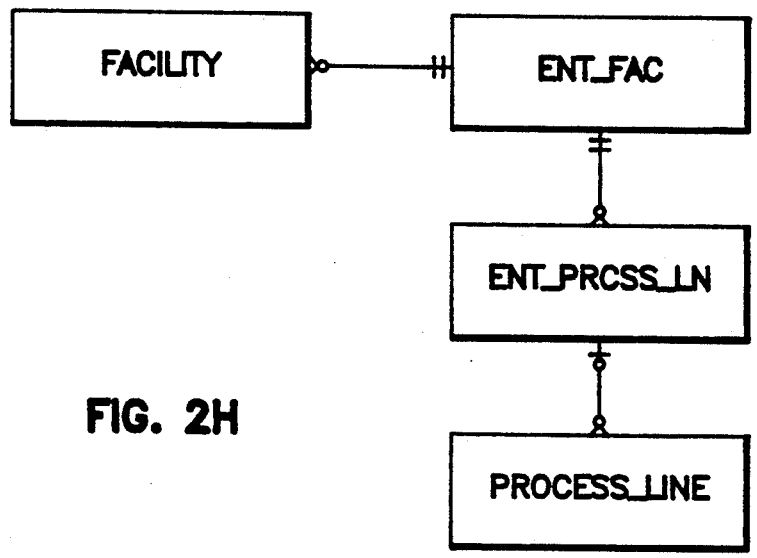
FIG. 2H is a preferred logical data model of Enterprise Level modules.

As shown in FIG. 2A, for an element 130 there must be at least one element 131 and there may be many elements 131. Each element 131 may be linked to one and only one element 130. As shown in FIG. 2B, there may be zero or many elements 133 for each element 132. Each element 133 may be linked to zero or one element 132.

The preferred data models of FIGS. 2C-2H are organized by module as indicated in the description of the drawings. Each module contains a number of conversations, and preferred conversations for each module are conveniently listed in the description of the drawings and explained below. The conversations for each module are the vehicle used to maintain tables in the corresponding data model.

B. DATABASE STRUCTURE

FIGS. 3A-3H represent a preferred database structure for an manufacturing system. The symbols used in these database structure diagrams have the same meaning as shown in FIGS. 2A and 2B. The preferred system uses the keys listed in the database structure diagram to access the corresponding database tables. The system uses keys to write and retrieve data to and from records within the database tables.

The preferred database structure shown in FIGS. 3A-3H contain tables identical to the tables shown in the data models. The database structure shows the interaction and links between modules by showing interconnections between tables of different modules.

III. SYSTEM MODULES

FIGS. 4-126 represent the preferred data flow in the modules of an integrated manufacturing system. In the data flow diagrams, the boxes are associated with preferred user interfaces. The user interfaces are indicated by screen identifiers in the boxes. The preferred user interfaces are in the file history for the present specification and are available from the Patent and Trademark Office. The user interfaces contain screen identifiers in the lower right corner and conversation numbers in the upper left corner. The conversation numbers identify the module to which the user interfaces correspond. The conversation numbers are also used in description of the drawings to index and relate the flow diagrams to the corresponding module.

The preferred data flow diagrams represent both the operation of the system and how a user interacts with the system via the user interfaces. When reading the diagrams, the preferred flow of data is from top to bottom. A user may move thus from one user interface to another from top to bottom on the flow diagrams. Often the system allows a user to toggle between screens at the same level for convenience. Otherwise, without toggling, a user may move from one user interface to another back up the flow diagram and then move down the diagram on a different path.

The preferred user interfaces serve two purposes. First, they represent the preferred method of allowing a user to interact with the system. Second, the fields within the user interfaces correspond to fields in preferred records contained within database tables of the system. The tables are illustrated in the database structure diagrams.

Preferred report formats are in the file history for the present specification and are available from the Patent and Trademark Office.

A. COMMON SYSTEM FUNCTIONS (PSCS)

1. System Support/Set-Up (CSSS)

a. System Parameter Maintenance (CS01)

The System Parameters Maintenance (CS01) conversation may be used to maintain the security, technical, and functional parameters for the system. These parameters are initially defined during system installation.

Technical system parameters include the language code, password length, security level, number of sessions permitted for each user, and screen processing information.

Functional system parameters include the base unit of measure, base unit of currency, costing method, screen symbols, and screen literals that are specific to the facility.

This conversation may also be used to specify the parameters used to create system-generated numbers. The start number, end number, and increment may consist of up to 32 different types of numbers.

b. User Maintenance (CS02)

The User Maintenance conversation (CS02) may be used to define and maintain information about system users and to assign ownership and subfacility codes to a user.

User information includes the user ID, system user name, password, user class, and language.

Ownership codes identify the inventory authorized for a user without taking the physical location into account. Subfacility codes, which represent physical locations, identify the areas within the facility where a user is authorized to make inventory transactions.

c. Shop Calendar Maintenance (CS03)

The Shop Calendar Maintenance conversation (CS03) may be used to define and maintain the standard working days, holidays, and non-working days for a given calendar year.

For each calendar year, a user may specify a calendar type, the day of the week on which January 1st falls, and the shift start and end times.

The information in this conversation is used to generate a shop calendar and to determine the days when no production is planned in the plant. On days defined as holidays or non-working days, process lines in the system are not available for production.

d Currency Exchange Rate Maintenance (CS04)

The Currency Exchange Rate Maintenance conversation (CS04) may be used to define and maintain information used to convert a monetary value from one currency to another.

Currency information includes the currency to be converted to, the currency to be converted from, the exchange rate to be used in the conversion, and the date when the exchange rate is to become effective.

The information in this conversation is used throughout the system to convert monetary values from one currency to another on screens.

e. UOM Conversion Factor Maintenance (CS05)

The UOM Conversion Factor Maintenance conversation (CS05) may be used to define and maintain conversion factors for all units of measure used within the system except item/container-specific units of measure. The information in this conversation is used to convert the quantity of an item from one unit of measure to another.

Information for each unit of measure includes the unit of measure type (weight, volume, length), the unit of measure to be converted to, and the conversion factor to be used.

Conversion factors for units of measure that are item/container specific are defined in the Item/Spec Container Maintenance conversation (PR13).

2. Functions Maintenance (CSFM)

a. Facility Maintenance (CS06)

The Facility Maintenance conversation (CS06) may be used to define and maintain information about the facility using the system. This information includes environmental data.

Facility information includes: the facility's name and address; management, technical, and emergency contacts; and information about the agencies associated with the facility, such as fire and police departments.

Environmental information about the facility includes the compliance quantity tolerance, procedure codes identifying the Material Safety Data Sheet disclaimer and cover letter, and the source, type and environmental location for each compliance quantity source.

b. Enterprise Facility Maintenance (CS27)

The Enterprise Facility Maintenance conversation (CS27) may be used to define and maintain information about the facility using the system at the enterprise level. This information includes environmental data.

Facility information includes: the facility's name and address; management, technical, and emergency contacts; and information about the agencies associated with the facility, such as fire and police departments.

Environmental information about the facility includes the compliance quantity tolerance, procedure codes identifying the Material Safety Data Sheet disclaimer and cover letter, and the source type and environmental location for each compliance quantity source.

c. Agency Maintenance (CS07)

The Agency Maintenance conversation (CS07) may be used to maintain information about agencies associated with the facility. An agency is any organization outside the plant——such as the local fire and police departments, environmental reporting agencies, and hazardous waste transporters.

Agency information includes the agency name, address, phone number, and primary contact. If the agency is a government agency, enter the ID for the state or federal Environmental Protection Agency (EPA).

The agency information defined in this conversation is primarily used for government reporting requirements.

d. Vendor Maintenance (CS09)

The Vendor Maintenance conversation (CS09) may be used to define and maintain information about vendors providing products, materials, services, or utilities.

Vendor information includes the vendor's address, the language and currency used by the vendor, trade terms, payment terms, shipping mode, and performance rating.

Vendor information may be used to create purchase orders and to record the receipt of materials. To define a relationship between vendors and their products, use the Item/Spec/Vendor Maintenance conversation (CS21).

e. Employee Maintenance (CS10)

The Employee Maintenance conversation (CS10) may be used to define and maintain information about employees in the facility.

Employee information includes the employee's social security number, hire date, department number, and supervisor. It also includes the health and safety requirements for each employee, such as job classification and occupation code.

Employee information may be used to support employee medical exam and incident reporting, as well as to monitor employee exposure to hazardous items and physical agents.

f. Container Maintenance (CS12)

The Container Maintenance conversation (CS12) may be used to define and maintain information about containers. A container is any item used to store, ship, or hold materials or goods.

Container information includes the container type, material, lining, capacity, cubic measurement, and unit of measure. For stationary containers that are not moved within the plant, such as tanks and silos, define a location code.

Container information is used when defining packaging requirements for an item/spec. Assign valid containers to item/specs by using the Item/Spec Container Maintenance conversation (PR13).

g. Procedure Maintenance (CS13)

The Procedure Maintenance conversation (CS13) may be used to define and maintain free-form text describing procedures that are performed within the facility.

Examples of procedures include production, quality, hazardous material handling, and first aid procedures. Also defined as procedures are some items, such as the cover letter and disclaimer for the Material Safety Data Sheet.

Procedures defined in this conversation are linked to a specific entity in other conversations. The Procedure Code Where Used conversation (CS25) may be used to review all items associated with a specific procedure.

The Process Line Maintenance conversation (CS14) may be used to define and maintain a process line. A process line is a series of operating units that are used to produce an item/spec.

Process line information includes equipment codes and descriptions for the operating units; a maintenance procedure code; and standard, minimum, and maximum batch sizes and production rates.

This information also includes standard line downtime——when the line will not be available for production during the working day. Standard line downtime is used during production scheduling to determine when production will or will not take place on the process line.

i. Enterprise Process Line Maintenance (CS28)

The Enterprise Level Line Maintenance conversation (CS28) may be used to define and maintain a process line for each facility at the enterprise level. A process line is a series of operating units that are used to produce an item/spec.

Process line information includes equipment codes and descriptions for the operating units; a maintenance procedure code; and standard, minimum, and maximum batch sizes and production rates.

This information also includes standard line downtime——when the line will not be available for production during the working day. Standard line downtime is used during production scheduling to determine when production will take place on the process line for each facility.

j. Customer Bill-To Maintenance (CS15)

The Customer Bill-To Maintenance conversation (CS15) may be used to define and maintain customer bill-to information used during order entry.

Bill-to information includes invoice destination, trade terms, the language and currency used by the customer, the salesperson associated with the customer, customer contacts, and customer classification.

Additional customer information may be maintained using the Customer Ship-To Maintenance (CS16) conversation and the Customer/Item/Spec Maintenance (CS18) conversation.

k. Customer Ship-To Maintenance (CS16)

The Customer Ship-To Maintenance conversation (CS16) may be used to define and maintain customer shipping information. There may be several ship-to locations for each customer. Each location is identified by a three character ship-to code.

The shipping information for each ship-to location includes the ship-to address, customer contact, and phone number. Additional customer information may be maintained using the Customer Bill-To Maintenance (CS15) conversation and the Customer/Item/Spec Maintenance (CS18) conversation.

l. Session Constant Maintenance (CS22)

The Session Constants Maintenance conversation (CS22) may be used to change session constants from the default values to other valid values.

Each time a user signs on the system, the values of the session constants are set to the default values for the facility and for the user's ID. If desired, a user may change tho following values for a session: the subfacility and ownership codes, the printer queue, and the characters to be used when displaying currency amounts. Proper authorization is required to change subfacility and ownership codes.

The new values will only be used during the present session. At the next system sign on, the session constants will be set to the original default values.

m. Electronic Mail User Maintenance (CS23)

The Electronic Mail User Maintenance conversation (CS23) may be used to define each PROCESS/1 user who will receive electronic mail messages from the system. Indicate all users capable of being assigned as a project leader for a new product development effort.

For each mail message user, a user may define the user's nickname, VAX user ID, and VAX node. The user nickname is used throughout PROCESS/1 to refer to a user.

n. Inventory Location Maintenance (CS24)

The Inventory Location Maintenance conversation (CS24) may be used to define and maintain locations where inventory may be stored within the facility.

The information for each location includes the location code, description, storage capacity, and unit of measure. It also includes an environmental location code and Tier II information, such as pressure and temperature.

The information in this conversation may be used to determine a desirable storage location for an item/spec.

o. Procedure Code Where Used (CS25)

The Procedure Code Where Used conversation (CS25) may be used to review all items associated with a specific procedure. Procedures are defined in the Procedure Maintenance conversation (CS13) and are linked to a specific item using Product Management conversations.

p. Electronic Mail Message Maintenance (CS26)

The Electronic Mail Message Maintenance conversation (CS26) may be used to create and maintain electronic mail messages used within the PROCESS/1 system. For each message, the following may be defined:

all project team members who will receive the message
the subject of the message
detailed message text Once an electronic mail message is defined, it can be associated with various events occurring within PROCESS/1. Whenever an event occurs, the system will automatically send the message text to the specified team members.

PROCESS/1 requires some electronic mail messages for normal operation; these messages cannot be deleted. For required mail messages, the distribution list and message text can still be maintained.

3. Product Relationship (CSPR)

a. Customer/Item/Spec Maintenance (CS18)

The COA Requirements Maintenance conversation (CS18) may be used to define and maintain information about an item/spec purchased by a customer.

The customer/item/spec information includes the number and name that the customer uses for the item/spec and Certificate of Analysis (COA) information.

This conversation may be used to maintain separate COA information for each ship-to location code that is defined for a customer. COA information includes laboratory tests for an item/spec that a customer requests, the range of acceptable test results, the addresses where the COA should be sent, and the method of delivery.

b. Item/Spec/Vendor Maintenance (CS21)

The Item/Spec/Vendor Maintenance conversation (CS21) may be used to define and maintain purchasing information for an item/spec from a vendor.

Purchasing information includes the vendor/item/spec rating, vendor lead time, unit price, and material number and name used by the vendor for the item/spec. This conversation may be used to record and track Material Safety Data Sheet and Certificate of Analysis receipts for a vendor's item/spec.

The information in this conversation is used when selecting vendors during purchase order creation. It also provides a cross-reference for environmental and quality certification information.

B. ENVIRONMENT (PSEN)

1. EHST Setup (ENES)

a. Job Type Maintenance (EN20)

The Job Type Maintenance conversation (EN20) may be used to review and maintain names and descriptions for each type of job that an employee may perform. Also use this conversation to create and maintain a list of training courses that are recommended for an employee based on the employee's job.

For each job, a user may enter a list of recommended training courses and, if the employee should take a course on a periodic basis, specify how often the employee should take the course.

Job Type Maintenance
- PURPOSE: To access job type information. Also use this screen to review and maintain training courses associated with a job type.
- BROWSE: Review the job type information.
- BRWCRS: Browse Training Course. To review training courses associated with a job, press the 'BrwCrs' function key combination.

Job Type Course Maintenance
- PURPOSE: To browse training course information. Training courses are recommended for an employee based on his/her job type. Also use this screen to access job type information.
- SEARCH: With the cursor on the first blank line, enter full or partial Course Number or Course Name and press the 'Find' key. If the first line is not blank, use the space bar to clear the fields before entering information. To start at the beginning of the list, press the 'Find' key. To see additional courses, press the 'Next Screen' key.

Job Type Course Maintenance
- BROWSE: Review the course information for the job type.
- HEADER: Header. To review job type information, press the 'Header' function key combination.

Job Type Maintenance
- PURPOSE: To add or modify job type information. Also use this screen to review and maintain training courses associated with a job type.
- INSERT: Required:
  Job Type Number
  Job Type Description
- MODIFY: Change the Job Type Description.

Job Type Maintenance
- BRWCRS: Browse Training Course. To review training courses associated with a job, press the 'BrwCrs' function key combination.
- UPDCRS: Update Training Course. To update training courses associated with a job, press the 'UpdCrs' function key combination.

Job Type Course Maintenance
- PURPOSE: To search for, add, browse, or modify training course information. Training courses are recommended for an employee based on his/her job type. Also use this screen to access job type information.
- SEARCH: With the cursor on the first blank line, enter a full or partial Course Number or Course Name and press the 'Find' key. If the first line is not blank, use the space bar to clear the fields before entering information. To start at the beginning of the list, press the 'Find' key. To see additional courses, press the 'Next Screen' key.

Job Type Course Maintenance
- INSERT: Required: Course Number
  The job type and course combination must be unique.
- MODIFY: Search if necessary. Enter the course to change or place the cursor on the course from the list. Change the Course Number or Frequency (in days).
- HEADER: Header. To review job type information, press the 'Header' function key combination.

Job Type List
- PURPOSE: To search for and select a job type. Also use this screen to review and maintain training courses associated with a job type.
- SEARCH: With the cursor on the first blank line, enter a full or partial Job Code or Job Name and press the 'Find' key. If the first line is not blank, use the space bar to clear the fields before entering information. To start at the beginning of the list, press the 'Find' key. To see additional job types, press the 'Next Screen' key.

Job Type List
- INSERT: Press the 'Insert' function key combination.
- BROWSE: Search if necessary. Enter the job to browse or place the cursor on the desired job from the list. Press the 'Browse' function key combination.
- MODIFY: Search if necessary. Enter the job to change or place the cursor on the desired job from the list. Press the 'Modify' function key combination.

Job Type List
- BRWCRS: Browse Training Course. To review training courses associated with a job type, search if necessary. Enter the course or place the cursor on the desired course from the list. Press the 'BrwCrs' function key combination.
- UPDCRS: Update Training Course. To update training courses associated with a job type, search if necessary. Enter the course or place the cursor on the desired course from the list. Press the 'UpdCrs' function key combination.

Training Course List
- PURPOSE: To search for and select training course information.
- SEARCH: With the cursor on the first blank line, enter a full or partial Course Number or Course Name and press the 'Find' key. If the first line is not blank, use the space bar to clear the fields before entering information. To start at the beginning of the list, press the 'Find' key. To see additional courses, press the 'Next Screen' key.

Training Course List
- SELECT: Place the cursor on the desired course. Press the 'Return' function key to return the selected information to the detail screen.

b. Environmental Location Maintenance (EN21)

The Location Exam/Course Maintenance (EN21) conversation may be used to assign and maintain the medical exams and training courses an employee is recommended to take as the result of working in a particular environmental location.

For medical exams, a user may enter the exam number and the frequency that the employee should take the medical exam. For training courses, include the course number and frequency for the course.

This conversation may also be used to enter and maintain environmental location information.

Location Exam Maintenance

PURPOSE: To browse medical exam information associated with a location. Also use this screen to access location information and to access training course information for review or modification. This information is used to determine the recommended training courses and medical exams an employee should take.

Location Exam Maintenance

SEARCH: With the cursor on the first blank line, enter a full or partial Exam Number or Exam Name and press the 'Find' key. If the first line is not blank, use the space bar to clear the screen before entering information. To start at the beginning of the list, press the 'Find' key. To see additional exams, press the 'Next Screen' key.

BROWSE: Review the location exam information.

Location Exam Maintenance

BRWCRS: Browse Training Course. To review training courses associated with a location, search if necessary. Enter the course or place the cursor on the desired course from the list. Press the 'BrwCrs' function key combination.

HEADER: Location Number and Name. To maintain the location number and name, press the 'Header' function key combination.

Location Course Maintenance

PURPOSE: To browse training course information associated with a location. Also use this screen to access location information and to access medical exam information for review or modification.

SEARCH: With the cursor on the first blank line, enter a full or partial Course Number or Course Name and press the 'Find' key. If the first line is not blank, use the space bar to clear the fields before entering information. To start at the beginning of the list, press the 'Find' key. To see additional courses, press the 'Next Screen' key.

Location Course Maintenance

BROWSE: Review the location course information.

BRWEXM: Browse Medical Exam. To review medical exams associated with a location, search if necessary. Enter the exam or place the cursor on the desired exam from the list. Press the 'BrwExm' function key combination.

HEADER Location Number and Name. To maintain the location number and name, press the 'Header' function key combination.

Environmental Location Maintenance

PURPOSE: To browse an environmental location number and name. Also use this screen to go to the screen where the user may review and maintain medical exams and training courses associated with an environmental location. This information is used to determine the recommended training courses and medical exams an employee should take.

BROWSE: Review the environmental location information.

Environmental Location Maintenance

BRWEXM: Browse Medical Exam. To review medical exams associated with an environmental location, press the 'BrwExm' function key combination.

BRWCRS: Browse Training Course. To review training courses associated with an environmental location, press the 'BrwCrs' function key combination.

Location Exam Maintenance

PURPOSE: To search for, insert, update or delete medical exam information associated with a location. Also use this screen to access location information and to access environmental location training course information for review or modification. This information is used to determine the recommended medical exams an employee should take.

Location Exam Maintenance

SEARCH: With the cursor on the first blank line, enter a full or partial Exam Number or Exam Name and press the 'Find' key. If the first line is not blank, use the space bar to clear the screen before entering information. To start at the beginning of the list, press the 'Find' key. To see additional exams, press the 'Next Screen' key.

Location Exam Maintenance

INSERT: Required: Exam Number. After entering exam information, press the 'Insert' key.

DELETE: Search if necessary. Enter the exam to delete or place the cursor on the desired information from the list. Press the 'Delete' function key combination.

Location Exam Maintenance

BRWCRS: Browse Training Course. To review training courses associated with a location, search if necessary. Enter the course or place the cursor on the desired course from the list. Press the 'BrwCrs' function key combination.

UPDCRS: Update Training Course. To update training courses associated with a location, search if necessary. Enter the course or place the cursor on the desired course from the list. Press the 'UpdCrs' function key combination.

Location Exam Maintenance

HEADER: Location Number and Name. To maintain the location number and name, press the 'Header' function key combination.

Location Course Maintenance

PURPOSE: To search for, insert, modify, or delete training course information associated with a location. Also use this screen to access location information and to access environmental location medical exam information for review or modification. This information is used to determine the recommended training courses an employee should take.

Location Course Maintenance

SEARCH: With the cursor on the first blank line, enter a full or partial Course Number or Course Name and press the 'Find' key. If the first line is not blank, use the space bar to clear the fields before entering information. To start at the beginning of the list, press the 'Find' key. To see additional courses, press the 'Next Screen' key.

Location Course Maintenance

INSERT: Required: Course Number. After entering course information, press the 'Insert' key MODIFY: Search if necessary. Modify the Course Code or Course Frequency Days.

DELETE: Search if necessary. Enter the course to delete or place the cursor on the desired information from the list. Press the 'Delete' function key combination.

Location Course Maintenance

BRSEXM: Browse Medical Exam. To review medical exams associated with a location, search if necessary. Enter the exam or place the cursor on the desired exam from the list. Press the 'BrwExm' function key combination.

UPDEXM: Update Medical Exam. To update medical exams associated with a location, search if necessary. Enter the exam or place the cursor on the desired exam from the list. Press the 'UpdExm' function key combination.

Location Course Maintenance

HEADER: Location Number and Name. To maintain the location number and name, press the 'Header' function key combination. Environmental Location Maintenance PURPOSE: To add or modify the environmental location number and name. Also use this screen to go to the screen where the user may review and maintain medical exams and training courses associated with an environmental location. This information is used to determine the recommended training courses and medical exams an employee should take.

INSERT: Required:
Location Number
Location Description

Environmental Location Maintenance

MODIFY: Change the Location Number or Location Description.

BRWEXM: Browse Medical Exam. To review medical exams associated with an environmental location, press the 'BrwExm' function key combination.

UPDEXM: Medical Exam. To update medical exams associated with an environmental location, press the 'UpdExm' function key combination.

Environmental Location Maintenance

BRWCRS: Browse Training Course. To review training courses associated with an environmental location, press the 'BrwCrs' function key combination.

UPDCRS: Update Training Course. To update training courses associated with an environmental location, press the 'UpdCrs' function key combination.

Environmental Location List

PURPOSE: To search for and select an environmental location. Also use this screen to access environmental location medical exam and training course information for review or modification.

SEARCH: With the cursor on the first blank line, enter a full or partial Location Number or Location Description and press the 'Find' key. If the first line is not blank, use the space bar to clear the fields before entering information. To start at the beginning of the list, press the 'Find' key. To see additional locations, press the 'Next Screen' key.

Environmental Location List

INSERT: Press the 'Insert' function key combination.

MODIFY: Search if necessary. Enter the location to modify or place the cursor on the desired information from the list. Press the 'Modify' function key combination.

BRWEXM: Browse Medical Exam. To review medical exams associated with a location, press the 'BrwExm' function key combination.

Environmental Location List

UPDEXM: Update Medical Exam. To update medical exams associated with a location, press the 'UpdExm' function key combination.

BRWCRS: Browse Training Course. To review training courses associated with a location, press the 'BrwCrs' function key combination.

UPDCRS: Update Training Course. To update training courses associated with a location, press the 'UpdCrs' function key combination.

Medical Exam List

PURPOSE: To search for and select medical exam information.

SEARCH: With the cursor on the first blank line, enter a full or partial Medical Exam Code or Medical Exam Name and press the 'Find' key. If the first line is not blank, use the space bar to clear the fields before entering information. To start at the beginning of the list, press the 'Find' key. To see additional exams, press the 'Next Screen' key.

Medical Exam List

SELECT: Place the cursor on the desired exam. Press the 'Return' function key to return the selected information to the detail screen.

Training Course List

PURPOSE: To search for and select a training course.

SEARCH: With the cursor on the first blank line, enter a full or partial Course Number or Course Name and press the 'Find' key. If the first line is not blank, use the space bar to clear the fields before entering information. To start at the beginning of the list, press the 'Find' key. To see additional courses, press the 'Next Screen' key.

Training Course List

SELECT: Place the cursor on the desired course. Press the 'Return' function key to return the selected information to the detail screen.

c. Physical Agent Maintenance (EN22)

The Physical Agent Maintenance (EN22) conversation may be used to review and maintain recommended training course and medical exam information for employees who are exposed to physical agents. A physical agent is any intangible or uninventoried element exposed to an employee, such as dust or noise.

For recommended training courses, a user may include the course number and the frequency that the employee should take the course. For recommended medical exams, a user may include the exam number and the exam frequency.

Additionally, this conversation may be used to maintain the physical agent's number and name.

Physical Agent Course Maintenance

PURPOSE: To review training course information associated with a physical agent. Also use this screen to access physical agent information and medical exam information for review or modification. This information is used to determine the recommended training courses and medical exams an employee should take.

Physical Agent Course Maintenance

SEARCH: With the cursor on the first blank line, enter a full or partial Course Number or Course Name and press the 'Find' key. If the first line is not blank, use the space bar to clear the screen before entering information. To start at the beginning of the list, press the 'Find' key. To see additional courses, press the ,Next Screen' key.

Physical Agent Course

BROWSE: Search if necessary. Enter the course to browse or place the cursor on the desired course from the list. Review the information.

BRWEXM: Browse Medical Exam. To review medical exams associated with a physical agent, search if necessary. Enter the exam or place the cursor on the desired exam from the list. Press the 'BrwExm' function key combination.

Physical Agent Course Maintenance

HEADER: Physical Agent Number and Name. To maintain the physical agent number and name, press the 'Header' function key combination.

Physical Agent Exam Maintenance

PURPOSE: To review medical exam information associated with a physical agent. Also use this screen to access physical agent information and training course information for review or modification. This information may be used to determine the recommended training courses and medical exams an employee should take.

Physical Agent Exam Maintenance

SEARCH: With the cursor on the first blank line, enter a full or partial Exam Number or Exam Name and press the 'Find' key. If the first line is not blank, use the space bar to clear the fields before entering information. To start at the beginning of the list, press the 'Find' key. To see additional exams, press the 'Next Screen' key.

Physical Agent Exam Maintenance

BROWSE: Search if necessary. Enter the exam to browse or place the cursor on the desired exam from the list. Review the information.

BRWCRS: Browse Training Course. To review training courses associated with a physical agent, search if necessary. Enter the course or place the cursor on the desired course from the list. Press the 'BrwCrs' function key combination.

Physical Agent Exam Maintenance

HEADER: Physical Agent Number and Name. To maintain the physical agent number and name, press the 'Header' function key combination.

Physical Agent Maintenance

PURPOSE: To review the physical agent number and name. Also use this screen to review and maintain medical exams and training courses associated with a physical agent. This information is used to determine the recommended training courses and medical exams an employee should take.

BROWSE: Review the physical agent information.

Physical Agent Maintenance

BRWEXM: Browse Medical Exam. To review medical exams associated with a physical agent, press the 'BrwExm' function key combination.

BRWCRS: Browse Training Course. To review training courses associated with a physical agent, press the 'BrwCrs' function key combination.

Physical Agent Course Maintenance

PURPOSE: To search for, insert, modify, or delete training course information associated with a physical agent. Also use this screen to access physical agent information and to access medical exam information for review or modification. This information is used to determine the recommended training courses an employee should take.

Physical Agent Course Maintenance

SEARCH: With the cursor on the first blank line, enter a full or partial Course Number or Course Name and press the 'Find' key. If the first line is not blank, use the space bar to clear the fields before entering information. To start at the beginning of the list, press the 'Find' key. To see additional courses, press the 'Next Screen' key.

Physical Agent Course Maintenance

INSERT: Required: Course Number. After entering course information, press the 'Insert' key.

MODIFY: Search if necessary. Modify the Course Code or Course Frequency Days.

DELETE: Search if necessary. Enter the course to delete or place the cursor on the desired information from the list. Press the 'Delete' function key combination.

Physical Agent Course Maintenance

BRWEXM: Browse Medical Exam To review medical exams associated with a physical agent, search if necessary. Enter the exam or place the cursor on the desired exam from the list. Press the 'BrwExm' function key combination.

UPDEXM: Medical Exam. To update medical exams associated with a physical agent, search if necessary. Enter the exam or place the cursor on the desired exam from the list. Press the 'UpdExm' function key combination.

Physical Agent Course Maintenance

HEADER: Physical Agent Number and Name. To maintain the physical agent number and name, press the 'Header' function key combination.

Physical Agent Exam Maintenance

PURPOSE: To search for, insert, update or delete medical exam information associated with a physical agent. Also use this screen to access physical agent information and training course information for review or modification. This information is used to determine the recommended training courses and medical exams an employee should take.

Physical Agent Exam Maintenance

SEARCH: With the cursor on the first blank line, enter a full or partial Exam Number or Exam Name and press the 'Find' key. If the first line is not blank, use the space bar to clear the screen before entering information. To start at the beginning of the list, press the 'Find' key. To see additional exams, press the 'Next Screen' key.

Physical Agent Exam Maintenance

INSERT: Required: Exam Number. After entering exam information, press the 'Insert' key.

DELETE: Search if necessary. Enter the exam to delete or place the cursor on the desired information from the list. Press the 'Delete' function key combination.

Physical Agent Exam Maintenance

BRWCRS: Browse Training Course. To review training courses associated with a physical agent, search if necessary. Enter the course or place the cursor on the desired course from the list. Press the 'BrwCrs' function key combination.

UPDCRS: Update Training Course. To update training courses associated with a physical agent, search if necessary. Enter the course or place the cursor on the desired course from the list. Press the 'UpdCrs' function key combination.

Physical Agent Exam Maintenance

HEADER: Physical Agent Number and Name. To maintain the physical agent number and name, press the 'Header' function key combination.

Physical Agent Maintenance

PURPOSE: To add or modify the physical agent number and name. Also use this screen to go to the screen where the user may review and maintain medical exams and training courses associated with a physical agent. This information is used to determine the recommended training courses and medical exams an employee should take.

INSERT: Required:
Physical Agent Number
Physical Agent Name
Physical Agent Maintenance
MODIFY: Change the Physical Agent Number or Physical Agent Name.
BRWEXM: Browse Medical Exam. To review medical exams associated with a physical agent, press the 'BrwExm' function key combination.
UPDEXM: Update Medical Exam. To update medical exams associated with a physical agent, press the 'UpdExm' function key combination.
Physical Agent Maintenance
BRWCRS: Browse Training Course. To review training courses associated with a physical agent, press the 'BrwCrs' function key combination.
UPDCRS: Update Training Course. To update training courses associated with a physical agent, press the 'UpdCrs' function key combination.
Physical Agent List
PURPOSE: To search for and select a physical agent. Also use this screen to go to the screen where the user may review and maintain medical exams and training courses associated with a physical agent.
SEARCH: With the cursor on the first blank line, enter a full or partial Physical Agent Code or Physical Agent Name and press the 'Find' key. If the first line is not blank, use the space bar to clear the fields before entering information. To start at the beginning of the list, press the 'Find' key. To see additional physical agents, press the 'Next Screen' key.
Physical Agent List
INSERT: Press the 'Insert' function key combination.
BROWSE: Search if necessary. Enter the physical agent to browse or place the cursor on the desired physical agent from the list. Press the 'Browse' function key combination.
MODIFY: Search if necessary. Enter the physical agent to change or place the cursor on the desired physical agent from the list. Press the 'Modify' function key combination.
Physical Agent List
BRWEXM: Browse Medical Exam. To review medical exams associated with a physical agent, search if necessary. Enter the exam or place the cursor on the desired exam from the list. Press the 'BrwExm' function key combination.
UPDEXM: Update Medical Exam. To update medical exams associated with a physical agent, search if necessary. Enter the exam or place the cursor on the desired exam from the list. Press the 'UpdExm' function key combination.
Physical Agent List
BRSCRS: Browse Training Course. To review training courses associated with a physical agent, search if necessary. Enter the course or place the cursor on the desired course from the list. Press the 'BrwCrs' function key combination.
UPDCRS: Update Training Course. To update training courses associated with a physical agent, search if necessary. Enter the course or place the cursor on the desired course from the list. Press the 'UpdCrs' function key combination.

Training List
PURPOSE: To search for and select training course information.
SEARCH: With cursor on the first blank line, enter a full or partial Course Number or Course Name and press the 'Find' key. If the first blank, use the space bar to clear the fields before entering information. To start at the beginning of the list, press the 'Find' key. To see additional courses, press the 'Next Screen' key.
Training Course List
SELECT: Place the cursor on the desired course. Press the 'Return' function key to return the selected information to the detail screen.
Medical Exam List
PURPOSE: To search for and select medical exam information.
SEARCH: With the cursor on the first blank line, enter a full or partial Medical Exam Code or Medical Exam Name and press the 'Find' key. If the first line is not blank, use the space bar to clear the fields before entering information. To start at the beginning of the list, press the 'Find' key. To see additional exams, press the 'Next Screen' key.
Medical Exam List
SELECT: Place the cursor on the desired exam. Press the 'Return' function key to return the selected information to the detail screen.

2. Compliance Quantities (ENCQ)

a. CQ Inquiry (EN10)

The CQ (Compliance Quantities) Maintenance conversation (EN10) may be used to review all compliance quantities existing on the system. A compliance quantity represents a permissible amount that is associated with any item that is regulated. Sources of compliance quantities include agencies (OSHA, EPA), permits, local regulations, and internal standards.

The information about compliance quantities that displays in this conversation may include the source, the associated item or physical agent, the location code (if a compliance quantity is for a specific location), the type, the value, and the unit of measure.

Compliance Quantities List
PURPOSE: To search for compliance quantity information.
SEARCH: With the cursor on the first blank line, enter a full of partial CQ Source, Exposure Source, Exposure Type, or Location Code. If the first line is not blank, use the space bar to clear the fields before entering information. To start at the beginning of the list, press the 'Find' key. To see additional compliance quantities, press the 'Next Screen' key.
Environmental Location List
PURPOSE: To search for and select an environmental location.
SEARCH: With the cursor on the first blank line, enter a full or partial Location Number or Location Description and press the 'Find' key. If the first line is not blank, use the space bar to clear the fields before entering information. To start at the beginning of the list, press the 'Find' key. To see additional locations, press the 'Next Screen' key.
Environmental Location List SELECT: Place the cursor on the desired location. Press the 'Return' function key to return the selected information to the detail screen.

Compliance Quantity Source List

PURPOSE: To search for and select a compliance quantity source.

SEARCH: With the cursor on the first blank line, enter a full or partial CQ Source Code or CQ Source Description and press the 'Find' key. If the first line is not blank, use the space bar to clear the fields before entering information. To start at the beginning of the list, press the 'Find' key. To see additional compliance quantity sources, press the 'Next Screen' key.

Compliance Quantity Source List

SELECT: Place the cursor on the desired compliance quantity source. Press the 'Return' function key to return the selected information to the detail screen.

b. CQ Source Maintenance (EN11)

The CQ (Compliance Quantity) Source Maintenance conversation (EN11) may be used to create and maintain information about compliance quantity sources. Sources of compliance quantities include agencies (OSHA, EPA), permits, local regulations, and internal standards.

This conversation may be used to enter information for all compliance quantities that appear on a specific source, such as the value for the compliance quantity, the item number or physical agent code, location code, and A user may also enter information about agencies to be notified when a source exceeds a compliance quantity.

CQ Source Maintenance

PURPOSE: To browse compliance quantity source information and to access additional compliance quantity source information and agency notification information when a compliance quantity is exceeded. A compliance quantity source is any source of compliance quantities, including federal lists, permits, or internal standards.

CQ Source Maintenance

BROWSE: Review the compliance quantity source information. Compliance Quantity Notification. To maintain agency NOTIF: notification information, press the 'CQNotf' function key combination.

CQ  Compliance Quantity Quantities. To review compliance

QTY: quantity source information, press the 'CQ Qty' function key combination.

CQ Source Quantity Maintenance

PURPOSE: To browse compliance quantity source information and to access compliance quantity notification and physical agent information. Compliance quantities are used to determine if EPA notification is necessary for an unplanned release of material. This information determines if results from environmental and exposure monitoring exceeds federal, local, or internal standards.

CQ Source Quantity Maintenance

SEARCH: With the cursor on the first blank line, enter a full or partial Compliance Quantity or Unit of Measure and press the 'Find' key. If the first line is not blank, use the space bar to clear the fields before entering information. To start at the beginning of the list, press the 'Find' key. To see additional exposure information, press the 'Next Screen' key.

CQ Source Quantity Maintenance

BROWSE: Review the compliance source quantity information.

NOTIF: Compliance Quantity Notification. To maintain agency notification information, press the 'CQ Notf' function key combination.

CQ Source Notification Maintenance

PURPOSE: To browse agency notification information and to access compliance quantity source information.

SEARCH: With the cursor on the first blank line, enter a full or partial Agency Code or Agency Name and press the 'Find' key. If the first line is not blank, use the space bar to clear the fields before entering information. To start at the beginning of the list, press the 'Find' key. To see additional agencies, press the 'Next Screen' key.

CQ Source Notification Maintenance

BROWSE: Review the notification information.

CQQTY: Compliance Quantity Quantities. To review compliance quantity source information, press the 'CQ Qty' function key combination.

CQ Source Maintenance

PURPOSE: To modify compliance quantity source information and to access additional compliance quantity source information and agency notification information when a compliance quantity is exceeded. A compliance quantity source is any source of compliance quantities, including federal lists, permits, or internal standards.

CQ Source Maintenance

MODIFY: Change any information except the CQ Source Code.

NOTIF: Compliance Quantity Notification. To maintain agency notification information, press the 'CQNotf' function key combination.

CQQTY: Compliance Quantity Quantities. To maintain compliance quantity source information, press the 'CQ Qty' function key combination.

CQ Source Quantity Maintenance

PURPOSE: To search for, insert, update or delete a compliance quantity source and to access compliance quantity agency information. Compliance quantities are used to determine if agency notification is necessary as the result of some occurrence which has occurred in the plant.

CQ Source Quantity Maintenance

SEARCH: With the cursor on the first blank line, enter a full or partial Compliance Quantity or Unit of Measure and press the 'Find' key. If the first line is not blank, use the space bar to clear the fields before entering information. To start at the beginning of the list, press the 'Find' key. To see additional compliance quantity sources, press the 'Next Screen' key.

CQ Source Quantity Maintenance

INSERT: Required: CQ Qty (Compliance Quantity) and UM (Unit of Measure). After entering compliance quantity information, press the 'Insert' key.

DELETE: Search if necessary. Enter the compliance quantity information to delete or place the cursor on the desired information from the list. Press the 'Delete' function key combination.

CQ Source Quantity Maintenance

NOTIF: Compliance Quantity Notification. To maintain agency notification information, press the 'CQ Notf' function key combination.

PHYAG: Physical Agent. To maintain physical agent information, press the 'PhyAg' function key combination.

CQ Source Notification Maintenance

PURPOSE: To search for, insert, update or delete agency notification information and to access compliance quantity source information.

SEARCH: With the cursor on the first blank line, enter a full or partial Agency Code or Agency Name and press the 'Find' key. If the first line is not blank, use the space bar to clear the fields before entering information. To start at the beginning of the list, press the 'Find' key. To see additional agencies, press the 'Next Screen' key.

CQ Source Notification Maintenance

INSERT: Required: Agency Code. After entering agency information, press the 'Insert' key.

MODIFY: Search if necessary. Modify the Notification Days or Report Description.

CQ Source Notification Maintenance

DELETE: Search if necessary. Enter the agency to delete or place the cursor on the desired information from the list. Press the 'Delete' function key combination.

CQQTY: Compliance Quantity Quantities. To review compliance quantity source information, press the 'CQ Qty' function key combination.

Compliance Quantity Source List

PURPOSE: To search for and select a compliance quantity source.

SEARCH: With the cursor on the first blank line, enter a full or partial CQ Source Code or CQ Source Description and press the 'Find' key. If the first line is not blank, use the space bar to clear the fields before entering information. To start at the beginning of the list, press the 'Find' key. To see additional compliance quantity sources, press the 'Next Screen' key.

Compliance Quantity Source List

INSERT: Press the 'Insert' function key combination.

BROWSE: Search if necessary. Enter the compliance quantity source to review or place the cursor on the desired item from the list. Press the 'Browse' function key combination.

MODIFY: Search if necessary. Enter the compliance quantity source to change or place the cursor on the desired item from the list. Press the 'Modify' function key combination.

Agency List

PURPOSE: To search for and select an agency.

SEARCH: With the cursor on the first blank line, enter a full or partial Agency Code or Agency Name and press the 'Find' key. If the first line is not blank, use the space bar to clear the fields before entering information. To start at the beginning of the list, press the 'Find' key. To see additional agencies, press the ,Next Screen, key.

Agency List

SELECT: Place the cursor on the desired agency. Press the 'Return' function key to return the selected information to the detail screen.

Item List

PURPOSE: To search for and select an item.

SEARCH: With the cursor on the first blank line, enter a full or partial Item Number, Item Name, or Type and press the 'Find' key. If the first line is not blank, use the space bar to clear the fields before entering information. To start at the beginning of the list, press the 'Find' key. To see additional items, press the 'Next Screen' key.

Item List

SELECT: Place the cursor on the desired item. Press the 'Return' function key to return the selected information to the detail screen.

Physical Agent

PURPOSE: To search for and select a physical agent.

SEARCH: With the cursor on the first blank line, enter a full or partial Physical Agent Code or Physical Agent Name and press the 'Find' key. If the first line is not blank, use the space bar to clear the fields before entering information. To start at the beginning of the list, press the 'Find' key. To see additional physical agents, press the 'Next Screen' key.

Physical Agent

SELECT: Place the cursor on the desired physical agent. Press the 'Return' function key to return the selected information to the screen.

Environmental Location List

PURPOSE: To search for and select an environmental location.

SEARCH: With the cursor on the first blank line, enter a full or partial Location Number or Location Description and press the 'Find' key. If the first line is not blank, use the space bar to clear the fields before entering information. To start at the beginning of the list, press the Find, key. To see additional locations, press the 'Next Screen' key.

Environmental Location List

SELECT: Place the cursor on the desired location. Press the 'Return' function key to return the selected information to the detail screen.

3. Release Management (ENRM)

a. Unplanned Release Maintenance (EN03)

The Unplanned Release Maintenance conversation (EN03) may be used to record and maintain information about chemical releases within the facility or during the transportation of a chemical item.

In addition to unplanned release information, use this conversation may be used to enter comments about the release, maintain the quantity of items released, and indicate clean-up procedures.

Unplanned Release Maintenance

PURPOSE: To revise, insert, browse, or modify information associated with an unplanned release. This information identifies where and when a release occurred, the cause of the release, and the number of people affected. This information is used when creating agency notifications.

REVISE: To revise the header information, including the item number, name, and release quantity/unit of measure, press the 'Revise' function key combination.

Unplanned Release Maintenance

INSERT: Required:
Start Date/Time
Media
End Date/Time
Release Cause
Discovered Date/Time NOTE: The end date/time must be later than the start date/time.

BROWSE: Review the unplanned release item information.

Unplanned Release Maintenance

MODIFY: Change any field except Release Number, Release Revision Number, and Location Description.

ITMLST: Item List To see the items and quantities release associated with an unplanned release, press the 'Item List' function key combination.

Unplanned Release Item Maintenance

PURPOSE: To search for, insert, update or delete item information associated with an unplanned release. Also use this screen to access and enter any comments about the items associated with an unplanned release.

SEARCH: With the cursor on the first blank line, enter a full or partial Item Number or Item Name and press the 'Find' key. If the first line is not blank, use the space bar to clear the fields before entering information. To start at the beginning of the list, press the 'Find' key. To see additional information, press the 'Next Screen' key.

INSERT: Add items by moving the cursor below the items listed. Press the 'Insert' key. Required:
Item Number
UM (Unit of Measure)
Release Quantity Unplanned Release Item Maintenance DELETE: Search if necessary. Delete unplanned release items by placing the cursor on the appropriate item and pressing the 'Delete' function key combination; confirm the deletion by pressing the 'Remove' key or retain the item by pressing the 'Unconfirm' function key combination.

Unplanned Release Item Maintenance

TEXT: To enter comments about the unplanned release, press the 'Text' function key combination. On the word processing screen, type in the comments above the [End of file] statement. When finished, press the 'F10' function key. When the screen with "Choose Desired Action . . . " appears, to save the comments, press the 'F10' function key. To cancel the comments, press the 'Remove' key.

Unplanned Release List

PURPOSE: To search for and select an unplanned release. This screen allows the user to access and revise release information including the materials released.

SEARCH: With the cursor on the first blank line, enter a full or partial Release Number, Start Date, or Location Number and press the 'Find' key. If the first line is not blank, use the space bar to clear the fields before entering information. To start at the beginning of the list, press the 'Find' key. To see additional releases, press the 'Next Screen' key.

Unplanned Release List

REVISE: Press the 'Revise' function key combination.

INSERT: Press the 'Insert' function key combination.

BROWSE: Search if necessary. Enter the release to browse or place the cursor on the desired release from the list. Press the 'Browse' function key combination.

Unplanned Release List

MODIFY: Search if necessary. Enter the release to change or place the cursor on the desired release from the list. Press the 'Modify' function key combination.

ITMLST: Item List. To see the items and quantities associated with an unplanned release, search if necessary. Enter the release or place the cursor on the desired release from the list. Press the 'Itm Lst' function key combination.

Item List

PURPOSE: To search for and select an item.

SEARCH: With the cursor on the first blank line, enter a full or partial Item Number, Item Name, or Type and press the 'Find' key. If the first line is not blank, use the space bar to clear the fields before entering information. To start at the beginning of the list, press the 'Find' key. To see additional items, press the 'Next Screen' key.

SELECT: Place the cursor on the desired item. Press the 'Return'function key to return the selected information to the detail screen.

Environmental Location List

PURPOSE: To search for and select location information to add to the detail screen.

SEARCH: With the cursor on the first blank line, enter a full or partial Location Number or Location Description and press the 'Find' key. If the first line is not blank, use the space bar to clear the fields before entering information. To start at the beginning of the list, press the 'Find' key. To see additional locations, press the 'Next Screen' key.

Environmental Location List

SELECT: Place the cursor on the desired location. Press the 'Return' function key to return the selected information to the detail screen.

b. Agency Notification Maintenance (EN05)

The Agency Notification Maintenance conversation (EN05) may be used to support unplanned release notification requirements. This conversation may be used in conjunction with the Unplanned Release Maintenance conversation (EN03) to notify agencies after an unplanned release. For each agency notification, the screen displays the notification type and allowed time period to notify the agency. This conversation may also be used to create unplanned release documentation and make revisions to suggested agency notifications.

The operator reporting a release may use the Unplanned Release Maintenance conversation (EN03) to enter the items released and their quantities. The Agency Notification Maintenance conversation (EN05) will then break these quantities down to a molecular level and compare them to reportable quantities. Based on this comparison, a threshold quantity, and information from the Facility Maintenance conversation (CS06), the system will suggest appropriate notifications.

Agency Notification Maintenance

PURPOSE: To create or revise an agency notification of an unplanned release. This screen allows the user to maintain the items which were released and are included in the notification. This information is used to create an agency notification report. Also use this screen to access comments about the agency notification, the CQ Actual Quantity Comparison List, or the Agency Notification List.

Agency Notification Maintenance

INSERT: Required:
Notification Number (system generated)

Notification Revision Number

MODIFY: Change any accessible field.

DELETE: Place the cursor on the item to delete. Press the 'Delete' function key combination. Confirm the deletion by pressing the 'Confirm' function key combination or retain the item by pressing the 'Unconfirm' function key combination key.

Agency Notification Maintenance

DELETE: Items with an actual quantity greater than the compliance quantity cannot be deleted.

EDITTEXT: Add Comments. To add comments about the agency notification, press the 'EditText' function key combination. On the word processing screen, enter comments above the [End of file] statement. When through, press the 'F10' function key. When the screen with "Choose Desired Action . . . " appears, to save the text, press the 'F10' function key. To cancel the text, press the 'Remove' key.

Agency Notification Maintenance

BRWSTEXT: Browse Comments. To browse comments about the agency notification, press the 'BrswText' function key combination.

BRWSCQ: Browse CQ Actual Quantity Comparison. Search if necessary. Place the cursor on the exception event associated with the actual quantity comparison to browse and press the 'BrwsCq' function key combination.

Agency Notification Maintenance

BRAGEN: Browse Agency Notification. Search if necessary. Place the cursor on the exception event associated with the agency notification to browse and press the 'BrAgen' function key combination.

CQ (Compliance Quantity) Exception Event List

PURPOSE: To search for a CQ exception event and access the associated actual quantity comparison list or agency notification list.

SEARCH: With the cursor on the first blank line, enter a full or partial Event Number, Event Type, Event Description, Start Date or Location Number and press the 'Find' key. If the first line is not blank, use the space bar to clear the fields before entering information. To start at the beginning of the list, press the 'Find' key. To see additional exception events, press the 'Next Screen' key.

CQ (Compliance Quantity) Exception Event List

BRWSCQ: Browse CQ Actual Quantity Comparison. Search if necessary. Place the cursor on the exception event associated with the actual quantity comparison to browse and press the 'BrwsCq' function key combination.

BRAGEN: Browse Agency Notification. Search if necessary. Place the cursor on the exception event associated with the agency notification to browse and press the 'BrAgen' function key combination.

CQ (Compliance Quantity) Actual Quantity Comparison List

PURPOSE: To search for the actual quantity and compliance quantity comparisons for an exception event and create an agency notification or access a list of agency notifications.

SEARCH: With the cursor on the first blank line, enter a full or partial Agency Code, Exposure Source, Exposure Source Type, or Reported Quantity Source Code and press the 'Find' key. If the first line is not blank, use the space bar to clear the fields before entering information. To start at the beginning of the list, press the 'Find' key. To see additional quantity information, press the 'Next Screen' key.

CQ (Compliance Quantity) Actual Quantity Comparison List

INSERT: To create an agency notification, press the 'Insert' function key combination. Agency notifications must be unique.

BRAGEN: Browse Agency Notification. Search if necessary. Place the cursor on the exception event associated with the agency notification to browse and press the 'BrAgen' function key combination.

Agency Notification List

PURPOSE: To search for an agency notification to browse or modify. Also use this screen to access compliance quantity actual comparisons for an exception event.

SEARCH: With the cursor on the first blank line, enter a full or partial Notification Number, Notification Revision Number, Notification Date or Agency Code and press the 'Find' key. If the first line is not blank, use the space bar to clear the fields before entering information. To start at the beginning of the list, press the 'Find' key. To see additional agency notifications, press the 'Next Screen' key.

Agency Notification List

BROWSE: Search if necessary. Enter the notification to browse or place the cursor on the notification from the list. Press the 'Browse' function key combination.

ANREVIS: Agency Notification Revision. Search if necessary. Enter the notification to revise or place the cursor on the notification from the list. Press the 'ANRevis' function key combination.

Agency Notification List

BRWSCQ: Browse CQ Actual Quantity Comparison. Search if necessary. Place the cursor on the exception event associated with the actual quantity comparison to browse and press the 'BrwsCq' function key combination.

4. Waste Management (ENWM)

a. Waste Shipping Request Maintenance (EN07)

The Waste Shipping Request Maintenance conversation (EN07) may be used to enter a request for the shipment of waste materials. Each waste shipping request is identified by a shipping request number.

For a waste shipping request, a user may include the shipping request status, the number of the waste item/spec that is to be shipped, the quantity to be shipped, and information about the location and container of the waste.

After entering a request, a user may schedule the waste for shipment using the Waste Shipment Maintenance conversation (MM52).

Waste Shipping Request Maintenance

PURPOSE: To browse information associated with a waste shipping request. A waste request is a request to ship a quantity of waste from an area of inventory.

BROWSE: Review the waste shipping request information.

Waste Shipping Request Maintenance

PURPOSE: To insert or modify information associated with a waste shipping request. A waste request is a request to ship a quantity of waste from an area of inventory.

INSERT: Required:

Ship Request Number
Ship Request Status
Requested Ship Quantity/Unit of Measure
MODIFY: Change the Ship Request Status or Requested Ship Quantity/Unit of Measure.
Waste Shipping Request List
PURPOSE: To search for and select a waste shipping request.
SEARCH: With the cursor on the first blank line, enter a full of partial Status, Item Number, or Item/Spec Number. If the first line is not blank, use the space bar to clear the fields before entering information. To start at the beginning of the list, press the 'Find' key. To see additional information, press the 'Next Screen' key.
Waste Shipping Request List
INSERT: Press the 'Insert' function key combination.
BROWSE: Search if necessary. Enter the item to browse or place the cursor on the desired item from the list. Press the 'Browse' function key combination.
MODIFY: Search if necessary. Enter the item to change or place the cursor on the desired item from the list. Press the 'Modify' function key combination.
Inventory List By Keys
PURPOSE: To search for and select inventory locations for items.
SEARCH: With the cursor on the first blank line, enter a full or partial Item Number, Item Spec Number, Owner Code, Inventory Status Code, Lot Number, Grade, Container, Building, or Inventory Location Code and press the 'Find' key. If the first line is not blank, use the space bar to clear the fields before entering information.
Inventory List By Keys
SEARCH: To start at the beginning of the list, press the 'Find' (cont) key. To see additional locations, press the 'Next Screen' key.
SELECT: Place the cursor on the desired inventory item. Press the 'Return' function key to return the selected information to the detail screen.
  b. Waste Profile Maintenance (EN09)

The Vendor Maintenance conversation (CS09) may be used to define and maintain information about vendors providing products, materials, services, or utilities.

Vendor information includes the vendor's address, the language and currency used by the vendor, trade terms, payment terms, shipping mode, and performance rating.

Vendor information may be used to create purchase orders and to record the receipt of materials. To define a relationship between vendors and their products, a user may use the Item/Spec/Vendor Maintenance conversation (CS21).

Waste Profile Maintenance
PURPOSE: To browse waste profile information. A waste profile is an agreement by a waste treatment facility to accept a specified type of waste from the plant. This information is used during the shipping function.
BROWSE: Review the waste profile information.
Waste Profile Maintenance
PURPOSE: To insert or modify waste profile information. A waste profile is an agreement by a waste treatment facility to accept a specified type of waste from the plant. This information is used during the shipping function.
INSERT: Required:
Profile Number
Waste Facility Code
Active Profile flag
Container Type
Item Number
Profile
Creation
Date
Spec Number
Certification Date
Waste Profile Maintenance
MODIFY: Change the Active Profile flag, Profile Creation Date, Profile Close Date, Certification Date, Maximum Ship Quantity/Unit of Measure.
Waste Profile List
PURPOSE: To search for and select a waste profile. Also use this screen to view all shipments associated with the selected profile.
SEARCH: With the cursor on the first blank line, enter a full or partial Profile Number, Item/Spec Number, or Waste Facility code and press the 'Find' key. If the first line is not blank, use the space bar to clear the fields before entering information. To start at the beginning of the list, press the 'Find' key. To see additional profiles, press the 'Next Screen' key.
Waste Profile List
INSERT: Press the 'Insert' function key combination.
BROWSE: Search if necessary. Enter the waste profile to browse or place the cursor on the desired waste profile from the list. Press the 'Browse' function key combination.
MODIFY: Search if necessary. Enter the waste profile to change or place the cursor on the desired waste profile from the list. Press the 'Modify' function key combination.
Waste Profile List
SHIP: Search if necessary. Enter the waste profile to ship or place the cursor on the desired waste profile from the list. Press the 'Ship' function key combination.
Waste Profile Shipment Line List
PURPOSE: To maintain information about each shipment associated with a waste profile.
SEARCH: With the cursor on the first blank line, enter a full or partial Shipment Number, Ship Line Status, Scheduled Date, or Acknowledged Date and press the 'Find' key. If the first line is not blank, use the space bar to clear the fields before entering information. To start at the beginning of the list, press the 'Find' key. To see additional shipments, press the 'Next Screen' key.
Waste Profile Shipment Line List
BROWSE: Search if necessary. Enter the shipment to browse or place the cursor on the desired shipment from the list. Press the 'Browse' function key combination.
MODIFY: Search if necessary. Enter the shipment to change or place the cursor on the desired shipment from the list. Press the 'Modify' function key combination.
Item/Spec Name List
PURPOSE: To search for and select an item/spec.

SEARCH: With the cursor on the first blank line, enter a full or partial Item Number, Item/Spec Number, or Item Name and press the 'Find' key. If the first line is not blank, use the space bar to clear the fields before entering information. To start at the beginning of the list, press the 'Find' key. To see additional items, press the 'Next Screen' key.

Item/Spec Name List

SELECT: Place the cursor on the desired item. Press the 'Return' function key to return the selected information to the detail screen.

Agency List

PURPOSE: To search for and select an agency.

SEARCH: With the cursor on the first blank line, enter a full or partial Agency Code or Agency Name and press the 'Find' key. If the first line is not blank, use the space bar to clear the fields before entering information. To start at the beginning of the list, press the 'Find' key. To see additional items, press the 'Next Screen' key.

Agency List

SELECT: Place the cursor on the desired agency. Press the 'Return' function key to return the selected information to the detail screen.

Item—Valid Container List

PURPOSE: To search for and select container information for an item/spec.

SEARCH: With the cursor on the first blank line, enter a full or partial Container Code or Description and press the 'Find' key. If the first line is not blank, use the space bar to clear the fields before entering information. To start at the beginning of the list, press the 'Find' key. To see additional containers, press the 'Next Screen' key.

Item—Valid Container List

SELECT: Place the cursor on the desired container. Press the 'Return' function key to return the selected information to the detail screen.

c. Biennial Summary Maintenance (EN14)

The Waste Generator Report Maintenance conversation (EN14) may be used to enter and maintain text describing the efforts taken to reduce the production of waste for the selected year as well as the actual results of the efforts taken.

Year List

PURPOSE: To search for and select a year in order to enter waste reduction efforts and results that will appear on the Biennial Summary Report.

SEARCH: With the cursor on the first blank line, enter a full or partial Year and press the 'Find' key. If the first line is not blank, use the space bar to clear the fields before entering information. To start at the beginning of the list, press the 'Find' key. To see additional years, press the 'Next Screen' key.

Year List

EFFORTS: To enter waste reduction efforts for the year, press the 'Effrt' function key combination. On the word processing screen, type the efforts above the [End of file] statement. When through, press the 'F10' function key. When the screen with "Choose Desired Action..." appears, to save the text, press the 'F10' function key. To cancel the text, press the 'Remove' key.

Year List

RESULTS: To enter waste reduction results for the year, press the 'Rslts' function key combination. On the word processing screen, type the results above the [End of file] statement. When through, press the 'F10' function key. When the screen with "Choose Desired Action..." appears, to save the text, press the 'F10' function key. To cancel the text, press the 'Remove' key.

5. Employee Exposures (ENEE)

a. Employee Job/Location Maintenance (EN16)

The Employee Job/Location Maintenance conversation (EN16) may be used to create and maintain a list of an employee's jobs and the locations where the employee performs each job. For each employee, a user may enter the job code associated with the job that the employee performs and the location code associated with the location where the employee performs the job.

The information in this conversation determines which medical exams and training courses that an employee should take. It also tracks an employee's exposure to materials, items, and physical agents.

Employee Job Location Maintenance

PURPOSE: To search for and browse employee job location information. This information is used to determine the materials to which an employee is exposed. It also determines recommended medical exams and training courses for an employee to take.

SEARCH: With the cursor on the first blank line, enter a full or partial Job Code, Job Name, or Location Code and press the 'Find' key. If the first line is not blank, use the space bar to clear the fields before entering information.

Employee Job Location Maintenance

SEARCH: To start at the beginning of the list, press the 'Find' key. To see additional job location information, press the 'Next Screen' key.

BROWSE: Review the job location information.

Employee Job Location Maintenance

PURPOSE: To search for, insert, or delete employee job location information. This information is used to determine materials to which an employee is exposed. It also determines recommended medical exams and training courses for an employee to take.

Employee Job Location Maintenance

SEARCH: With the cursor on the first blank line, enter a full or partial Job Code, Job Name, or Location Code and press the 'Find' key. If the first line is not blank, use the space bar to clear the fields before entering information. To start at the beginning of the list, press the 'Find' key. To see additional job location information, press the 'Next Screen' key.

INSERT: All fields are optional. After entering job location information, press the 'Insert' function key combination.

Employee Job Location Maintenance

DELETE: Search if necessary. Enter the job location to delete or place the cursor on the desired item from the list. Press the 'Delete' function key combination. Be sure this is the job location information to delete. Confirm the deletion by pressing the 'LnConf' function key combination or retain the component by pressing the 'Unconfirm' function key combination.

Employee List

PURPOSE: To search for and select an employee.

SEARCH: With the cursor on the first blank line, enter a full or partial Employee Number or Last Name and press the 'Find' key. If the first line is not blank, use the space bar to clear the fields before entering information. To start at the beginning of the list, press the 'Find' key. To see additional employees, press the 'Next Screen' key.

Employee List

BROWSE: Search if necessary. Enter the employee number/name or place the cursor on the desired employee from the list. Press the 'Browse' function key combination.

MODIFY: Search if necessary. Enter the employee number/name or place the cursor on the desired employee from the list. Press the 'Modify' function key combination.

Environmental Location List

PURPOSE: To search for and select an environmental location.

SEARCH: With the cursor on the first blank line, enter a full or partial Location Number or Location Description and press the 'Find' key. If the first line is not blank, use the space bar to clear the fields before entering information. To start at the beginning of the list, press the 'Find' key. To see additional locations, press the 'Next Screen' key.

Environmental Location List

SELECT: Place the cursor on the desired location. Press the 'Return' function key to return the selected information to the screen.

Job Type List

PURPOSE: To search for and select a job type.

SEARCH: With the cursor on the first blank line, enter a full or partial Job Code or Job Name and press the 'Find' key. If the first line is not blank, use the space bar to clear the fields before entering information. To start at the beginning of the list, press the 'Find' key. To see additional job types, press the 'Next Screen' key.

Job Type List

SELECT: Place the cursor on the desired job type. Press the 'Return' function key to return the selected information to the screen.

b. Job/Location Exposure Maintenance (EN17)

The Job/Location Exposure Maintenance conversation (EN17) may be used to create and maintain information associated with the items and physical agents encountered on a specific job at a specific location.

This conversation may also be used to record the number and type of each exposure for a job/location, the exposure quantity, and unit of measure. A user may also enter the exposure quantity for each component of an exposure.

Job Location Exposure Maintenance

PURPOSE: To browse job/location exposure information and to access item health hazards information. This information is used to determine recommended medical exams and training courses for an employee to take. It also determines the material to which employees are exposed.

Job Location Exposure Maintenance

SEARCH: With the cursor on the first blank line, enter a full or partial Exposure Number, Exposure Type, or Exposure Name. If the first line is not blank, use the space bar to clear the fields before entering information. To start at the beginning of the list, press the 'Find' key. To see additional exposure information, press the 'Next Screen' key.

BROWSE: Review the job location exposure information.

Job Location Exposure Maintenance

PHYAG: Physical Agent. To review physical agent information associated with an exposure for a job location, press the 'PhyAg' function key combination.

ITMHAZ: Item Health Hazards. To review item health hazard information associated with an exposure for a job location, press the 'ItmHaz' function key combination.

Job Location Exposure Component Maintenance

PURPOSE: To browse job/location exposure component information and to access item health hazards information. This information is used to determine the material to which employees are exposed. It also determines the recommended medical exams and training courses which all employees are to take.

Job Location Exposure Component Maintenance

SEARCH: With the cursor on the first blank line, enter a full or partial Component Number, Exposure Number, Type, or Component Name. If the first line is not blank, use the space bar to clear the fields before entering information. To start at the beginning of the list, press the 'Find' key. To see additional exposure component information, press the 'Next Screen' key.

BROWSE: Search if necessary. Review the job location exposure information.

Job Location Exposure Component Maintenance

ITMHAZ: Item Health Hazards. To review item health hazard information associated with an exposure for a job location, press the 'ItmHaz' function key combination.

Item—Health Hazards

PURPOSE: To review health hazards information and access exposure components and exposure sources.

EXPCMP: Exposure Component. To review exposure component information associated with a job location, press the 'Expcmp' function key combination.

EXPSR: Exposure Sources. To review exposure source information associated with a job location, press the 'Expsr' function key combination.

Job Location Exposure Maintenance

PURPOSE: To search for, insert, modify, or delete job location exposure information and to access item health hazards and exposure component information. This information is used to determine recommended medical exams and training courses for an employee to take, and to determine the materials to which the employee is exposed.

Job Location Exposure Maintenance

SEARCH: With the cursor on the first blank line, enter a full or partial Exposure Number, Type, or Exposure Name. If the first line is not blank, use the space bar to clear the fields before entering information. To start at the beginning of the list, press the 'Find' key. To see additional exposure information, press the 'Next Screen' key.

MODIFY: Search if necessary. Enter the exposure information to change or place the cursor on the desired information from the list. Press the 'Modify' function key combination.

Job Location Exposure Maintenance

DELETE: Search if necessary. Enter the exposure information to change or place the cursor on the desired information from the list. Press the 'Delete' function key combination.

PHYAG: Physical Agent. To review physical agent information associated with an exposure for a job location, press the 'PhyAg' function key combination.

Job Location Exposure Maintenance

ITMHAZ: Item Health Hazards. To review item health hazard information associated with an exposure for a job location, press the 'ItmHaz' function key combination.

Job Location Exposure Component Maintenance

PURPOSE: To search for or modify job/location exposure component information and to access item health hazards information. This information is used to determine the materials to which employees are exposed. It also determines the recommended medical exams and training courses which all employees are to take.

Job Location Exposure Component Maintenance

SEARCH: With the cursor on the first blank line, enter a full or partial Component Number, Exposure Number, Type, or Component Name. If the first line is not blank, use the space bar to clear the fields before entering information. To start at the beginning of the list, press the 'Find' key. To see additional exposure component information, press the 'Next Screen' key.

Job Location Exposure Component Maintenance

MODIFY: Search if necessary. Enter the component/exposure information to change or place the cursor on the desired information from the list. Press the 'Modify' function key combination.

ITMHAZ: Item Health Hazards. To review item health hazard information associated with an exposure for a job location, press the 'ItmHaz' function key combination.

PURPOSE: To review health hazards information and access exposure components and exposure sources.

EXPCMP: Exposure Component. To review exposure component information associated with a job location, press the 'Expcmp' function key combination.

EXPSR: Exposure Sources. To review exposure source information associated with a job location, press the 'Expsr' function key combination.

Job Location List

PURPOSE: To search for and select a job/location record. Also use this screen to access and modify exposure component information.

SEARCH: With the cursor on the first blank line, enter a full of partial Job Code, Job Name, Location Code, or Location Description. If the first line is not blank, use the space bar to clear the fields before entering information. To start at the beginning of the list, press the 'Find' key. To see additional locations, press the 'Next Screen' key.

Job Location List

INSERT: Press the 'Insert' function key combination.

MODIFY: Search if necessary. Enter the location to change or place the cursor on the desired item from the list. Press the 'Modify' function key combination.

Job Location List

BRWCMP: Browse Component. To review component exposure information, search if necessary. Enter the job or place the cursor on the desired job from the list. Press the 'BrwCmp' function key combination.

UDTCMP: Update Component. To update component exposure information, search if necessary. Enter the job or place the cursor on the desired job from the list. Press the 'UdtCmp' function key combination.

Physical Agent

PURPOSE: To search for and select a physical agent.

SEARCH: With the cursor on the first blank line, enter a full or partial Physical Agent Code or Physical Agent Name and press the 'Find' key. If the first line is not blank, use the space bar to clear the fields before entering information. To start at the beginning of the list, press the 'Find' key. To see additional physical agents, press the 'Next Screen' key.

Physical Agent

SELECT: Place the cursor on the desired physical agent. Press the 'Return' function key to return the selected information to the screen.

Item List

PURPOSE: To search for and select an item.

SEARCH: With the cursor on the first blank line, enter a full or partial Item Number, Item Name, or Type and press the 'Find' key. If the first line is not blank, use the space bar to clear the fields before entering information. To start at the beginning of the list, press the 'Find' key. To see additional items, press the 'Next Screen' key.

Item List

SELECT: Place the cursor on the desired item. Press the 'Return' function key to return the selected information to the detail screen.

Environmental Location List

PURPOSE: To search for and select an environmental location.

SEARCH: With the cursor on the first blank line, enter a full or partial Location Number or Location Description and press the 'Find' key. If the first line is not blank, use the space bar to clear the fields before entering information. To start at the beginning of the list, press the 'Find' key. To see additional locations, press the 'Next Screen' key.

Environmental Location List

SELECT: Place the cursor on the desired location. Press the 'Return' function key to return the selected information to the detail screen.

Job Type List

PURPOSE: To search for and select a job type.

SEARCH: With the cursor on the first blank line, enter a full or partial Job Code or Job Name and press the 'Find' key. If the first line is not blank, use the space bar to clear the fields before entering information. To start at the beginning of the list, press the 'Find' key. To see additional job type, press the 'Next Screen' key.

Job Type List

SELECT: Place the cursor on the desired job type. Press the 'Return' function key to return the selected information to the detail screen.

c. Employee Exposure Inquiry (EN18)

The Employee Exposure Inquiry conversation (EN18) may be used to review information about an employee's current or past exposure to items and physical agents.

This conversation may display information about exposures that currently affect an employee. This information includes the exposure number, name, type, the current maximum exposure quantity, and the number of locations where the employee is exposed. It may also display an employee's previous exposure information, including the start and end dates of the exposure, the exposure quantity, and the related job and location codes.

Employee List
PURPOSE: To search for and browse employee numbers and names and to access a list of employee exposures.
SEARCH: With the cursor on the first blank line, enter a full or partial Employee Number or Last Name and press the 'Find' key. If the first line is not blank, use the space bar to clear the fields before entering information. To start at the beginning of the list, press the 'Find' key. To see additional employees, press the 'Next Screen' key.

Employee List
BROWSE: Search if necessary. Press the 'Browse' function key combination to review employee exposure information.

Employee Exposure List
PURPOSE: To search for and browse employee exposure information and to access the history of the employee's exposure information.
SEARCH: With the cursor on the first blank line, enter a full or partial Exposure Source Number, Exposure Source Type, Active Exposure Flag, or Exposure Name and press the 'Find' key. If the first line is not blank, use the space bar to clear the fields before entering information. To start at the beginning of the list, press the 'Find' key. To see additional exposure information, press the 'Next Screen' key.

Employee Exposure List
BROWSE: Search if necessary. Press the 'Browse' function key combination to review the history of the employee's exposure.

Employee Exposure History List
PURPOSE: To search for and review employee exposure history information, including every job/location where an employee is or has been exposed to the selected exposure.

Employee Exposure History List
SEARCH: With the cursor on the first blank line, enter a full or partial Exposure End Date, Job Code, Job Name, Location Code, or Location Description and press the 'Find' key. If the first line is not blank, use the space bar to clear the fields before entering information. To start at the beginning of the list, press the 'Find' key. To see additional exposure history information, press the 'Next Screen' key.

d. Item Exposure Maintenance (EN19)

The Item Exam/Course Maintenance conversation (EN19) may be used to access and maintain information about training courses and medical exams recommended for employees exposed to the selected item.

The training information for review and maintenance includes a list of training courses that an employee should take if exposed to an item or physical agent while working on a job. For each item, a user may enter the job type, course number, and the frequency that the employee should take the course.

The recommended medical exam information for employees who are exposed to an item or physical agent includes the exam number and how often the employee should take the exam. This information displays for each item.

Item/Job Exposure Course Maintenance
PURPOSE: To browse item exposure course information. Also use this screen to access medical exams associated with item exposures. This information is used to determine recommended training courses for employees performing a certain job which exposes him/her to an item.

Item/Job Exposure Course Maintenance
SEARCH: With the cursor on the first blank line, enter a full or partial Course Number or Course Name and press the 'Find' key. If the first line is not blank, use the space bar to clear the fields before entering information. To start at the beginning of the list, press the 'Find' key. To see additional courses, press the 'Next Screen' key.

Item/Job Exposure Course Maintenance
BROWSE: Review the item/job exposure course information.
BRWEXM: Browse Medical Exams. To review medical exams associated with item exposures, search if necessary. Enter the course information or place the cursor on the course from the list and press the 'BrwExm' function key combination.

Item Exposure Exam Maintenance
PURPOSE: To browse item exposure exam information. Also use this screen to access training courses associated with item exposures. This information is used to determine recommended medical exams for employees exposed to a particular item.

Item Exposure Exam Maintenance
SEARCH: With the cursor on the first blank line, enter a full or partial Exam Number or Exam and press the 'Find' key. If the first line is not blank, use the space bar to clear the fields before entering information. To start at the beginning of the list, press the 'Find' key. To see additional exams, press the 'Next Screen' key.
BROWSE: Review the item exposure exam information.

Item Exposure Exam Maintenance
BRWCRS: Browse Training Course. To review training courses associated with item exposures, search if necessary. Enter the exam information or place the cursor on the exam from the list and press the 'BrwCrs' function key combination.

Item/Job Exposure Course Maintenance
PURPOSE: To search for, insert, modify, or delete item exposure course information. Also use this screen to access and maintain medical exams associated with item exposures. This information is used to determine recommended training courses for employees performing a certain job which exposes him/her to an item.

Item/Job Exposure Course Maintenance
SEARCH: With the cursor on the first blank line, enter a full or partial Course Number or Course Name and press the 'Find' key. If the first line is not blank, use the space bar to clear the fields before entering information. To start at the beginning of the list, press the 'Find' key. To see additional courses, press the 'Next Screen' key.
BROWSE: Search if necessary. Enter the course to browse or place the cursor on the desired course from the list. Press the 'Browse' function key combination.

Item/Job Exposure Course Maintenance

INSERT: Required: Job Type Code and Course Number. After entering job type/course information, press the 'Insert' key.

MODIFY: Search if necessary. Change any field except Item Number, Item Name, Description, Job Name, or Course Number.

Item/Job Exposure Course Maintenance

DELETE: Search if necessary. Enter the course to delete or place the cursor on the desired course from the list. Press the 'Delete' function key combination.

BRWEXM: Browse Medical Exams. To review medical exams associated with item exposures, search if necessary. Enter the course information or place the cursor on the course from the list and press the 'BrwExm' function key combination.

Item/Job Exposure Course Maintenance

UPDEXM: Update Medical Exams. To update medical exams associated with item exposures, search if necessary. Enter the course information or place the cursor on the course from the list and press the 'UpdExm' function key combination.

Item Exposure Exam Maintenance

PURPOSE: To search for, insert, modify, or delete item exposure exam information. Also use this screen to access and maintain training courses associated with item exposures. This information is used to determine recommended medical exams for employees exposed to a particular item.

Item Exposure Exam Maintenance

SEARCH: With the cursor on the first blank line, enter a full or partial Exam Number or Exam and press the 'Find' key. If the first line is not blank, use the space bar to clear the fields before entering information. To start at the beginning of the list, press the 'Find' key. To see additional exams, press the 'Next Screen' key.

Item Exposure Exam Maintenance

BROWSE: Search if necessary. Enter the exam to browse or place the cursor on the desired exam from the list. Press the 'Browse' function key combination.

INSERT: Required: Exam Number. After entering exam information, press the 'Insert' key.

MODIFY: Search if necessary. Modify the Exam Number or Frequency.

Item Exposure Exam Maintenance

DELETE: Search if necessary. Enter the exam to delete or place the cursor on the desired information from the list. Press the 'Delete' function key combination.

BRWCRS: Browse Training Course. To review training courses associated with item exposures, search if necessary. Enter the exam information or place the cursor on the exam from the list and press the 'BrwCrs' function key combination.

Item Exposure Exam Maintenance

UPDCRS: Update Training Course. To update training courses associated with item exposures, search if necessary. Enter the exam information or place the cursor on the exam from the list and press the 'UpdCrs' function key combination.

Item List

PURPOSE: To search for and select an item. Also use this screen to access and maintain medical exam and training courses associated with an item.

Item List

SEARCH: With the cursor on the first blank line, enter a full or partial Item Number, Item Name, or Type and press the 'Find' key. If the first line is not blank, use the space bar to clear the fields before entering information. To start at the beginning of the list, press the 'Find' key. To see additional item information, press the 'Next Screen' key.

Item List

BROWSE: Search if necessary. Enter the item to browse or place the cursor on the desired item from the list. Press the 'Browse' function key combination.

BRWEXM: Browse Medical Exam. To review medical exams associated with item exposures, search if necessary. Enter the item information or place the cursor on the item from the list and press the 'BrwExm' function key combination.

Item List

UPDEXM: Update Medical Exam. To update medical exams associated with item exposures, search if necessary. Enter the item information or place the cursor on the item from the list and press the 'UpdExm' function key combination.

BRWCRS: Browse Training Course. To review training courses associated with item exposures, search if necessary. Enter the item information or place the cursor on the item from the list and press the 'BrwCrs' function key combination.

Item List

UPDCRS: Update Training Course. To update training courses associated with item exposures, search if necessary. Enter the item information or place the cursor on the item from the list and press the 'UpdCrs' function key combination.

Item Exposure Employee List

PURPOSE: To search for an employee who is currently exposed to or has been exposed to an item. Also use this screen to review and maintain medical exams and training courses associated with an employee's item exposures.

Item Exposure Employee List

SEARCH: With the cursor on the first blank line, enter a full or partial Employee Number or Employee Last Name and press the 'Find' key. If the first line is not blank, use the space bar to clear the fields before entering information. To start at the beginning of the list, press the 'Find' key. To see additional employee/item information, press the 'Next Screen' key.

Item Exposure Employee List

BROWSE: Search if necessary. Enter the item to browse or place the cursor on the desired item from the list. Press the 'Browse' function key combination.

BRWEXM: Browse Medical Exam. To review medical exams associated with item exposures, search if necessary. Enter the item information or place the cursor on the item from the list and press the 'BrwExm' function key combination.

Item Exposure Employee List

UPDEXM: Update Medical Exam. To update medical exams associated with item exposures, search if necessary. Enter the item information or place the cursor on the item from the list and press the 'UpdExm' function key combination.

BRWCRS: Browse Training Course. To review training courses associated with item exposures, search if necessary. Enter the item information or place the cursor on the item from the list and press the 'BrwCrs' function key combination.

Item Exposure Employee List

UPDCRS: Update Training Course. To update training courses associated with item exposures, search if necessary. Enter the item information or place the cursor on the item from the list and press the 'UpdCrs' function key combination.

Medical Exam List

PURPOSE: To search for and select medical exam information.

SEARCH: With the cursor on the first blank line, enter a full or partial Medical Exam Code or Medical Exam Name and press the 'Find' key. If the first line is not blank, use the space bar to clear the fields before entering information. To start at the beginning of the list, press the 'Find' key. To see additional exams, press the 'Next Screen' key.

Medical Exam List

SELECT: Place the cursor on the desired exam. Press the 'Return' function key to return the selected information to the detail screen.

Job Type List

PURPOSE: To search for and select a job type.

SEARCH: With the cursor on the first blank line, enter a full or partial Job Code or Job Name and press the 'Find' key. If the first line is not blank, use the space bar to clear the fields before entering information. To start at the beginning of the list, press the 'Find' key. To see additional job types, press the 'Next Screen' key.

Job Type List

SELECT: Place the cursor on the desired job type. Press the 'Return' function key to return the selected information to the detail screen.

Training Course List

PURPOSE: To search for and select training course information.

SEARCH: With the cursor on the first blank line, enter a full or partial Course Number or Course Name and press the 'Find' key. If the first line is not blank, use the space bar to clear the fields before entering information. To start at the beginning of the list, press the 'Find' key. To see additional courses, press the 'Next Screen' key.

Training Course List

SELECT: Place the cursor on the desired course. Press the 'Return' function key to return the selected information to the detail screen.

C. HEALTH (PSHL)

1. Medical Surveillance (HLMS)

a. Medical Exam Maintenance (HL01)

The Medical Exam Maintenance conversation (HL01) may be used to create and maintain information about medical exams that employees take. This information preferably includes the exam number, exam name, and both a short and long description of the exam.

To schedule exams or record exam results, a user may use the Exam Schedule Maintenance conversation (HL03).

Medical Exam Maintenance

PURPOSE: To browse medical exam information. Also use this screen to review expected results for medical exams. This information is used in medical functions throughout this system.

BROWSE: Review the medical exam maintenance information.

RESULTS: Expected Results. To review expected results for medical exams, press the 'Results' function key Medical Exam Expected Results Maintenance PURPOSE: To search for or browse medical result information associated with a medical exam. Also use this screen to access medical exam information.

SEARCH: With the cursor on the first blank line, enter a full or partial Result Number or Result Description and press the 'Find' key. If the first line is not blank, use the space bar to clear the screen before entering information. To start at the beginning of the list, press the 'Find' key. To see additional results, press the 'Next Screen' key.

Medical Exam Expected Results Maintenance

BROWSE: Review the expected results information.

HEADER: Exam Number, Name, and Description. To access the exam number, name, and description, press the Medical Exam Maintenance PURPOSE: To insert or modify medical exam information. Also use this screen to access and maintain expected results for medical exams. This information is used in the capturing of actual results in the Scheduled Exam Conversation (HL03).

INSERT: Required:
Exam Number Exam Description—short
Exam Name
Exam Description—long MODIFY: Modify the Exam Name, Exam Description—short, or Exam Description—long.

Medical Exam Maintenance

RESULTS: Expected Results. To review or maintain expected results for medical exams, press the 'Results' function key combination. 'Header' function key combination.

Medical Exam Expected Results Maintenance

PURPOSE: To search for, insert, or delete medical result information associated with a medical exam. Also use this screen to access medical exam information.

SEARCH: With the cursor on the first blank line, enter a full or partial Result Number or Result Description and press the 'Find' key. If the first line is not blank, use the space bar to clear the screen before entering information. To start at the beginning of the list, press the 'Find' key. To see additional results, press the 'Next Screen' key.

Medical Exam Expected Results

INSERT: All fields are optional. Insert results associated with this exam by moving the cursor to a result line below the first blank line. Press the 'Insert' key. Search if necessary. Enter all results associated with this medical exam.

DELETE: Search if necessary. Enter the result delete or place the cursor on the desired result from the list. Press the 'Delete' function key combination.

Medical Exam Expected Results Maintenance

HEADER: Exam Number, Name, and Description. To maintain the exam number, name, and description, press the 'Header' function key combination.

Medical Exam List

PURPOSE: To search for or select a medical exam. Also use this screen to access, review, and maintain expected results and medical exam information.

SEARCH: With the cursor on the first blank line, enter a full or partial Exam Number or Exam Name and press the 'Find' key. If the first line is not blank, use the space bar to clear the fields before entering information. To start at the beginning of the list, press the 'Find' key. To see additional medical exams, press the 'Next Screen' key.

Medical Exam List

INSERT: Press the 'Insert' function key combination.

BROWSE: Search if necessary. Enter the medical exam to browse or place the cursor on the desired medical exam from the list. Press the 'Browse' function key combination.

MODIFY: Search if necessary. Enter the medical exam to change or place the cursor on the desired medical exam from the list. Press the 'Modify' function key combination.

Medical Exam List

UPDRES: Update Medical Exam Results. To update medical exam results and expected results, search if necessary. Enter the exam or place the cursor on the desired exam from the list. Press the 'UpdRes' function key combination.

BRWRES: Browse Medical Exam Results. To review medical exam results and expected results, search if necessary. Enter the exam or place the cursor on the desired exam from the list. Press the 'BrwRes' function key combination.

Medical Result List

PURPOSE: To search for and select result type information.

SEARCH: With the cursor on the first blank line, enter a full or partial Result Type Code or Result Type Name and press the 'Find' key. If the first line is not blank, use the space bar to clear the fields before entering information. To start at the beginning of the list, press the 'Find' key. To see additional result types, press the 'Next Screen' key.

Medical Result List

SELECT: Place the cursor on the desired result. Press the 'Return' function key to return the selected information to the detail screen.

b. Employee Exam Maintenance (HL02)

The Employee Exam Maintenance conversation (HL02) may be used to assign medical exams to employees. Prior to assigning exams, a user may review a list of recommended exams for employees based on the employee's job, job locations, and exposure to hazardous items or physical agents. From this list, a user may choose the exams that the employee should take. If necessary, a user may assign additional exams or adjust the frequency for an exam to be taken on a periodic basis.

To schedule exams and report exam results, a user may use the Exam Schedule Maintenance conversation (HL03).

Employee Exam Maintenance

PURPOSE: To search for and browse employee exam information. Medical exams are recommended for employees as a result of an employee's job, job location, and materials to which an employee is exposed.

Employee Exam Maintenance

SEARCH: With the cursor on the first blank line, enter a full or partial Exam Number or Exam Name and press the 'Find' key. If the first line is not blank, use the space bar to clear the fields before entering information. To start at the beginning of the list, press the 'Find' key. To see additional exams, press the 'Next Screen' key.

BROWSE: Search if necessary. Review the employee's exam information.

Employee Exam Maintenance

PURPOSE: To search for and modify employee exam information. Also use this screen to access and maintain medical exam information. Medical exams are recommended for employees as a result an employee's job, job location, and materials to which an employee is exposed.

Employee Exam Maintenance

SEARCH: With the cursor on the first blank line, enter a full or partial Exam Number or Exam Name and press the 'Find' key. If the first line is not blank, use the space bar to clear the fields before entering information. To start at the beginning of the list, press the 'Find' key. To see additional exams, press the 'Next Screen' key.

Employee Exam Maintenance

INSERT: Place the cursor below the first blank line and press the 'Insert' key. Required:
Exam Number
Active Exam flag Employee Exam Maintenance MODIFY: Search if necessary. Enter the exam to modify or place the cursor on the desired information from the list. Modify the Active Exam field or the Assigned Frequency (Days) field.

BRWEXM: Browse Medical Exam. To review or maintain medical exams associated with a location, press the 'BrmExm' function key combination.

Employee List

PURPOSE: To search for and select an employee. Also use this screen to access and maintain employee medical exam information.

SEARCH: With the cursor on the first blank line, enter a full or partial Employee Number or Last Name and press the 'Find' key. If the first line is not blank, use the space bar to clear the fields before entering information. To start at the beginning of the list, press the 'Find' key. To see additional employees, press the 'Next Screen' key.

Employee List

BROWSE: Search if necessary. Enter the employee to browse or place the cursor on the desired information from the list. Press the 'Browse' function key combination.

MODIFY: Search if necessary. Enter the employee to modify or place the cursor on the desired information from the list. Press the 'Modify' function key combination.

BRWEXM: Browse Medical Exam. To review medical exams associated with a location, press the 'BrmExm' function key combination.

Employee Exam List

PURPOSE: To search for and browse exam information for an employee.

SEARCH: With the cursor on the first blank line, enter a full or partial Exam Number or Exam Name and press the 'Find' key. If the first line is not blank, use the space bar to clear the fields before entering information. To start at the beginning of the list, press the 'Find' key. To see additional exams for an employee, press the 'Next Screen' key.

Employee Exam List

BROWSE: Search if necessary. Enter the exam to modify or place the cursor on the desired information from the list. Press the 'Browse' function key combination.

MODIFY: Search if necessary. Enter the exam to modify or place the cursor on the desired information from the list. Press the 'Modify' function key combination.

Medical Exam List

PURPOSE: To search for and select a medical exam.

SEARCH: With the cursor on the first blank line, enter a full or partial Exam Number or Exam Name and press the 'Find' key. If the first line is not blank, use the space bar to clear the fields before entering information. To start at the beginning of the list, press the 'Find' key. To see additional medical exams, press the 'Next Screen' key.

Medical Exam List

SELECT: Place the cursor on the desired medical exam. Press the 'Return' function key to return the selected information to the detail screen.

c. Exam Schedule Maintenance (HL03)

The Employee Exam Schedule Maintenance conversation (HL03) may be used to schedule employee exams and maintain exam results.

Employee exam information may include the employee number and name, the exam number and name, the scheduled exam date/time and location, the physician performing the exam, the reason for the exam, and any comments about the exam.

Exam result information may include employee and exam information, the result type code and description, if the result was positive or negative, and the result quantity and its unit of measure. This conversation may also indicate if a medical result is outside of the acceptable range for that type of result, based on the employee's sex and age.

Employee Exam Maintenance

PURPOSE: To review the medical exam schedule for an employee. Also use this screen to review employee exam results.

REVIEW: Review the employee's medical exam schedule.

BROWSE: Employee Exam Results. To review results associated with an employee's exam, press the 'Browse' function key combination.

Employee Exam Results Maintenance

PURPOSE: To search for and browse results for an employee's medical exam. Also use this screen to access and maintain exam schedule information associated with a result.

SEARCH: With the cursor on the first blank line, enter a full or partial Result Code and press the 'Find' key. If the first line is not blank, use the space bar to clear the screen before entering information. To start at the beginning of the list, press the 'Find' key. To see additional results, press the 'Next Screen' key.

Employee Exam Results Maintenance

BROWSE: Search if necessary. Review the exam result information.

EXMSCH: Exam Schedule. To maintain an employee's exam schedule information associated with a result, search if necessary. Enter the result code or place the cursor on the desired result from the list. Press the 'ExmSch' function key combination.

Employee Exam Schedule Maintenance

PURPOSE: To insert or modify the information specific to a particular occurrence of an employee exam. Also use this screen to access exam actual results for review or modification.

INSERT: Required: Scheduled Date

NOTE: The Exam Status for the employee must preferably be Tentative or Scheduled.

Employee Exam Schedule Maintenance

MODIFY: Change any field except Employee number, Exam Number, Exam Name, Active Exam, or Frequency (Days).

NOTE: The Exam Status for the employee must be Tentative or Scheduled.

BROWSE: Employee Exam Results. To maintain results associated with an employee's exam, press the 'Browse' function key combination.

Employee Exam Results Maintenance

PURPOSE: To search for, insert, modify, or delete results for an employee's medical exam. Also use this screen to access and maintain exam schedule information associated with a result.

SEARCH: With the cursor on the first blank line, enter a full or partial Result Code and press the 'Find' key. If the first line is not blank, use the space bar to clear the screen before entering information. To start at the beginning of the list, press the 'Find' key. To see additional results press the 'Next Screen' key.

Employee Exam Results Maintenance

INSERT: All fields are optional. To enter result information, move the cursor below the first blank line and press the 'Insert' key. Enter the Result Code, Normal, Quantity, and UM (Unit of Measure) fields.

NOTE: The system will determine if the result is out of the acceptable range for this type of result.

Employee Exam Results Maintenance

MODIFY: Search if necessary. Enter the result to modify or place the cursor on the desired information from the list. Modify the Normal, Quantity, or UM (Unit of Measure) field.

DELETE: Search if necessary. Enter the result to delete or place the cursor on the desired information from the list. Press the 'Delete' function key combination.

Employee Exam Results Maintenance

EXMSCH: Exam Schedule. To maintain an employee's exam schedule information associated with a result, search if necessary. Enter the result code or place the cursor on the desired result from the list. Press the 'ExmSch' function key combination.

PRCSS: Process Individual Results. To process results individually, enter the information for one result; press the 'Prcss' function key combination.

Employee Exam Results Maintenance

PRCSS: NOTE: To process all results at one time, enter all results; then press the 'End' function key.

Employee Exam Schedule List

PURPOSE: To search for or select an occurrence of an employee exam.

SEARCH: With the cursor on the first blank line, enter a full or partial Employee Number, Exam Number, Exam Status, or Schedule Date and press the 'Find' key. If the first line is not blank, use the space bar to clear the fields before entering information. To start at the beginning of the list, press the 'Find' key. To see additional exam schedules, press the 'Next Screen' key.

Employee Exam Schedule List

INSERT: Press the 'Insert' function key combination.

BROWSE: Search if necessary. Enter the exam schedule to browse or place the cursor on the desired exam schedule from the list. Press the 'Browse' function key combination.

MODIFY: Search if necessary. Enter the exam schedule to change or place the cursor on the desired exam schedule from the list. Press the 'Modify' function key combination.

Employee List

PURPOSE: To search for and select an employee.

SEARCH: With the cursor on the first blank line, enter a full or partial Employee Number or Last Name and press the 'Find' key. If the first line is not blank, use the space bar to clear the fields before entering information. To start at the beginning of the list, press the 'Find' key. To see additional employees, press the 'Next Screen' key.

Employee List

SELECT: Place the cursor on the desired employee. Press the 'Return' function key to return the selected information to the detail screen.

Medical Exam List

PURPOSE: To search for and select a medical exam.

SEARCH: With the cursor on the first blank line, enter a full or partial Exam Number or Exam Name and press the 'Find' key. If the first line is not blank, use the space bar to clear the fields before entering information. To start at the beginning of the list, press the 'Find' key. To see additional medical exams, press the 'Next Screen' key.

Medical Exam List

SELECT: Place the cursor on the desired medical exam. Press the 'Return' function key to return the selected information to the detail screen.

Medical Result List

PURPOSE: To search for and select a medical result.

SEARCH: With the cursor on the first blank line, enter a full or partial Result Type Code or Result Type Name and press the 'Find' key. If the first line is not blank, use the space bar to clear the fields before entering information. To start at the beginning of the list, press the 'Find' key. To see additional medical results, press the 'Next Screen' key.

Medical Result List

SELECT: Place the cursor on the desired medical result. Press the 'Return' function key to return the selected information to the detail screen.

d. Medical Result Maintenance (HL08)

The Medical Results Maintenance conversation (HL08) may be used to enter and maintain information about the results for each type of medical exam. This information includes the medical result type code and description, acceptable minimum and maximum quantities based upon sex and age, and the corresponding units of measure.

Medical Result Maintenance

PURPOSE: To browse medical result information. This information includes acceptable result quantities for different age ranges.

BROWSE: Review the medical result information.

Medical Result Maintenance

PURPOSE: To insert or modify medical result information. This information includes acceptable result quantities for different age ranges.

INSERT: Required: Result Type Description

NOTE: For quantity ranges, the Minimum Quantity must be less than the Maximum Quantity.

BROWSE: Review the medical result information.

MODIFY: Modify any field except the Result Type Code.

NOTE: To add an acceptable quantity range, move the cursor below the Acceptable Quantity Range portion of the screen. Press the 'Insert' key and enter the information. To delete an acceptable quantity range, move the cursor to the desired range. Press the 'Delete' function key combination.

Medical Result List

PURPOSE: To search for and select a medical result type. Medical results are any type of result associated with a medical exam, such as a red blood count for a blood test.

SEARCH: With the cursor on the first blank line, enter a full or partial Result Type Code or Result Type Name and press the 'Find' key. If the first line is not blank, use the space bar to clear the fields before entering information. To start at the beginning of the list, press the 'Find' key. To see additional medical results, press the 'Next Screen' key.

INSERT: Press the 'Insert' function key combination.

BROWSE: Search if necessary. Enter the medical result to browse or place the cursor on the desired medical result from the list. Press the 'Browse' function key combination.

MODIFY: Search if necessary. Enter the medical result to change or place the cursor on the desired medical result from the list. Press the 'Modify' function key combination.

e. Employee Work Restriction Maintenance (HL09)

The Work Restrictions Maintenance conversation (HL09) may be used to create and maintain employee work restrictions. This information includes the employee number and name, the work restriction number and description, the beginning and ending restriction dates, the name of the person restricting the employee, and the name of the person removing the restriction from the employee.

Employee Work Restriction Maintenance

PURPOSE: To browse employee work restriction information. Employees are restricted from performing certain jobs because of medical problems.

BROWSE: Review the employee work restriction information.

Employee Work Restriction Maintenance

PURPOSE: To insert or modify employee work restriction information. Employees are restricted from performing certain jobs because of medical problems.

INSERT: Required:
Restriction Description
Start Date
Start Authorized

NOTE: The Start Date and End Date must include the name of the person authorizing the restriction in the Authorized By field.

MODIFY: Modify any field except the Employee Number, Employee Name, or the Restriction Number.

NOTE: The Start Date and End Date must include the name of the person authorizing the restriction in the Authorized By field.

Employee List

PURPOSE: To search for an employee and to access and maintain work restriction information.

SEARCH: With the cursor on the first blank line, enter a full or partial Employee Number or Last Name and press the 'Find' key. If the first line is not blank, use the space bar to clear the fields before entering information. To start at the beginning of the list, press the 'Find' key. To see additional employees, press the 'Next Screen' key.

EMPRES: Employee Work Restrictions. To review an employee's restrictions for work because of health reasons, press the 'EmpRes' function key combination.

Employee Work Restriction List

PURPOSE: To search for and access work restriction information for an employee.

SEARCH: With the cursor on the first blank line, enter a full or partial Restriction Number, Start Date, or End Date and press the 'Find' key. If the first line is not blank, use the space bar to clear the fields before entering information. To start at the beginning of the list, press the 'Find' key. To see additional work restrictions, press the 'Next Screen' key.

INSERT: Press the 'Insert' function key combination.

BROWSE: Search if necessary. Enter the restriction to browse or place the cursor on the desired information from the list. Press the 'Browse' function key combination.

MODIFY: Search if necessary. Enter the restriction to modify or place the cursor on the desired information from the list. Press the 'Modify' function key combination.

f. Dispensary Visit Maintenance (HL10)

The Dispensary Visit Maintenance conversation (HL10) may be used to record all employee visits to the dispensary. This information may be used to list visits by employee or visit type.

Dispensary Visit Maintenance

PURPOSE: To browse dispensary visit information. This information includes employee information and details about each visit to the dispensary.

BROWSE: Review the dispensary visit information.

Dispensary Visit Maintenance

PURPOSE: To insert or modify dispensary visit information. This information includes employee information and details about each visit an employee made to the dispensary.

INSERT: Required: Visit Number
Department Code
Visit Type
Shift
Visit Date/Time
Case Number
Employee Number
OSHA Record
Employee First Name
Work Related
Employee Last Name
Visit
Description 1
Job Class Code INSERT: The Visit Number must be a unique number. (cont.) The combination of Employee Number and Case Number must be valid.

MODIFY: Modify any accessible field.

Dispensary Visit List

PURPOSE: To search for and access dispensary visit information.

SEARCH: With the cursor on the first blank line, enter a full or partial Visit Number, Visit Date/Time, Employee Number, Job Class, Department Code, or Case Number and press the 'Find' key. If the first line is not blank, use the space bar to clear the fields before entering information. To start at the beginning of the list, press the 'Find' key. To see additional dispensary visits, press the 'Next Screen' key.

INSERT: Press the 'Insert' function key combination.

BROWSE: Search if necessary. Enter the dispensary visit to browse or place the cursor on the desired dispensary visit from the list. Press the 'Browse' function key combination.

MODIFY: Search if necessary. Enter the dispensary visit to change or place the cursor on the desired dispensary visit from the list. Press the 'Modify' function key combination.

Employee List

PURPOSE: To search for and select an employee.

SEARCH: With the cursor on the first blank line, enter a full or partial Employee Number or Last Name and press the 'Find' key. If the first line is not blank, use the space bar to clear the fields before entering information. To start at the beginning of the list, press the 'Find' key. To see additional employees, press the 'Next Screen' key.

SELECT: Place the cursor on the desired employee. Press the 'Return' function key to return the selected information to the detail screen.

Incident List

PURPOSE: To search for and select an incident.

SEARCH: With the cursor on the first blank line, enter a full or partial Incident Number, Incident Date, Illness Type, Employee Number, or Employee Last Name and press the 'Find' key. If the first line is not blank, use the space bar to clear the fields before entering information. To start at the beginning of the list, press the 'Find' key. To see additional incidents, press the 'Next Screen' key.

SELECT: Place the cursor on the desired incident. Press the 'Return' function key to return the selected information to the detail screen.

g. Incident Maintenance (FT04)

The Inj/Ill Incident Maintenance conversation (FT04) may be used to record occupational injury and illness information. This information supports the OSHA (Office of Safety and Health Administration) forms 101 and 200. The information in this conversation is used to create safety statistics which are used in the Occupational Illness and Injury Incidents Inquiry conversation (FT06).

Incident Maintenance

PURPOSE: To browse incident information. This information includes the employee involved in the incident, what happened, how and where it happened, and the result of the incident happening. Incident information is the basis for safety statistics. Also use this screen to access the following information:
incident comments
body parts associated with an incident
incident causes
injury nature Incident Maintenance BROWSE: Review the incident information.

INCCMNT: Incident Comments. To access comments related to an incident, press the 'IncCmnt' function key combination.

BRWBPRT: Browse Body Parts. To access body part information, press the 'BrwBPrt' function key combination.

BRWCAUS: Browse Incident Cause. To access incident cause information, press the 'BrwCaus' function key combination.

Incident Maintenance

BRWNATR: Browse Injury Nature. To access injury nature information, press the 'BrwNatr' function key combination.

Incident Maintenance—Body Parts

PURPOSE: To search for and browse a body part affected by an incident. Also use this screen to access the following information:
incident information
incident causes
injury nature Incident Maintenance—Body Parts SEARCH: With the cursor on the first blank line, enter a full or partial Body Part Code and press the 'Find' key. If the first line is not blank, use the space bar to clear the fields before entering information. To start at the beginning of the list, press the 'Find' key. To see additional body parts, press the 'Next Screen' key.

BROWSE: Review the body part information.

Incident Maintenance—Body Parts

BROWSE: Browse Incident Information. To access incident information, press the 'Browse' function key combination.

BRWCAU: Browse Incident Cause. To access incident cause information, press the 'BrwCau' function key combination.

BRWNAT: Browse Injury Nature. To access injury nature information, press the 'BrwNat' function key combination.

Incident Maintenance—Cause

PURPOSE: To search for and browse an incident cause. Also use this screen to access the following information:
incident information
body parts associated with an incident
injury nature Incident Maintenance—Cause SEARCH: With the cursor on the first blank line, enter a full or partial Incident Cause Code and press the 'Find' key. If the first line is not blank, use the space bar to clear the fields before entering information. To start at the beginning of the list, press the 'Find' key. To see additional causes, press the 'Next Screen' key.

BROWSE: Browse Incident Information. To access incident information, press the 'Browse' function key combination.

Incident Maintenance—Cause

BRWBPR: Browse Body Part. To access body part information, press the 'BrwBPr' function key combination.

BRWNAT: Browse Injury Nature. To access injury nature information, press the 'BrwNat' function key combination.

Incident Maintenance—Nature

PURPOSE: To search for and browse the nature of injuries sustained during an incident. Also use this screen to access the following information:
incident information
body parts associated with an incident
incident cause Incident Maintenance—Nature SEARCH: With the cursor on the first blank line, enter a full or partial Injury Origin Code and press the 'Find' key. If the first line is not blank, use the space bar to clear the fields before entering information. To start at the beginning of the list, press the 'Find' key. To see additional injury natures, press the 'Next Screen' key.

BROWSE: Browse Incident Information. To access incident information, press the 'Browse' function key combination.

Incident Maintenance—Nature

BRWBPR: Browse Body Part. To access body part information, press the 'BrwBPr' function key combination.

BRWCAU: Browse Incident Cause. To access incident cause information, press the 'BrwCau' function key combination.

Incident Maintenance

PURPOSE: To insert or modify incident information. This information includes the employee involved in the incident, what happened, how and where it happened, and the result of the incident happening. Incident information is the basis for safety statistics. Also use this screen to access the following information:
incident comments
body parts associated with an incident
incident causes
injury nature Incident Maintenance INSERT: Required:
 Incident Number
 Shift Worked
 Incident Date
 OSHA Recordable flag
 Incident Type Code
 Severity Code
 Employee Number
 Incident Activity Code
 Employee Last Name
 Equipment Type Code
 Employee First Name
 Incident Location Code
 Employee Type Code
 Incident TSCA
 Department Number
 Work Related Indicator
 Job Class
 Incident TSCA 8B flag (TSCA is the Toxic Substance Control Act)

Incident Maintenance

INSERT:
 If the Employee 'Contractor', the Employee Number must exist on the Employee Table.
 If the Employee Type Code is 'Contractor' and the Employee Number exists, the system retrieves employee information from the Employee Master Table and displays it in the employee fields.
 If the Employee Type Code is 'Contractor' and the Employee Number does not exist, insert information into the employee fields.

Incident Maintenance
INSERT:
  At least one body part, cause, and injury nature must exist for an incident; if one does not exist, the system displays the appropriate screen where at least one must be entered.
  The Incident Number must be unique.
  If the Incident Type is 'Illness', the Incident Illness Code is required.
MODIFY: Modify any accessible field. For more information, refer to the notes about inserting on the previous screen.

Incident Maintenance
INCCMNT: Incident Comments. To access comments related to an incident, press the 'IncCmnt' function key combination. On the word processing screen, enter comments above the statement. When through, press the 'F10' function key. When the screen with "Choose Desired Action..." appears, to save the text, press the 'F10' function key. To cancel the text, press the 'Remove' key.

Incident Maintenance
UPD: Update Body Parts. To access body part information,
BPR: press the 'UpdBPr' function key combination.
UPD: Update Incident Cause. To access incident cause information,
CAU: press the 'UpdCau' function key combination.
UPD: Update Injury Nature. To access injury nature information,
NAT: press the 'UpdNat' function key combination.

Incident Maintenance
BRW: Browse Body Parts. To access body part information,
BPR: press the 'BrwBPr' function key combination.
BRW: Browse Incident Cause. To access incident cause information,
CAU: press the 'BrwCau' function key combination.
BRW: Browse Injury Nature. To access injury nature information,
NAT: press the 'BrwNat' function key combination.

Incident Maintenance—Body Parts
PURPOSE: To search for, insert, modify, or delete a body part affected by an incident. Also use this screen to access the following information:
  incident information
  incident causes
  injury nature Incident Maintenance—Body Parts
SEARCH: With the cursor on the first blank line, enter a full or partial Body Part Code and press the 'Find' key. If the first line is not blank, use the space bar to clear the fields before entering information. To start at the beginning of the list, press the 'Find' key. To see additional body parts, press the 'Next Screen' key.
INSERT: Place the cursor on a blank line. Press the 'Insert' key. Enter the Body Part Code. Each body part must be unique for this incident.

Incident Maintenance—Body Parts
INSERT: At least one body part, cause, and injury nature must exist for an incident; if one does not exist, the system displays the appropriate screen where at least one must be entered.
MODIFY: Search if necessary. Place the cursor on the body part to modify. Modify the Cody Part Code. Each body part must be unique for this incident.

Incident Maintenance—Body Parts
MODIFY: At least one body part, cause, and injury nature must exist for an incident; if one does not exist, the system displays the appropriate screen where at least one must be entered.
DELETE: Search if necessary. Place the cursor on the body part to delete. Press the 'Delete' function key combination. Confirm the deletion by pressing the 'Confirm' function key combination or retain the body part by pressing the 'Unconfirm' function key combination.

Incident Maintenance—Body Parts
UPD: Update Incident Cause. To access incident cause information,
CAU: press the 'UpdCau' function key combination.
UPD: Update Injury Nature. To access injury nature information,
NAT: press the 'UpdNat' function key combination.
BRW: Browse Incident Cause. To access incident cause information,
CAU: press the 'BrwCau' function key combination.

Incident Maintenance—Body Parts
BRW: Browse Injury Nature. To access injury nature information,
NAT: press the 'BrwNat' function key combination.
BROWSE: To return without changes to Incident Maintenance press the 'Browse' function key combination.

Incident Maintenance—Cause
PURPOSE: To search for, insert, modify, or delete an incident cause. Also use this screen to access the following information:
  incident information
  body parts associated with an incident
  injury nature Incident Maintenance—Cause
SEARCH: With the cursor on the first blank line, enter a full or partial Incident Cause Code and press the 'Find' key. If the first line is not blank, use the space bar to clear the fields before entering information. To start at the beginning of the list, press the 'Find' key. To see additional causes, press the 'Next Screen' key.
INSERT: Place the cursor on a blank line. Press the 'Insert' key. Enter the Incident Cause Code. Each incident cause must be unique for this incident.

Incident Maintenance—Cause
INSERT: At least one body part, cause, and injury nature must exist for an incident; if one does not exist, the system displays the appropriate screen where at least one must be entered.
MODIFY: Search if necessary. Place the cursor on the incident cause to modify. Modify the Incident Cause Code. Each body part must be unique for this incident.

Incident Maintenance—Cause
MODIFY: At least one body part, cause, and injury nature must exist for an incident; if one does not exist, the system displays the appropriate screen where at least one must be entered.
DELETE: Search if necessary. Place the cursor on the incident cause to delete. Press the 'Delete' function key combination. Confirm the deletion by pressing the 'Confirm' function key combination or retain the incident cause by pressing the 'Unconfirm' function key combination.

Incident Maintenance—Cause

UPD: Update Body Part. To access body part information,
BPR: press the 'UpdBPr' function key combination.
UPD: Update Injury Nature. To access injury nature information,
NAT: press the 'UpdNat' function key combination.
BRW: Browse Body Parts. To access body part information,
BPR: press the 'BrwBPr' function key combination.
Incident Maintenance—Cause
BRW: Browse Injury Nature. To access injury nature information,
NAT: press the 'BrwNat' function key combination.
BROWSE: To return without updates to Incident maintenance press the 'Browse' function key combination.
Incident Maintenance—Nature
PURPOSE: To search for, insert, modify, or delete the nature of injuries sustained during an incident. Also use this screen to access the following information:
incident information
body parts associated with an incident
incident cause
Incident Maintenance—Nature
SEARCH: With the cursor on the first blank line, enter a full or partial Injury Origin Code and press the 'Find' key. If the first line is not blank, use the space bar to clear the fields before entering information. To start at the beginning of the list, press the 'Find' key. To see additional injury natures, press the 'Next Screen' key.
INSERT: Place the cursor on a blank line. Press the 'Insert' key Enter the Injury Origin Code. Each injury nature must be unique for this incident.
Incident Maintenance—Nature
INSERT: At least one body part, cause, and injury nature must exist for an incident; if one does not exist, the system displays the appropriate screen where at least one must be entered.
MODIFY: Search if necessary. Place the cursor on the injury nature to modify. Modify the Injury Origin Code. Each injury nature must be unique for this incident.
Incident Maintenance—Nature
MODIFY: At least one body part, cause, and injury nature must exist for an incident; if one does not exist, the system displays the appropriate screen where at least one must be entered.
DELETE: Search if necessary. Place the cursor on the injury nature to delete. Press the 'Delete' function key combination. Confirm the deletion by pressing the 'Confirm' function key combination or retain the injury nature by pressing the 'Unconfirm' function key combination.
Incident Maintenance—Nature
UPD: Update Body Part. To access body part information,
BPR: press the 'UpdBPr' function key combination.
UPD: Update Incident Cause. To access incident cause information,
CAU: press the 'UpdCau' function key combination.
BRW: Browse Body Parts. To access body part information,
BPR: press the 'BrwBPr' function key combination.
Incident Maintenance—Nature
BRW: Browse Incident Cause. To access incident cause information,
CAU: press the 'BrwCau' function key combination.
BROWSE: To return without updates to Incident Maintenance press the 'Browse' function key combination.
Incident List
PURPOSE: To search for and access information for an incident.
SEARCH: With the cursor on the first blank line, enter a full or partial Incident Number, Incident Date, Illness Type, Employee Number, or Employee Last Name and press the 'Find' key. If the first line is not blank, use the space bar to clear the fields before entering information. To start at the beginning of the list, press the 'Find' key. To see additional incidents, press the 'Next Screen' key.
Incident List
INSERT: Press the 'Insert' function key combination.
BROWSE: Search if necessary. Enter the incident to browse or place the cursor on the desired incident from the list. Press the 'Browse' function key combination.
MODIFY: Search if necessary. Enter the incident to change or place the cursor on the desired incident from the list. Press the 'Modify' function key combination.
Employee List
PURPOSE: To search for and select an employee.
SEARCH: With the cursor on the first blank line, enter a full or partial Employee Number or Last Name and press the 'Find' key. If the first line is not blank, use the space bar to clear the fields before entering information. To start at the beginning of the list, press the 'Find' key. To see additional employees, press the 'Next Screen' key.
Employee List
SELECT: Place the cursor on the desired employee. Press the 'Return' function key to return the selected information to the detail screen.
Unplanned Release List
PURPOSE: To search for and select an unplanned release.
SEARCH: With the cursor on the first blank line, enter a full or partial Release Number, Revision Number, Start Date, or Environmental Location Code and press the 'Find' key. If the first line is not blank, use the space bar to clear the fields before entering information. To start at the beginning of the list, press the 'Find' key. To see additional releases, press the 'Next Screen' key.
Unplanned Release List
SELECT: Place the cursor on the desired release. Press the 'Return' function key to return the selected information to the detail screen.
h. Safety Statistics Maintenance (FT05)
The Safety Statistics Maintenance conversation (FT05) may be used to record the number of workhours by department and type of employee. Safety statistics for employees and contractors are available for review by month and year-to-date. The statistics include OSHA (Office of Safety and Health Administration) recordable cases, cases involving restrictions, and lost time cases. The rate for these cases displays in cases per 200,000 workhours.
Incident Reporting Information Maintenance
PURPOSE: To search for and browse the hours worked by department within a month. Also use this screen to access safety statistics information.

SEARCH: With the cursor on the first blank line, enter a full or partial Department Number and press the 'Find' key. If the first line is not blank, use the space bar to clear the fields before entering information. To start at the beginning of the list, press the 'Find' key. To see additional information, press the 'Next Screen' key.

Incident Reporting Information Maintenance

BROWSE: Review the incident reporting information.

Incident Reporting Information Maintenance

PURPOSE: To search for, insert, modify, or delete the hours worked by department within a month. Also use this screen to access safety statistics information.

SEARCH: With the cursor on the first blank line, enter a full or partial Department Number and press the 'Find' key. If the first line is not blank, use the space bar to clear the fields before entering information. To start at the beginning of the list, press the 'Find' key. To see additional information, press the 'Next Screen' key.

Incident Reporting Information Maintenance

INSERT: Place the cursor on a blank line. Press the 'Insert' key. Enter the Department Number, Employee Type, and Workhours. Each department number/employee type/month combination must be unique.

MODIFY: Search if necessary. Place the cursor on the information to modify. Modify the Department Number or Employee Type. Each department number/employee type/month combination must be unique.

Incident Reporting Information Maintenance

DELETE: Search if necessary. Place the cursor on the information to delete. Press the 'Delete' function key combination. Confirm the deletion by pressing the 'Confirm' function key combination or retain the information by pressing the 'Unconfirm' function key combination.

Safety Statistics—Department List

PURPOSE: To review safety statistics for the facility. These facility statistics display by:
employees
contractors
totals for the month
year-to-date totals
Also use this screen to access statistic information by department.

Safety Statistics—Department List

BROWSE: Review the safety statistics for the facility.

DPTSTA: Safety Statistics—Department. To access safety statistics for the department, press the 'DptSta' function key combination.

Safety Statistics List

PURPOSE: To search for and access incident reporting information. Also use this screen to access facility safety statistics and annual reporting information for incidents.

SEARCH: With the cursor on the first blank line, enter a full or partial Month Number or Incident Reporting Year and press the 'Find' key. If the first line is not blank, use the space bar to clear the fields before entering information. To start at the beginning of the list, press the 'Find' key. To see additional incidents, press the 'Next Screen' key.

Safety Statistics List

INSERT: Press the 'Insert' function key combination.

BROWSE: Search if necessary. Enter the month or year to browse or place the cursor on the desired one from the list. Press the 'Browse' function key combination.

MODIFY: Search if necessary. Enter the month or year to change or place the cursor on the desired one from the list. Press the 'Modify' function key combination.

Safety Statistics List

FACSTA: Safety Statistics—Facility. To access safety statistics for the facility, press the 'FacSta' function key combination.

DPTSTA: Safety Statistics—Department. To access safety statistics for the department, press the 'DptSta' function key combination.

Safety Statistics—Department

PURPOSE: To search for and review the department safety statistics for a specified month. Also use this screen to access facility safety statistics.

SEARCH: With the cursor on the first blank line, enter a full or partial Department Number and press the 'Find' key. If the first line is not blank, use the space bar to clear the fields before entering information. To start at the beginning of the list, press the 'Find' key. To see additional department safety statistics, press the 'Next Screen' key.

Safety Statistics—Department

FACSTA: Safety Statistics—Facility. To access safety statistics for the facility, press the 'FacSta' function key combination.

i. Occupational Illness and Injury Incidents Maintenance (FT06)

The Inj/Ill Incident Log Inquiry conversation (FT06) may be used to review incident information and spot trends and target areas for improved safety. This information displays in a variety of ways: by department, employee, incident cause, activity, body part affected, etc.

Incident Maintenance

PURPOSE: To browse incident information. This information includes the employee involved in the incident, what happened, how and where it happened, and the result of the incident happening. Incident information is the basis for safety statistics. Also use this screen to access the following information:
incident comments
body parts associated with an incident
incident causes
injury nature Incident Maintenance BROWSE: Review the incident information.

INCCMN: Incident Comments. To access comments related to an incident, press the 'IncCmn' function key combination. BRW Browse Body Parts. To access body part information, BPR: press the 'BrwBPr' function key combination.

BRWAU: Browse Incident Cause. To access incident cause information, press the 'BrwCau' function key combination.

Incident Maintenance

BRWCAU: Browse Injury Nature. To access injury nature information, press the 'BrwNat' function key combination.

Incident Maintenance—Body Parts

PURPOSE: To search for and browse a body part affected by an incident. Also use this screen to access the following information:
incident information
incident causes
injury nature Incident Maintenance—Body Parts SEARCH: With the cursor on the first blank line, enter a full or partial Body Part Code and press the 'Find' key. If the first line is not blank, use the space bar to clear the fields before entering information. To start at the beginning of the list, press the 'Find' key. To see additional body parts, press the 'Next Screen' key.

BROWSE: Review the body part information.

Incident Maintenance—Body Parts

BROWSE: Browse Incident Information. To access incident information, press the 'Browse' function key combination.

BRWCAU: Browse Incident Cause. To access incident cause information, press the 'BrwCau' function key combination.

BRWNAT: Browse Injury Nature. To access injury nature information, press the 'BrwNat' function key combination.

Incident Maintenance—Cause

PURPOSE: To search for and browse an incident cause. Also use this screen to access the following information:
incident information
body parts associated with an incident
injury nature Incident Maintenance—Cause SEARCH: With the cursor on the first blank line, enter a full or partial Incident Cause Code and press the 'Find' key. If the first line is not blank, use the space bar to clear the fields before entering information. To start at the beginning of the list, press the 'Find' key. To see additional causes, press the 'Next Screen' key.

BROWSE: Browse Incident Information. To access incident information, press the 'Browse' function key combination.

Incident Maintenance—Cause

BRWBPR: Browse Body Part. To access body part information, press the 'BrwBPr' function key combination.

Browse Injury Nature. To access injury nature information, press the 'BrwNat' function key combination.

Incident Maintenance—Nature

PURPOSE: To search for and browse the nature of injuries sustained during an incident. Also use this screen to access the following information:
incident information
body parts associated with an incident
incident cause Incident Maintenance—Nature SEARCH: With the cursor on the first blank line, enter a full or partial Injury Origin Code and press the 'Find' key. If the first line is not blank, use the space bar to clear the fields before entering information. To start at the beginning of the list, press the 'Find' key. To see additional injury natures, press the 'Next Screen' key.

BROWSE: Browse Incident Information. To access incident information, press the 'Browse' function key combination.

Incident Maintenance—Nature

BRWBPR: Browse Body Part. To access body part information, press the 'BrwBPr' function key combination.

BRWCAU: Browse Incident Cause. To access incident cause information, press the 'BrwCau' function key combination.

Incident Maintenance

PURPOSE: To insert or modify incident information. This information includes the employee involved in the incident, what happened, how and where it happened, and the result of the incident happening. Incident information is the basis for safety statistics. Also use this screen to access the following information:
incident comments
body parts associated with an incident
incident causes Incident Maintenance
INSERT:
  Required:
  Incident Number
  Shift Worked
  Incident Date
  OSHA Recordable flag
  Incident Type Code
  Severity Code
  Employee Number
  Incident Activity Code
  Employee Last Name
  Equipment Type Code
  Employee First Name
  Incident Location Code
  Employee Type Code
  Incident TSCA
  Department Number
  Work Related Indicator
  Job Class
  Incident TSCA 8B flag (TSCA is the Toxic Substance Control Act)

Incident Maintenance
INSERT:
  If the Employee Type is not 'Contractor', the Employee Number must exist on the Employee Table.
  If the Employee Type Code is 'Contractor' and the Employee Number exists, the system retrieves employee information from the Employee Master Table and displays it in the employee fields.
  If the Employee Type Code is 'Contractor' and the Employee Type Code is 'Contractor' and the Employee Number does not exist, insert information into the employee fields.

Incident Maintenance
INSERT:
  At least one body part, cause, and injury nature must exist for an incident; if one does not exist, the system displays the appropriate screen where at least one must be entered.
  The Incident Number must be unique.
  If the Incident Type is 'Illness', the Incident Illness Code is required.

MODIFY: Modify any accessible field. For more information, refer to the notes about inserting on the previous screen.

Incident Maintenance

INCCMNT: Incident Comments. To access comments related to an incident, press the 'IncCmnt' function key combination. On the word processing screen, enter comments above the [End of File] statement. When through, press the 'F10' function key. When the screen with "Choose Desired Action . . . " appears, to save the text, press the 'F10' function key. To cancel the text, press the 'Remove' key.

Incident Maintenance

UPDBPRT: Update Body Parts. To access body part information, press the 'UpdBPrt' function key combination.

UPDCAUS: Update Incident Cause. To access incident cause information, press the 'UpdCaus' function key combination.

UPDNATR: Update Injury Nature. To access injury nature information, press the 'UpdNatr' function key combination.

Incident Maintenance—Body Parts

PURPOSE: To search for, insert, modify, or delete a body part affected by an incident. Also use this screen to access the following information:
incident information
incident causes
injury nature Incident Maintenance—Body Parts SEARCH: With the cursor on the first blank line, enter a full or partial Body Part Code and press the 'Find' key. If the first line is not blank, use the space bar to clear the fields before entering information. To start at the beginning of the list, press the 'Find' key. To see additional body parts, press the 'Next Screen' key.

INSERT: Place the cursor on a blank line. Press the 'Insert' key. Enter the Body Part Code. Each body part must be unique for this incident.

Incident Maintenance—Body Parts

INSERT: At least one body part, cause, and injury nature must exist for an incident; if one does not exist, the system displays the appropriate screen where at least one must be entered.

MODIFY: Search if necessary. Place the cursor on the body part to modify. Modify the Cody Part Code. Each body part must be unique for this incident.

Incident Maintenance—Body Parts

MODIFY: At least one body part, cause, and injury nature must exist for an incident; if one does not exist, the system displays the appropriate screen where at least one must be entered.

DELETE: Search if necessary. Place the cursor on the body part to delete. Press the 'Delete' function key combination. Confirm the deletion by pressing the 'Confirm' function key combination or retain the body part by pressing the 'Unconfirm' function key combination.

Incident Maintenance—Body Parts

UPDINC: Update Incident Information. To access incident information, press the 'UpdInc' function key combination.

UPDCAUS: Update Incident Cause. To access incident cause information, press the 'UpdCaus' function key combination.

UPDNATR: Update Injury Nature. To access injury nature information, press the 'UpdNatr' function key combination.

Incident Maintenance—Cause

PURPOSE: To search for, insert, modify, or delete an incident cause. Also use this screen to access the following information:
incident information
body parts associated with an incident
injury nature Incident Maintenance—Cause SEARCH: With the cursor on the first blank line, enter a full or partial Incident Cause Code and press the 'Find' key. If the first line is not blank, use the space bar to clear the fields before entering information. To start at the beginning of the list, press the 'Find' key. To see additional causes, press the 'Next Screen' key.

INSERT: Place the cursor on a blank line. Press the 'Insert' key. Enter the Incident Cause Code. Each incident cause must be unique for this incident.

Incident Maintenance—Cause

INSERT: At least one body part, cause, and injury nature must exist for an incident; if one does not exist, the system displays the appropriate screen where at least one must be entered.

MODIFY: Search if necessary. Place the cursor on the incident cause to modify. Modify the Incident Cause Code. Each body part must be unique for this incident.

Incident Maintenance—Cause

MODIFY: At least one body part, cause, and injury nature must exist for an incident; if one does not exist, the system displays the appropriate screen where at least one must be entered.

DELETE: Search if necessary. Place the cursor on the incident cause to delete. Press the 'Delete' function key combination. Confirm the deletion by pressing the 'Confirm' function key combination or retain the incident cause by pressing the 'Unconfirm' function key combination.

Incident Maintenance—Cause

UPDINC: Update Incident Information. To access incident information, press the 'UpdInc' function key combination.

UPDBPRT: Update Body Part. To access body part information, press the 'UpdBPrt' function key combination.

UPDNATR: Update Injury Nature. To access injury nature information, press the 'UpdNatr' function key combination.

Incident Maintenance—Nature

PURPOSE: To search for, insert, modify, or delete the nature of injuries sustained during an incident. Also use this screen to access the following information:
incident information
body parts associated with an incident
incident cause Incident Maintenance—Nature SEARCH: With the cursor on the first blank line, enter a full or partial Injury Origin Code and press the 'Find' key. If the first line is not blank, use the space bar to clear the fields before entering information. To start at the beginning of the list, press the 'Find' key. To see additional injury natures, press the 'Next Screen' key.

INSERT: Place the cursor on a blank line. Press the 'Insert' key. Enter the Injury Origin Code. Each injury nature must be unique for this incident.

Incident Maintenance—Nature

INSERT: At least one body part, cause, and injury nature must exist for an incident; if one does not exist, the system displays the appropriate screen where at least one must be entered.

MODIFY: Search if necessary. Place the cursor on the injury nature to modify. Modify the Injury Origin Code. Each injury nature must be unique for this incident.

Incident Maintenance—Nature

MODIFY: At least one body part, cause, and injury nature must exist for an incident; if one does not exist, the system displays the appropriate screen where at least one must be entered.

DELETE: Search if necessary. Place the cursor on the injury nature to delete. Press the 'Delete' function key combination. Confirm the deletion by pressing the 'Confirm' function key combination or retain the injury nature by pressing the 'Unconfirm' function key combination.

Incident Maintenance—Nature

UPDINC: Update Incident Information. To access incident information, press the 'UpdInc' function key combination.

UPDBPRT: Update Body Part. To access body part information, press the 'UpdBPrt' function key combination.

UPDCAUS: Update Incident Cause. To access incident cause information, press the 'UpdCaus' function key combination.

Occupational Illness and Injury Incidents List

PURPOSE: To search for incident information and review the following associated information:
incident comments
body parts associated with an incident
incident causes
injury nature Occupational Illness and Injury Incidents List SEARCH: With the cursor on the first blank line, enter a full or partial Incident Date, Illness Code, Severity Code, Cause Code, Activity Code, Job Class, Body Part, Department Number or Employee Number and press the 'Find' key. If the first line is not blank, use the space bar to clear the fields before entering information. To start at the beginning of the list, press the 'Find' key. To see additional information, press the 'Next Screen' key.

Occupational Illness and Injury Incidents List

BROWSE: After selecting one of the listed incident dates, to browse the selected incident date, press the 'Browse' function key combination.

2. Training (TR)

a. Training Course Maintenance (TR01)

The Training Course Maintenance conversation (TR01) may be used to create and maintain information about training courses offered at the facility. It may establish training courses for training employees about safety procedures, protective equipment, job tasks, etc. Course information includes the course name, description, prerequisites, length of time, and information about instructional material.

Training Course Maintenance

PURPOSE: To insert, browse, or modify training course information. Training courses are used to train employees about safety procedures, protective equipment, job tasks, etc.

INSERT: Required:
Course Number
Course Name
Course Description

BROWSE: Review the training course information.
MODIFY: Change any accessible field.

BRW: To access the editor to browse the training course.

DES: description, press the 'BrwDes' function key combination.

MNT: To access the editor to maintain the training course

DES: description, press the 'MntDes' function key combination.

Training Course List

PURPOSE: To search for and select a training course.

SEARCH: With the cursor on the first blank line, enter a full or partial Course Number or Course Name and press the 'Find' key. If the first line is not blank, use the space bar to clear the fields before entering information. To start at the beginning of the list, press the 'Find' key. To see additional courses, press the 'Next Screen' key.

INSERT: Press the 'Insert' function key combination.

BROWSE: Search if necessary. Enter the course or place the cursor on the desired course from the list. Press the 'Browse' function key combination.

MODIFY: Search if necessary. Enter the course or place the cursor on the desired course from the list. Press the 'Modify' function key combination.

1. Purchasing (MMPR)

a. Blanket Purchase Order Maintenance (MM01)

The Blanket Purchase Order Maintenance conversation (MM01) may be used to create and maintain blanket purchase orders. A blanket purchase order is a formal agreement with a vendor to provide a specified quantity of material at agreed-upon prices over a specified period of time. During this period, portions of the total quantity, called releases, are ordered when needed.

The system keeps track of the quantity and cost of the orders being released. It issues a warning when the total to-date reaches the maximum limit.

Blanket purchase order header information applies to the entire blanket purchase order. Header information includes the vendor contact's name and phone number, effective and expiration dates, shipping and freight information, and payment terms. Header information is used during the creation of releases and prints on the blanket purchase order.

For each item, or line, on the blanket purchase order, maintain the item/spec number, the vendor item number, and both minimum and maximum quantities and amounts. The quantity and value ordered and received to-date, display for each line item.

Enter price break information for each line item. Price breaks are discounts given to an item based on the release quantity and container. Usually, the larger the quantity, the lower the price.

This conversation may also be used to enter text describing the terms of a blanket purchase order. Include standard pieces of text and enter special terms and comments. These terms and comments print on the blanket purchase order.

b. Purchase Requisition Maintenance (MM02)

The Purchase Requisition Maintenance conversation (MM02) may be used to create, maintain, and approve purchase requisitions. For each purchase requisition, indicate the item/spec number, container, quantity desired, requested delivery date, and any applicable comments.

Once the requisition information is complete, it requires approval. The approval section on the screen allows authorized persons to change the requisition status to "approved" and assign the vendor. After the vendor is assigned, the corresponding blanket purchase order reference number will appear on the requisition, if applicable.

c. Purchase Order Maintenance (MM03)

The Purchase Order Maintenance conversation (MM03) may be used to create and maintain purchase order information and to select purchase requisitions for a purchase order. To create a purchase order, select one or more approved purchase requisitions for the same vendor and group them together. On the purchase order, each purchase requisition becomes a purchase order line.

Purchase order header information applies to the entire purchase order. Header information includes the vendor's address; vendor contact's name, title, and phone number; shipping and freight information; and payment terms. The header information prints on each purchase order.

This conversation also contains information about individual purchase order lines, including the item/spec, price, and quantity. A user may add lines to an existing purchase order by selecting additional requisitions for the same vendor. A single item/spec may appear on multiple purchase order lines, with each line specifying a different purchase order date.

If desired, enter shipping and delivery information for the purchase order and maintain comments about the purchase order. Comments print on the purchase order.

d. Vendor Return Maintenance (MM04)

The Vendor Return Maintenance conversation (MM04) may be used to create and maintain information about material being returned to a vendor. A user may create a return only if an item/spec and lot has no allocations or reservations.

Vendor return information includes the item/spec being returned to the vendor, the vendor return number, the lot number, a vendor authorization number, the quantity to return, and comments describing the reason for the return.

During this conversation, the system assigns a vendor return number which is used later when the material is shipped to the vendor.

2. Customer Orders (MMCO)

a. Customer Order Maintenance (MM40)

The Customer Order Maintenance conversation (MM40) may be used to create and maintain customer orders. When creating a customer order, first review the on-hand inventory and scheduled production of an ordered item/spec. If inventory is available, it can be allocated to the C.O. Scheduled production outputs can be promised as future productions for the C.O. If desired, a user may add special instructions.

Customer order header information applies to the entire order. The header information includes the customer order number, order status, sold-to address and ship-to address. The header also includes shipping/freight information, payment terms, and if the customer will accept a partial shipment.

A user may enter customer order line detail information about each item/spec/container within a customer order, including COA (Certificate of Analysis) and MSDS (Material Safety Data Sheet) requirements, tax status, and price. The screen also includes information about the quantity allocated, promised, or already shipped.

This conversation may also be used to enter comments about the customer order, such as packaging instructions or special shipping considerations.

b. Customer Order Line Assignment (MM41)

The Customer Order Line Assignments conversation (MM41) may be used to allocate available inventory or promise scheduled production to a customer order line. This conversion may be used to allocate or promise to existing or downloaded customer orders. This conversation may also be used to review the customer order header and order lines. To maintain customer order information, a user may use the Customer Order Maintenance conversation (MM40).

c. Customer Return Maintenance (MM42)

The Customer Return conversation (MM42) may be used to create and maintain approvals for the return of goods from customers. This conversation includes information about the customer and the item/spec to be returned. It may specify return information, such as the quantity approved for return, the return reason, who approved the return, and comments about the return——such as the item/spec condition.

Once a return has been approved, a user may record receipts of the return using the Customer Return Receipt conversation (MM11).

3. Inventory (MMIN)

a. Inventory Inquiry (MM20)

The Inventory Inquiry conversation (MM20) may be used to display current inventory information for an item/spec and to summarized and detail information.

Information available for review includes: scheduled production allowable substitutes, expected deliveries, item/spec allocations, and current on-hand inventory.

b. Record Inventory Transaction (MM21)

The Inventory Adjustments conversation (MM21) may be used to create inventory transactions. Enter inventory transactions for a single inventory record or for an entire lot. For single inventory records, transactions include quantity adjustments, physical location moves, and changes in grade, status, container, or item/spec. For an entire lot, transactions include changes in grade and status.

To change existing inventory information, a user may use the two columns of information on the screen: one contains current inventory information and the other is for entering changes to the information.

Information about customer order lines tied to a particular inventory record is also available for review. This information includes the customer order number, customer order line number, and quantity allocated. To free allocated inventory for use elsewhere, remove existing allocations.

Information about production campaigns tied to a particular inventory record also displays. To free reserved inventory for use elsewhere, cancel appropriate reservations.

c. Item Transfer (MM22)

The Item Transfer conversation (MM22) may be used to transfer ownership of inventory by changing the ownership code for a partial or entire inventory balance. The physical location of the available inventory can also be changed, but it should remain in the same plant because the shipping documents required for transport on public roads are not generated by this conversation. Inventory transfer is a two-step process that involves issuing the transfer and then receiving it. An item is suspended from use while the transfer is in process. Only owners of inventory may issue a transfer for that inventory. The user IDs of employees issuing and receiving the material, as well as the date and time of the issue and receipt, are recorded.

When a transfer is issued, an internal customer order can be referenced. If it is a reference order, the transfer will be processed as though it is a shipment against the internal order. Upon receipt of the transfer, it will be recorded as a receipt against the corresponding internal purchase order.

d. Record Lot Split and Merge (MM23)

The Lot Split and Merge Maintenance conversation (MM23) may be used to split and merge inventory item/spec lots.

An item/spec lot can be split into a new lot in addition to the original lot. When splitting a lot, use any quantity up to the quantity available. For the new lot, modify the lot number, location code, and item grade/status.

Multiple inventory lots can be merged into each other. Merge either the entire quantity on-hand for the item/spec or any portion of the quantity available. If merging all of the on-hand inventory, the system will update any reservations or allocations to indicate that the lot is being assigned to the new lot number.

For tracing and tracking purposes, both splits and merges of inventory lots are recorded in the lot history. To trace and track lots, use the Item/Lot Tracing/Tracking conversation (MM24).

e. Item Lot Tracking and Tracing (MM24)

The Item/Lot Tracking/Tracing conversation (MM24) to review the history of transactions made against a specific lot. Inventory transactions are tracked and the lot history table is updated to provide a trail of the lot relationships. Tracing is the process of specifying an item/spec/lot and reviewing the item/spec/lot(s) from which it came. Tracing may be used to walk backward through the history of a specific item/spec/lot. Tracing indicates the contents of the specified item/spec/lot.

Tracking is the process of specifying an item/spec/lot and reviewing the item/spec/lot(s) that come from it. Tracking may be used to walk forward through the history of a specific item/spec/lot. Tracking indicates where the specified item/spec/lot was used.

f. Browse Inventory Transaction (MM25)

The Inventory Transaction History conversation (MM25) may be used to review inventory transaction information. Inventory transactions include receipts, shipments, transfers, adjustments, cycle counts, production usages and lot splits or merges. When these transactions are performed, the system records the before and after inventory balances. This conversation may be used to review balances for each transaction, as well as the user ID, date, time, transaction type, and order cross-reference associated with the transaction.

All inventory transaction records that are affected by a single inventory transaction have the same reference number and have sequential reference line numbers starting with '001'.

g. Cycle Count Class Assignments (MM30)

The Cycle Count Class Maintenance conversation (MM30) may be used to create and maintain class assignments for items to be included in regular cycle counts.

The system recommends cycle count classes based on the total percentage and cumulative percentage. The percentages relate to usages, sales, or other figures determined by the installation and are updated periodically.

h. Cycle Count Results (MM31)

The Cycle Count Results Maintenance conversation (MM31) may be used to record results from cycle counting and to review past counts.

Cycle count information includes the quantity counted, unit of measure, and number of containers counted for an item/spec in a specific subfacility associated with an owner.

Inventory adjustments are based on recorded counts. Use this conversation to review inventory balance accuracy statistics and totals of previous counts, grouped by item/spec, owner, and subfacility.

i. Cycle Count Schedule Maintenance (MM32)

The Cycle Count Schedule Maintenance conversation (MM32) may be used to create and maintain the cycle count schedule. Cycle count information includes the current class assignment, the last date when the item was counted, and the next scheduled count date.

The next count date for each item/spec is automatically set when a count is reported. If necessary, this conversation may be used to change the date by manually setting it.

Count cycle intervals set for each class are maintained in codes tables.

4. Receiving (MMRC)

a. Purchased Item Receipt/Rejection (MM10)

The Purchase Order Line Receipt/Rejection conversation (MM10) may be used to create and maintain information about the receipt or rejection of a purchased item/spec.

When a shipment has been received, enter basic information about the receipt of each item/spec. This includes purchase order line cross-reference information, receipt date, carrier, bill of lading information, and applicable comments.

In addition to general information, a user may include specific inventory information about the item/specs being received. Enter multiple inventory records based on the item's lot number and container, status, expiration date, inventory location, and quantity. Indicate the quantity in any unit of measure. This conversation may also be used to record the rejection of a shipment. Only record an entire shipment of an item/spec as rejected if it is not unloaded. If the shipment for a particular P.O. line is unloaded, or if only part of it is rejected, record a normal receipt using this conversation, and then record a vendor return using the Vendor Return Maintenance conversation (MM04).

If an error occurs when entering receipt or rejection information, a user may correct it using the Historical Receipts/Corrections conversation (MM13).

b. Customer Return Receipt (MM11)

The Customer Return Receipt conversation (MM11) may be used to enter information about the receipt of an item/spec returned by a customer. The receipt information includes the date the item/spec was returned, carrier, bill of lading information, grade, status, quantity returned, and comments about the receipt, such as the condition of the returned item/spec or the carrier's performance.

Only customer returns approved using the Customer Return Maintenance conversation (MM42) may be received using this conversation (MM11). If an error occurs while recording the receipt of returned item/specs, correct it using the Historical Receipts/Corrections conversation (MM13).

c. Historical Receipts/Corrections (MM13)

The Receipts/Corrections conversation (MM13) may be used to review information about receipts and correct errors made when entering information for receipts of purchased items, customer returns, or purchased item rejections.

The correction process 'backs-out', or reverses, any inventory transactions that occurred as a result of the original receipt. After the correction is made, the original receipt is updated with a status of 'corrected'. If the received inventory has been moved or changed in any way, perform manual inventory transactions to return the inventory to its original version before attempting to 'correct' the receipt.

5. Shipping (MMSP)

a. Customer Shipment Maintenance (MM50)

The Customer Order Shipping conversation (MM50) may be used to create and maintain the information necessary to ship an item/spec to a customer. This conversation supports full or partial shipments of one or multiple item/specs against one or multiple customer order lines. It may create and print pick lists with specific pick list instructions.

Shipment header information applies to the entire shipment and includes the shipping mode and carrier. This conversation also calculates scheduled net/gross weights and cubic volume, and allows entry of the actual shipment scale weight amounts.

This conversation may be used to create and maintain shipping lines. A shipment line describes the item/spec to be shipped and cross-references the customer order line for the shipment line.

When a shipment line is entered, a default pick list is created. If necessary, override the quantities on the default pick list. To enter the results of the pick, use the Shipment Pick List Maintenance conversation (MM53).

After the material has been picked, review the results of the pick and confirm or modify them. It is also possible to record the shipment directly by entering the quantities without using the pick list.

Once recorded, finalize the shipping transaction from the shipment header screen and ship it. If there is a shipment transaction error, reverse it by unshipping it.

For any item/spec being picked or shipped, this conversation provides access to shipping and safety information, such as DOT Ratings and required protective equipment. Extent of modification ability on the detail screens depends on the status of the shipment.

b. Waste Shipment Maintenance (MM52)

The Waste Shipping conversation (MM52) may be used to create and maintain the information necessary to ship waste material to a waste facility.

Shipment header information applies to the entire shipment and includes the shipping mode and carrier. This conversation also calculates scheduled net/gross weights and cubic volume, and indicates the actual shipment scale weight amounts, the manifest number, waste transporter number, and the waste facility number.

This conversation may also be used to create and maintain shipping lines. A shipment line describes the item/spec to be shipped.

When a shipment line is entered, a default pick list is created. If necessary, override the quantities on the default pick list. To enter the results of the pick, use the Shipment Pick List Maintenance conversation (MM53).

After the waste has been picked, review the results of the pick and confirm or modify them. It is also possible to record the shipment directly by entering the quantities without using the pick list.

Once recorded, finalize the shipping transaction from the shipment header screen by shipping it. If there is a shipment transaction error, reverse it by unshipping it.

For any item/spec being picked or shipped, this conversation may be used to access to shipping and safety information, such as DOT Ratings required protective equipment.

c. Report Shipment Pick List (MM53)

The Shipment Pick List Reporting conversation (MM53) may be used to record and maintain information about the inventory picked for shipment.

Pick lists are created for a shipment using the Shipping conversation (MM50), the Vendor Return Shipping conversation (MM51), or the Waste Shipping conversation (MM52). The results of the pick display on the Create Pick/Report Ship screen in each of these conversations.

E. PRODUCTION MANAGEMENT (PSPM)

1. Production Planning (PMPP)

a. Production Order Maintenance (PM01)

The Production Order Maintenance conversation (PM01) may be used to enter and maintain the two types of production orders: packaging orders and processing orders.

When a processing order is created, a production output is created for each output material specified in the process code formula. Outputs represent primary products, co-products, by-products, or waste products.

When a packaging order is created, a fill item/spec must be specified along with the packaging item. The output for the packaging order will be the fill item/spec and the container will be the packaging item/spec. The only output of a packaging order is the fill item/spec.

For each output created by the production order, specify a bulk container or package for the output. If a package is specified for an output, also indicate the process code for the packaging process.

b. Production Scheduling (PM02)

The Physical Hazards Maintenance conversation (PR02) may be used to review and maintain information about hazards associated with an item, procedures to deal with emergencies, and precautions to take with an item.

The conversation's checklist may be used to indicate an item's hazardous characteristics, such as whether the item is flammable, explosive, or reactive. A user may also enter procedure codes that identify other information, such as incompatible and decomposition products, and that define the principle physical hazards.

Procedure codes allow identification of the hazard precautions and procedures for an item, such as storage and handling, fire extinguishing media, and primary health hazards. It also lists and maintains Hazardous Material Identification System (HMIS) ratings and comments for each item's Material Safety Data Sheet (MSDS).

c. Detail Production Resource Netting (PM04)

The Compliance Quantities Maintenance conversation (PR04) may be used to define and maintain regulatory release tolerance levels and exposure limits for an item, or to indicate that a chemical is on the Form R list.

For each compliance source, a user may include the compliance quantity type and value, the associated location, its effective date, and any MSDS (Material Safety Data Sheet) comments.

To review or maintain compliance quantities from a specific source, use the CQ (Compliance Quantity) Maintenance conversation (EN11).

d. Campaign Launch (PM05)

The Transportation Data Maintenance conversation (PR05) may be used to define and maintain information about transporting an item and comments to print on the bill of lading.

This conversation may also be used to maintain transportation information such as packaging exceptions and requirements, disposal method, and freight classification. It may also maintain government regulation information, such as the item's maximum shipment quantities for various types of vehicles, and specify any comments to print on the item's bill of lading.

Incompatible and decomposition products display for informational purposes only; to maintain them, use the Physical Hazards Maintenance conversation (PR02).

e. Process Line Downtime Maintenance (PM30)

The Line Downtime Maintenance conversation (PM30) may also be used to specify when a process line will not be available. Process lines may not be available for many reasons——including maintenance and safety/training meetings.

Downtime information to enter and maintain includes the start date and time of the downtime, the number of hours that the line needs to be down, and the required completion date for the downtime.

A user may also specify if the start and end dates and times may be changed by indicating if the downtime is movable within the process line production schedule.

2. Production Execution (PMPE)

a. Record Production Results (PM10)

The Production Recording conversation (PM10) may be used to record in-process and end-product production and to manually issue materials. This conversation automatically creates lot relationships that are available for review in the Item/Lot Tracking and Tracing conversation (MM24).

Using the production quantities entered for in-process and end-product recording, the system calculates the quantity used for each component and deducts this amount from the inventory balances. This process is called backflushing.

Component usage quantities, including packaging components, are projected based on the recorded production quantity, the process code formula, and changes in quantities made when the campaign was launched. The system uses the inventory status, available quantity, and expiration date to calculate usage quantities from different stocks of inventory for each component.

Before the calculated usage quantities are deducted from inventory balances, if necessary, the ability exists to override the calculated quantities with the actual usage quantities.

When in-process and end-product production are recorded, backflushing can be performed for all components added to the process since the last process step when production was recorded. (Backflushing is optional and determined by a flag set for each process code.) End-product production recording also adds the quantity produced to the inventory level of the end-product item/spec.

When manual issues for materials are recorded, an adjustment to inventory levels occurs——but no backflushing occurs.

If necessary, a user may correct recording production errors using the Correct Production Recording conversation (PM13).

b. Record Miscellaneous Production (PM11)

The Miscellaneous Production Recording conversation (PM11) may be used to record the production of miscellaneous items, such as scrap that was not produced as the result of any specific production campaign.

When reporting miscellaneous production for item/specs produced by a process line shift, indicate the quantity of the item produced. Also include the following information: the inventory status code, lot number, grade, and inventory location code. Using this information, the system creates and maintains a historical record of the transaction.

To correct miscellaneous recording production errors, use the Production Record Correction conversation (PM13).

c. Record Process Line Events (PM12)

The Line Event Recording conversation (PM12) may be used to record and maintain events occurring on a process line. Define each event on the process line with an event code, the shift when the event occurred, and the dates and times when the event started and ended. Also record a reference for each event, such as a campaign number or downtime order number.

The information in this conversation may be used to track the use of a process line. This information can be reviewed in the Process Line Utilization conversation (PM21).

d. Correct Production Recording (PM13)

The Production Record Correction conversation (PM13) may be used to correct/backout errors made during production recording.

A user may select the transaction to correct from those listed. When the incorrect transaction displays, confirm it. Confirming it reverses all inventory and production record adjustments caused by the incorrect transaction.

A user may enter the corrected transaction using the Record Production Results conversation (PM10) or the Miscellaneous Production Recording conversation (PM11).

3. Production History (PMPH)

a. Production Statistics (PM20)

The Production Statistics conversation (PM20) may be used to review the production statistics for a campaign. These statistics include information about component item/specs, production variance statistics for item/spec containers, quality yields, and process step yield losses.

For each component item/spec, the following information displays: the standard/planned quantity, the run-time adjusted quantity, and the quantity actually used in the campaign. The percent variance between the actual quantity and the other two quantities also displays.

Production variance statistics for item/spec and container combinations produced in the campaign include the scheduled and actual number of hours for the campaign, average and instantaneous production rates combination, the scheduled and actual quantities produced, and the associated variance percents. The quality percentages portion of this conversation includes the following information: the actual amount and the percentage of the total quantity produced for each item grade, as well as the standard quality yield loss percent.

Process step yield loss information includes the planned and actual yield loss for each process step in the campaign and the percent of variance between the planned and actual yield loss.

b. Process Line Utilization (PM21)

The Process Line Utilization conversation (PM21) may be used to review all events that were recorded for a process line. The events that display were recorded in the Record Process Line Events conversation (PM12).

This conversation may be used to display events in the format in which they were recorded, listed by the start date and time. Other information that displays includes the shift, event code, total hours for the event, and event reference information.

Information for a specific shift and period of time also displays. The number of hours and the percentage of the total time displays for each event recorded on the process line during the specified time period.

F. NEW PRODUCT DEVELOPMENT (PSPD)

1. Design Request (PDDR)

a. Create/Submit A Request (PD03)

The Create and Submit A Request conversation (PD03) may be used to define a request for a new product and submit the request to a selected business manager.

The list screen may be used to select an unsubmitted design request for modification or choose to create a new request. The detail screens in this conversation may be used to document the business case for the requested effort. Enter customer and prospective marketplace information, existing competitors, reasons for the request, and the detailed end-product specifications as either required or desired by the customer. If desired, enter additional comments about the request.

After submitting a design request, the system sends an electronic mail message to notify the appropriate business manager.

Design Request—Profile
PURPOSE: To browse information for an unsubmitted design request. This information is used throughout new product development to document the business case for the development and base future decisions on the effort. Also use this screen to review:
  comments about the profile
  customer requirements and specifications associated with the design request
  currency and unit of measure conversion.
Design Request—Profile
BROWSE: Review the unsubmitted design request.
CUSRQT: Customer End-Product Requirements and Specifications. To access the customer requirements, specifications, and objectives for the requested product, press the 'CusRqt' function key combination.
ADDCMT: Additional Comments. To browse design request comments in the text editor, press the 'AddCmt' function key combination.
Design Request—Profile
UMCONV: Unit of Measure Conversion. To convert the potential volume, press the 'UMConv' function key combination. Weight units of measure cannot be converted to volume units of measure and vice versa. Non-weight/volume units of measure (eaches) cannot be converted.
Design Request—Profile
CRCYCONV: Currency Conversion. To view the anticipated market price in a foreign currency, press the 'Crcy Conv' function key combination.
Customer End-Product Requirements and Specifications
PURPOSE: To browse the customer's reasons for requesting a new product development and the requirements and objectives for the end-product. Customer objectives are marked as either 'required' or 'desired'. These objectives are used to evaluate the performance of the experimental prototypes developed for the request. Also use the screen to access customer product requirements, comments about the request, submit a design request to a business manager for approval, and to access customer and marketplace information about the request.
Customer End-Product Requirements and Specifications
BROWSE: Review the customer end-product requirements and specifications.
ADDCMT: Additional Comments. To browse design request comments in the text editor, press the 'AddCmt' function key combination.
PROFIL: Profile To access customer and marketplace information about the request, press the 'Profil' function key combination.
Design Request—Profile
PURPOSE: To insert or modify design request information before submitting it to a business manager. A design request is used to track the entire product development process. Also use this screen to access comments about the profile and to access customer requirements and specifications associated with the design request. Once a design request is submitted, the system sends an electronic mail message to the specified business manager.
Design Request—Profile
INSERT: Required:
  Design/Revision
  Business Opportunity
  Number
  Request Date
  End Market & Use
  Required Date
  Anticipated Market
  Price
  Requestor
  Price UM
  Customer (name)
  Potential Volume
  Customer Contact
  Volume UM/Time UM
  Customer's Customer Parent
  Item/Spec
  Numbers
  Business Group Code
  The Design Number is generated by the system.
Design Request—Profile
INSERT:

When creating a request, the revision number is 00. The Request Date uses the current date.
The Requestor name is for documentation purposes only. E-Mail messages are addressed to the User-ID of the person logged on the system when the request is created.
To create a design request and design description, the Requestor is required.

Design Request—Profile
INSERT:
  Potential volume cannot be converted from Weight UM to Volume UM and vice versa.
  Once submitted, a design request can no longer be maintained in the Create/Submit A Request (PD03).
MODIFY: Change any accessible field.

Design Request—Profile
CUSRQT: Customer End-Product Requirements and Specifications. To access the customer requirements, specifications, and objectives for the requested product, press the 'CusRqt' function key combination.
ADDCMT: Additional Comments. To add design request comments in the text editor, press the 'AddCmt' function key combination.

Design Request—Profile
SUBMIT: Submit Design Request. To submit the design request to the specified business manager for approval, press the 'Submit' function key combination. The business manager will receive an electronic mail message alerting him/her that the design request was submitted for approval.
REPORTS: Custom Report Request. To pass the design request to the Create A Design Request Report Conversation (PD14) to create custom reports that may be required to submit the request, press the 'Reports' function key combination.

Customer End-Product Requirements
PURPOSE: To insert or modify the customer's reasons for requesting a new product development, the requirements and objectives for the end-product. Customer objectives are indicated as either 'required' or 'desired'. These objectives are used to evaluate the performance of the experimental prototypes developed for the request. Also use the screen to access customer product requirements, comments about the request, submit a design request to a business manager for approval, and to access customer and marketplace information about the request.

Customer End-Product Requirements
INSERT: Required:
  Design/Revision
  Reason for Request
  Number (1-4)
  Description
  Specific Objective
  Required Date
  Required flag
  Customer Approval
  Desired flag
  Required flag
  Objectives must be marked as EITHER 'Required' or 'Desired'.
  At least one Reason for Request and one Objective is required to submit a design request.

Customer End-Product Requirements
INSERT: When adding requirements, the system saves the User Nickname of the person adding the requirements, the date, and the objective. These are for audit trail and reporting purposes.
MODIFY: Change any accessible field.

Customer End-Product Requirements
MODIFY: When modifying requirements, the system saves the User Nickname of the person modifying the requirements, the date, and the objective. These are for audit trail and reporting purposes. Objectives display in the order in which they were entered.

Customer End-Product Requirements
DELETE: Place the cursor on the objective to delete. Press the 'Delete' function key combination. Delete the objective by pressing the 'Confirm' function or retain the objective by pressing the 'Cancel' function key combination.
ADDCMT: Additional Comments. To add design request in the comments text editor, press the 'AddCmt' function key combination.
PROFIL: Profile. To access customer and marketplace information about the request, press the 'Profil' function key combination.

Customer End-Product Requirements
SUBMIT: Submit Design Request. To submit the design request to the specified business manager for approval, press the 'Submit' function key combination. The business manager will receive an electronic mail message alerting him/her that the design request was submitted for approval. In order to submit a request, at least one of the following is required:
Reason for Request
Specific Objective marked as Required OR Desire Un-Submitted Design Request List
PURPOSE: To search for and select a design request to insert, browse, or modify that has not yet been submitted to a business manager for approval.
SEARCH: With the cursor on the first blank line, enter a full or partial Design Number, Business Group, or Requestor NPD ID and press the 'Find' key. If the first line is not blank, use the space bar to clear the fields before entering information. To start at the beginning of the list, press the 'Find' key. To see additional unsubmitted design requests, press the 'Next Screen' key.

Un-Submitted Design Request List
INSERT: Press the 'Insert' function key combination to create a new design request.
BROWSE: Search if necessary. Enter the unsubmitted design request to browse or place the cursor on the desired one from the list. Press the 'Browse' function key combination.
MODIFY: Search if necessary. Enter the unsubmitted design request to modify or place the cursor on the desired one from the list. Press the 'Modify' function key combination.

Business Group
PURPOSE: To search for and select a business group.
SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.

Business Group
SELECT: Place the cursor on the desired business group. Press the 'Return' function key to return the selected information to the detail screen.
Item/Spec Name List
PURPOSE: To search for and select an item/spec.
SEARCH: With the cursor on the first blank line, enter a full or partial Item Number, Item Spec Number, or item Name and press the 'Find' key. If the first line is not blank, use the space bar to clear the fields before entering information. To start at the beginning of the list, press the 'Find' key. To see additional item/specs, press the 'Next Screen' key.
Item/Spec Name List
SELECT: Place the cursor on the desired item/spec. Press the 'Return' function key to return the selected information to the detail screen.
Electronic Mail—User List
PURPOSE: To search for and select users who are capable of receiving electronic mail messages. These users are the only ones who can create and submit design requests.
SEARCH: With the cursor on the first blank line, enter a full or partial User Nickname (NPD ID) or User Group Code and press the 'Find' key. If the first line is not blank, use the space bar to clear the fields before entering information. To start at the beginning of the list, press the 'Find' key. To see additional users, press the 'Next Screen' key.
Electronic Mail—User List
SELECT: Place the cursor on the desired electronic mail user. Press the 'Return' function key to return the selected information to the detail screen.
Business Group
PURPOSE: To search for and select a business group.
SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.
Business Group
SELECT: Place the cursor on the desired business group. Press the 'Return' function key to return the selected information to the detail screen.

b. Browse A Request (PD04)

The Browse A Design Request conversation (PD04) may be used to review detailed information about a previously submitted design request.

The list screen provides a working queue of design requests, based on the request's business group and current status.

Detail screens document the business case for the development effort, the project milestones and dates, the project's team members, and the status approvals for request.

This conversation may also be used to review detailed information about each of the experimental prototype's developed for the request. Access any commercial scale-up authorizations, item and physical specification information, and control formulas. Also available for review are custom reports created for a design request, an experimental prototype, or a commercial scale-up authorization. If desired, submit a selected design request report for printing.

Design Request—Project Definition
PURPOSE: To browse the project definition for the design request, including the design category, project leader, and priority. Also use this screen to access comments about design request and to access project team member information, project milestones, status detail, financial simulations, experimental solutions, and custom reports.
BROWSE: Review the project definition information. If the Request Comments flag is Y (Yes), use the 'AddCmt' function key combination to access comments.
Design Request—Project Definition
PRIRTY: Project Leader Queue. To access project leader information, press the 'Prirty' function key combination.
PERSNL: Project Team Members. To access project team member information, press the 'Persnl' function key combination.
ADDCMT: Additional Comments. To browse comments for the design request press the 'AddCmt' function key combination.
MILSTN: Project Milestones. To access the project milestone information, press the 'Milstn' information.
Design Request—Project Definition
REPORT: Design Request Custom Reports. To access design request custom report information, press the 'Report' function key combination.
PROFIL: Customer and Marketplace Information. To access the customer and marketplace information, press the 'Profil' function key combination.
FINLIS: Financial Simulations. To access the list of financial simulations, press the 'Finlis' function key combination.
Design Request—Project Definition
XPSOLN: Experimental Prototype Solutions. To access the experimental prototype solutions information, press the 'XpSoln' function key combination.
Design Request—Profile
PURPOSE: To browse customer and marketplace information for the design request. A design request is used to track the entire product development process. Also use this screen to access comments about the profile, to access customer requirements and specifications associated with the design request, and project definition information.
Design Request—Profile
BROWSE: Review the design request information. The Requestor name is for documentation purposes only. E-Mail messages are addressed to the User-ID of the person logged on the system when the request is created.
PRJDEF: Project Definition. To access the project definition, press the 'PrjDef' function key combination.
Design Request—Profile
CUSRQT: Customer End-Product Requirements and Specifications. To access the customer requirements, specifications, and objectives for the requested product, press the 'CusRqt' function key combination.
ADDCMT: Additional Comments. To browse design request comments in the text editor, press the 'AddCmt' function key combination.
Customer End-Product Requirements PURPOSE: To browse the customer's reasons for requesting a new product development, the requirements and objectives for the end-product. Customer objectives are indicated as either 'required' or 'desired'. These objectives are used to evaluate the performance of the experimental prototypes developed for the request. Also use the screen to access customer product requirements, comments about the request, submit a design request to a business manager for approval, and to access customer and marketplace information about the request.

Customer End-Product Requirements
BROWSE: Review the customer product requirements. Objectives display in the order in which they were entered.
ADDCMT: Additional Comments. To browse design request comments in the test editor, press the 'AddCmt' function key combination.
Customer End-Product Requirements
PROFILE: Profile. To access customer and marketplace information about the request, press the 'Profil' function key combination.
PRJDEF: Project Definition. To access the project definition, press the 'PrjDef' function key combination.
Design Request—Project Personnel
PURPOSE: To browse the project team members that will be involved in the new product development effort. These team members will receive electronic mail messages associated with the design request.
BROWSE: Review the project team member information. User Nicknames are defined in the Electronic Mail User Maintenance conversation (CS23).
Design Request—Project Personnel
PRJ Project Definition. To access project definition
DEF: information, press the 'PrjDef' function key combination.
Design Request—Project Status Detail
PURPOSE: To browse the current status and status history of a design request. Use this screen to update a design request's status to rejected, reworked, or commercialized and to maintain comments about a design request. Whenever a design request is updated, the system saves the updated design request with the user's name and the date of update. This serves as an audit trail. When a status is successfully updated, the system sends a predefined electronic mail message to the project team.
Design Request—Project Status Detail
BROWSE: Review the project status detail information.
PRJDEF: Project Definition. To access project information, press the 'PrjDef' function key combination.
REJCMT: Browse Rejection Comments. To browse the rejection comments press the 'RejCmt' function key combination.
Design Request—Project Milestones
PURPOSE: To browse the milestone events and dates that will be used to track the progress of the new product's development. This screen includes the targeted commercial facility and process line.
BROWSE: Review the project milestone information. Milestones display in the order in which they were entered.

Design Request—Project Milestones
PRJDEF: Project Definition. To access project information, press the 'PrjDef' function key combination.
Project Leader Priority Queue
PURPOSE: To browse the priorities of all design requests that are assigned to a project leader.
BROWSE: Review the priorities for the design requests. Priorities must be sequentially ordered from the number one to the total number of projects assigned to the project leader.
PRJDEF: Project Definition. To access project information, press the 'PrjDef' function key combination.
Design Request Experimental Prototype Solutions
PURPOSE: To browse experimental prototypes that have been developed for a selected design request. If more than one prototype was developed, the research and development scientist uses this screen to indicate preferred solutions. This screen also indicates which prototypes have or will become commercialized products. From this screen, choose to access a variety of detailed Product Management information about the prototypes.
Design Request Experimental Prototype Solutions
BROWSE: Review the experimental prototype solutions for the design request.
PRJDEF: Project Definition. To access project information, press the 'PrjDef' function key combination.
REPORT: Design Request Report List. To access a list of reports that are defined for the experimental prototype, press the 'Reports' function key combination.
Design Request Experimental Prototype Solutions
CTLFRM: Item/Spec Control Formula. To access the control formula for the experimental prototype, press the 'CtlFrm' function key combination.
SPECS: Item/Spec Physical Specifications. To access detailed physical specification data for the prototype, press the 'Specs' function key combination.
SPCINF: Experimental Item/Spec Information. To access user-defined information for the experimental prototype, press the 'SpcInf' function key combination.
Design Request Experimental Prototype Solutions
ITEMGNL: Item General Information. To access physical property data for the experimental prototype, press the 'ItemGnl' function key combination.
CSALIS: Commercial Scale-Up Authorization. To access the commercial scale-up production information for the experimental prototype, press the 'CSALis' function key combination.
Item—General Information
PURPOSE: To browse information about an item. This information is used primarily in environmental system functions.
BROWSE: Review the item information.
XPSOLN: Design Request Experimental Prototype Solutions. To return to the design request experimental solutions, press the 'XpSoln' function key combination.
PRJDEF: Project Definition. To access project information, press the 'PrjDef' function key combination.
Experimental Solution Item/Spec Information PURPOSE: To browse information about experimental item/spec solutions. As an experimental solution nears commercialization, this information helps to define the new commercial product. Also use this screen to access a list of experimental prototype solutions for the design request.

BROWSE: Review the experimental item/spec solutions.

Experimental Solution Item/Spec Information

XPSOLN: Experimental Prototype Solutions. To access a list of experimental prototype solutions for the design request, press the 'XpSoln' function key combination.

PRJDEF: Project Definition. To access project information, press the 'PrjDef' function key combination.

Item/Spec—Physical Specifications

PURPOSE: To browse physical specification information for an item/spec. Also use this screen to review test specifications for an item. Item/spec information is used throughout the system in functions such as inventory, production scheduling, order processing, and shipping.

BROWSE: Review the physical specifications information for this item. TESTS: Test Specifications. To review test specifications for the item, press the 'Tests' function key combination.

Item/Spec—Physical Specifications

XPSOLN: Experimental Prototype Solutions. To access a list of experimental prototype solutions for the design request, press the 'XpSoln' function key combination.

Experimental Solution Commercial Scale-Up Authorization

PURPOSE: To browse a new scale-up authorization. This screen provides information about the item/spec to be produced, the product development team, and the customer requesting the product. Use this screen to access the following additional product information:
item general
physical/test specifications
control formula
project design request
associated reports
CSA comments (if they exist)

Experimental Solution Commercial Scale-Up Authorization

BROWSE: Review the commercial scale-up authorization information. If comments exist for the commercial scale-up authorization, the CSA Comments Exist field will contain a Y (Yes).

CRCYCONV: Currency Conversion. To do currency conversion press the "CrcyConv' function key combination.

Experimental Solution Commercial Scale-Up Authorization

UMCONV: Unit of Measure Conversion. To do the conversion of unit of measure, press the 'UMConv' function key combination.

REPORT: Design Request Report List. To access a list of reports that are defined for the scale-up authorization, press the 'Report' function key combination.

SPECS: Physical Specifications and Tests. To access detailed physical specification and test data for the experimental item/spec, press the 'Specs' function key combination.

Experimental Solution Commercial Scale-Up Authorization

CSALIS: Commercial Scale-Up Authorization. To access the commercial scale-up authorizations for the experimental prototype, press the 'CSALis' function key combination.

CSACMT: Scale-Up Authorization Comments. To access scale-up authorization comments, press the 'CSACmt' function key combination.

PRJDEF: Project Definition. To access project information, press the 'PrjDef' function key combination.

Item/Spec Test Specifications

PURPOSE: To browse item/spec test specifications. Test specifications indicate tests that need to be performed to ensure the consistent quality of an item/spec. Also use this screen to review physical specifications for an item.

BROWSE: Review the item/spec test specifications information.

SPECS: Physical Specifications. To review physical specifications for an item, press the 'Specs' function key combination.

Item/Spec Control Formula Maintenance

PURPOSE: To browse control formula information. This information defines the components in a process formula. It specifies the quantity of each item in the process formula and indicates if it is possible to change the quantity. Also use this screen to enter MSDS (Material Safety Date Sheet) comments about the control formula.

BROWSE: Review the control formula information.

TEXT: To review MSDS (Material Safety Data Sheet) comments, press the 'Text' function key combination.

Item/Spec Control Formula Maintenance

XPSOLN: Experimental Prototype Solutions. To access a list of experimental prototype solutions for the design request, press the 'XpSoln' function key combination.

FRMLST: Control Formula List. To access the control formula list, press the 'FrmLst' function key combination.

Design Request—Estimated Costs

PURPOSE: To browse a financial simulation for a design request. The simulation includes the discount rate and economic life for the product, along with the estimated investments and cashflows over the product's lifetime. Also use this screen to review the cost estimates and other assumptions used to estimate the period investments and operating cash flows.

Design Request—Estimated Costs

BROWSE: Review the financial simulation for a design request.
Use the arrow keys to review the investments/cashflows for all periods.
Period Investments are interpreted as negative cash flows.
Period Operating cash flows are interpreted as positive cash flows.

Design Request—Estimated Costs

FINANL: Financial Analysis. To access financial analysis information, press the 'FinAnl' function key combination.

FINCMT: Financial Comments. To access financial analysis comments, press the 'FinCmt' function key combination.

PRJDEF: Project Definition. To access project information, press the 'PrjDef' function key combination.

Design Request—Financial Analysis

PURPOSE: To browse the results of a present value analysis applied to the estimated investments and cash flows. These results include the net present value, profitability index, and internal rate of return. Also use this screen to review financial comments and estimated costs.

BROWSE: Review the financial analysis results.

ESCOST: Estimated Costs. To access estimated cost information, press the 'EsCost' function key combination.

Design Request—Financial Analysis

FINCMT: Financial Comments. To access financial analysis comments, press the 'FinCmt' function key combination.

CRCYCONV: Currency Conversion. To do currency conversion, press the 'CrcyConv' function key combination.

PRJDEF: Project Definition. To access project information, press the 'PrjDef' function key combination.

Design Request List

PURPOSE: To search for and browse a design request.

SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the 'Find' key. To see additional design requests, press the 'Next Screen' key.

Design Request List

BROWSE: Search if necessary. Enter the design request to browse or place the cursor on the desired one from the list. Press the 'Browse' function key combination.

Commercial Scale-Up Authorizations List

PURPOSE: To search for and browse a commercial scale-up authorization.

SEARCH: With the cursor on the first blank line, enter a full or partial Design Number, Experimental Item Number, Spec Number, CSA Number, or Design Request Active Indicator and press the 'Find' key. If the first line is not blank, use the space bar to clear the fields before entering information. To start at the beginning of the list, press the 'Find' key. To see additional authorizations, press the 'Next Screen' key.

Commercial Scale-Up Authorizations List

BROWSE: Place the cursor on the desired commercial scale-up authorization. Press the 'Browse' function key to browse the selected commercial scale-up authorization.

Control Formula List

PURPOSE: To search for and browse a control formula.

SEARCH: With the cursor on the first blank line, enter a full or partial Item/Spec Number, Item Name, Formula ID, or In-Effect Date and press the 'Find' key. If the first line is not blank, use the space bar to clear the fields before entering information. To start at the beginning of the list, press the 'Find' key. To see additional items, press the 'Next Screen' key.

Control Formula List

BROWSE: Place the cursor on the desired control formula. Press the 'Browse' function key to browse the control formula selected.

Electronic Mail—User List

PURPOSE: To search for and browse users who are to receive electronic mail messages. These users are the only ones who can create and submit design requests.

SEARCH: With the cursor on the first blank line, enter a full or partial User Nickname (NPD ID) or User Group Code and press the 'Find' key. If the first line is not blank, use the space bar to clear the fields before entering information. To start at the beginning of the list, press the 'Find' key. To see additional users, press the 'Next Screen' key.

Electronic Mail—User List

BROWSE: Place the cursor on the desired electronic mail user. Press the 'Browse' function key to browse the selected electronic mail user.

Design Request Status List

PURPOSE: To search for and browse a design request status. Statuses are used to track the progress of the request through the new product development pipeline.

SEARCH: With the cursor on the first blank line, enter a full or partial Status Number or Status Code and press the 'Find' key. If the first line is not blank, use the space bar to clear the fields before entering information. To start at the beginning of the list, press the 'Find' key. To see design request statuses, press the 'Next Screen' key.

Design Request Status List

BROWSE: Place the cursor on the desired design request status. Press the 'Browse' function key to browse the selected design request status.

Business Group

PURPOSE: To search for and browse a business group.

SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.

Business Group

BROWSE: Place the cursor on the desired business group. Press the 'Browse' function key to browse the selected business group.

Financial Simulations List

PURPOSE: To search for and select financial analysis simulations.

SEARCH: With the cursor on the first blank line, enter a full or partial valid Design Number or valid Simulation Number and press the 'Find' key. If the first line is not blank, use the space bar to clear the fields before entering information. To start at the beginning of the list, press the 'Find' key. To see financial analysis simulations, press the 'Next Screen' key.

Financial Simulations List

SELECT: Place the cursor on the desired financial analysis simulation. Press the 'Return' function key to return the selected information to the detail screen.

2. Request Maintenance (DRMN)

a. Update A Request (PD05)

The Maintain A Design Request conversation (PD05) may be used to maintain detailed information about a previously submitted design request.

The list screen provides a working queue of design requests, based on the request's business group and current status.

Detail screens document the business case for the development effort, the project milestones and dates, the project's team members, and the status approvals for the request. This conversation may also be used to maintain detailed information about each of the experimental prototype's developed for the request. Access any commercial scale-up authorizations, item and physical specification information, and control formulas. Also available for review are custom reports created for a design request, an experimental prototype, or a commercial scale-up authorization. If desired, a user may submit a selected design request report for printing.

Design Request—Project Definition
 PURPOSE: To modify the project d design request, including the design category, project leader, and priority. Also use this screen to access comments about design request and to access project team member information.
 MODIFY: Required:
  Business Group Code
  Project Leader Name
  Request Priority
  Only active revisions can be modified.
Design Request—Project Definition
 MODIFY:
  If the Current Status is greater than the submitted status, the Design Category and Required Date cannot be changed.
  The Request Priority must be greater than zero and less that the total number of requests currently assigned to the project leader.
  When entering a project leader, assign a priority, and when assigning a priority, enter a project leader.
Design Request—Project Definition
 MODIFY:
  Once a request has been assigned to a project leader and prioritized, the project leader can never be removed; however, the request can be assigned to new project leaders.
  To update the request to ANY status beyond submitted, assign a design category.
  If the fields below are changed, the following electronic mail messages will be sent:
Design Request—Project Definition

| MODIFY: | Field: | E-Mail Message: |
|---|---|---|
| (cont.) | Business Group | S2 |
| | Project Leader | S3 |
| | Request Priority | S4 |
| | If the Request Comments flag is Y (Yes), use the 'AddCmts' function key combination to access comments. | |
| | If the Request Reports flag is Y (Yes), use Reports to access them. | |

Design Request—Project Definition
 PRIRTY: Project Leader Queue. To access project leader information, press the 'Prirty' function key combination.
 PERSNL: Project Team Members. To access project team member information, press the 'Persnl' function key combination.
 ADDCMT: Additional Comments. To maintain comments for the design request, press the 'AddCmt' function key combination.
 REPORT: Request Reports. To access request report information, press the 'Report' function key combination.
Design Request—Project Definition
 PROFIL: Customer and Marketplace Information. To access customer and marketplace information, press the 'Profil' function key combination.
 MILSTN: Project Milestones. To access project milestone information, press the 'Milstn' function key combination.
 STATUS: Status Detail. To access status detail information, press the 'Status' function key combination.
Design Request—Project Definition
 XPSOLN: Experimental Prototype Solutions. To access experimental solutions information, press the 'XpSoln' function key combination.
 ESCOST: Financial Simulations and Estimated Costs. To access the financial simulations and estimated cost information, press the 'EsCost' function key combination.
Design Request—Profile
 PURPOSE: To modify design request information. A design request is used to track the entire product development process. Also use this screen to access comments about the profile, to access customer requirements and specifications associated with the design request, and project definition information.
 PRJDEF: Project Definition. To access project information, press the 'PrjDef' function key combination.
Design Request—Profile
 CUSRQT: Customer End-Product Requirements and Specifications. To access the customer requirements, specifications, and objectives for the requested product, press the 'CusRqt' function key combination.
 ADDCMT: Add Comments. To add design request comments in the text editor, press the 'AddCmt' function key combination.
Customer End-Product Requirements
 PURPOSE: To insert or modify the customer's reasons for requesting a new product development, the requirements and objectives for the end-product. Customer objectives are indicated as either 'required' or 'desired' These objectives are used to evaluate the performance of the experimental prototypes developed for the request. Also use the screen to access customer product requirements, comments about the request, and to access customer and marketplace information about the request.
Customer End-Product Requirements
 MODIFY: Change any accessible field.
  When modifying requirements, the system saves the User Nickname of the person modifying the requirements, the date, and the objective. These are for audit trail and reporting purposes.

Objectives display in the order in which they were entered.

Customer End-Product Requirements

DELETE: Place the cursor on the objective to delete. Press the 'Delete' function key combination. Delete the objective by pressing the 'Confirm' function or retain the objective by pressing the 'Cancel' function key combination.

ADDCMT: Add Comments. To add design request comments in the text editor, press the 'Add Cmt' function key combination.

PROFIL: Profile. To access customer and marketplace information about the request, press the 'Profil' function key combination.

Design Request—Project Personnel

PURPOSE: To insert, modify, or delete the project team members that will be involved in the new product development. These team members will receive electronic mail messages associated with the design request.

INSERT: Press the 'Insert' key. Required:
Personnel Type Code
Personnel Type Name
Enter an User Nickname (NPD ID) for each personnel type.

Design Request—Project Personnel
INSERT:
User Nicknames are defined in the Electronic Mail User Maintenance conversation (CS23).
Required personnel types are defined in the codes table, CRQDPSNL.
Personnel types are defined in the codes table, CPRSNL.
MODIFY: Modify any accessible field.

Design Request—Project Personnel
DELETE: Place the cursor on the team member to delete and press the 'Delete' function key combination. Delete the team member by pressing the 'Confirm' function or retain the team member pressing the 'Cancel' function key combination. If a required personnel type is the only one assigned to the team, he/she cannot be deleted.

PRJDEF: Project Definition. To access project information, press the 'PrjDef' function key combination.

Design Request—Project Status Detail
PURPOSE: To modify the current status of a design request. Use this screen to update a design request's status to rejected, reworked, or commercialized and to maintain comments about a design request. Whenever a design request is updated, the system saves the updated design request with the user's name and the date of update. This serves as an audit trail. When a status is successfully updated, the system sends a predefined electronic mail message to the project team.

Design Request—Project Status Detail
MODIFY: The cursor is on the next available status. Complete the status or reassign it.
COMPLETESTATUS: If the status has been completed, place an 'X' in the Completed column next to the status. Once completed, the system will send a pre-defined electronic mail message to the project team notifying them of the status completion.

Design Request—Project Status Detail
REASSIGNSTATUS:
Comments are required in order to reject/rework a design request.
To update to the 'reject for rework' status, enter a 'reassign' status.
To update to the 'reassign' status, enter a 'reject for rework' status.
The 'reassign' status cannot be greater than the current status of the request.

Design Request—Project Status Detail
REASSIGNSTATUS:
To update to the 'commercialized' status, all normal statuses must be complete and at least one experimental prototype must be marked for commercialization.
Rejecting or commercializing a design request will make it inactive and its detailed information will not be modifiable.
Rejecting a request for rework will create a new revision and will deactivate the old revision. The new revision's history will be set back to the reassign status.

Design Request—Project Status Detail
REASSIGNSTATUS: Commercializing a status causes all experimental prototypes marked for commercialization to appear in the Commercialize Queue conversation (PD13).
MILSTN: Project Milestones. To access project milestones for the design request, press the 'Milstn' function key combination.
XPSOLN: Experimental Prototype Solutions. To access a list of experimental prototype solutions for the design request, press the 'XPSoln' function key combination.

Design Request—Project Status Detail
PRJDEF: Project Definition. To access project information, press the 'PrjDef' function key combination.
COMSOL: Commercialization. To access commercialization information, press the 'ComSol' function key combination.
REPORT: Design Request Report List. To access a list of reports that are defined for the experimental prototype, press the 'Report' function key combination.

Design Request—Project Status Detail
ESCOST: Financial Simulations and Estimated Costs. To access financial simulations and estimated costs, press the 'EsCost' function key combination.
ADDCMT: Add Cement. To add anything to the comment, press the 'AddCmt' function key combination.
REJCMT: Browse Rejection Comment. To browse the rejection comment, press the 'RejCmt' function key combination.

Design Request—Project Status Detail
BRRQST: Browse Request. To browse the request, press the 'BrRqst' function key combination.

Design Request—Project Milestones
PURPOSE: To modify the milestone events and dates that will be used to track the progress of the new product's development. This screen includes the targeted commercial facility and process line. Also use this screen to access additional design request information.
MODIFY: Modify any of the following fields:
Target Date
Target Line Code Estimated Development Time
Milestone
Target Location Code
Milestone Date
Design Request—Project Milestones
MODIFY: NOTES:
  Milestones are stored exactly in the order in which they were entered.
  The Milestone Date is required for all milestones.
  The target line must exist for a valid facility.
  Each time project milestone information is modified, the user's name and current date is updated. This provides an audit trail.
Design Request—Project Milestones
PRJDEF: Project Definition. To access project definition information, press the 'PrjDef' function key combination.
Design Request List
PURPOSE: To search for a design request and to access associated design requests to modify.
SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the 'Find' key. To see additional design requests, press the 'Next Screen' key.
Design Request List
MODIFY: Search if necessary. Enter the design request containing the project milestones to modify or place the cursor on the desired one from the list. Press the 'Browse' function key combination.
  NOTE: Inactive design requests cannot be modified.
Project Leader Priority Queue
PURPOSE: To search for and select a project leader for the design request. The screen displays all requests currently assigned to the leader with their priorities.
SEARCH: With the cursor on the first blank line, enter a full or partial Project Leader ID and press the 'Find' key. If the first line is not blank, use the space bar to clear the fields before entering information. To start at the beginning of the list, press the 'Find' key. To see additional design
Project Leader Priority Queue
SELECT: Press the 'Return' function key to return the selected information to the detail screen.
Design Category List
PURPOSE: To search for and select a design category.
SEARCH: With the cursor on the first blank line, enter a full or partial Design Category Code and press the 'Find' key. If the first line is not blank, use the space bar to clear the fields before entering information. To start at the beginning of the list, press the 'Find' key. To see additional design category codes, press the 'Next Screen' key.
SELECT: Place the cursor on the desired design category. Press the 'Return' function key to return the selected information to the detail screen.
Business Group
PURPOSE: To search for and select a business group.
SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.
Business Group
SELECT: Place the cursor on the desired business group. Press the 'Return' function key to return the selected information to the detail screen.
Design Request Status List
PURPOSE: To search for and select a design request status. Statuses are used to track the progress of the request through the new product development pipeline.
SEARCH: With the cursor on the first blank line, enter a full or partial Status Number or Status Code and press the 'Find' key. If the first line is not blank, use the space bar to clear the fields before entering information. To start at the beginning of the list, press the 'Find' key. To see design request statuses, press the 'Next Screen' key.
Design Request Status List
SELECT: Place the cursor on the desired design request status. Press the 'Return' function key to return the selected information to the detail screen.
Electronic Mail—User List
PURPOSE: To search for and select users who are to receive electronic mail messages. These users are the only ones who can create and submit design requests.
SEARCH: With the cursor on the first blank line, enter a full or partial User Nickname (NPD ID) or User Group Code and press the 'Find' key. If the first line is not blank, use the space bar to clear the fields before entering information. To start at the beginning of the list, press the 'Find' key. To see additional users, press the ,Next Screen, key.
Electronic Mail—User List
SELECT: Place the cursor on the desired electronic mail user. Press the 'Return' function key to return the selected information to the detail screen.
Business Group
PURPOSE: To search for and select a business group.
SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.
Business Group
SELECT: Place the cursor on the desired business group. Press the 'Return' function key to return the selected information to the detail screen.
Project Leaders List
PURPOSE: To search for and select users assigned to a project leader for a new product development design request.
SEARCH: With the cursor on the first blank line, enter a full or partial User Nickname or User Group Code and press the 'Find' key. If the first line is not blank, use the space bar to clear the fields before entering information. To start at the beginning of the list, press the 'Find' key. To see additional information, press the 'Next Screen' key.
Project Leaders List SELECT: Place the cursor on the desired user. Press the 'Return' function key to return the selected information to the detail screen.

Item/Spec Name List

PURPOSE: To search for and select an item/spec.

SEARCH: With the cursor on the first blank line, enter a full or partial Item Number, Item Spec Number, or item Name and press the 'Find' key. If the first line is not blank, use the space bar to clear the fields before entering information. To start at the beginning of the list, press the 'Find' key. To see additional item/specs, press the 'Next Screen' key.

Item/Spec Name List

SELECT: Place the cursor on the desired item/spec. Press the 'Return' function key to return the selected information to the detail screen.

Project Leaders List

PURPOSE: To search for and select users assigned to a project leader for a new product development design request.

SEARCH: With the cursor on the first blank line, enter a full or partial User Nickname or User Group Code and press the 'Find' key. If the first line is not blank, use the space bar to clear the fields before entering information. To start at the beginning of the list, press the 'Find' key. To see additional information, press the 'Next Screen' key.

Project Leaders List

SELECT: Place the cursor on the desired user. Press the 'Return' function key to return the selected information to the detail screen.

Business Group

PURPOSE: To search for and select a business group.

SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.

Business Group

SELECT: Place the cursor on the desired business group. Press the 'Return' function key to return the selected information to the detail screen.

Electronic Mail—User List

PURPOSE: To search for and select users who are to receive electronic mail messages. These users are the only ones who can create and submit design requests.

SEARCH: With the cursor on the first blank line, enter a full or partial User Nickname (NPD ID) or User Group Code and press the 'Find' key. If the first line is not blank, use the space bar to clear the fields before entering information. To start at the beginning of the list, press the 'Find' key. To see additional users, press the 'Next Screen' key.

Electronic Mail—User List

SELECT: Place the cursor on the desired electronic mail user. Press the 'Return' function key to return the selected information to the detail screen.

Facility List

PURPOSE: To search for and select a facility.

SEARCH: With the cursor on the first blank line, enter a full or partial Facility Code or Facility Name and press the 'Find' key. If the first line is not blank, use the space bar to clear the fields before entering information. To start at the beginning of the list, press the 'Find' key. To see additional facilities, press the 'Next Screen' key.

Facility List

SELECT: Place the cursor on the desired facility. Press the 'Return' function key to return the selected information to the detail screen.

Process Line List

PURPOSE: To search for and select a process line.

SEARCH: With the cursor on the first blank line, enter a full or partial Facility Code, Facility Name, Process Line Number, or Process Line Name and press the 'Find' key. If the first line is not blank, use the space bar to clear the fields before entering information. To start at the beginning of the list, press the 'Find' key. To see additional process lines, press the 'Next Screen' key.

Process Line List

SELECT: Place the cursor on the desired process line. Press the 'Return' function key to return the selected information to the detail screen.

b. Project Milestones (PD08)

The Design Request Project Milestones conversation may be used to document the events and dates used to gauge the development effort's progress.

The combination of the overall estimated development time, target completion date, and milestone dates will establish the entire project's timeframe. The targeted commercial location and line provide early determination of manufacturing capabilities.

In addition, to review other detailed information about the design request, a user may access the Browse A Design Request conversation (PD04).

Design Request—Project Milestones

PURPOSE: To browse the milestone events and dates that will be used to track the progress of the new product's development. This screen includes the targeted commercial facility and process line. Also use this screen to access additional design request information.

BROWSE: Review the project milestones for the design request. Milestones display in the order in which they were entered.

Design Request—Project Milestones

BRRQST: Design Request—Project Definition. To browse all design request detail screens, press the 'BrRqst' function key combination.

Design Request—Project Milestones

PURPOSE: To modify the milestone events and dates that will be used to track the progress of the new product's development. This screen includes the targeted commercial facility and process line. Also use this screen to access additional design request information.

MODIFY: Modify any of the following fields:
Target Date
Target Line Code
Estimated Development Time
Milestone
Target Location Code
Milestone Date Design Request—Project Milestones MODIFY: NOTES: Milestones are stored exactly in the order in which they were entered.
The Milestone Date is required for all milestones.
The target line must exist for a valid facility.

Each time project milestone information is modified, the user's name and current date is updated. This provides an audit trail.

Design Request—Project Milestones

BRRQST: Design Request—Project Definition. To browse all design request detail screens, press the 'BrRqst' function key combination.

Design Request List

PURPOSE: To search for a design request and to access associated project milestones to browse or modify.

SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start the beginning of the list, press the 'Find' key. To see additional design requests, press the 'Next Screen' key.

Design Request List

BROWSE: Search if necessary. Enter the design request containing the project milestones to browse or place the cursor on the desired one from the list. Press the 'Browse' function key combination.

MODIFY: Search if necessary. Enter the design request containing the project milestones to modify or place the cursor on the desired one from the list. Press the 'Browse' function key combination.

NOTE: Inactive design requests cannot be modified.

Electronic Mail—User List

PURPOSE: To search for and select an electronic mail user.

SEARCH: With the cursor on the first blank line, enter a full or partial User Nickname (NPD ID) or User Group Code and press the 'Find' key. If the first line is not blank, use the space bar to clear the fields before entering information. To start at the beginning of the list, press the 'Find' key. To see additional electronic mail users, press the 'Next Screen' key.

Electronic Mail—User List

SELECT: Place the cursor on the desired electronic mail user. Press the 'Return' function key to return the selected information to the detail screen.

Business Group

PURPOSE: To search for and select a business group.

SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.

Business Group

SELECT: Place the cursor on the desired business group. Press the 'Return' function key to return the selected information to the detail screen.

Design Request Status List

PURPOSE: To search for and select a design request status. Statuses are used to track the progress of the request through the new product development pipeline.

SEARCH: With the cursor on the first blank line, enter a full or partial Status Number or Status Code and press the 'Find' key. If the first line is not blank, use the space bar to clear the fields before entering information. To start at the beginning of the list, press the 'Find' key. To see design request statuses, press the 'Next Screen' key.

Design Request Status List

SELECT: Place the cursor on the desired design request status. Press the 'Return' function key to return the selected information to the detail screen.

Facility List

PURPOSE: To search for and select a facility.

SEARCH: With the cursor on the first blank line, enter a full or partial Facility Code or Facility Name and press the 'Find' key. If the first line is not blank, use the space bar to clear the fields before entering information. To start at the beginning of the list, press the 'Find' key. To see additional facilities, press the 'Next Screen' key.

Facility List

SELECT: Place the cursor on the desired facility. Press the 'Return' function key to return the selected information to the detail screen.

Process Line List

PURPOSE: To search for and select a process line.

SEARCH: With the cursor on the first blank line, enter a full or partial Facility Code, Facility Name, Process Line Number, or Process Line Name and press the 'Find' key. If the first line is not blank, use the space bar to clear the fields before entering information. To start at the beginning of the list, press the 'Find' key. To see additional process lines, press the 'Next Screen' key.

Process Line List

SELECT: Place the cursor on the desired process line. Press the 'Return' function key to return the selected information to the detail screen.

c. Request Status (PD09)

The Status Detail conversation (PD09) may be used to update the current status of a request as it progresses through the New Product Development process.

Request statuses are defined in the Request Status Maintenance conversation (PD15). They allow a request to be rejected, re-worked, or commercialized, as well as documenting other approvals required in the process.

This conversation may be used to access the PD08, PD04, PD06, PD19, PD22, PD14, and PD11 conversations (in order) and to maintain detailed information that may be required to update a status.

When a design request is successfully updated to a new status, electronic mail messages are sent to the appropriate project team members.

Design Request—Project Status Detail

PURPOSE: To browse the current status of a design request. Use this screen to review the status history of the design request, including the current status, design category, and the dates when previous statuses were updated. The screen also displays the name of the user who updated each status. If the request has been rejected, this screen displays where the rework began and any comments or reasons for the rejection.

Design Request Experimental Prototype Solutions

BROWSE: Review the project status information. If the status has been completed, an 'X' appears in the Completed column.

REFCMT: Rejection Comments. To review the reasons that this revision of the design request was rejected, press the 'RejCmt' function key combination.

ADDCMT: Additional Comments. To review additional comments associated with the design request and all revisions to the design request, press the 'AddCmt' function key combination.

Design Request Experimental Prototype Solutions

BRRQST: Design Request—Project Definition. To browse all design request detail screens, press the 'BrRqst' function key combination.

Design Request—Project Status Detail

PURPOSE: To modify the current status of a design request. Use this screen to update a design request's status to rejected, reworked, or commercialized and to maintain comments about a design request. Whenever a design request is updated, the system saves the updated design request with the user's name and the date of update. This serves as an audit trail. When a status is successfully updated, the system sends a predefined electronic mail message to the project team.

Design Request—Project Status Detail

MODIFY: The cursor is on the next available status. Complete the status or reassign it.

COMPLETE: If the status has been completed, place an 'X' in the

STATUS: Completed column next to the status. Once completed, the system will send a pre-defined electronic mail message to the project team notifying them of the status completion.

Design Request—Project Status Detail
REASSIGNSTATUS:

Comments are required in order to reject/rework a design request.

To update to the ,reject for rework, status, enter a 'reassign' status.

To update to the 'reassign' status, enter a 'reject for rework' status.

The 'reassign' status cannot be greater than the current status of the request.

Design Request—Project Status Detail
REASSIGNSTATUS:

To update to the 'commercialized' status, all normal statuses must be complete and at least one experimental prototype must be marked for commercialization.

Rejecting or commercializing a design request will make it inactive and its detailed information will not be modifiable.

Rejecting a request for rework will create a new revision and will deactivate the old revision. The new revision's history will be set back to the reassign status.

Design Request—Project Status Detail
REASSIGNSTATUS: Commercializing a status causes all experimental prototypes marked for commercialization to appear in the Commercialize Queue conversation (PD13).

BRRQST: Design Request—Project Definition. To browse all design request detail screens, press the 'BrRqst' function key combination.

MILSTN: Project Milestones. To access project milestones for the design request, press the 'Milstn' function key combination.

Design Request—Project Status Detail

XPSOLN: Experimental Prototype Solutions. To access a list of experimental prototype solutions for the design request, press the 'XPSoln' function key combination.

PRJDEF: Project Definition. To access project information, press the 'PrjDef' function key combination.

COMSOL: Commercialization. To access commercialization information, press the 'Comsol' function key combination.

Design Request—Project Status Detail

REPORT: Design Request Report List. To access a list of reports that are defined for the experimental prototype, press the 'Report' function key combination.

ESCOST: Financial Simulations and Estimated Costs. To access the financial simulations and estimated cost information, press the 'EsCost' function key combination.

REJCMT: Rejection Comments. To review the reasons that this revision of the design request was rejected, press the 'RejCmt' function key combination.

Design Request—Project Status Detail

ADDCMT: Additional Comments. To review additional comments associated with the design request and all revisions to the design request, press the 'AddCmt' function key combination.

Design Request List

PURPOSE: To search for a design request and to access associated status detail information to browse or modify.

SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the 'Find' key. To see additional design requests, Design Request List BROWSE: Search if necessary. Enter the design request containing the status details to browse or place the cursor on the desired one from the list. Press the 'Browse' function key combination.

MODIFY: Search if necessary. Enter the design request containing the status details to modify or place the cursor on the desired one from the list. Press the 'Browse' function key combination.

NOTE: Inactive design requests cannot be modified.

Electronic Mail—User List

PURPOSE: To search for and select an electronic mail user.

SEARCH: With the cursor on the first blank line, enter a full or partial User Nickname (NPD ID) or User Group Code and press the 'Find' key. If the first line is not blank, use the space bar to clear the fields before entering information. To start at the beginning of the list, press the 'Find' key. To see additional electronic mail users, press the 'Next Screen' key.

Electronic Mail—User List

SELECT: Place the cursor on the desired electronic mail user. Press the 'Return' function key to return the selected information to the detail screen.

Business Group

PURPOSE: To search for and select a business group.

SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.

Business Group

SELECT: Place the cursor on the desired business group. Press the 'Return' function key to return the selected information to the detail screen.

Design Request Status List

PURPOSE: To search for and select a design request status. Statuses are used to track the progress of the request through the new product development pipeline.

SEARCH: With the cursor on the first blank line, enter a full or partial Status Number or Status Code and press the 'Find' key. If the first line is not blank, use the space bar to clear the fields before entering information. To start at the beginning of the list, press the 'Find' key. To see design request statuses, press the 'Next Screen' key.

Design Request Status List

SELECT: Place the cursor on the desired design request status. Press the 'Return' function key to return the selected information to the detail screen.

d. Maintain Profile (PD10)

The Request Profile conversation (PD10) may be used to review and maintain a business case that was documented for a previously submitted design request.

Available for maintenance are customer and marketplace information, major competitors, reasons for the request, and detailed end-product specifications. If desired, a user may enter additional comments about the development effort.

Design Request—Profile

PURPOSE: To browse design request information after submission to a business manager. A design request is used to track the entire product development process. Also use this screen to access comments about the profile and to access customer requirements and specifications associated with the design request. Once submitted, the system sends an electronic mail message to the specified business manager.

Design Request—Profile

BROWSE: Review the unsubmitted design request.

CUSRQT: Customer End-Product Requirements and Specifications. To access the customer requirements, specifications, and objectives for the requested product, press the 'CusRqt' function key combination.

ADDCMT: Additional Comments. To access design request comments in the text editor, press the 'AddCmt' function key combination.

Design Request—Profile

BRRQST: Design Request—Project Definition. To access project definition information, press the 'BrRqst' function key combination.

CRCYCONV: Currency Conversion. To access the currency conversion information, press the 'CrcyConv' function key combination.

UOMCONV: Unit Of Measure Conversion. To access the unit of measure conversion information, press the 'UOMConv' function key combination.

Customer End-Product Requirements

PURPOSE: To browse the customer's reasons for requesting a new product development and the requirements and objectives for the end-product. Customer objectives are indicated as either 'required' or 'desired' These objectives are used to evaluate the performance of the experimental prototypes developed for the request. Also use the screen to access customer product requirements, comments about the request, submit a design request to a business manager for approval, and to access customer and marketplace information about the request.

Customer End-Product Requirements

BROWSE: Review the customer end-product requirements and specifications. Objectives display in the order in which they were entered.

ADDCMT: Additional Comments. To access design request comments in the text editor, press the 'AddCmt' function key combination.

Customer End-Product Requirements

BRRQST: Design Request—Project Definition. To access project information, press the 'BrRqst' function key combination.

PROFIL: Design Request—Profile. To access the design request profile, press the 'Profil' function key combination.

Customer End-Product Requirements

PURPOSE: To browse the customer's reasons for requesting a new product development and the requirements and objectives for the end-product. Customer objectives are indicated as either 'required' or 'desired'. These objectives are used to evaluate the performance of the experimental prototypes developed for the request. Also use the screen to access customer product requirements, comments about the request, submit a design request to a business manager for approval, and to access customer and marketplace information about the request.

Customer End-Product Requirements

BROWSE: Review the customer end-product requirements and specifications. Objectives display in the order in which they were entered.

ADDCMT: Additional Comments. To access design request comments in the text editor, press the 'AddCmt' function key combination.

Customer End-Product Requirements

BRRQST: Design Request—Project Definition. To access project information, press the 'BrRqst' function key combination.

PROFIL: Design Request—Profile. To access the design request profile, press the 'Profil' function key combination.

Design Request—Profile

PURPOSE: To browse or modify design request information after submission to a business manager. A design request is used to track the entire product development process. Also use this screen to access comments about the profile and to access customer requirements and specifications associated with the design request. Once submitted, the system sends an electronic mail message to the specified business manager.

MODIFY: Change any accessible field.

Design Request—Profile

DELETE: Search if necessary. Place the cursor on the break quantity to delete. Press the 'Delete' function key combination. Delete the quantity by pressing the 'LnConf' function key or retain the quantity by pressing the 'Unconfirm' function key combination.

CUSRQT: Customer End-Product Requirements and Specifications. To access the customer requirements, specifications, and objectives for the requested product, press the 'Cust Reqt' function key combination.

Design Request—Profile

ADDCMT: Add Comments. To access design request comments in the text editor, press the 'AddCmt' function key combination.

BRRQST: Design Request—Project Definition. To browse all design request detail screens, press the 'BrRqst' function key combination.

Customer End-Product Requirements

PURPOSE: To insert or modify the customer's reasons for requesting a new product development and the requirements and objectives for the end-product. Customer objectives are indicated as either 'required' or 'desired'. These objectives are used to evaluate the performance of the experimental prototypes developed for the request. Also use the screen to access customer product requirements, comments about the request, and to access customer and marketplace information about the request.

Customer End-Product Requirements

MODIFY: Change any accessible field.
  Objectives display in the same order they were entered.
  Objectives must be marked as EITHER 'Required' or 'Desired'.
  When modifying requirements, the system saves the User Nickname of the person modifying the requirements, the date, and the objective. These are for audit trail and reporting purposes.

Customer End-Product Requirements

DELETE: Place the cursor on the objective to delete. Press the 'Delete' function key combination. Delete the objective by pressing the 'Confirm' function or retain the objective by pressing the 'Cancel' function key combination.

ADDCMT: Additional Comments. To maintain design request comments in the text editor, press the 'AddCmt' function key combination.

Customer End-Product Requirements

BRRQST: Design Request—Project Definition. To browse all design request detail screens, press the 'BrRqst' function key combination.

PROFIL: Design Request—Profile. To access the design request profile, press the 'Profil' function key combination.

Design Request List

PURPOSE: To search for a design request and to access associated customer and marketplace information to browse or modify.

SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the 'Find' key. To see additional design requests, press the 'Next Screen' key.

Design Request List

BROWSE: Search if necessary. Enter the design request containing the project milestones to browse or place the cursor on the desired one from the list. Press the 'Browse' function key combination.

MODIFY: Search if necessary. Enter the design request containing the project milestones to modify or place the cursor on the desired one from the list. Press the 'Browse' function key combination.

NOTE: Inactive design requests cannot be modified.

Business Group

PURPOSE: To search for and select a business group.

SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.

Business Group

SELECT: Place the cursor on the desired business group. Press the 'Return' function key to return the selected information to the detail screen.

Design Request Status List

PURPOSE: To search for and select a design request status. Statuses are used to track the progress of the request through the new product development pipeline.

SEARCH: With the cursor on the first blank line, enter a full or partial Status Number or Status Code and press the 'Find' key. If the first line is not blank, use the space bar to clear the fields before entering information. To start at the beginning of the list, press the 'Find' key. To see design request statuses, press the 'Next Screen' key.

Design Request Status List

SELECT: Place the cursor on the desired design request status. Press the 'Return' function key to return the selected information to the detail screen.

Electronic Mail—User List

PURPOSE: To search for and select users who are to receive electronic mail messages. These users are the only ones who can create and submit design requests.

SEARCH: With the cursor on the first blank line, enter a full or partial User Nickname (NPD ID) or User Group Code and press the 'Find' key. If the first line is not blank, use the space bar to clear the fields before entering information. To start at the beginning of the list, press the 'Find' key. To see additional users, press the 'Next Screen' key.

Electronic Mail—User List

SELECT: Place the cursor on the desired electronic mail user. Press the 'Return' function key to return the selected information to the detail screen.

Item/Spec Name List

PURPOSE: To search for and select an item/spec.

SEARCH: With the cursor on the first blank line, enter a full or partial Item Number, Item Spec Number, or item Name and press the 'Find' key. If the first line is not blank, use the space bar to clear the fields before entering information. To start at the beginning of the list, press the 'Find' key. To see additional item/specs, press the 'Next Screen' key.

Item/Spec Name List

SELECT: Place the cursor on the desired item/spec. Press the 'Return' function key to return the selected information to the detail screen.

e. Maintain Definition (PD11)

The Project Definition conversation (PD11) may be used to review and maintain information that defines the product development effort. This information includes the project leader, request priority, targeted commercial location and line, and design category.

Also, this conversation may be used to define and maintain information about the personnel comprising the project team.

Design Request—Project Definition
PURPOSE: To browse the project definition for the design request, including the design category, project leader, and priority. Also use this screen to access comments about design request and to access project team member information.
BROWSE: Review the project definition information. Once a request has been assigned to a project leader and prioritized, the project leader can never be removed; however, the request can be assigned to new project leaders.

Design Request—Project Definition
If the Request Comments flag is Y (Yes), use the 'AddCmts' function key combination to access comments.
If the Request Reports flag is Y (Yes), use another conversation to maintain them.
PRIRTY: Project Leader Queue. To access project leader information, press the 'Prirty' function key combination.
PERSNL: Project Team Members. To access project team member information, press the 'Persnl' function key combination.

Design Request—Project Personnel
PURPOSE: To browse the project team members who will be involved in the new product development. These team members will receive electronic mail messages associated with the design request.
BROWSE: Review the project personnel information.
  User Nicknames are defined in the Electronic Mail User Maintenance conversation (CS23).
  Required personnel types are defined in the codes table, CRQDPSNL.
  Personnel types are defined in the codes table, CPRSNL.

Design Request—Project Personnel
PRJDEF: Design Request—Project Definition. To access design request project definition, press the 'PrjDef' function key combination.

Design Request—Project Definition
PURPOSE: To modify the project definition for the design request, including the design category, project leader, and priority. Also use this screen to access comments about design request and to access project team member information.
MODIFY: Required:
  Business Group Code
  Project Leader Name
  Request Priority
  Only active revisions can be modified.
  If the Current Status is greater than the status submitted, the Design Category and Required Date cannot be changed.
  If the fields below are changed, the following electronic mail messages will be sent:

| Field: | E-Mail Message: |
| --- | --- |
| Business Group | S2 |
| Project Leader | S3 |
| Request Priority | S4 |

Design Request—Project Definition
The Request Priority must be greater than zero and less that the total number of requests currently assigned to the project leader.
Once a request has been assigned to a project leader and prioritized, the project leader can never be removed; however, the request can be assigned to new project leaders.
When entering a project leader, assign a priority, and when assigning a priority, enter a project leader.

Design Request—Project Definition
To update the request to ANY status beyond submitted, assign a design category.
If the Request Comments flag is Y (Yes), use the 'AddCmts' function key combination to access comments.
If the Request Reports flag is Y (Yes), use the 'Reports' conversation to maintain them.

Design Request—Project Definition
PRIRTY: Project Leader Queue. To access project leader information, press the 'Prirty' function key combination.
PERSNL: Project Team Members. To access project team member information, press the 'Persnl' function key combination.

Design Request—Project Personnel
PURPOSE: To insert, modify, or delete the project team members that will be involved in the new product development. These team members will receive electronic mail messages associated with the design request.
INSERT: Press the 'Insert' key. Required:
  Personnel Type Code
  Personnel Type Name
  Enter an User Nickname (NPD ID) for each personnel type.

Design Request—Project Personnel
INSERT:
  User Nicknames are defined in the Electronic Mail User Maintenance conversation (CS23).
  Required personnel types are defined in the codes table, CRQDPSNL.
  Personnel types are defined in the codes table, CPRSNL.
MODIFY: Modify any accessible field.

Design Request—Project Personnel
DELETE: Place the cursor on the team member to delete and press the 'Delete' function key combination. Delete the team member by pressing the 'Confirm' function or retain the team member pressing the 'Cancel' function key combination. If a required personnel type is the only one assigned to the team, he/she cannot be deleted.
PRJDEF: Project Definition. To access design request project definition, press the 'PrjDef' function key combination.

Design Request List
PURPOSE: To search for a design request and to access associated project definition and team member information to browse or modify.

SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the 'Find' key. To see additional design requests, press the 'Next Screen' key.

BROWSE: Search if necessary. Enter the design request containing the project milestones to browse or place the cursor on the desired one from the list. Press the 'Browse' function key combination.

Design Request List

MODIFY: Search if necessary. Enter the design request containing the project milestones to modify or place the cursor on the desired one from the list. Press the 'Modify' function key combination.

NOTE: Inactive design requests cannot be modified.

Business Group

PURPOSE: To search for and select a business group.

SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.

Business Group

SELECT: Place the cursor on the desired business group. Press the 'Return' function key to return the selected information to the detail screen.

Design Request Status List

PURPOSE: To search for and select a design request status. Statuses are used to track the progress of the request through the new product development pipeline.

SEARCH: With the cursor on the first blank line, enter a full or partial Status Number or Status Code and press the 'Find' key. If the first line is not blank, use the space bar to clear the fields before entering information. To start at the beginning of the list, press the 'Find' key. To see design request statuses, press the 'Next Screen' key.

Design Request Status List

SELECT: Place the cursor on the desired design request status. Press the 'Return' function key to return the selected information to the detail screen.

Electronic Mail—User List

PURPOSE: To search for and select users who are to receive electronic mail messages. These users are the only ones who can create and submit design requests.

SEARCH: With the cursor on the first blank line, enter a full or partial User Nickname (NPD ID) or User Group Code and press the 'Find' key. If the first line is not blank, use the space bar to clear the fields before entering information. To start at the beginning of the list, press the 'Find' key. To see additional users, press the 'Next Screen' key.

Electronic Mail—User List

SELECT: Place the cursor on the desired electronic mail user. Press the 'Return' function key to return the selected information to the detail screen.

Project Leader Priority Queue

PURPOSE: To search for and select a project leader for the design request. Displays all requests assigned to a leader and their priorities.

SEARCH: With the cursor on the first blank line, enter a full or partial Project Leader ID and press the 'Find' key. If the first line is not blank, use the space bar to clear the fields before entering information. To start at the beginning of the list, press the 'Find' key. To see additional design requests, press the 'Next Screen' key.

Project Leader Priority Queue

SELECT: Press the 'Return' function key to return the selected information to the detail screen.

Project Leader List

PURPOSE: To search for and select users assigned to a project leader for a new product development design request.

SEARCH: With the cursor on the first blank line, enter a full or partial User Nickname or User Group Code and press the 'Find' key. If the first line is not blank, use the space bar to clear the fields before entering information. To start at the beginning of the list, press the 'Find' key. To see additional information, press the 'Next Screen' key.

Project Leader List

SELECT: Place the cursor on the desired user. Press the 'Return' function key to return the selected information to the detail screen.

Facility List

PURPOSE: To search for and select a facility.

SEARCH: With the cursor on the first blank line, enter a full or partial Facility Code or Facility Name and press the 'Find' key. If the first line is not blank, use the space bar to clear the fields before entering information. To start at the beginning of the list, press the 'Find' key. To see additional facilities, press the 'Next Screen' key.

Facility List

SELECT: Place the cursor on the desired facility. Press the 'Return' function key to return the selected information to the detail screen.

f. Revision History (PD12)

The Revision History conversation (PD12) may be used to review existing revisions or create new revisions for a selected design request.

From the design request list screen, a user may choose a design request and review its revision history. This screen may also be used to create a new revision for a selected design request.

On the design request - revision history screen, scroll through the revisions for the selected design request, or confirm the creation of a new revision. From the revision history screen, access the Browse A Design Request conversation (PD04) to browse detailed design request information for a selected revision.

Design Request Revision History

PURPOSE: To browse the revision history for a selected design request. Revisions to design requests are made when the design request changes and it is necessary to save its previous status. This screen displays a list of all revisions that have been created for the selected design request, the person who created each revision, the reason for each revision, and the date when each revision was created. Also use this screen to access additional comments and any design request rejection comments.

Design Request Revision History

BROWSE: Review the design request revision history.

ADDCMT: Additional Comments. To access additional comments about the design request, press the 'AddCmt' function key combination.

REJCMT: Rejection Comments. To access rejection comments about the design request, press the 'RejCmt' function key combination.

BRRQST: Design Request—Project Definition. To browse all design request detail screens, press the 'BrRqst' function key combination.

Design Request Revision History

PURPOSE: To create a new revision for a selected design request when the design request changes and it is necessary to save its previous status.

CREATE: Enter the reason for the revision and press the 'Create' function key.

ADDCMT: Additional Comments. To access additional comments about the design request, press the 'AddCmt' function key combination.

Design Request Revision History

REJCMT: Rejection Comments. To access rejection comments about the design request, press the 'RejCmt' function key combination.

BRRQST: Design Request—Project Definition. To browse all design request detail screens, press the 'BrRqst' function key combination.

Design Request List

PURPOSE: To search for a design request and to create a new revision for the request or to browse an existing design request.

SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the 'Find' key. To see additional design requests, press the 'Next Screen' key.

Design Request List

BROWSE: Search if necessary. Enter the design request containing the revision history to browse or place the cursor on the desired one from the list. Press the 'Browse' function key combination.

MODIFY: Search if necessary. Enter the design request for which a new revision is to be created or place the cursor on the desired one from the list. Press the 'Modify' function key combination.

NOTE: Inactive design requests cannot be modified.

Business Group

PURPOSE: To search for and select a business group.

SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.

Business Group

SELECT: Place the cursor on the desired business group. Press the 'Return' function key to return the selected information to the detail screen.

Design Request Status List

PURPOSE: To search for and select a design request status. Statuses are used to track the progress of the request through the new product development pipeline.

SEARCH: With the cursor on the first blank line, enter a full or partial Status Number or Status Code and press the 'Find' key. If the first line is not blank, use the space bar to clear the fields before entering information. To start at the beginning of the list, press the 'Find' key. To see design request statuses, press the 'Next Screen' key.

Design Request Status List

SELECT: Place the cursor on the desired design request status. Press the 'Return' function key to return the selected information to the detail screen.

Electronic Mail—User List

PURPOSE: To search for and select users who are to receive electronic mail messages. These users are the only ones who can create and submit design requests.

SEARCH: With the cursor on the first blank line, enter a full or partial User Nickname (NPD ID) or User Group Code and press the 'Find' key. If the first line is not blank, use the space bar to clear the fields before entering information. To start at the beginning of the list, press the 'Find' key. To see additional users, press the 'Next Screen' key.

Electronic Mail—User List

SELECT: Place the cursor on the desired electronic mail user. Press the 'Return' function key to return the selected information to the detail screen.

g. Design Request Comments (PD17)

The Additional Comments conversation (PD17) may also be used to review or maintain the comments corresponding to an active or inactive design request.

Design Request List

PURPOSE: To browse or modify additional comments for a design request.

SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the 'Find' key. To see additional design requests, press the 'Next Screen' key.

Design Request List

BROWSE: Search if necessary. Enter the design request to browse or place the cursor on the desired design request, and press the 'Browse' function key combination.

MODIFY: Search if necessary. Enter the design request to modify or place the cursor on the desired design request, and press the 'Modify' function key combination.

Electronic Mail—User List

PURPOSE: To search for and select an electronic mail user.

SEARCH: With the cursor on the first blank line, enter a full or partial User Nickname (NPD ID) or User Group Code and press the 'Find' key. If the first line is not blank, use the space bar to clear the fields before entering information. To start at the beginning of the list, press the 'Find' key. To see additional users, press the 'Next Screen' key.

Electronic Mail—User List

SELECT: Place the cursor on the desired electronic mail user. Press the 'Return' function key to return the selected information to the detail screen.

Business Group
PURPOSE: To search for and select a business group.
SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.
Business Group
SELECT: Place the cursor on the desired business group. Press the 'Return' function key to return the selected information to the detail screen.
Design Request Status List
PURPOSE: To search for and select a design request status. Statuses are used to track the progress of a design request through the new product development pipeline.
SEARCH: With the cursor on the first blank line, enter a full or partial Status Number or Status Code and press the 'Find' key. If the first line is not blank, use the space bar to clear the fields before entering information. To start at the beginning of the list, press the 'Find' key. To see design request statuses, press the 'Next Screen' key.
Design Request Status List
SELECT: Place the cursor on the desired design request status. Press the 'Return' function key to return the selected information to the detail screen.
h. Financial Analysis (PD19)
Use the Design Request Financial Analysis conversation (PD19) to create, maintain, and review various financial simulations associated with for a design request.

A list screen displays all of the financial simulations currently defined in the system.

Use first detail screen in this conversation to document the expected investment outlays and estimated operating cash flows over the entire economic life of the new product. Also document the assumptions and cost estimates used to determine the cash flows on this screen.

The second detail screen contains results of a present value analysis applied to the estimates entered on the first screen. This analysis provides some basic financial parameters such as the net present value, profitability index, internal rate of return, and the present value payback period.

Design Request—Estimated Costs
PURPOSE: To browse a financial simulation for a design request. The simulation includes the discount rate and economic life for the product, along with the estimated investments and cashflows over the product's lifetime. Also use this screen to review the cost estimates and other assumptions used to estimate the period investments and operating cash flows.
Design Request—Estimated Costs
BROWSE: Review the financial simulation for a design request.
  Use the arrow keys to review the investments/cashflows for all periods.
  Period Investments are interpreted as negative cash flows.
  Period Operating cash flows are interpreted as positive cash flows.
Design Request—Estimated Costs
FINANL: Financial Analysis. To access financial analysis information, press the 'FinAnl' function key combination.
FINCMT: Financial Comments. To access financial analysis comments, press the 'FinCmt' function key combination.
BRRQST: Browse Request. To browse the request, press the 'BrRqst' function key combination.
CRCYCONV: Currency Conversion. To do the currency conversion, press the 'CrcyConv' function key combination.
Design Request—Financial Analysis
PURPOSE: To browse the results of a present value analysis applied to the estimated investments and cash flows. These results include the net present value, profitability index, and internal rate of return. Also use this screen to review financial comments and estimated costs.
BROWSE: Review the financial analysis results.
Design Request—Financial Analysis
ESCOST: Estimated Costs. To access estimated cost information, press the 'EsCost' function key combination.
FINCMT: Financial Comments. To access financial analysis comments, press the 'FinCmt' function key combination.
CRCYCONV: Currency Conversion. To do the currency conversion, press the 'CrcyConv' function key combination.
Design Request—Financial Analysis
PURPOSE: To browse the results of a present value analysis applied to the estimated investments and cash flows. These results include the net present value, profitability index, and internal rate of return. Also use this screen to review financial comments and estimated costs.
BROWSE: Review the financial analysis results.
Design Request—Financial Analysis
ESCOST: Estimated Costs. To access estimated cost information, press the 'EsCost' function key combination.
FINCMT: Financial Comments. To access financial analysis comments, press the 'FinCmt' function key combination.
CRCYCONV: Currency Conversion. To do the currency conversion, press the 'CrcyConv' function key combination.
Design Request—Estimated Costs
PURPOSE: To insert, browse, modify, or delete a financial simulation for a design request. The simulation includes the discount rate and economic life for the product, along with the estimated investments and cashflows over the product's lifetime. Also use this screen to document the cost estimates and other assumptions used to estimate the period investments and operating cash flows.
INSERT: Required:
  Design Number
  Simulation Number
Design Request—Estimated Costs
INSERT:
  The Design Number/Simulation Number combination must be unique.
  Use the arrow keys to review the investments/cashflows for all periods.
  To complete financial analysis calculations, data must be entered for all periods in the economic life.

The Target Facility Code is required if the Target Line Code is entered.

Design Request—Estimated Costs

INSERT:
  Financial Period numbers are system-assigned.
  Period Investments are interpreted as negative cash flows.
  Period Operating Cash Flows are interpreted as positive cash flows.
MODIFY: Change any accessible field. For more information, refer to the notes in the INSERT section.

Design Request—Estimated Costs

DELETE: Place the cursor on the simulation to delete. Press the 'Delete' function key combination. Delete the simulation by pressing the 'Confirm' function key or retain the simulation by pressing the 'Unconfirm' function key combination.

Design Request—Estimated Costs

FINANL: Financial Analysis. To access financial analysis information, press the 'FinAnl' function key combination.

FINCMT: Financial Comments. To access financial analysis comments, press the 'FinCmt' function key combination.

BRRQST: Design Request—Project Definition. To browse all design request detail screens, press the 'BrRqst' function key combination.

Design Request—Estimated Costs

On the word processing screen, enter comments above the [End of file] statement. When through, press the 'F10' function key. When the screen with "Choose Desired Action . . ." appears, to save the text, press the 'F10' function key. To cancel the text, press the 'Remove' key.

Design Request—Estimated Costs

PURPOSE: To copy a financial simulation for a design request. The simulation includes the discount rate and economic life for the product, along with the estimated investments and cashflows over the product's lifetime. Also use this screen to document the cost estimates and other assumptions used to estimate the period investments and operating cash flows.

COPY: Place the cursor on the simulation to copy. Press the 'Copy' function key combination. Enter the new Design Number and Simulation Number and any additional information.

Design Request—Estimated Costs

COPY:
  The Design Number/Simulation Number combination must be unique.
  To complete financial analysis calculations, data must be entered for all periods in the economic life.
  The Target Facility Code is required if the Target Line Code is entered.

Design Request—Estimated Costs

COPY:
  Financial Period numbers are system-assigned.
  Period Investments cash flows are interpreted as negative cash flows.
  Period Operating cash flows are interpreted as positive cash flows.
FINANL: Financial Analysis. To access financial analysis information, press the 'FinAnl' function key combination.

Design Request—Estimated Costs

FINCMT: Financial Comments. To access financial analysis comments, press the 'FinCmt' function key combination.

BRRQST: Design Request—Project Definition. To browse all design request detail screens, press the 'BrRqst' function key combination.

Design Request—Estimated Costs

On the word processing screen, enter comments above the [End of file] statement. When through, press the 'F10' function key. When the screen with "Choose Desired Action . . ." appears, to save the text, press the 'F10' function key. To cancel the text, press the 'Remove' key.

Financial Simulations List

PURPOSE: To search for, insert, browse, modify, delete, or copy financial analysis simulations.

SEARCH: With the cursor on the first blank line, enter a full or partial valid Design Number or valid Simulation Number and press the 'Find' key. If the first line is not blank, use the space bar to clear the fields before entering information. To start at the beginning of the list, press the 'Find' key. To see financial analysis simulations, press the 'Next Screen' key.

Financial Simulations List

INSERT: Press the 'Insert' function key combination.

BROWSE: Search if necessary. Enter the financial simulation to browse or place the cursor on the desired one from the list. Press the 'Browse' function key combination.

MODIFY: Search if necessary. Enter the financial simulation to modify or place the cursor on the desired one from the list. Press the 'Modify' function key combination.

Financial Simulations List

DELETE: Search if necessary. Enter the financial simulation to delete or place the cursor on the desired one from the list. Press the Delete function key combination.

COPY: Search if necessary. Enter the financial simulation to copy or place the cursor on the desired one from the list. Press the 'Copy' function key combination. Design Request List PURPOSE: To search for and select a design request.

SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the 'Find' key. To see additional design requests, press the 'Next Screen' key.

Design Request List

SELECT: Place the cursor on the desired design request. Press the 'Return' function key to return the selected information to the detail screen.

Item/Spec Name List

PURPOSE: To search for and select an item/spec.

SEARCH: With the cursor on the first blank line, enter a full or partial Item Number, Item Spec Number, or item Name and press the 'Find' key. If the first line is not blank, use the space bar to clear the fields before entering information. To start at the beginning of the list, press the 'Find' key. To see additional item/specs, press the 'Next Screen' key.

Item/Spec Name List
SELECT: Place the cursor on the desired item/spec. Press the 'Return' function key to return the selected information to the detail screen.

Facility List
PURPOSE: To search for and select a facility.
SEARCH: With the cursor on the first blank line, enter a full or partial Facility Code or Facility Name and press the 'Find' key. If the first line is not blank, use the space bar to clear the fields before entering information. To start at the beginning of the list, press the 'Find' key. To see additional facilities, press the 'Next Screen' key Facility List
SELECT: Place the cursor on the desired facility. Press the 'Return' function key to return the selected information to the detail screen.

Process Line List
PURPOSE: To search for and select a process line.
SEARCH: With the cursor on the first blank line, enter a full or partial Facility Code, Facility Name, Process Line Number, or Process Line Name and press the Find' key. If the first line is not blank, use the space bar to clear the fields before entering information. To start at the beginning of the list, press the 'Find' key. To see additional process lines, press the 'Next Screen' key.

Process Line List
SELECT: Place the cursor on the desired process line. Press the 'Return' function key to return the selected information to the detail screen.

Design Request List
PURPOSE: To search for and select a design request.
SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the 'Find' key. To see additional design requests, press the 'Next Screen' key.

Design Request List
SELECT: Place the cursor on the desired design request. Press the 'Return' function key to return the selected information to the detail screen.

3. Experimental Solutions (DRES)

a. Experimental Solutions (PD06)

Use the Experimental Prototypes conversation (PD06) to review and maintain information associated with the experimental prototype solutions that were developed to satisfy a design request.

The experimental solution screen displays a list of the experimental solutions developed for the design request. From the Experimental Solution screen, access the item/spec information screen to review and maintain detail information for a selected solution. Also use this screen to access the product management module to review item general information, physical specifications, specification tests and control formula information for a selected solution.

Also use this conversation to review or create reports for a solution, or access and review the design request. Additionally, access the Scale-Up Authorization conversation (PD21) to review and create a commercial scale-up authorization for a selected solution.

Design Request Experimental Prototype Solutions
PURPOSE: To browse experimental prototypes that have been developed for a selected design request. If more than one prototype was developed, the research and development scientist uses this screen to indicate preferred solutions. This screen also indicates which prototypes have or will become commercialized products. From this screen, choose to access a variety of detailed Product Management information about the prototypes.

Design Request Experimental Prototype Solutions
BROWSE: Review the experimental prototype solutions for the design request.
BRRQST: Browse Request. To browse the design request, press the 'BrRqst' function key combination.
REPORT: Design Request Report List. To access a list of reports that are defined for the experimental prototype, press the 'Reports' function key combination.

Design Request Experimental Prototype Solutions
CTLFRM: Item/Spec Control Formula. To access a list of control formulas for the experimental prototype, press the 'CtlFrm' function key combination.
SPECS: Item/Spec Physical Specifications. To access detailed physical specification data for the prototype, press the 'Specs' function key combination.
SPCINF: Experimental Item/Spec Information. To access user-defined information for the experimental prototype, press the 'SpcInf' function key combination.

Design Request Experimental Prototype Solutions
ITMGNL: Item General Information. To access physical property data for the experimental prototype, press the 'ItmGnl' function key combination.
CSALIS: Commercial Scale-Up Authorization. To access a list of commercial scale-up authorizations for the experimental prototype, press the 'CSALis' function key combination.

Item—General Information
PURPOSE: To browse information about an item. This information is used primarily in environmental system functions.
BROWSE: Review the item information.

Experimental Solution Item/Spec Information
PURPOSE: To browse information about experimental item/spec solutions. As an experimental solution nears commercialization, this information helps to define the new commercial product. Also use this screen to access a list of experimental prototype solutions for the design request.
BROWSE: Review the experimental item/spec solutions.

Experimental Solution Item/Spec Information
XPSOLN: Experimental Prototype Solutions. To review the list of experimental prototype solutions for the design request, press the 'XpSoln' function key combination.

Item/Spec—Physical Specifications
PURPOSE: To browse physical specification information for an item/spec. Also use this screen to review test specifications for an item. Item/spec information is used throughout the system in functions such as inventory, production scheduling, order processing, and shipping.
BROWSE: Review the physical specifications information for this item.

TSTSPC: Test Specifications. To review test specifications for the item, press the 'TstSpc' function key combination.

Item/Spec Test Specifications

PURPOSE: To browse item/spec test specifications. Test specifications indicate tests that need to be performed to ensure the consistent quality of an item/spec. Also use this screen to review physical specifications for an item.

BROWSE: Review the item/spec test specifications information.

SPECS: Physical Specifications. To review physical specifications for an item, press the 'Specs' function key combination.

Item—General Information

PURPOSE: To browse information about an item. This information is used primarily in environmental system functions.

BROWSE: Review the item information.

Item/Spec—Physical Specifications

PURPOSE: To browse physical specification information for an item/spec. Also use this screen to review test specifications for an item. Item/spec information is used throughout the system in functions such as inventory, production scheduling, order processing, and shipping.

BROWSE: Review the physical specifications information for this item.

TSTSPC: Test Specifications. To review test specifications for the item, press the 'TstSpc' function key combination.

Item/Spec Test Specifications

PURPOSE: To browse item/spec test specifications. Test specifications indicate tests that need to be performed to ensure the consistent quality of an item/spec. Also use this screen to review physical specifications for an item.

BROWSE: Review the item/spec test specifications information.

SPECS: Physical Specifications. To review physical specifications for an item, press the 'Specs' function key combination.

Design Request Experimental Prototype Solutions

PURPOSE: To modify experimental prototypes that have been developed for a selected design request. If more than one prototype was developed, the research and development scientist uses this screen to indicate preferred solutions. This screen also indicates which prototypes have or will become commercialized products. From this screen, choose to access a variety of detailed Product Management information for a selected prototype.

Design Request Experimental Prototype Solutions

MODIFY: Modify any of the following fields:
  Development Location Code
  Development Line Code
  R & D Preference: Rank these from most to least preferred.

BRRQST: Browse Request. To browse the design request, press the 'BrRqst' function key combination.

Design Request Experimental Prototype Solutions

REPORT: Design Request Report List. To access a list of reports that are defined for the experimental prototype, press the 'Reports' function key combination.

CTLFRM: Item/Spec Control Formula. To access a list of control formulas for the experimental prototype, press the 'CtlFrm' function key combination.

SPECS: Item/Spec Physical Specifications. To access detailed physical specification data for the prototype, press the 'Specs' function key combination.

Design Request Experimental Prototype Solutions

SPCINF: Experimental Item/Spec Information. To access user-defined information for the experimental prototype, press the 'SpcInf' function key combination.

ITMGNL: Item General Information. To access physical property data for the experimental prototype, press the 'ItmGnl' function key combination.

CSALIS: Commercial Scale-Up Authorization. To access a list of commercial scale-up authorizations for the experimental prototype, press the 'CSALis' function key combination.

Experimental Solution Item/Spec Information

PURPOSE: To modify information about experimental item/spec solutions. As an experimental solution nears commercialization, this information helps to define the new commercial product.

MODIFY: Maintain experimental item/spec information.

EXSOLN: Experimental Prototype Solutions. To review the list of experimental prototype solutions for the design request, press the 'XpSoln' function key combination.

Design Request List

PURPOSE: To search for a design request for which experimental solution information is to be viewed. This screen displays all created design requests.

SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, Design Request List SEARCH: press the 'Find' key. To see additional design requests, press the 'Next Screen' key.

BROWSE: Search if necessary. Enter the design request for which experimental solutions are to be viewed or place the cursor on the desired one from the list. Press the 'Browse' function key combination.

MODIFY: Search if necessary. Enter the design request for which experimental solutions are to be viewed or place the cursor on the desired one from the list. Press the 'Modify' function key combination.

Business Group

PURPOSE: To search for and select a business group.

SEARCH: With the cursor on the first blank line, enter a full or partial

Business Group code or Manager NPD ID and press the 'Find' key. If the first line is not blank, use the space bar to clear the fields before entering information. To start at the beginning of the list, press the 'Find' key. To see additional business groups, press the 'Next Screen' key.

Business Group

SELECT: Place the cursor on the desired business group. Press the 'Return' function key to return the selected information to the detail screen.

Design Request Status List

PURPOSE: To search for and select a design request status. Statuses are used to track the progress of the request through the new product development pipeline.

SEARCH: With the cursor on the first blank line, enter a full or partial Status Number or Status Code and press the 'Find' key. If the first line is not blank, use the space bar to clear the fields before entering information. To start at the beginning of the list, press the 'Find' key. To see additional design request statuses, press the 'Next Screen' key.

Design Request Status List

SELECT: Place the cursor on the desired design request status. Press the 'Return' function key to return the selected information to the detail screen.

Electronic Mail—User List

PURPOSE: To search for and select an electronic mail user.

SEARCH: With the cursor on the first blank line, enter a full or partial User Nickname (NPD ID) or User Group Code and press the 'Find' key. If the first line is not blank, use the space bar to clear the fields before entering information. To start at the beginning of the list, press the 'Find' key. To see additional electronic mail users, press the 'Next Screen' key.

Electronic Mail—User List

SELECT: Place the cursor on the desired electronic mail user. Press the 'Return' function key to return the selected information to the detail screen.

Process Line List

PURPOSE: To search for and select a process line.

SEARCH: With the cursor on the first blank line, enter a full or partial Facility Code, Facility Name, Process Line Number, or Process Line Name and press the 'Find' key. If the first line is not blank, use the space bar to clear the fields before entering information. To start at the beginning of the list, press the 'Find' key. To see additional process lines, press the 'Next Screen' key.

Process Line List

SELECT: Place the cursor on the desired process line. Press the 'Return' function key to return the selected information to the detail screen.

b. Commercialize Queue (PD13)

The Activate Experimental Item/Specs conversation (PD13) may be used to activate experimental prototype solutions which have been approved for commercial production.

The item/spec commercialize queue screen displays a list of experimental solutions which require commercialization. Position the cursor on a listed prototype and use the appropriate function key combination to commercialize it. The item and specification information, specification tests, control formulas, and environmental data for the experimental solution will be copied to a new commercial number, if desired, or it will be updated to a commercial status.

Item—General Information

PURPOSE: To browse information about an item. This information is used primarily in environmental system functions.

BROWSE: Review the item information.

COMQUE: Commercialization Queue. To return to the Commercialization queue, press the 'ComQue' function key combination.

Item—Physical Specifications

PURPOSE: To browse physical specifications information for an item. Also use this screen to review test specifications for an item. Item/spec information is used throughout the system in functions such as inventory, production scheduling, order processing, and shipping.

BROWSE: Review the physical specifications information for this item.

TESTS: Test Specifications. To review test specifications for the item, press the 'Tests' function key combination.

Item—Physical Specifications

COMQUE: Commercialization Queue. To return to the Commercialization queue, press the 'ComQue' function key combination.

Item/Spec Test Specifications

PURPOSE: To browse item/spec test specifications. Test specifications indicate tests that need to be performed to ensure the consistent quality of an item/spec. Also use this screen to review physical specifications for an item.

BROWSE: Review the item/spec test specifications information.

SPECS: Physical Specifications To review physical specifications for an item, press the 'Specs' function key combination.

Item/Spec Test Specifications

COMQUE: Commercialization Queue. To return to the Commercialization queue, press the 'ComQue' function key combination.

Experimental Solution Item/Spec Information

PURPOSE: To browse information about experimental item/spec solutions. As an experimental solution nears commercialization, this information helps to define the new commercial product. Also use this screen to access a list of experimental prototype solutions for the design request.

BROWSE: Review the experimental item/spec solutions.

Experimental Solution Item/Spec Information

COMQUE: Commercialization Queue. To return to the Commercialization queue, press the 'ComQue' function key combination.

Item/Spec Commercialization Queue

PURPOSE: To activate or commercialize experimental item/specs. This screen displays a list of experimental item/specs which have been approved for commercialization using the Commercialize Prototypes conversation (PD22). All design requests for the item/specs listed have been updated to a 'commercial' status. Also use this screen to access detailed Product Management information about the prototypes.

Item/Spec Commercialization Queue

ACTIVATE: Place the cursor on the item/spec to commercialize. If the Commercial Item/Spec Number is different from the Experimental Item/Spec Number, enter the Commercial Item/Spec Number. When an experimental item/spec is commercialized, all of its associated product definition data is copied to a commercial item/spec number.

Item/Spec Commercialization Queue

COMRCL: Commercialize. To commercialize an experimental item/spec, perform the steps to activate (above) and press the 'Comrcl' function key combination.

CTLFRM: Item/Spec Control Formula. To access the control formulas for the experimental item/spec, press the 'CtlFrm' function key combination.

SPECS: Physical Specifications and Tests. To access detailed physical specification and test data for the experimental item/spec, press the 'Specs' function key combination.

Item/Spec Commercialization Queue

ITMGNL: Item General Information. To access physical property data for the experimental item/spec, press the 'ItmGnl' function key combination.

BRRQST: Design Request—Project Definition. To browse design request information associated with the experimental item/spec, press the 'BrRqst' function key combination.

SPCINF: Experimental Item/Spec Information. To access user-defined information for the experimental prototype, press the 'SpcInf' function key combination.

c. Commercial Scale Up (PD21)

The Scale-Up Authorization (CSA) conversation (PD21) may be used to authorize experimental item/specs to be run on commercial production lines.

A list screen displays a list of commercial scale-up authorizations. Select a commercial scale-up authorization from the list to browse and modify, or choose to insert a new commercial scale-up authorization.

The commercial scale-up authorization detail screen documents the scale-up authorization with information pertaining to the experimental product and the requested scale-up production run. From the commercial scale-up authorization screen, review the design request, physical specifications, custom reports, item general information, or control formulas for the experimental product being scaled-up. Using the text editor, a user may maintain comments about the commercial scale-up authorization. If desired, submit a scale-up authorization report for printing.

Experimental Solution Commercial Scale-Up Authorization

PURPOSE: To browse a scale-up authorization. This screen provides information about the item/spec to be produced, the product development team, and the customer requesting the product. Use this screen to access the following additional product information:
item general
physical/test specifications
control formula
project design request
associated reports
CSA comments (if they exist)

Experimental Solution Commercial Scale-Up Authorization

BROWSE: Review the commercial scale-up authorization information. If comments exist for the commercial scale-up authorization, the CSA Comments Exist field will contain a Y (Yes).

ITMGNL: Item General Information. To access physical property data experimental prototype, press the 'ItmGnl' function key combination.

Experimental Solution Commercial Scale-Up Authorization

CTLFRM: Item/Spec Control Formula. To access the control formulas for the experimental prototype, press the 'CtlFrm' function key combination.

REPORT: Design Request Report List. To access a list of reports that are defined for the scale-up authorization, press the 'Report' function key combination.

SPECS: Physical Specifications and Tests. To access detailed physical specification and test data for the experimental item/spec, press the 'Specs' function key combination.

Experimental Solution Commercial Scale-Up Authorization

BRRQST: Design Request—Project Definition. To browse design request information associated with the experimental item/spec, press the 'BrRqst' function key combination.

CSACMT: Scale-Up Authorization Comments. To access scale-up authorization comments, press the 'CSACmt' function key combination.

Item/Spec—Physical Specifications

PURPOSE: To browse physical specification information for an item/spec. Physical specification information includes physical properties and characteristics of an item/spec, such as the color and specific gravity. This information is necessary to properly complete the commercial scale-up authorization for an experimental item/spec. Also use this screen to review commercial scale-up authorization information and to review test specifications for an item/spec.

BROWSE: Review the physical specification information for the item/spec.

CSADTL: Commercial Scale-Up Authorizations. To review commercial scale-up authorization information, press the 'CSADtl' function key combination.

TESTS: Test Specifications. To access test specifications and procedures associated with the item/spec, press the 'Tests' function key combination.

Item—General Information

PURPOSE: To browse information about an item. This information includes the item type and item synonyms and is necessary to properly complete the commercial scale-up authorization for an item/spec.

BROWSE: Review the item information. To see additional synonyms, use the 'Prev Screen' or 'Next Screen' keys.

CSADTL: Commercial Scale-Up Authorizations. To review commercial scale-up authorization information, press the 'CSADtl' function key combination.

Item/Spec Test Specifications

PURPOSE: To browse test specification information for an item/spec. This information is used to ensure the consistency and quality of an item/spec. Also use this screen to review commercial scale-up authorization information and to review physical specification information for an item/spec.

BROWSE: Review the test specification information for the item/spec.

Item/Spec Test Specifications

SPECS: Physical Specifications To review physical specification information for the item, press the 'Specs' function key combination.

CSADTL: Commercial Scale-Up Authorizations. To review commercial scale-up authorization information, press the 'CSADtl' function key combination.

Experimental Solution Commercial Scale-Up Authorization

PURPOSE: To insert or modify a scale-up authorization. This screen provides information about the item/spec to be produced, the product development team, and the customer requesting the product. Use this screen to access the following additional product information:
item general
physical/test specifications
control formula
project design request
associated reports
CSA comments (if they exist)

Experimental Solution Commercial Scale-Up Authorization
   INSERT: Required:
      Design Number
      Experimental Item Number
      Experimental Spec Number
         Assign a valid Design Number and Experimental Item/Spec Number to the commercial scale-up authorization.
         If comments exist for the commercial scale-up authorization, the CSA Comments Exist field will contain a Y (Yes).

Experimental Solution Commercial Scale-Up Authorization
   MODIFY: Modify any accessible field. If comments exist for the commercial scale-up authorization, the CSA Comments Exist field will contain a Y (Yes).
   ITMGNL: Item General Information. To access physical property data for the experimental prototype, press the 'ItmGnl' function key combination.

Experimental Solution Commercial Scale-Up Authorization
   CTLFRM: Item/Spec Control Formula. To access the control formulas for the experimental prototype, press the 'CtlFrm' function key combination.
   REPORT: Design Request Report List. To access a list of reports that are defined for the scale-up authorization, press the 'Report' function key combination.
   SPECS: Physical Specifications and Tests. To access detailed physical specification and test data for the experimental item/spec, press the 'Specs' function key combination.

Experimental Solution Commercial Scale-Up Authorization
   BRRQST: Design Request—Project Definition. To browse design request information associated with the experimental item/spec, press the 'BrRqst' function key combination.
   CSACMT: Scale-Up Authorization Comments. To access scale-up authorization comments, press the 'CSACmt' function key combination.

Commercial Scale-Up Authorizations List
   PURPOSE: To search for, insert, browse, modify or print a commercial scale-up authorization.
   SEARCH: With the cursor on the first blank line, enter a full or partial Design Number, Experimental Item Number, Spec Number, CSA Number, or Design Request Active Indicator and press the 'Find' key. If the first line is not blank, use the space bar to clear the fields before entering information. To start at the beginning of the list, press the 'Find' key. To see additional authorizations, press the 'Next Screen' key.

Commercial Scale-Up Authorizations List
   INSERT: Press the 'Insert' function key combination.
   BROWSE: Search if necessary. Enter the scale-up authorization to browse or place the cursor on the desired one from the list. Press the 'Browse' function key combination.
   MODIFY: Search if necessary. Enter the scale-up authorization to modify or place the cursor on the desired one from the list. Press the 'Modify' function key combination.

Commercial Scale-Up Authorizations List
   PRINT: Commercial Scale-Up Authorization. Search if necessary. Enter the authorization to print or place the cursor on the desired one from the list. Press the 'PRINT' function combination.

Design Request List
   PURPOSE: To search for and select a design request.
   SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the 'Find' key. To see additional design requests, press the 'Next Screen' key.

Design Request List
   SELECT: Place the cursor on the desired design request. Press the 'Return' function key to return the selected information to the detail screen.

Item/Spec Name List
   PURPOSE: To search for and select an item/spec.
   SEARCH: With the cursor on the first blank line, enter a full or partial Item Number, Item Spec Number, or Item/Spec Name and press the 'Find' key. If the first line is not blank, use the space bar to clear the fields before entering information. To start at the beginning of the list, press the 'Find' key. To see additional item/specs, press the 'Next Screen' key.

Item/Spec Name List
   SELECT: Place the cursor on the desired item/spec. Press the 'Return' function key to return the selected information to the detail screen.

Facility List
   PURPOSE: To search for and select a facility.
   SEARCH: With the cursor on the first blank line, enter a full or partial Facility Code or Facility Name and press the 'Find' key. If the first line is not blank, use the space bar to clear the fields before entering information. To start at the beginning of the list, press the 'Find' key. To see additional facilities, press the 'Next Screen' key.

Facility List
   SELECT: Place the cursor on the desired facility. Press the 'Return' function key to return the selected information to the detail screen.

Process Line List
   PURPOSE: To search for and select a process line.
   SEARCH: With the cursor on the first blank line, enter a full or partial Facility Code, Facility Name, Process Line Number, or Process Line Name and press the 'Find' key. If the first line is not blank, use the space bar to clear the fields before entering information. To start at the beginning of the list, press the 'Find' key. To see additional process lines, press the 'Next Screen' key.

Process Line List

SELECT: Place the cursor on the desired process line. Press the 'Return' function key to return the selected information to the detail screen.

d. Commercialize P-Types (PD22)

The Activate Prototypes conversation (PD22) may be used to select the experimental solutions that have been developed for a design request and are to be updated to 'commercial' status.

The first list screen in this conversation displays all design requests. A user may select a design request from the list.

The next screen, experimental solutions, lists all of the experimental item/specs which have been developed for the selected design request.

A user may mark the experimental solutions that are to be commercialized. After updating the design request to "commercial" status, the experimental solutions marked will appear in the commercialization queue, a screen displaying experimental products which require commercialization.

From the experimental solutions screen, access the following: item general information, item/spec information, commercial scale-up authorizations, item/spec physical specifications, control formulas, reports and the design request for the experimental solutions.

Design Request Experimental Prototype Solutions

PURPOSE: To browse experimental item/specs that have been developed for a selected design request. The user will use this screen to indicate which prototype solutions should become 'commercialized' item/specs. Multiple solutions can be commercialized for active or previously commercialized design requests. From this screen, it is possible to access detailed Product Management information for each prototype.

BROWSE: Review the list of experimental prototypes.

Design Request Experimental Prototype Solutions

BRRQST: Design Request—Project Definition. To browse design request information associated with the experimental item/spec, press the 'BrRqst' function key combination.

REPORT: Design Request Report List. To access a list of reports that are defined for the experimental item/spec, press the 'Report' function key combination.

CTLFRM: Item/Spec Control Formula. To access the control formulas for the experimental item/spec, press the 'CtlFrm' function key combination.

Design Request Experimental Prototype Solutions

SPECS: Physical Specifications and Tests. To access detailed physical specification and test data for the experimental item/spec, press the 'Specs' function key combination.

SPCINF: Experimental Solution Item/Spec Information. To access information for the experimental item/spec, press the 'SpcInf' function key combination.

ITMGNL: Item General Information. To access physical property data for the experimental item/spec, press the 'ItmGnl' function key combination.

Design Request Experimental Prototype Solutions

CSALIS: Commercial Scale-Up Authorization. To access the commercial scale-up authorizations for the experimental item/spec, press the 'CSALis' function key combination.

Item—General Information

PURPOSE: To browse information about an item, including the item type and item synonyms. This information is used to properly review/approve experimental item/specs developed for a design request. Also use this screen to review a list of experimental prototype solutions for the design request.

BROWSE: Review the item information. To see additional synonyms, use the 'Prev Screen' or 'Next Screen' keys.

Item—General Information

XPSOLN: Experimental Prototype Solutions. To review a list of experimental prototype solutions for the design request, press the 'XPSoln' function key combination.

Experimental Solution Item/Spec Information

PURPOSE: To browse information about experimental item/spec solutions. As an experimental solution nears commercialization, this information helps to define the new commercial product. Also use this screen to review a list of experimental prototype solutions for the design request.

BROWSE: Review the information for the experimental prototype.

Experimental Solution Item/Spec Information

XPSOLN: Experimental Prototype Solutions. To review a list of experimental prototype solutions for the design request, press the 'XPSoln' function key combination.

Item/Spec—Physical Specifications

PURPOSE: To browse physical specification information for an item/spec. Physical specification information includes physical properties and characteristics of an item/spec, such as the color and specific gravity. This information is necessary to properly review/approve experimental item/specs developed for a design request. Also use this screen to review a list of experimental prototype solutions for the design request and to review test specifications for an item/spec.

Item/Spec—Physical Specifications

BROWSE: Review the physical specification information for the item/spec.

XPSOLN: Experimental Prototype Solutions. To review a list of experimental prototype solutions for the design request, press the 'XPSoln' function key combination.

TESTS: Test Specifications. To access test specifications and procedures associated with the item/spec, press the 'Tests' function key combination.

Item/Spec Test Specifications

PURPOSE: To browse test specification information for an item/spec. This information is used to ensure the consistency and quality of an item/spec. Also use this screen to review a list of experimental prototype solution information and to review physical specification information for an item/spec.

BROWSE: Review the test specification information for the item/spec.

Item/Spec Test Specifications

SPECS: Physical Specifications. To review physical specification information for the item, press the 'Specs' function key combination.

XPSOLN: Experimental Prototype Solutions. To review a list of experimental prototype solutions for the design request, press the 'XPSoln' function key combination.

Item—General Information

PURPOSE: To browse information about an item, including the item type and item synonyms. This information is used to properly review/approve experimental item/specs developed for a design request. Also use this screen to review a list of experimental prototype solutions for the design request.

BROWSE: Review the item information. To see additional synonyms, use the 'Prev Screen' or 'Next Screen' keys.

Item—General Information

XPSOLN: Experimental Prototype Solutions. To review a list of experimental prototype solutions for the design request, press the 'XPSoln' function key combination.

Item/Spec—Physical Specifications

PURPOSE: To browse physical specification information for an item/spec. Physical specification information includes physical properties and characteristics of an item/spec, such as the color and specific gravity. This information is necessary to properly review/approve experimental item/specs developed for a design request. Also use this screen to review a list of experimental prototype solutions for the design request and to review test specifications for an item/spec.

Item/Spec—Physical Specifications

BROWSE: Review the physical specification information for the item/spec.

XPSOLN: Experimental Prototype Solutions. To review a list of experimental prototype solutions for the design request, press the 'XPSoln' function key combination.

TESTS: Test Specifications. To access test specifications and procedures associated with the item/spec, press the 'Tests' function key combination.

Item/Spec Test Specifications

PURPOSE: To browse test specification information for an item/spec. This information is used to ensure the consistency and quality of an item/spec. Also use this screen to review a list of experimental prototype solution for the design request and to review physical specification information for an item/spec.

BROWSE: Review the test specification information for the item/spec.

Item/Spec Test Specifications

SPECS: Physical Specifications. To review physical specification information for the item, press the Specs' function key combination.

XPSOLN: Experimental Prototype Solutions. To review a list of experimental prototype solutions for the design request, press the 'XPSoln' function key combination.

Design Request Experimental Prototype Solutions

PURPOSE: To modify experimental item/specs that have been developed for a selected design request. The user will use this screen to indicate which prototype solutions should become commercialized item/specs. Multiple solutions can be commercialized for active or previously commercialized design requests. From this screen, it is possible to access detailed Product Management information for each item/spec.

BROWSE: Review the list of experimental item/specs. Design Request Experimental Prototype Solutions MODIFY: Modify any of the following fields:
  Development Location Code
  Development Line Code
  R & D Preference: Research and develop scientists rank these from most to least preferred.
  Commercial Flag. Indicates which prototype solutions have or will become commercialized products.

Design Request Experimental Prototype Solutions

BRRQST: Design Request—Project Definition. To browse design request information associated with the experimental item/spec, press the 'BrRqst' function key combination.

REPORT: Design Request Report List. To access a list of reports that are defined for the experimental item/spec, press the 'Report' function key combination.

CTLFRM: Item/Spec Control Formula. To access the control formula for the experimental item/spec, press the 'CtlFrm' function key combination.

Design Request Experimental Prototype Solutions

SPECS: Physical Specifications and Tests. To access detailed physical specification and test data for the experimental item/spec, press the 'Specs' function key combination.

SPCINF: Experimental Solution Item/Spec Information. To access information for the item/spec, press the 'SpcInf' function key combination.

ITMGNL: Item General Information. To access physical property data for the experimental item/spec, press the 'ItmGnl' function key combination.

Design Request Experimental Prototype Solutions

CSALIS: Commercial Scale-Up Authorization. To access the commercial scale-up authorizations for the experimental item/spec, press the 'CSALis' function key combination.

Experimental Solution Item/Spec Information

PURPOSE: To modify information about experimental item/specs. As an experimental item/spec nears commercialization, this information helps to define the new commercial item/spec. Also use this screen to review a list of experimental prototype solutions for the design request.

Experimental Solution Item/Spec Information

MODIFY: Modify any of the following fields:
  Internal Description
  Pricing Policy Code
  External Description
  Stocking Policy Code
  Stockkeeping UM
  Initial Commercial Price
  Pricing UM
  User Defined fields 1-6
  Market Group XPSOLN: Experimental Prototype Solutions. To review a list of experimental prototype solutions for the design request, press the 'XPSoln' function key combination.

Design Request List

PURPOSE: To search for a design request and to access associated experimental prototypes to browse or modify.

SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the 'Find' key. To see additional design requests, press the 'Next Screen' key.

Design Request List
- BROWSE: Search if necessary. Enter the design request containing the experimental prototypes to browse or place the cursor on the desired one from the list. Press the 'Browse' function key combination.
- MODIFY: Search if necessary. Enter the design request containing the experimental prototypes to modify or place the cursor on the desired one from the list. Press the 'Modify' function key combination.

Business Group
- PURPOSE: To search for and select a business group.
- SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.

Business Group
- SELECT: Place the cursor on the desired business group. Press the 'Return' function key to return the selected information to the detail screen.

Design Request Status List
- PURPOSE: To search for and select a design request status. Statuses are used to track the progress of the request through the new product development pipeline.
- SEARCH: With the cursor on the first blank line, enter a full or partial Status Number or Status Code and press the 'Find' key. If the first line is not blank, use the space bar to clear the fields before entering information. To start at the beginning of the list, press the 'Find' key. To see design request statuses, press the 'Next Screen' key.

Design Request Status List
- SELECT: Place the cursor on the desired design request status. Press the 'Return' function key to return the selected information to the detail screen.

Electronic Mail—User List
- PURPOSE: To search for and select an electronic mail user.
- SEARCH: With the cursor on the first blank line, enter a full or partial User Nickname or User Group Code and press the 'Find' key. If the first line is not blank, use the space bar to clear the fields before entering information. To start at the beginning of the list, press the 'Find' key. To see additional electronic mail users, press the 'Next Screen' key.

Electronic Mail—User List
- SELECT: Place the cursor on the desired electronic mail user. Press the 'Return' function key to return the selected information to the detail screen.

Facility List
- PURPOSE: To search for and select a facility.
- SEARCH: With the cursor on the first blank line, enter a full or partial Facility Code or Facility Name and press the 'Find' key. If the first line is not blank, use the space bar to clear the fields before entering information. To start at the beginning of the list, press the 'Find' key. To see additional facilities, press the 'Next Screen' key.

Facility List
- SELECT: Place the cursor on the desired facility. Press the Return' function key to return the selected information to the detail screen.

Process Line List
- PURPOSE: To search for and select a process line.
- SEARCH: With the cursor on the first blank line, enter a full or partial Facility Code, Facility Name, Process Line Number, or Process Line Name and press the 'Find' key. If the first line is not blank, use the space bar to clear the fields before entering information. To start at the beginning of the list, press the 'Find' key. To see additional process lines, press the 'Next Screen' key.

Process Line List
- SELECT: Place the cursor on the desired process line. Press the 'Return' function key to return the selected information to the detail screen.

4. Request Custom Reports (DDRP)

a. Design Request Reports (PD14)

The Create and Maintain Reports conversation (PD14) may be used to complete and update a custom design request report. A user may create a report for a specific design request, experimental prototype, or commercial scale-up authorization.

All custom reports are created from report templates defined in the Report Template Maintenance conversation (PD20). After completing a custom report, send a pre-defined electronic mail message to the project team members notifying them of the report's existence. If desired, submit a selected custom design request report for printing.

Create a Design Request Report
- PURPOSE: To create a report using a report template defined in the Report Template Maintenance conversation (PD20). After creating a report, use this screen to assign a corresponding electronic mail message to be sent to the project team to notify them of the report's creation. If desired, use the Request Status Maintenance conversation (PD15) and make the report required for updating the design request status.

Create a Design Request Report
- CREATE: To create the report, press the 'Create' function key combination. The specified blank report template appears. Required:
  Design Number
  Item/Spec Number
  Report Type Code
  CSA Number
  All required fields are dependent on the report type.
  Required fields must be valid.
  No duplicate reports are allowed.

Create a Design Request Report
- CREATE: Complete the information on the report template. When through, press the 'F10' function key. When the screen with "Choose Desired Action . . . " appears, to save the text, press the 'F10' function key. To cancel the text, press the 'Remove' key.
- E-MAIL: To send a pre-defined electronic mail message to the project team notifying them of the report's creation, press the 'E-Mail' function key combination.

Create a Design Request Report

E-MAIL: Mail messages for each report type are defined in the Electronic Mail Message Maintenance conversation (CS26).

Design Request Reports List

PURPOSE: To search for, insert, browse, modify, or print a custom design request report, an experimental prototype report, or a commercial scale-up authorization report. The report templates for these reports were created in the Report Template Maintenance conversation (PD20) and all use the text editor to maintain the text on each report.

SEARCH: With the cursor on the first blank line, enter a full or partial Design Number, Experimental Item/Spec Number, CSA Number, or Report Type and press the 'Find' key.

Design Request Reports List

SEARCH: If the first line is not blank, use the space bar to clear the fields before entering information. To start at the beginning of the list, press the Find' key. To see additional reports press the 'Next Screen' key.

INSERT: Press the 'Insert' function key combination.

BROWSE: Search if necessary. Enter the report to browse or place the cursor on the desired one from the list. Press the 'Browse' function key combination.

Design Request Reports List

MODIFY: Search if necessary. Enter the report to modify or place the cursor on the desired one from the list. Press the 'Modify' function key combination.

PRINT: Search if necessary. Enter the report to print or place the cursor on the desired one from the list. Press the 'Print' function key combination.

Item/Spec Name List

PURPOSE: To search for and select an item/spec.

SEARCH: With the cursor on the first blank line, enter a full or partial Item Number, Item Spec Number, or item Name and press the 'Find' key. If the first line is not blank, use the space bar to clear the fields before entering information. To start at the beginning of the list, press the 'Find' key. To see additional item/specs, press the 'Next Screen' key.

Item/Spec Name List

SELECT: Place the cursor on the desired item/spec. Press the 'Return' function key to return the selected information to the detail screen.

Design Request List

PURPOSE: To search for and select a design request.

SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the 'Find' key. To see additional design requests, press the 'Next Screen' key.

Design Request List

SELECT: Place the cursor on the desired design request. Press the 'Return' function key to return the selected information to the detail screen.

Commercial Scale-Up Authorizations List

PURPOSE: To search for and select a commercial scale-up authorization.

SEARCH: With the cursor on the first blank line, enter a full or partial Design Number, Experimental Item Number, Spec Number, CSA Number, or Design Request Active Indicator and press the 'Find' key. If the first line is not blank, use the space bar to clear the fields before entering information. To start at the beginning of the list, press the 'Find' key. To see additional authorizations, press the 'Next Screen' key.

Commercial Scale-Up Authorizations List

SELECT: Place the cursor on the desired commercial scale-up authorization. Press the 'Return' function key to return the selected information to the detail screen.

Report Type List

PURPOSE: To search for and select a report template.

SEARCH: With the cursor on the first blank line, enter a full or partial Report Type Code and press the 'Find' key. If the first line is not blank, use the space bar to clear the fields before entering information. To start at the beginning of the list, press the 'Find' key. To see additional report types, press the 'Next Screen' key.

Report Type List

SELECT: Place the cursor on the desired report type. Press the 'Return' function key to return the selected information to the detail screen.

Item/Spec Name List

PURPOSE: To search for and select an item/spec.

SEARCH: With the cursor on the first blank line, enter a full or partial Item Number, Item Spec Number, or item Name and press the 'Find' key. If the first line is not blank, use the space bar to clear the fields before entering information. To start at the beginning of the list, press the 'Find' key. To see additional item/specs, press the 'Next Screen' key.

Item/Spec Name List

SELECT: Place the cursor on the desired item/spec. Press the 'Return' function key to return the selected information to the detail screen.

Design Request List

PURPOSE: To search for and select a design request.

SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the Find' key. To see additional design requests, press the 'Next Screen' key.

Design Request List

SELECT: Place the cursor on the desired design request. Press the 'Return' function key to return the selected information to the detail screen.

Commercial Scale-Up Authorizations List

PURPOSE: To search for and select a commercial scale-up authorization.

SEARCH: With the cursor on the first blank line, enter a full or partial Design Number, Experimental Item Number, Spec Number, CSA Number, or Design Request Active Indicator and press the 'Find' key. If the first line is not blank, use the space bar to clear the fields before entering information. To start at the beginning of the list, press the 'Find' key. To see additional authorizations, press the 'Next Screen' key.

Commercial Scale-Up Authorizations List

SELECT: Place the cursor on the desired commercial scale-up authorization. Press the 'Return' function key to return the selected information to the detail screen.

Report Type List

PURPOSE: To search for and select a report template.

SEARCH: With the cursor on the first blank line, enter a full or partial Report Type Code and press the 'Find' key. If the first line is not blank, use the space bar to clear the fields before entering information. To start at the beginning of the list, press the 'Find' key. To see additional report types, press the 'Next Screen' key.

Report Type List

SELECT: Place the cursor on the desired report type. Press the 'Return' function key to return the selected information to the detail screen.

b. Browse Design Request Reports (PD24)

The Browse Reports conversation (PD24) may be used to review a custom report created for a design request, experimental prototype, or commercial scale-up authorization. All of these reports were created using templates defined in the Report Template Maintenance conversation (PD20). If desired, a user may submit a selected custom design request report for printing.

Design Request Report List

PURPOSE: To search for and browse reports that have been created in the system.

SEARCH: With the cursor on the first blank line, enter a full or partial Design Number, Experimental Item/Spec Number, CSA Number, Report Type Code, or Design Request Active Indicator, press the 'Find' key. If the first line is not blank, use the space bar to clear the fields before entering information. To start at the beginning of the list, press the 'Find' key. To see additional information, press the 'Next Screen' key.

Design Request Report List

BROWSE: Browse Reports. To browse reports, search if necessary. Place the cursor on the design request and press the 'Browse' function key combination.

PRINT: Search if necessary. Enter the report to print or place the cursor on the desired one from the list. Press the 'Print' function key combination.

E-MAIL: To send a pre-defined electronic mail message to the project team notifying them of the report's creation, press the 'E-Mail' function key combination.

Item/Spec Name List

PURPOSE: To search for and select an item/spec.

SEARCH: With the cursor on the first blank line, enter a full or partial Item Number, Item Spec Number, or Item/Spec Name and press the 'Find' key. If the first line is not blank, use the space bar to clear the fields before entering information. To start at the beginning of the list, press the 'Find' key. To see additional item/specs, press the 'Next Screen' key.

Item/Spec Name List

SELECT: Place the cursor on the desired item/spec. Press the 'Return' function key to return the selected information to the detail screen. Report Type List PURPOSE: To search for and select a report template code.

SEARCH: With the cursor on the first blank line, enter a full or partial Report Type Code and press the 'Find' key. If the first line is not blank, use the space bar to clear the fields before entering information. To start at the beginning of the list, press the 'Find' key. To see additional report types, press the 'Next Screen' key.

Report Type List

SELECT: Place the cursor on the desired report type. Press the 'Return' function key to return the selected information to the detail screen.

Commercial Scale-Up Authorizations List

PURPOSE: To search for and select a commercial scale-up authorization.

SEARCH: With the cursor on the first blank line, enter a full or partial Design Number, Experimental Item Number, Spec Number, CSA Number, or Design Request Active Indicator and press the 'Find' key. If the first line is not blank, use the space bar to clear the fields before entering information. To start at the beginning of the list, press the 'Find' key. To see additional authorizations, press the 'Next Screen' key.

Commercial Scale-Up Authorizations List

SELECT: Place the cursor on the desired commercial scale-up authorization. Press the 'Return' function key to return the selected information to the detail screen. Design Request List PURPOSE: To search for and select a design request.

SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the Find' key. To see additional design requests, press the 'Next Screen' key.

Design Request List

SELECT: Place the cursor on the desired design request. Press the 'Return' function key to return the selected information to the detail screen.

5. Work Queue Management (DRWQ)

a. Priority Detail (PD07)

Use the Project Leader Priorities conversation (PD07) to browse or modify the priorities of the design requests assigned to a selected project leader.

Use the list screen to select a leader whose project priorities are to be reviewed or modified.

After selecting a project leader, scroll through the active projects which are currently assigned to the project leader. If modifying one or more of the priorities of the listed projects, the resulting priorities must be in order, starting with one, and ending with the total number of priorities listed. Project Leader Priority Queue PURPOSE: To browse the priorities of all design requests that are assigned to a project leader. Also use this screen to access additional design request information.

BROWSE: Review the project leader's list of priorities.

BRRQST: Design Request—Project Definition. To browse all design request detail screens, press the 'BrRqst' function key combination.

Project Leader Priority Queue
STATUS: Design Request—Status Detail. To access the request's progress through the new product development pipeline, press the 'Status' function key combination.
XPSOLN: Experimental Prototype Solutions. To access a list of experimental prototype solutions for the design request, press the 'XPSoln' function key combination.
MILSTN: Project Milestones. To access project milestones for the design request, press the 'Milstn' function key combination.
Project Leader Priority Queue
PROFIL: Design Request—Profile. To access customer and marketplace information for the design request, press the 'Profil' function key combination.
PRJDEF: Design Request—Project Definition. To access the design request project definition, press the 'PrjDef' function key combination.
Project Leader Priority Queue
PURPOSE: To browse or modify the priorities of all design requests that are assigned to a project leader.

If modifying the project leader priority queue, use this screen to reassign project priorities for a project leader. Also use this screen to access additional design request information.

MODIFY: Modify the priorities of the design requests assigned to a selected project leader. Priorities must be sequentially order from the number one to the total number of projects assigned to the project leader.
Project Leader Priority Queue
BRRQST: Design Request—Project Definition. To browse all design request detail screens, press the 'BrRqst' function key combination.
STATUS: Design Request—Status Detail. To access the request's progress through the new product development pipeline, press the 'Status' function key combination.
XPSOLN: Experimental Prototype Solutions. To access a list of experimental prototype solutions for the design request, press the 'XPSoln' function key combination.
Project Leader Priority Queue
MILSTN: Project Milestones. To access project milestones for the design request, press the 'Milstn' function key combination.
PROFILE: Design Request—Profile. To access customer and marketplace information for the design request, press the 'Profil' function key combination.
PRJDEF: Design Request—Project Definition. To access the design request project definition, press the 'PrjDef' function key combination.
Project Leaders List
PURPOSE: To search for a user who is defined as a product development project leader.
SEARCH: With the cursor on the first blank line, enter a full or partial NPD ID or User Group code and press the 'Find' key. If the first line is not blank, use the space bar to clear the fields before entering information. To start at the beginning of the list, press the 'Find' key. To see additional project leaders, press the 'Next Screen' key.
Project Leaders List
BROWSE: Search if necessary. Enter the project leader to browse or place the cursor on the desired one from the list. Press the 'Browse' function key combination to browse user projects (priorities).
MODIFY: Search if necessary. Enter the project leader or place the cursor on the desired one from the list. Press the 'Modify' function key combinations to modify the user projects (priorities).
Electronic Mail—User List
PURPOSE: To search for and select an electronic mail user.
SEARCH: With the cursor on the first blank line, enter a full or partial User Nickname (NPD ID) or User Group Code and press the 'Find' key. If the first line is not blank, use the space bar to clear the fields before entering information. To start at the beginning of the list, press the 'Find' key. To see additional electronic mail users, press the Next Screen' key.
Electronic Mail—User List
SELECT: Place the cursor on the desired electronic mail user. Press the 'Return' function key to return the selected information to the detail screen.
Business Group
PURPOSE: To search for and review a business group.
SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.
Design Request Status List
PURPOSE: To search for and review a list of design request statuses. Statuses are used to track the progress of the design request through the new product development pipeline.
SEARCH: With the cursor on the first blank line, enter a full or partial Status Number or Status Code and press the 'Find' key. If the first line is not blank, use the space bar to clear the fields before entering information. To start at the beginning of the list, press the 'Find' key. To see additional design request statuses, press the 'Next Screen' key.
Business Group
PURPOSE: To search for and select a business group.
SEARCH: With the cursor on the first blank line, enter a full or partial Business Group code or Manager NPD ID and press the 'Find' key. If the first line is not blank, use the space bar to clear the fields before entering information. To start at the beginning of the list, press the 'Find' key. To see additional business groups, press the 'Next Screen' key.
Business Group
SELECT: Place the cursor on the desired business group. Press the 'Return' function key to return the selected information to the detail screen.
Design Request Status List
PURPOSE: To search for and select a design request status. Statuses are used to track the progress of the request through the new product development pipeline.
SEARCH: With the cursor on the first blank line, enter a full or partial Status Number or Status Code and press the Find' key. If the first line is not blank, use the space bar to clear the fields before entering information. To start at the beginning of the list, press the 'Find' key. To see design request statuses, press the 'Next Screen' key.

Design Request Status List
SELECT: Place the cursor on the desired design request status. Press the 'Return' function key to return the selected information to the detail screen.

b. Project Leader Work Queue (PD23)

The Project Leader Work Queue conversation (PD23) may be used to review all of the milestone events associated with the active design requests currently in a project leader's queue. This information displays in chronological order.

Additional information such as the design request priority and current status is also provided. This information helps to track the project leader's current and future work load. This conversation may be used to access the Browse A Design Request conversation (PD04) to review all detailed information pertaining to a design request currently in the queue. If desired, submit a selected project leader work queue report for printing.

Project Leader Work Queue
PURPOSE: To search for and browse project milestones for all design requests currently assigned to a project leader. Milestones display in chronological order.
SEARCH: Enter a full or partial Project Leader ID, Start Date or End Date and press the 'Find' key. To start at the beginning of the list, press the 'Find' key. To see additional information, press the 'Next Screen' key.

Project Leader Work Queue
BRRQST: Design Request—Project Definition. To browse all design request detail screens, search if necessary. Place the cursor on the design request and press the 'BrRqst' function key combination.
PRINT: Print Report. To print the Project Leader Work Queue Report, press the 'Print' function key combination.

Project Leaders List
PURPOSE: To search for and select users that have been assigned as a project leader for a new product development design request.
SEARCH: Enter a full or partial User Nickname or User Group Code and press the 'Find' key. To start at the beginning of the list, press the 'Find' key. To see additional information, press the 'Next Screen' key.

Project Leaders List
SELECT: Place the cursor on the desired user. Press the 'Return' function key to return the selected information to the detail screen.

6. Raw Materials (PDRM)

a. Environmental Summary (PD02)

The Environmental Summary conversation (PD02) may be used to review environmental information for a selected item. This conversation begins by displaying environmental procedures, by code, which were asssigned to the item through Product Management conversations. Also available for review are comments associated with each of the procedure codes assigned to the item, in an online report format.

From the summary screen, environmental, health, safety, and training screens from the product management conversations are accessible. These screens may be used to review detailed environmental information for the selected item. If desired, for the selected item, a user may submit an environmental summary report for printing.

Environmental Summary
PURPOSE: To browse environmental procedures that are assigned to an item. Based on this environmental information, product development personnel choose environmentally sound ingredients for a new product. Also use this screen to access detailed environmental information and to print an environmental summary report.
BROWSE: Review the environmental summary information for this item.

Environmental Summary
PRCDTL: Procedure Detail Text. To review the text (TPU editor) associated with an environmental procedure, press the 'PrcDtl' function key combination.
RECAP: All Procedure Text. To review the text (TPU editor) associated with all environmental procedures assigned to this item, press the 'ReCap' function key combination.
TRNSDT: Transportation Data. To review transportation data associated with this item, press the 'TrnsDt' function key combination.

Environmental Summary
INGDNT: Molecular Components/Ingredients. To review the molecular components/ingredients for this item, press the 'Ingdnt' function key combination.
PHSHZD: Physical Hazards. To review physical hazards associated with this item, press the 'PhsHzd' function key combination.
HLTHZD: Health Hazards. To review health hazards associated with this item, press the 'HltHzd' function key combination.

Environmental Summary
COMPRQ: Compliance Requirements. To review compliance requirements associated with this item, press the 'CompRq' function key combination.
CNTLMS: Control Measures. To review control measures associated with this item, press the 'CntlMs' function key combination.
PRINT: Environmental Summary Report. To print an Environmental Summary Report for this item, press the 'Print' function key combination.

Item—Molecular Component
PURPOSE: To browse molecular components for an item and associated hazardous ingredient comments. Product developers use this screen to determine sound raw materials for new products.
BROWSE: Review the molecular component information.
ENVSUM: Environmental Summary. To review environmental hazard information associated with this item, press the 'EnvSum' function key combination.

Item—Molecular Component
CMPLST: Component List. To review a list of molecular components associated with this item, press the 'CmpLst' function key combination.
BRTXT: Browse Text. To review hazardous ingredients comments associated with this item, press the 'BrTxt' function key combination.

Item—Physical Hazards & Reactivity
PURPOSE: To browse physical hazard and reactivity information. Product developers use this information to determine sound raw materials for new products and how to safely handle the materials. Also use this screen to review MSDS (Material Safety Data Sheet) comments associated with an item and to review detailed environmental summary information.

BROWSE: Review the physical hazards and reactivity information.

Item—Physical Hazards & Reactivity

ENVSUM: Environmental Summary. To review environmental hazard information associated with the item, press the 'EnvSum' function key combination.

PRECTN: Precautions and Procedures. To review physical precautions and procedures related to the item, press the 'PreCtn' function key combination.

BRTXT: Browse Text. To review MSDS (Material Safety Data Sheet) comments associated with the item, press the 'BrTxt' function key combination.

Item—Hazard Precautions & Procedures

PURPOSE: To browse hazard precautions and procedures associated with an item. Product developers use this information to determine sound raw materials for new products and how to safely handle the materials. Also use this screen to review the following:
physical hazards and reactivity information
MSDS (Material Safety Data Sheet) comments
detailed environmental summary information Item—Hazard Precautions & Procedures BROWSE: Review the hazard precautions and procedure information.

ENVSUM: Environmental Summary. To review environmental hazard information associated with this item, press the 'EnvSum' function key combination.

HZRDS: Physical Hazards and Reactivity. To review physical hazards and procedures associated with the item, press the 'PhyHzd' function key combination.

Item—Hazard Precautions & Procedures

BRTXT: Browse Text. To review MSDS (Material Safety Data Sheet) comments associated with the item, press the 'BrTxt' function key combination.

Item—Health Hazards

PURPOSE: To browse health hazard information and MSDS (Material Safety Data Sheet) comments associated with an item. This information classifies hazardous and indicates the organs affected by the hazardous item. Product developers use this information to determine sound raw materials for new products and how to safely handle the materials. Also use this screen to review MSDS (Material Safety Data Sheet) comments associated with an item and to review detailed environmental summary information.

Item—Hazard Precautions & Procedures

BROWSE: Review the health hazard information.

BRTXT: Browse Text. To review MSDS (Material Safety Data Sheet) comments associated with the item, press the 'BrTxt' function key combination.

ENSUM: Environmental Summary. To review environmental hazard information associated with this item, press the 'EnvSum' function key combination.

Item Maintenance—Compliance Quantities

PURPOSE: To browse compliance quantity information and MSDS (Material Safety Data Sheet) comments associated with an item. This information is used in environmental system functions to control and report spills, emissions, and exposures. Product developers use this information to determine sound raw materials for new products and how to safely handle the materials. Also use this screen to review MSDS (Material Safety Data Sheet) comments associated with an item and to review detailed environmental summary information.

Item Maintenance—Compliance Quantities

BROWSE: Review the compliance quantity information.

BRTXT: Browse Text. To review MSDS (Material Safety Data Sheet) comments associated with the item, press the 'BrTxt' function key combination.

ENVSUM: Environmental Summary. To review environmental hazard information associated with this item press the 'EnvSum' function key combination.

Item—Transportation Data

PURPOSE: To browse transportation information and MSDS (Material Safety Data Sheet) comments associated with an item. Product developers use this information to determine sound raw materials for new products. Also use this screen to review MSDS (Material Safety Data Sheet) comments associated with an item and to review detailed environmental summary information.

BROWSE: Review the transportation information.

Item—Transportation Data

BRTXT: Browse Text. To review MSDS (Material Safety Data Sheet) comments associated with the item, press the 'BrTxt' function key combination.

ENVSUM: Environmental Summary. To review environmental hazard information associated with the item, press the 'EnvSum' function key combination.

Item—Control and Safety Measures

PURPOSE: To browse control (exhaust procedures) measures, safety (protective equipment) measures, and MSDS (Material Safety Data Sheet) comments associated with an item. Product developers use this information to determine sound raw materials for new products. Also use this screen to review MSDS (Material Safety Data Sheet) comments associated with an item and to review detailed environmental summary information.

Item—Control and Safety Measures

BROWSE: Review the control and safety measure information.

BRTXT: Browse Text. To review MSDS (Material Safety Data Sheet) comments associated with the item, press the 'BrTxt' function key combination.

ENVSUM: Environmental Summary. To review environmental hazard information associated with the item, press the 'EnvSum' function key combination.

Item List

PURPOSE: To search for an item and browse its associated environmental summary information.

SEARCH: With the cursor on the first blank line, enter a full or partial Item Number, Item Name, or Type and press the 'Find' key. If the first line is not blank, use the space bar to clear the fields before entering information. To start at the beginning of the list, press the 'Find' key. To see additional items, press the 'Next Screen' key.

Item List

BROWSE: Search if necessary. Enter the item containing the environmental summary information to browse or place the cursor on the item from the list. Press the 'Browse' function key combination.

Item—Molecular Components List

PURPOSE: To search for and select an item containing molecular information to browse. Also use this screen to review environmental hazard information for the selected item.

SEARCH: With the cursor on the first blank line, enter a full or partial Molecular Item Number, Name, or CAS Number and press the 'Find' key. If the first line is not blank, use the space bar to clear the fields before entering information. To start at the beginning of the list, press the 'Find' key. To see additional items, press the 'Next Screen' key.

Item—Molecular Components List

BROWSE: Search if necessary. Enter the item containing the molecular component information to browse or place the cursor on the desired item from the list. Press the 'Browse' function key combination.

ENVSUM: Environmental Summary. Press the 'EnvSum' function key combination to return to the environmental summary screen.

7. Parameter Maintenance (PDPM)

a. Status Maintenance (PD15)

The Request Status Maintenance conversation (PD15) may be used to maintain the statuses which product development projects must pass through.

The request status maintenance screen is used to define the code and description associated with the status and the design request data and reports which are required when the status is attained during a development project.

The status security maintenance screen may be used to enter the user classes that will have security to update a design request to the request status being maintained.

Design Request—Status Maintenance

PURPOSE: To browse design request status information. Statuses are used to track the progress of the design request through the new product development process. Use this screen to browse the information that is required each time a design request reaches a status in the product development process. Also use this screen to access security information about the user classes who are authorized to update a design request to the status.

Design Request—Status Maintenance

Review the design request status information. Statuses are used in the creation of design categories. Design categories consist of design request statuses that all projects of that category must go through. Design categories are maintained in the Design Category Maintenance conversation (PD16).

SECRTY: To review security information about the groups who are authorized to update a design request to the status, press the 'Secrty' function key combination.

Design Request—Status Security

PURPOSE: To browse the user classes that will have security to update a design request to the status. Each time a user tries to update a design request to another status, the system will verify that the user is authorized to do so. Also use this screen to access design request status information.

BROWSE: Review the status security information for the design request.

Design Request—Status Security

STMNT: To browse design request status information, press the 'StMnt' function key combination.

Design Request—Status Maintenance

PURPOSE: To insert, modify, or delete design request statuses. Statuses are used to track the progress of the design request through the new product development process. Use this screen to maintain the information that is required each time a design request reaches a status in the product development process. Also use this screen to access security information about the user groups who are authorized to update a design request to the status.

Design Request—Status Maintenance

INSERT: Required:
Status Number
Status Name
Status Code
Status Type Code
Enter a unique status code and status name for the status entered.

Statuses are used categories. Design categories consist of design request statuses that all projects of that category must go through. Design categories are maintained in the Design Category Maintenance conversation (PD16).

Design Request—Status Maintenance

INSERT: After adding a status and pressing the 'F10' key, the Status Security screen will automatically be displayed.

MODIFY: Modify any accessible field. To insert a required report, place the cursor in the report section at the bottom of the screen. Press the 'Insert' key. Enter the Report Type.

Design Request—Status Maintenance

MODIFY: To delete a required report, place the cursor on the report to delete in the report section at the bottom of the screen. Press the 'Delete' function key combination. Delete the report by pressing the 'Confirm' function key combination or retain the report by pressing the 'Cancel' function key.

SECRTY: To maintain security information about the groups who are authorized to update a design request to the status, press the 'Secrty' function key combination.

Design Request—Status Maintenance
Design Request—Status Security

PURPOSE: To modify the user classes that will have security to update a design request to the status. Each time a user tries to update a design request to another status, the system will verify that the user is authorized to do so. Also use this screen to access design request status information.

MODIFY: To insert a new user class, press the 'Insert' key. Enter the User Class Code. The system supplies the User Class Name.

Design Request—Status Security

MODIFY: To delete a user class, place the cursor on the user class to delete. Press the 'Delete' function key combination. Be sure this is the user class to delete. Delete the user class by pressing the 'Confirm' function key combination or retain the user class by pressing the 'Cancel' function key.

STMNT: To access design request status information, press the 'StMnt, function key combination.

Design Request Status List

PURPOSE: To search for, insert, browse, modify, or delete design request statuses. Statuses are used to track the progress of the request through the new product development process.

SEARCH: With the cursor on the first blank line, enter a full or partial Status Number or Status Code and press the 'Find' key. If the first line is not blank, use the space bar to clear the fields before entering information. To start at the beginning of the list, press the 'Find' key. To see additional design request statuses, press the 'Next Screen' key.

Design Request Status List

INSERT: Press the 'Insert' function key combination.

BROWSE: Search if necessary. Enter the design request status to browse or place the cursor on the desired one from the list. Press the 'Browse' function key combination.

MODIFY: Search if necessary. Enter the design request status to modify or place the cursor on the desired one from the list. Press the 'Modify' function key combination.

Design Request Status List

DELETE: Search if necessary. Enter the design request status to delete or place the cursor on the desired one from the list. Press the 'Delete' function key combination.

NOTE: A design request status cannot be deleted if it is the current status of an active design request.

Report Type List

PURPOSE: To search for and select a report template.

SEARCH: With the cursor on the first blank line, enter a full or partial Report Type Code and press the 'Find' key. If the first line is not blank, use the space bar to clear the fields before entering information. To start at the beginning of the list, press the 'Find' key. To see additional report types, press the 'Next Screen' key.

Report Type List

SELECT: Place the cursor on the desired report type. Press the 'Return' function key to return the selected information to the detail screen.

b. Design Category Maintenance (PD16)

The Design Category Maintenance conversation (PD16) may be used to define the design request statuses that are required for a particular category of a product development effort. When adding a new design category, all statuses that have been defined using the Design Request Status Maintenance conversation (PD15) will display on a list. For each status required for the design category, a user may enter the code associated with an electronic mail message. This message will be sent each time a design request reaches the specified status.

Design Category Maintenance

PURPOSE: To browse design category information. Design categories define the statuses that design requests must pass through during the product development process. This screen displays required statuses and the corresponding electronic mail messages that are to be sent when those statuses are attained.

BROWSE: Review the design category and status information. Use the 'Next Screen' or 'Prev Screen' keys to see the next or previous design category statuses.

Design Category Maintenance

PURPOSE: To insert, modify, or delete design category information. Design categories define the statuses that design requests must pass through during the product development process. For each design category in the system, define and maintain required statuses and the corresponding electronic mail messages that are to be sent when those statuses are attained.

INSERT: Required:
 Design Category Code
 Design Category Name
 Required Flag

Design Category Maintenance

INSERT:
 Specify if each of the statuses defined are required for projects falling within the design category.
 The system requires that status number 01 be required for all design categories.

MODIFY: Modify any of the following fields:
 Design Category Name
 Required Flag
 Mail Message Code Design Category Maintenance MODIFY: Use the 'Next Screen' or 'Prev Screen' keys to see the next or previous statuses for the design category.

DELETE: Be sure this is the design category to delete. Delete the category by pressing the 'Confirm' function key combination or retain the category by pressing the 'Cancel' function key.

Design Category List

PURPOSE: To search for, insert, browse, modify, or delete a design category.

SEARCH: With the cursor on the first blank line, enter a full or partial Category code and press the 'Find' key. If the first line is not blank, use the space bar to clear the fields before entering information. To start at the beginning of the list, press the 'Find' key. To see additional design categories, press the 'Next Screen' key.

Design Category List

INSERT: Press the 'Insert' function key combination.

BROWSE: Search if necessary. Enter the design category to browse or place the cursor on the desired one from the list. Press the 'Browse' function key combination.

MODIFY: Search if necessary. Enter the design category to modify or place the cursor on the desired one from the list. Press the 'Modify' function key combination.

Design Category List

DELETE: Search if necessary. Enter the design category to delete or place the cursor on the desired one from the list. Press the 'Delete' function key combination.

Note: Design categories which are assigned to active Design Requests cannot be deleted.

Mail Message List

PURPOSE: To search for and select an electronic mail message to be sent to project team members when a product development status is reached.

SEARCH: With the cursor on the first blank line, enter a full or partial Mail Code and press the 'Find' key. If the first line is not blank, use the space bar to clear the fields before entering information. To start at the beginning of the list, press the 'Find' key. To see additional message codes, press the 'Next Screen' key.

Mail Message List

SELECT: Place the cursor on the desired message. Press the 'Return' function key to return the selected information to the detail screen.

c. Business Group Maintenance (PD18)

The Business Group Maintenance conversation (PD18) may be used to define the business group teams that will develop requested new products. A user may define a business group code and description, the primary business manager, and the other project personnel who will make up the business group team. Enter certain personnel types that are required for all business groups. Default personnel types display for each new business group.

Business Group Maintenance

PURPOSE: To browse business group information. Business group teams are assigned as default project teams when a design request is assigned to the business group. Each business group consists of a primary business manager and the project personnel. Each team must contain at least one of each required personnel type.

BROWSE: Review the business group information.

Business Group Maintenance

PURPOSE: To insert, modify, or delete business group information. Business group teams are assigned as the default project team when a design request is assigned to the business group. Each business group consists of a primary business manager and the project personnel. Each team must contain at least one of each required personnel type.

INSERT: Required:
  Business Group Code
  Group Description
  Primary Manager User-ID Business Group Maintenance MODIFY: Modify one of the following fields: Group Description or Primary Manager User-ID
  To insert a personnel type, place the cursor in the personnel section an the lower portion of the screen. Press the 'Insert' key. Enter the Personnel Type code and the NPD ID of the team member.
  To delete a personnel type, place the cursor on the personnel type to delete in the lower portion of the screen. Press the 'Delete' function key combination.

Business Group Maintenance

MODIFY: Delete the personnel type by pressing the 'Confirm' function key combination or retain the personnel type by pressing the 'Cancel' function key.

DELETE: Verify that this is the business group to delete. Delete the group by pressing the 'Confirm' function key combination or retain the group by pressing the 'Cancel' function key.

Business Group List

PURPOSE: To search for, insert, browse, modify, or delete a business group. This list displays business groups and their managers.

SEARCH: With the cursor on the first blank line, enter a full or partial Business Group Code or Manager User ID and press the 'Find' key. If the first line is not blank, use the space bar to clear the fields before entering information. To start at the beginning of the list, press the 'Find' key. To see additional business groups, press the 'Next Screen' key.

Business Group List

INSERT: Press the 'Insert' function key combination.

BROWSE: Search if necessary. Enter the business group to browse or place the cursor on the desired one from the list. Press the 'Browse' function key combination.

MODIFY: Search if necessary. Enter the business group to modify or place the cursor on the desired one from the list. Press the 'Modify' function key combination.

Business Group List

DELETE: Search if necessary. Enter the business group to delete or place the cursor on the desired one from the list. Press the 'Delete' function key combination.

Note: Business Groups which are assigned to active Design Requests cannot be deleted.

Electronic Mail—User List

PURPOSE: To search for and select users who are to receive electronic mail messages. These users are the only ones who can create and submit design requests.

SEARCH: With the cursor on the first blank line, enter a full or partial User Nickname (NPD ID) or User Group Code and press the 'Find' key. If the first line is not blank, use the space bar to clear the fields before entering information. To start at the beginning of the list, press the 'Find' key. To see additional users, press the 'Next Screen' key.

Electronic Mail—User List

SELECT: Place the cursor on the desired electronic mail user. Press the 'Return' function key to return the selected information to the detail screen.

Electronic Mail—User List

PURPOSE: To search for and select users who are to receive electronic mail messages. These users are the only ones who can create and submit design requests.

SEARCH: With the cursor on the first blank line, enter a full or partial User Nickname (NPD ID) or User Group Code and press the 'Find' key. If the first line is not blank, use the space bar to clear the fields before entering information. To start at the beginning of the list, press the 'Find' key. To see additional users, press the 'Next Screen' key.

Electronic Mail—User List

SELECT: Place the cursor on the desired electronic mail user. Press the 'Return' function key to return the selected information to the detail screen.

d. Report Template Maintenance (PD20)

The Report Template Maintenance conversation (PD20) may be used to define customized report templates. Report templates serve as standard report formats which are copied in as shells each time a given report type is created. Report templates and the reports themselves are both created using a text editor.

A user may indicate if this report type will be used for design requests, experimental prototypes, or commercial scale-up authorizations, and define the report's title lines. Also select data fields which will automatically be formatted when the report is created. If desired, assign a mail message for the report type, that may be sent each time a report is created.

Report Template Maintenance

PURPOSE: To browse customized report template information. These templates, along with their headers, are copied whenever a custom Design Request report is created using the Design Request Reports conversation (PD14). Also use this screen to review the body of the report using the text editor.

BROWSE: Review the report template information.

RPTTMP: Report Template. To review the body of the report template, press the 'RptTmp' function key combination.

Report Template Maintenance

PURPOSE: To insert, modify, or delete customized report template information. These templates, along with their headers, are copied whenever a custom Design Request report is created using the Design Request Reports conversation (PD14). The body of the report template is maintained using the text editor.

INSERT: Required:
Report Type Code
Report Type Description

Report Template Maintenance

INSERT:
Enter the report header, pre-formatted report fields, and the unique key for the report.
Assign a mail message which may be sent each time a report is created.

MODIFY: Modify any accessible field.

DELETE: Be sure this is the report template to delete. Delete the template by pressing the 'Confirm' function key combination or retain the template by pressing the 'Cancel' function key.

Report Template Maintenance

RPTTMP: Report Template. To maintain the body of the report template, press the 'RptTmp' function key combination.

Report Type List

PURPOSE: To search for, insert, browse, modify, or delete a customized report template. This list displays report type codes and their descriptions.

SEARCH: With the cursor on the first blank line, enter a full or partial Report Type Code and press the 'Find' key. If the first line is not blank, use the space bar to clear the fields before entering information. To start at the beginning of the list, press the 'Find' key. To see additional report types, press the 'Next Screen' key.

Report Type List INSERT: Press the 'Insert' function key combination.

BROWSE: Search if necessary. Enter the report type to browse or place the cursor on the desired one from the list. Press the 'Browse' function key combination.

MODIFY: Search if necessary. Enter the report type to modify or place the cursor on the desired one from the list. Press the 'Modify' function key combination.

Report Type List

DELETE: Search if necessary. Enter the report type to delete or place the cursor on the desired one from the list. Press the 'Delete' function key combination.

Mail Message List

PURPOSE: To search for and select a mail message.

SEARCH: With the cursor on the first blank line, enter a full or partial Mail Message Code and press the 'Find' key. If the first line is not blank, use the space bar to clear the fields before entering information. To start at the beginning of the list, press the 'Find' key. To see additional mail messages, press the 'Next Screen' key.

Mail Message List

SELECT: Place the cursor on the desired mail message. Press the 'Return' function key to return the selected information to the detail screen.

G. PRODUCT MANAGEMENT (PSPR)

1. Item Maintenance (PRIM)

a. Item Maintenance—General Information (PR01)

The Item—General Information conversation (PR01) may be used to define and maintain information about items used throughout the system. Items include molecular/CAS level, raw material, intermediate/bulk, finished goods, packaging, container, non-stocked, emission, waste and tool.

Item information includes identification data such as name and description; marketing, production, and environmental classifications; Chemical Abstract Service (CAS) number; and stockkeeping unit of measure. It also includes a lab procedure number that refers to handling or testing instructions, a primary name, and alternate names, or synonyms, for each item.

Item List

PURPOSE: To search for, insert, browse, modify, or copy an item.

SEARCH: With the cursor on the first blank line, enter a full or partial Item Number, Item Name, or Type and press the 'Find' key. If the first line is not blank, use the space bar to clear the fields before entering information. To start at the beginning of the list, press the 'Find' key. To see additional items, press the Next Screen' key.

Item List

INSERT: Press the 'Insert' function key combination.

BROWSE: Search if necessary. Enter the item to review or place the cursor on the desired item from the list. Press the 'Browse' function key combination.

MODIFY: Search if necessary. Enter the item to change or place the cursor on the desired item from the list. Press the 'Modify' function key combination.

Item List

COPY: Search if necessary. Enter the item to copy or place the cursor on the desired item from the list. Press the 'Copy' function key combination.

Procedure List

PURPOSE: To search for and select procedure information.

SEARCH: With the cursor on the first blank line, enter a full or partial Procedure Code or Description and press the 'Find' key. If the first line is not blank, use the space bar to clear the fields before entering information. To start at the beginning of the list, press the 'Find' key. To see additional information, press the 'Next Screen' key.

Procedure List

SELECT: Place the cursor on the desired procedure code. Press the 'Return' function key to return the selected information to the detail screen.

b. Item Maintenance—Physical Hazards and Precautions (PR02)

The Physical Hazards Maintenance conversation (PR02) may be used to review and maintain information about hazards associated with an item, procedures to deal with emergencies, and precautions to take with an item.

This conversation's checklist may be used to indicate an item's hazardous characteristics, such as whether the item is flammable, explosive, or reactive. A user may also enter procedure codes that identify other information, such as incompatible and decomposition products, and that define the principle physical hazards.

Procedure codes allow identification of the hazard precautions and procedures for an item, such as storage and handling, fire extinguishing media, and primary health hazards. It also lists and maintains Hazardous Material Identification System (HMIS) ratings and comments for each item's Material Safety Data Sheet (MSDS).

Item—Physical Hazards & Reactivity browse physical hazard and reactivity
 PURPOSE: To browse physical hazard and reactivity information. Also use this screen to review MSDS (Material Safety Data Sheet) comments associated with an item and hazard precautions and procedures.
 BROWSE: Review the physical hazards and reactivity information.
 PRECTN: Precautions and Procedures. To review physical precautions and procedures related to an item, press the 'PreCtn' function key combination.
Item—Physical Hazards & Reactivity
 BRTXT: Browse Text. To review MSDS (Material Safety Data Sheet) comments associated with an item, press the 'BrTxt' function key combination.
Item—Hazard Precautions & Procedures
 PURPOSE: To browse hazard precautions and procedures associated with an item. Also use this screen to review physical hazards and reactivity information.
 BROWSE: Review the hazard precautions and procedure information.
 PRECTN: Physical Hazards and Reactivity. To review physical hazards and procedures associated with an item, press the 'PreCtn' function key combination.
Item—Physical Hazards & Reactivity
 PURPOSE: To modify physical hazard and reactivity information. Also use this screen to review or maintain MSDS (Material Safety Data Sheet) comments associated with an item and hazard precautions and procedures.
 MODIFY: Add or change any field except Item Number or Item Name.
 PRECTN: Precautions and Procedures. To maintain physical precautions and procedures related to an item, press the 'PreCtn' function key combination.
Item—Physical Hazards & Reactivity
 BRTXT: Browse Text. To review MSDS (Material Safety Data Sheet) comments associated with an item, press the 'BrTxt' function key combination.
 TEXT: Maintain Text. To maintain MSDS (Material Safety Data Sheet) comments associated with an item, press the 'Text' function key combination.
Item List
 PURPOSE: To search for and select an item to browse or modify.
 SEARCH: With the cursor on the first blank line, enter a full or partial Item Number, Item Name, or Type and press the 'Find' key. If the first line is not blank, use the space bar to clear the fields before entering information. To start at the beginning of the list, press the 'Find' key. To see additional items, press the 'Next Screen' key.
Item List
 BROWSE: Search if necessary. Enter the item to browse or place the cursor on the desired item from the list. Press the 'Browse' function key combination.
 MODIFY: Search if necessary. Enter the item to change or place the cursor on the desired item from the list. Press the 'Modify' function key combination.

c. Item Maintenance—Health Hazards (PR03)

The Health Hazards Maintenance conversation (PR03) may be used to define and maintain information about health hazards associated with an item and possible health effects from working with an item.

This conversation's checklist may be used to indicate an item's hazards classifications (corrosive, toxic, irritant), the route of entry into the body (inhalation, skin, absorption, ingestion), and the organs that the hazardous material may affect.

For a specified item, a user may include procedure codes related to first aid, signs and symptoms, and health effects. These procedure codes are defined in the Procedure Maintenance conversation (CS13).

Item—Health Hazards
 PURPOSE: To browse health hazard information and MSDS (Material Safety Data Sheet) comments associated with an item. This information classifies hazards and indicates the organs affected by the hazardous item.
 BROWSE: Review the health hazard information.
 BRTXT: Browse Text. To review MSDS (Material Safety Data Sheet) comments associated with an item, press the 'BrTxt' function key combination.
Item—Health Hazards
 PURPOSE: To modify health hazard information and MSDS (Material Safety Data Sheet) comments associated with an item. This information classifies hazards and indicates the organs affected by the hazardous item.
 MODIFY: Change any field except Item Number or Item Name.
 BRTXT: Browse Text. To review MSDS (Material Safety Data Sheet) comments associated with an item, press the 'BrTxt' function key combination.
Item—Health Hazards
 TEXT: Maintain Text. To maintain MSDS (Material Safety Data Sheet) comments associated with an item, press the 'Text' function key combination.
Item List
 PURPOSE: To search for and select an item to browse or modify.
 SEARCH: With the cursor on the first blank line, enter a full or partial Item Number, Item Name, or Type and press the 'Find' key. If the first line is not blank, use the space bar to clear the fields before entering information. To start at the beginning of the list, press the 'Find' key. To see additional items, press the 'Next Screen' key.
Item List
 BROWSE: Search if necessary. Enter the item to review or place the cursor on the desired item from the list. Press the 'Browse' function key combination.
 MODIFY: Search if necessary. Enter the item to change or place the cursor on the desired item from the list. Press the 'Modify' function key combination.

Procedure List

PURPOSE: To search for and select procedure information.

SEARCH: With the cursor on the first blank line, enter a full or partial Procedure Code or Description and press the 'Find' key. If the first line is not blank, use the space bar to clear the fields before entering information. To start at the beginning of the list, press the 'Find' key. To see additional procedures, press the 'Next Screen' key.

Procedure List

SELECT: Place the cursor on the desired procedure code. Press the 'Return' function key to return the selected information to the detail screen.

d. Item Maintenance—Compliance Quantities (PR04)

The Compliance Quantities Maintenance conversation (PR04) may be used to define and maintain regulatory release tolerance levels and exposure limits for an item, or to indicate that a chemical is on the Form R list.

For each compliance source, a user may include the compliance quantity type and value, the associated location, its effective date, and any MSDS (Material Safety Data Sheet) comments.

To review or maintain compliance quantities from a specific source, use the CQ (Compliance Quantity) Maintenance conversation (EN11).

Item Maintenance—Compliance Quantities

PURPOSE: To browse compliance quantity information and MSDS (Material Safety Data Sheet) comments associated with an item. This information is used in environmental system functions to control and report spills, emissions, and exposures.

BROWSE: Review the compliance quantity information.

BRTXT: Browse Text. To review MSDS (Material Safety Data Sheet) comments associated with an item, press the 'BrTxt' function key combination.

Item Maintenance—Compliance Quantities

PURPOSE: To insert or delete compliance quantity information and MSDS (Material Safety Data Sheet) comments associated with an item. This information is used in environmental system functions to control and report spills, emissions, and exposures.

INSERT: Press the 'Insert' key. Required:
Source
Quantity/UM (Unit of Measure)
Type
Date In Effect Item Maintenance—Compliance Quantities DELETE: Place the cursor on the compliance quantity to delete. Press the 'Delete' function key combination. Confirm the deletion by pressing the Remove, key or retain the quantity by pressing the 'Unconfirm' function key combination.

BRTXT: Browse Text. To review MSDS (Material Safety Data Sheet) comments associated with an item, press the 'BrTxt' function key combination.

Item Maintenance—Compliance Quantities

TEXT: Maintain Text To maintain MSDS (Material Safety Data Sheet) comments associated with an item, press the 'Text' function key combination.

Item List

PURPOSE: To search for and select an item to browse or modify.

SEARCH: With the cursor on the first blank line, enter a full or partial Item Number, Item Name, or Type and press the 'Find' key. If the first line is not blank, use the space bar to clear the fields before entering information. To start at the beginning of the list, press the 'Find' key. To see additional items, press the 'Next Screen' key.

Item List

BROWSE: Enter the item to review or place the cursor on the desired item from the list. Press the 'Browse' function key combination.

MODIFY: Enter the item to change or place the cursor on the desired item from the list. Press the 'Modify' function key combination.

Compliance Quantity Source List

PURPOSE: To search for and select a compliance quantity (CQ) code.

SEARCH: With the cursor on the first blank line, enter a full or partial CQ Source Code or CQ Source Description and press the 'Find' key. If the first line is not blank, use the space bar to clear the fields before entering information. To start at the beginning of the list, press the 'Find' key. To see additional codes, press the 'Next Screen' key.

Compliance Quantity Source List

SELECT: Place the cursor on the desired CQ source code. Press the 'Return' function key to return the selected information to the detail screen.

Environmental Location List

PURPOSE: To search for and select location information.

SEARCH: With the cursor on the first blank line, enter a full or partial Location Number or Location Description and press the 'Find' key. If the first line is not blank, use the space bar to clear the fields before entering information. To start at the beginning of the list, press the 'Find' key. To see additional locations press the 'Next Screen' key.

Environmental Location List

SELECT: Place the cursor on the desired location number. Press the 'Return' function key to return the selected information to the detail screen.

e. Item Maintenance—Transportation Data (PR05)

The Transportation Data Maintenance conversation (PR05) may be used to define and maintain information about transporting an item and comments to print on the bill of lading.

This conversation may be used to maintain transportation information such as packaging exceptions and requirements, disposal method, and freight classification. Also maintain government regulation information, such as the item's maximum shipment quantities for various types of vehicles, and specify any comments to print on the item's bill of lading.

Incompatible and decomposition products display for informational purposes only; to maintain them, use the Physical Hazards Maintenance conversation (PR02).

Item—Transportation Data

PURPOSE: To browse transportation information and MSDS (Material Safety Data Sheet) comments associated with an item.

BROWSE: Review the transportation information.

BRTXT: Browse Text. To review MSDS (Material Safety Data Sheet) comments associated with an item, press the 'BrTxt' function key combination.

Item—Transportation Data

PURPOSE: To modify transportation information and MSDS (Material Safety Data Sheet) comments associated with an item.

MODIFY: Change any field except Item Number or Item Name.

BRTXT: Browse Text. To review MSDS (Material Safety Data Sheet) comments associated with an item, press the 'BrTxt' function key combination.

Item—Transportation Data

TEXT: Maintain Text. To maintain MSDS (Material Safety Data Sheet) comments associated with an item, press the 'Text' function key combination.

Item List

PURPOSE: To search for and select an item to browse or modify.

SEARCH: With the cursor on the first blank line, enter a full or partial Item Number, Item Name, or Type and press the 'Find' key. If the first line is not blank, use the space bar to clear the fields before entering information. To start at the beginning of the list, press the 'Find' key. To see additional items, press the 'Next Screen' key.

Item List

BROWSE: Search if necessary. Enter the item to review or place the cursor on the desired item from the list. Press the 'Browse' function key combination.

MODIFY: Search if necessary. Enter the item containing the physical hazards and reactivity information to change or place the cursor on the desired item from the list. Press the 'Modify' function key combination.

Procedure List

PURPOSE: To search for and select procedure information.

SEARCH: With the cursor on the first blank line, enter a full or partial Procedure Code or Description and press the 'Find' key. If the first line is not blank, use the space bar to clear the fields before entering information. To start at the beginning of the list, press the 'Find' key. To see additional procedures, press the 'Next Screen' key.

Procedure List

SELECT: Place the cursor on the desired procedure code. Press the 'Return' function key to return the selected information to the detail screen.

f. Item Maintenance—Molecular Formulation (PR06)

The Molecular Formulation Maintenance conversation (PR06) may be used to define and maintain the molecular formulation of an item by weight.

This conversation may be used to maintain information about the molecular components existing in an item. For each component, specify if the component is hazardous, the component's content percentage, and the component's Chemical Abstract Service (CAS) number. Also specify footnotes about the hazardous material for use in the Hazardous Ingredients Section of the Material Safety Data Sheet (MSDS).

The system uses this information for the following:
  Preparing Emergency Release Notifications
  Estimating Emission Quantities
  Reacting to Employee Exposure Levels
  Preparing Material Safety Data Sheets (MSDS)
  Preparing Form-R and Tier-II reports Item—Molecular Component PURPOSE: To review molecular components in an item and associated MSDS (Material Safety Data Sheet) comments.

BROWSE: Review the molecular component information.

COMPLIS: Component List. To review molecular components associated with this item, press the 'CompLst' function key combination.

BRTXT: Browse Text. To review MSDS (Material Safety Data Sheet) comments associated with an item, press the 'BrTxt' function key combination.

Item—Molecular Components List

PURPOSE: To search for and select an item containing molecular information to browse.

SEARCH: With the cursor on the first blank line, enter a full or partial Molecular Item Number, Name, or CAS Number and press the 'Find' key. If the first line is not blank, use the space bar to clear the fields before entering information. To start at the beginning of the list, press the 'Find' key. To see additional items, press the 'Next Screen' key.

Item—Molecular Components List

BROWSE: Search if necessary. Enter the item to browse or place the cursor on the desired item from the list. Press the 'Browse' function key combination.

Item—Molecular Component

PURPOSE: To review molecular components in an item and associated MSDS (Material Safety Data Sheet) comments.

BROWSE: Review the molecular component information.

COMPLIS: Component List. To review molecular components associated with this item, press the 'CompLst' function key combination.

BRTXT: Browse Text. To review (Material Safety Data Sheet) comments associated with an item, press the 'BrTxt' function key combination.

Item—Molecular Component 'PURPOSE: To insert, modify, or delete molecular components in an item.

INSERT: Required:
  Molecular Item Number
  Hazardous Ingredients Flag

MODIFY: Change any field except Item Number or Item Name.

DELETE: Confirm the deletion by pressing the 'Confirm' function key combination or retain the component by pressing the 'Cancel' function key.

Item—Molecular Component

COMPLIS: Component List. To maintain molecular components associated with this item, press the 'CompLst' function key combination.

BRTXT: Browse Text. To review MSDS (Material Safety Data Sheet) comments associated with an item, press the 'BrTxt' function key combination.

TEXT: Maintain Text. To maintain MSDS (Material Safety Data Sheet) comments associated with an item, press the 'Text' function key combination.

Item List

PURPOSE: To search for and select an item to browse or modify.

SEARCH: With the cursor or the first blank line, enter a full or partial Item Number, Item Name, or Type and press the 'Find' key. If the first line is not blank, use the space bar to clear the fields before entering information. To start at the beginning of the list, press the 'Find' key. To see additional items, press the 'Next Screen' key.

Item List
BROWSE: Search if necessary. Enter the item to review or place the cursor on the desired item from the list. Press the 'Browse' function key combination.
MODIFY: Search if necessary. Enter the item containing the physical hazards and reactivity information to change or place the cursor on the desired item from the list. Press the 'Modify' function key combination.
Item—Molecular Components List
PURPOSE: To search for and select an item containing molecular information to insert, modify, or delete.
SEARCH: With the cursor on the first blank line, enter a full or partial Molecular Item Number, Name, or CAS Number and press the 'Find' key. If the first line is not blank, use the space bar to clear the fields before entering information. To start at the beginning of the list, press the 'Find' key. To see additional items, press the 'Next Screen' key.
Item—Molecular Components List
MODIFY: Search if necessary. Enter the item containing the molecular component to change or place the cursor on the desired item from the list. Press the 'Modify' function key combination.
DELETE: Search if necessary. Enter the item containing the molecular component to delete or place the cursor on the desired item from the list. Press the 'Delete' function key combination.
Item List
PURPOSE: To search for and select an item.
SEARCH: With the cursor or the first blank line, enter a full or partial Item Number, Item Name, or Type and press the 'Find' key. If the first line is not blank, use the space bar to clear the fields before entering information. To start at the beginning of the list, press the 'Find' key. To see additional items, press the 'Next Screen' key.
Item List
SELECT: Place the cursor on the desired item. Press the 'Return' function key to return the selected information to the detail screen.

g. Item Maintenance—Control and Safety Measures (PR07)

The Control/Safety Measures Maintenance conversation (PR07) may be used to define and maintain an item's control measures and safety requirements. This information helps to prevent hazardous conditions.

Information for each item includes procedure codes that identify exhaust, ventilation, and hygienic procedures may also be used to maintain protection requirements which specify the protective equipment for specific body parts used when storing, producing, or handling an item.

To define exhaust, ventilation, and hygienic procedures associated with an item, use the Procedure Maintenance conversation (CS13).

Item—Control and Safety Measures
PURPOSE: To browse control (exhaust procedures) measures, safety (protective equipment) measures, and MSDS (Material Safety Data Sheet) comments associated with an item.
BROWSE: Review the control and safety measure information. BRTXT: Browse Text. To review MSDS (Material Safety Data Sheet) comments associated with an item, press the 'BrTxt' function key combination.

Item—Control and Safety Measures
PURPOSE: To modify control (exhaust procedures) measures, safety (protective equipment) measures, and MSDS (Material Safety Data Sheet) comments associated with an item.
MODIFY: Change any field except Item Number and Item Name.
To add body parts and associated protective equipment, press the 'Insert' key. Add the information.
To delete a body part/equipment place the cursor on the appropriate one and press the 'Delete' function key combination. Confirm the deletion by pressing the 'Remove' key or retain the information by pressing the 'Unconfirm' function key combination.
BRTXT: Browse Text. To review MSDS (Material Safety Data Sheet) comments associated with an item, press the 'BrTxt' function key combination.
TEXT: Maintain Text. To maintain MSDS (Material Safety Data Sheet) comments associated with an item, press the 'Text' function key combination.
Item List
PURPOSE: To search for and select the item containing control and safety measure information to browse or modify.
SEARCH: With the cursor on the first blank line, enter a full or partial Item Number, Item Name, or Type and press the 'Find' key. If the first line is not blank, use the space bar to clear the fields before entering information. To start at the beginning of the list, press the 'Find' key. To see additional items, press the 'Next Screen' key.
Item List
BROWSE: Search if necessary. Enter the item to review or place the cursor on the desired item from the list. Press the 'Browse' function key combination.
MODIFY: Search if necessary. Enter the item containing the control and safety information to change or place the cursor on the desired item from the list. Press the 'Modify' function key combination.
Procedure List
PURPOSE: To search for and select procedure information.
SEARCH: With the cursor on the first blank line, enter a full or partial Procedure Code or Description and press the 'Find' key. If the first line is not blank, use the space bar to clear the fields before entering information. To start at the beginning of the list, press the 'Find' key. To see additional procedures, press the 'Next Screen' key.
Procedure List
SELECT: Place the cursor on the desired procedure code. Press the 'Return' function key to return the selected information to the detail screen.

h. Item Maintenance—User Defined Fields (PR17)

The User Defined Field conversation (PR17) may be used to define and maintain item-related fields that are not defined on the standard data base.

Establish and maintain classification information that is specific to an item/spec.

Item User-Defined Fields
PURPOSE: To browse user-defined fields associated with an item. The first six user-defined fields are single lines which make up the header information. The remaining fields are multi-line fields which permit more than one line of information for user-defined fields.

BROWSE: Review the user-defined field information.

Item User-Defined Fields

PURPOSE: To modify user-defined fields associated with an item. The first six user-defined fields are single lines which make up the header information. The remaining fields are multi-line fields which permit more than one line of information for user-defined fields.

MODIFY: Change any of the user-defined fields. To add multi-line fields, move the cursor below Field 7. Press the 'Insert' key. Enter the information.

Item User-Defined Fields

MODIFY: To delete fields at the bottom of the screen, place the cursor on the field to delete. Press the 'Delete' function key combination. Delete the field by pressing the 'Remove' key. Retain the field by pressing the 'Unconfirm' function key combination.

2. Item/Spec Maintenance (PRSM)

a. Item/Spec Control Formula Maintenance (PR08)

The Control Formula conversation (PR08) may be used to define and maintain the control formula for an item/spec. The control formula lists the inputs and outputs involved in producing an item/spec and is a model for a specific process formula.

The information for an item/spec control formula includes the formula's effective and expiration dates, item/spec number, type, and usage quantity of each component item/spec within the formula.

The Process Code Maintenance conversation (PR15) uses the control formula as the basis for creating the process formula.

Item/Spec Control Formula Maintenance

PURPOSE: To browse control formula information. This information defines the components in a process formula. It specifies the quantity of each item in the process formula and indicates if it is possible to change the quantity. Also use this screen to enter MSDS (Material Safety Date Sheet) comments about the control formula.

BROWSE: Review the control formula information.

Item/Spec Control Formula Maintenance

TEXT: To review MSDS (Material Safety Data Sheet) comments, press the 'Text' function key combination. On the word processing screen, type the comments above the [End of file] statement. When through, press the 'F10' function key. When the screen with "Choose Desired Action . . . " appears, to save the text, press the 'F10' function key. To cancel the text, press the 'Remove' key.

Item/Spec Control Formula Maintenance

PURPOSE: To insert, modify, or copy control formula information. This information defines the components in a process formula. It specifies the quantity of each item in the process formula and indicates if it is possible to change the quantity. Also use this screen to enter MSDS (Material Safety Date Sheet) comments about the control formula.

INSERT: Required:
Item Number
Component Spec Number
Spec Number
Component Spec Name
Formula Number
Input/Output Flag
In-Effect Date
Type Item/Spec Control Formula Maintenance INSERT: Required:
Expires date
Change Flag
Component Number
Usage Quantity/UM
Only one active primary formula can exist for an item/spec number.
The total quantity of output components by weight cannot exceed the total quantity of input components by weight.
All formulas can have only one primary output.

Item/Spec Control Formula Maintenance

INSERT:
Components are maintained in the order in To save the added information, press the 'End/Save' function key combination.

MODIFY: Change any field except Item/Spec Number, Item/Spec Name and Formula ID. To add components, press the 'Insert' key.

Item/Spec Control Formula Maintenance

MODIFY:
To delete a component, press the 'Delete' function key.
To save the added information, press the 'End/Save' function key combination.

COPY: Enter the new Formula Number and Name. Change the remaining information as needed.

TEXT: To enter MSDS (Material Safety Data Sheet) comments, press the 'Text' function key combination.

Item/Spec Control Formula Maintenance

TEXT: On the word processing screen, type the comments above the [End of file] statement. When through, press the 'F10' function key. When the screen with "Choose Desired Action . . . " appears, to save the text, press the 'F10' function key. To cancel the text, press the 'Remove' key. END/Post Data. To save the maintained data, press the 'End/Save'

SAVE: function key combination.

Control Formula List

PURPOSE: To search for and select a control formula to insert, browse, modify, or copy.

SEARCH: With the cursor on the first blank line, enter a full or partial Item Number, Item Name, Formula ID, or In-Effect Date and press the 'Find' key. If the first line is not blank, use the space bar to clear the fields before entering information. To start at the beginning of the list, press the 'Find' key. To see additional items, press the 'Next Screen' key.

Control Formula List

INSERT: Press the 'Insert' function key combination.

BROWSE: Search if necessary. Enter the item to review or place the cursor on the desired item from the list. Press the 'Browse' function key combination.

MODIFY: Search if necessary. Enter the item to change or place the cursor on the desired item from the list. Press the 'Modify' function key combination.

Control Formula List

COPY: Search if necessary. Enter the item to copy or place the cursor on the desired item from the list. Press the 'Copy' function key combination.

b. Item/Spec Cost Maintenance (PR10)

The Item/Spec Cost Data conversation (PR10) may be used to define and maintain cost information for an item/spec.

The cost information for each item/spec includes the account code, cost type, and cost unit of measure. Each item can have several cost types, including standard cost, current cost, and simulated cost.

A user may also specify up to eight cost components for each cost type. The total of all cost components determines the total cost for the item/spec.

Item/Spec Cost Maintenance

PURPOSE: To browse cost information associated with an item/spec. Cost component information is used to define item/spec costs, such as standard costs, overhead, and labor.

BROWSE: Review the item/spec cost information.

Item/Spec Cost Maintenance

PURPOSE: To insert, modify, copy, or delete cost information associated with an item/spec. Cost component information is used to define item/spec costs, such as standard costs, overhead, and labor. NOTE: You cannot maintain cost information unless the item/spec, cost type, and unit of measure are defined.

INSERT: Required:
Item/Spec Number
Cost UM (Unit of Measure)
Cost Type
Account Code Item/Spec Cost Maintenance DELETE: Verify that this is the information to delete. To delete it, press the 'Confirm' function key combination. To retain the information, press the 'Cancel' function key.

CLCTOT: Calculate Total Cost. To calculate the total cost, press the 'ClcTot' function key combination.

Item/Spec Cost Type List

PURPOSE: To search for and select an item/spec's cost information to insert, browse, modify, delete, or copy.

SEARCH: With the cursor on the first blank line, enter a full or partial Item/Spec Number, Name, or Cost Type and press the 'Find' key. If the first line is not blank, use the space bar to clear the fields before entering information. To start at the beginning of the list, press the 'Find' key. To see additional information, press the 'Next Screen' key.

Item/Spec Cost Type List

INSERT: Press the 'Insert' function key combination.

BROWSE: Search if necessary. Enter the item to review or place the cursor on the desired item from the list. Press the 'Browse' function key combination.

MODIFY: Search if necessary. Enter the item containing the cost information to change or place the cursor on the desired item from the list. Press the 'Modify' function key combination.

Item/Spec Cost Type List

DELETE: Search if necessary. Enter the item containing the cost information to delete or place the cursor on the desired item from the list. Press the 'Delete' function key combination.

COPY: Search if necessary. Enter the item to copy or place the cursor on the desired item from the list. Press the 'Copy' function key combination.

Item/Spec Name List

PURPOSE: To search for and select item/spec information.

SEARCH: With the cursor on the first blank line, enter a full or partial Item/Spec Number or Item/Spec Name and press the 'Find' key. If the first line is not blank, use the space bar to clear the fields before entering information. To start at the beginning of the list, press the 'Find' key. To see additional information, press the 'Next Screen' key.

Item/Spec Name List

SELECT: Place the cursor on the desired item/spec. Press the 'Return' function key to return the selected information to the detail screen.

c. Item/Spec Maintenance (PR11)

The Item/Specification Maintenance conversation (PR11) may be used to define and maintain an item's physical and testing specifications.

An item can have more than one set of specifications. Each variation represents a specific product and the combination of an item number and a specification number identifies the product. Physical specifications are properties that describe an item——such as color, specific gravity, melting point, and evaporation rate.

Specifications provide information used by the Material Safety Data Sheet (MSDS); specific gravity is used in weight-to-volume and volume-to weight conversions.

This conversation may be used to maintain an item's physical specifications, including the physical state, flash point, vapor density, pressure, and specific gravity. Identify additional specifications or properties for the item/spec using a test code and a range of values.

A test flag for each test code indicates if a test is used to determine whether or not an item meets the specification. The range of values indicates the upper limits, lower limits, and the nominal value necessary for the item to meet the specification.

Item—Physical Specifications

PURPOSE: To browse physical specifications information for an item. Also use this screen to review test specifications for an item. Item/spec information is used throughout the system in functions such as inventory, production scheduling, order processing, and shipping.

BROWSE: Review the physical specifications information for this item.

TESTS: Test Specifications. To review test specifications for the item, press the 'Tests' function key combination.

Item—Physical Specifications

BR: Browse Request. To browse the request press the "BrRqst" RQST: key combination.

Item/Spec Test Specifications

PURPOSE: To browse item/spec test specifications. Test specifications indicate tests that need to be performed to ensure the consistent quality of an item/spec.

BROWSE: Review the item/spec test specifications information.

SPECS: Physical Specifications. To review physical specifications for an item, press the 'Specs' function key combination.

Item—Physical Specifications

PURPOSE: To add, modify, or copy physical specifications information for an item. Also use this screen to access test specifications for an item. Item/spec information is used throughout the system in functions such as inventory, production scheduling, order processing, and shipping.

INSERT: Required:
  Item Number
  Item Name
  Spec Number
  Spec Name
  Spec Description
  Specific Gravity
  Spec Status Item—Physical Specifications INSERT: NOTE: You cannot maintain item/spec information unless the item number, spec number, and specific gravity are defined.

MODIFY: Change any field except Item Number, Item Name, Spec Number, or Specific Gravity.

COPY: Enter the new Item Number and Spec Number. Change the remaining information as needed. Press the 'End' key.

Item—Physical Specifications

TESTS: Test Specifications. To review or maintain test specifications for the item, press the 'Tests' function key combination.

BRRQST: Browse Request. To browse the request press the 'BrRqst' key combination.

Item/Spec Test Specifications

PURPOSE: To insert, modify, or delete item/spec test specifications. Test specifications indicate tests that need to be performed to ensure the consistent quality of an item/spec. Also use this screen to access and maintain physical specifications for an item.

INSERT: Press the 'Insert' key. Required:
  Test Code
  Lower Limit
  Nominal Value
  Test (Y/N)
  Upper Limit Item/Spec Test Specifications INSERT: NOTE: The lower limit must be less than the upper limit. The nominal value must be greater than or equal to the lower limit and less than or equal to the upper limit.

MODIFY: Change any field except Item Number, Spec Number, Spec Description, Item Name, Spec Name, or Test Description.

Item/Spec Test Specifications

DELETE: To delete a test code, place the cursor on the code. Press the 'Delete' function key combination. To delete the code, press the 'Remove'. To retain the record, press the 'Unconfirm' function key combination.

SPECS: Physical Specifications. To review or maintain physical specifications for an item, press the 'Specs' function key combination.

Item/Spec Name List

PURPOSE: To search for and select an item/spec to insert, browse, modify, or copy.

SEARCH: With the cursor on the first blank line, enter a full or partial Item Number, Item/Spec Number, or Item Name and press the 'Find' key. If the first line is not blank, use the space bar to clear the screens before entering information. To start at the beginning of the list, press the 'Find' key. To see additional items, press the 'Next Screen' key.

Item/Spec Name List

INSERT: Press the 'Insert' function key combination.

BROWSE: Search if necessary. Enter the item/spec to browse or place the cursor on the desired item from the list. Press the 'Browse' function key combination.

MODIFY: Search if necessary Enter the item/spec to change or place the cursor on the desired item from the list. Press the 'Modify' function key combination.

Item/Spec Name List

COPY: Search if necessary. Enter the item/spec to copy or place the cursor on the desired item from the list. Press the 'Copy' function key combination.

DELETE: Search if necessary. Enter the item/spec to delete or place the cursor on the desired item from the list. Press the 'Delete' function key combination.

Item List

PURPOSE: To search for and select item/spec information.

SEARCH: With the cursor on the first blank line, enter a full or partial Item Number, Item Name, or Type and press the 'Find' key. If the first line is not blank, use the space bar to clear the fields before entering information. To start at the beginning of the list, press the 'Find' key. To see additional items, press the 'Next Screen' key.

Item List

SELECT: Place the cursor on the desired item. Press the 'Return' function key to return the selected information to the detail screen.

Design Request List

PURPOSE: To search for and select a design request.

SEARCH: With the cursor on the first blank line, enter a full or partial Design/Revision Number, Business Group code, design request Status, Requestor NPD ID, or Active indicator and press the 'Find' key. If the first line is not blank, use the space bar to clear the fields before entering information. To start at the beginning of the list, press the 'Find' key. To see additional design requests, press the 'Next Screen' key.

Design Request List

SELECT: Place the cursor on the desired design request. Press the 'Return' function key to return the selected information to the detail screen.

d. Item/Spec Substitute Maintenance (PR12)

The Item/Spec Substitutes conversation (PR12) may be used to identify item/specs used as substitutes for other item/specs. For each item/spec, include the substitute item/spec's number and name.

Item/Spec—Substitutes

PURPOSE: To browse substitutes for an item/spec.

BROWSE: Review the item/spec substitute information.

Item/Spec—Substitutes

PURPOSE: To insert, modify, or delete substitutes for an item/spec.

INSERT: Press the 'Insert' key. Add the Substitute Item Number and Spec Number, Substitute Name.

MODIFY: Change the Substitute Item Number or Substitute Spec Number.

DELETE: To delete a substitute, place the cursor on the substitute. Press the 'Delete' function key combination. To delete the substitute, press the 'Remove' key. To retain the record, press the 'Unconfirm' function key combination.

Item/Spec Name List

PURPOSE: To search for and select an item/spec to insert, browse, or modify.

SEARCH: With the cursor on the first blank line, enter a full or partial Item, Spec Number, or Name and press the 'Find' key. If the first line is not blank, use the space bar to clear the fields before entering information. To start at the beginning of the list, press the 'Find' key. To see additional items, press the 'Next Screen' key.

Item/Spec Name List

INSERT: Press the 'Insert' function key combination.

BROWSE: Search if necessary. Enter the item/spec to review or place the cursor on the desired item/spec from the list. Press the 'Browse' function key combination.

MODIFY: Search if necessary Enter the item/spec to change or place the cursor on the desired item/spec from the list. Press the 'Modify' function key combination.

Item/Spec Name List

PURPOSE: To search for and select an item/spec.

SEARCH: With the cursor on the first blank line, enter a full or partial Item/Spec Number or Item/Spec Name and press the 'Find' key. If the first line is not blank, use the space bar to clear the fields before entering information. To start at the beginning of the list, press the 'Find' key. To see additional information, press the 'Next Screen' key.

e. Item/Spec Container Maintenance (PR13)

The Item/Spec Container Maintenance conversation (PR13) may be used to assign containers to an item/specification, and to define and maintain information about the container, such as the container code, quantity per container, and unit of measure. Before assigning containers to item/specs, they must be defined in the Container Maintenance conversation (CS12). The standard capacity flag indicates whether a standard amount of the given item/spec is always filled into the container. If the standard capacity flag is set to 'Y' (yes), it enables 'special' unit of measure reporting in production. If it is not entered by the user, the quantity per container defaults to the container's defined capacity and is used to convert units of measure (containers, boxes, etc.) to stockkeeping units of measure. If necessary, change the default value when the container is assigned to a particular item/spec.

Item/Spec Container Maintenance

PURPOSE: To insert modify, copy, or delete item/spec container relationships. Also use this screen to access and maintain packaging comments.

BROWSE: Review the item/spec container information.

TEXT: Packaging/Labeling Comments. To review packaging/labeling comments about the item/spec container, press the 'Text' function key combination.

Item/Spec Container Maintenance

PURPOSE: To insert, modify, copy, or delete item/spec container relationships. Also use this screen to access and maintain packaging comments.

NOTE: To maintain item/spec containers, the Item/Spec Number and Container Code must be defined.

INSERT: Required:
  Item/Spec Number
  Container Code
  Standard Capacity Flag

Item/Spec Container Maintenance

INSERT: If the item/spec container has a standard capacity (Y in the Std Cap field), define the Qty (Quantity) Per Container and the UM (unit of measure).

MODIFY: Change the Standard Capacity flag, Quantity Per Container, Unit of Measure, or packaging comments.

COPY: Enter the new Item/Spec Number. If necessary, modify the remaining information. Press the 'End' function key to save the record.

Item/Spec Container Maintenance

DELETE: From the list screen, position the cursor on the item/spec container relationship and press the 'Delete' function key. Confirm the deletion by pressing the 'Confirm' function key combination Retain the information by pressing the 'Cancel' function key.

NOTE: You cannot delete item/spec container relationship information if it is associated with open customer orders or production outputs.

Item/Spec Container Maintenance

TEXT: Packaging/Labeling Comments. To maintain packaging/labeling comments about the item/spec container, press the 'Text' function key combination. On the word processing screen, type the comments above the [End of file] statement. When through, press the 'F10' function key. When the screen with "Choose Desired Action . . . " appears, to save the text, press the 'F10' function key. To cancel the text, press the 'Remove' key.

Item/Spec Container List

PURPOSE: To search for, insert, browse, modify, copy, or delete an item/spec container relationship.

SEARCH: With the cursor on the first blank line, enter a full or partial Item/Spec Number, Container, or Item/Spec Name and press the 'Find' key. If the first line is not blank, use the space bar to clear the fields before entering information. To start at the beginning of the list, press the 'Find' key. To see additional items, press the 'Next Screen' key.

Item/Spec Container List

INSERT: Press the 'Insert' function key combination.

BROWSE: Search if necessary. Enter the item/spec to browse or place the cursor on the desired item/spec from the list. Press the 'Browse' function key combination.

MODIFY: Search if necessary. Enter the item/spec to change or place the cursor on the desired item/spec from the list. Press the 'Modify' function key combination.

Item/Spec Container List

COPY: Search if necessary. Enter the item to copy or place the cursor on the desired item from the list. Press the 'Copy' function key combination.

DELETE: Search if necessary. Enter the item to delete or place the cursor on the desired item from the list. Press the 'Delete' function key combination.

Container List

PURPOSE: To search for and select a container.

SEARCH: With the cursor on the first blank line, enter a full or partial Container Code or Container Name and press the 'Find' key. If the first line is not blank, use the space bar to clear the fields before entering information. To start at the beginning of the list, press the 'Find' key. To see additional information, press the 'Next Screen' key.

Container List

SELECT: Place the cursor on the desired container. Press the 'Return' function key to return the selected information to the detail screen.

Item/Spec Name List

PURPOSE To search for and select an item/spec.

SEARCH: With the cursor on the first blank line, enter a full or partial Item, Spec Number, or Name and press the 'Find' key. If the first line is not blank, use the space bar to clear the fields before entering information. To start at the beginning of the list, press the 'Find' key. To see additional items, press the Next Screen' key.

Item/Spec Name List

SELECT: Place the cursor on the desired item/spec. Press the 'Return' function key to return the selected information to the detail screen.

f. Item/Spec Process Code Maintenance (PR15)

The Process Code Maintenance conversation (PR15) may be used to define and maintain process codes, process steps, process formulas, and process lines. Define all process information before using the process code in item/spec production. The information in this conversation includes:

Process code information: the formula ID, process type, process status, and codes that identify procedures for starting-up and wrapping-up a process.

Process step information: if the batch sheet is to be produced, the batch size and its unit of measure, the yield loss percentage, backflush point (indicates if production will occur at the step), and in-process specific gravity.

Process formula information: for each component, the step assigned to it, type quantity, and if the component is an input or output. A process formula is really the control formula from the Item/Spec Control Formula conversation (PR08).

Formula component information: When creating a process formula, assign the components to specific steps. If necessary, change the quantities for individual steps. If the change flag is set to 'No', the system checks total usage quantities against the control formula to ensure that the two are equal.

Item/spec process lines: These specify the process lines used to produce the item/spec. Rank the process lines in order of preferred usage. Process Lines are defined in the Process Line Maintenance conversation (CS14).

CAS Level Profile: This provides a Chemical Abstract Service profile that specifies if the component is manufactured, processed, or used in another way for this process.

Item/Spec Process Code Header

PURPOSE: To browse information for a process code header. Also use this screen to review process code steps, formulas, and lines. Process codes are used in production orders and campaign launches.

BROWSE: Review the process code header information.

STEPS: Process Code Steps. To review item/spec process code steps, press the 'Steps' function key combination.

Item/Spec Process Code Header

PRC Process Formula. To review item/spec process formulas,

FRM: press the 'PrcFrm' function key combination.

LINES: Process Lines. To review item/spec process lines, press the 'Lines' function key combination.

Item/Spec Process Code Steps

PURPOSE: To browse item/spec process code steps for a process formula. Also use this screen to review comments about the process code steps.

BROWSE: Review the item/spec process code steps.

BRTXT: Step Comments. To review step comments about the item/spec process code, press the 'Text' function key combination.

Item/Spec Process Formula

PURPOSE: To browse process step component information. Also use this screen to assign formula components to specific steps in the process.

BROWSE: Review the component information.

STPBRK: Step Formula Break-Up. To review the formula break-up for a process step, place the cursor on the desired process step. Press the 'StpBrk' function key combination.

Formula Components—Break Up By Step

PURPOSE: To assign components to specific steps in the process. Also use this screen to review the CAS (Chemical Abstract Service) Level and to access comments about the steps in the process formula.

BROWSE: Review the process formula steps.

CASLVL; Chemical Abstract Level. Review this information by pressing 'CASLvl' function key combination.

Formula Components—Break Up By Step

BRTXT: Break-Up Step Comments. To review step comments about the item/spec step, press the 'BrTxt' function key combination.

Item/Spec Valid Process Lines

PURPOSE: To browse process line information to be used in a process code. This information is used in production orders, campaign launches, and scheduling. Also use this screen to access item/spec process code header information.

BROWSE: Review the process line information.

HEADER: Process Code Header. To review the header information, press the 'Header' function key combination.

CAS Level Profile

PURPOSE: To search for and browse CAS (Chemical Abstract Service) level profile information for the components of an item used in a process code and step. Each component is either used, manufactured, or processed during the process step. This information is used to create the Form-R Usage report.

SEARCH: With the cursor on the first blank line, enter a full or partial Component Item Number and press the 'Find' key.

CAS Level Profile

SEARCH: If the first line is not blank, use the space bar to clear the fields before entering information. To start at the beginning of the list, press the 'Find' key. To see additional components, press the 'Next Screen' key.

BROWSE: Review the CAS profile information.

Item/Spec Process Code Header

PURPOSE: To insert, modify, or copy information for a process code header. Also use this screen to access and maintain process code steps, formulas, and lines. Process codes are used to model the entire production process.
INSERT: Required:
  Item Number
  Formula ID
  Item Spec Number
  Primary/Alternate flag
  Process Code
  NOTE: The item/spec must be established.
Item/Spec Process Code Header
INSERT: NOTE
  Once process components (formula) exist, the formula ID cannot be changed.
  Fill yield loss is only enterable for packaging type process codes (between 0-99.99). It will default to 0% and be protected in all modes for non-packaging process codes.
Item/Spec Process Code Header
MODIFY: Change any field except Item/Spec Number, Name, or Process Code.
COPY: Enter the new Name and change the remaining information as needed. Press the
STEPS: Process Code Steps. To review or maintain item/spec process code steps, press the 'Steps' function key combination.
Item/Spec Process Code Header
PRCFRM: Process Formula. To review or maintain item/spec process formulas, press the 'PrcFrm' function key combination.
LINES: Process Lines. To review or maintain item/spec process lines, press the 'Lines' function key combination.
Item/Spec Process Code Steps
PURPOSE: To insert, modify, or delete item/spec process code steps for a process formula. Also use this screen to access and maintain comments about the process code steps.
INSERT: Press the 'Insert' key. Fields are optional. After completing the screen, press the 'PstDa' function key combination to save the information entered in this conversation.
MODIFY: Change any process step information.
Item/Spec Process Code Steps
DELETE: Place the cursor on the process step to delete. Press the 'Delete' function key combination; confirm the deletion by pressing the 'Remove' key or retain the record by pressing the 'LnConf' function key combination.
HEADER: Return to the Process Header.
TEXT: Step Comments. To maintain step comments about the item/spec process code, press the 'Text' function key combination.
Item/Spec Process Code Steps
TEXT: On the word processing screen, type the comments above the [End of file] statement. When through, press the 'F10' function key. When the screen with "Choose Desired Action..." appears, to save the text, press the 'F10' function key. To cancel the text, press the 'Remove' key. END/Post Data. After maintaining step information, press SAVE: the 'End/Save' function key combination to save the data.
LEVEL: Return to the Process Header without updating the step data.
Item/Spec Process Formula
PURPOSE: To review process component information. Also use this screen to assign formula components to specific steps in the process.
REVIEW: Review the component information.
STPBRK: Step Formula Break-Up. To maintain the formula break-up for a process step, place the cursor on the desired process step. Press the 'StpBrk' function key combination.
HEADER: Return to the Process Header.
Item/Spec Process Formula
END/Post Data. After maintaining step information, press SAVE: the 'End/Save' function key combination to save the data on all screens associated with this item/spec.
LEAVE: Return to the Process Header without updating the step data.
Formula Components—Break-Up By Step
PURPOSE: To assign components to specific steps in the process. Also use this screen to perform the following:
  Calculate the steps, total and control formula total
  Maintain the CAS (Chemical Abstract Service) Level
  Access process formula information.
INSERT: Press the 'Insert' key. Enter the step information.
Formula Components—Break-Up By Step
DELETE: Place the cursor on the step to delete. Press the 'Delete' function key combination; confirm the deletion by pressing the 'Remove' key or retain the record by pressing the 'Remove' key or retain the record by pressing the 'LnConf' function key combination.
CLCTOT: Calculate Steps and Control Form Totals. To calculate these totals, press the 'ClcTot' function key combination.
CASLVL: Chemical Abstract Service Level. Maintain this information by pressing the 'CASLvl' function key combination.
Formula Components—Break-Up By Step
PRCFRM: Process Formula. Maintain this information by pressing the 'PrcFrm' function key combination.
TEXT: Break-Up Step Comments. To maintain step comments about the item/spec step, press the 'Text' function key combination. On the word processing screen, type the comments above the [End of file] statement. When through, press the 'F10' function key. When the screen with "Choose Desired Action..." appears, to save the text, press the 'F10' function key. To cancel the text, press the 'Remove' key.
Formula Components—Break-Up By Step
LEAVE: Return to Process Formula without updating step break-up information.
Item/Spec Valid Process Lines
PURPOSE: To insert or delete process line information to be used in a process code. This information is used in production orders, campaign launches, and scheduling. Also use this screen to access and maintain the item/spec process code header information.
INSERT: Press the 'Insert' key. Enter the process line information.
NEXT: To return to the process code header screen, press the 'Header' function key combination.
CAS Level Profile PURPOSE: To search for and browse CAS (Chemical Abstract Service) level profile information for the components of an item used in a process code and step. Each component is either used, manufactured, or processed during the process step. This information is used to create the Form-R Usage Report.

SEARCH: With the cursor on the first blank line, enter a full or partial Component Item Number and press the 'Find' key.

CAS Level Profile

SEARCH: If the first line is not blank, use the space bar to clear the fields before entering information. To start at the beginning of the list, press the 'Find' key. To see additional components, press the 'Next Screen' key.

BROWSE: Review the CAS profile information.

STP: Step Formula Break-Up. To return to the formula break-up

BRK: for a process step, press the 'StpBrk' function key combination.

Item/Spec Process Codes List

PURPOSE: To search for and select an item/spec process code to insert, browse, modify, or copy.

SEARCH: With the cursor on the first blank line, enter a full or partial Item Number, Item/Spec Number, Name, Process Code, or Name and press the 'Find' key. If the first line is not blank, use the space bar to clear the fields before entering information. To start at the beginning of the list, press the 'Find' key. To see additional items, press the 'Next Screen' key.

Item/Spec Process Codes List

INSERT: Press the 'Insert' function key combination.

BROWSE: Search if necessary. Enter the item/spec process code to review or place the cursor on the desired item from the list. Press the 'Browse' function key combination.

MODIFY: Search if necessary. Enter the item/spec process code to change or place the cursor on the desired item from the list. Press the 'Modify' function key combination.

Item/Spec Process Codes List

COPY: Search if necessary. Enter the item/spec process code to copy or place the cursor on the desired item from the list. Press the 'Copy' function key combination.

FRMCOPY: Search if necessary. Enter the item/spec process code and control formula to copy or place the cursor on the desired item from the list. Press the 'FrmCopy' function key combination.

Control Formula List

PURPOSE: To search for and select a control formula.

SEARCH: With the cursor on the first blank line, enter a full or partial Item/Spec Number, Item Name, Formula ID, or In-Effect Date and press the 'Find' key. If the first line is not blank, use the space bar to clear the fields before entering information. To start at the beginning of the list, press the 'Find' key. To see additional items, press the 'Next Screen' key.

Control Formula List SELECT: Place the cursor on the desired control formula. Press the 'Return' function key to return the selected information to the detail screen.

Control Formula List

PURPOSE: To search for and select a control formula.

SEARCH With the cursor on the first blank line, enter a full or partial Item/Spec Number, Item Name, Formula ID, or In-Effect Date and press the 'Find' key. If the first line is not blank, use the space bar to clear the fields before entering information. To start at the beginning of the list, press the 'Find' key. To see additional items, press the 'Next Screen' key.

Control Formula List

SELECT: Place the cursor on the desired control formula. Press the 'Return' function key to return the selected information to the detail screen.

Process Step List

PURPOSE: To search for and select process step information.

SEARCH: With the cursor on the first blank line, enter a full or partial Process Line Number or Description and press the 'Find' key. If the first line is not blank, use the space bar to clear the fields before entering information. To start at the beginning of the list, press the 'Find' key. To see additional process line, press the 'Next Screen' key.

Process Step List

SELECT: Place the cursor on the desired process line. Press the 'Return' function key to return the selected information to the detail screen.

Process Line List

PURPOSE: To search for and select process line information.

SEARCH: With the cursor on the first blank line, enter a full partial Process Line Number or Description and press the 'Find' key. If the first line is not blank, use the space bar to clear the fields before entering information. To start at the beginning of the list, press the 'Find' key. To see additional process line, press the 'Next Screen' key.

Process Line List

SELECT: Place the cursor on the desired process line. Press the 'Return' function key to return the selected information to the detail screen.

Procedure List

PURPOSE: To search for and select procedure information.

SEARCH: With the cursor on the first blank line, enter a full or partial Procedure Code or Description and press the 'Find' key. If the first line is not blank, use the space bar to clear the fields before entering information. To start at the beginning of the list, press the 'Find' key. To see additional procedures, press the 'Next Screen' key.

Procedure List

SELECT: Place the cursor on the desired procedure code. Press the 'Return' function key to return the selected information to the detail screen.

q. Item/Spec Where Used (PR16)

The Process Component Where-Used conversation (PR16) may be used to review a list of all item/specs using a specific component. Item/specs can include a finished or intermediate item, and the possible components can be items such as raw materials, waste, or containers.

This conversation displays all item/specs which use a given item/spec as a component. The associated process code for the parent item/spec is also shown.

Component Item/Spec—Where Used

PURPOSE: To search for and review a list of parent item/specs and their associated process codes in which the component is used.

SEARCH: With the cursor on the first blank line, enter a full or partial Item/Spec Number, Name, or Code and press the 'Find' key. If the first line is not blank, use the space bar to clear the fields before entering information. To start at the beginning of the list, press the 'Find' key. To see additional items, press the 'Next Screen' key.

Component Item/Spec—Where Used

REVIEW: Review the item/spec information.

Component Item/Spec—Where Used

PURPOSE: To search for and review a list of parent item/specs and their associated process codes in which the component is used.

SEARCH: With the cursor on the first blank line, enter a full or partial Item/Spec Number, Name, or Code and press the 'Find' key. If the first line is not blank, use the space bar to clear the fields before entering information. To start at the beginning of the list, press the 'Find' key. To see additional items, press the 'Next Screen' key.

Component Item/Spec—Where Used

REVIEW: Review the item/spec information.

Item/Spec Name List

PURPOSE: To search for and select an item/spec to browse.

SEARCH: With the cursor on the first blank line, enter a full or partial Item Number, Item/Spec Number, or Item Name and press the 'Find' key. If the first line is not blank, use the space bar to clear the fields before entering information. To start at the beginning of the list, press the 'Find' key. To see additional items, press the 'Next Screen' key.

Item/Spec Name List

BROWSE: Search if necessary. Enter the item/spec to browse or place the cursor on the desired item from the list. Press the 'Browse' function key combination.

h. Item/Spec Planning Data Maintenance (PR20)

The Item/Spec Planning Data conversation (PR20) may be used to define and maintain planning information for an item/spec. This information includes minimum and maximum inventory levels for the item/spec, the shelf life, cycle count class, planner code and the replenishment lead time.

The information in this conversation is used in production scheduling and inventory management to set planning parameters and to generate cycle count information respectively.

H. QUALITY CERTIFICATION (PSQC)

1. Quality Certification (QC01)

The Quality Certification conversation (QC01) may be used to record and maintain sample and composite analysis results and to maintain Certificate of Analysis (COA) information. An analysis is a test or group of tests performed on an item to verify that the item meets specifications.

Analysis Header Information

This information includes general analysis information such as the analysis number, if the analysis is a sample, composite, or COA, the item/spec that was tested, and the lot from which the item came. If the analysis was performed for a specific customer, include customer information.

Analysis Results Information

This information includes the results of a sample test or composite analysis. For each test, this information includes the upper and lower limits. The test codes and limits associated with them represent the item/spec standard specifications as defined in the Item/Spec Maintenance conversation (PR11). Each test contains a yes/no flag to indicate if the test should always be performed or only when requested.

Analysis Results Information

COA (Certificate of Analysis) Results Information

This information is printed on the Certificate of Analysis that the customer receives. This information is created by entering analysis results or by copying the results from an existing test or composite analysis. The test codes and limits associated with them represent the item/spec standard specifications as defined in the Customer/Item/Spec Maintenance conversation (CS18).

I. SYSTEM INTERFACE FUNCTIONS (PSSI)

1. Inbound Error Correcting (TO10)

The Inbound Transaction Maintenance conversation (TO10) may be used to monitor and maintain audit trail records that were created by inbound transactions to the PROCESS/1 system. Inbound transactions are transactions received from other PROCESS/1 systems that are located on separate computer nodes. An interface called Distribution Services connects these PROCESS/1 systems.

In addition to inbound transactions, Distribution Services also monitors sent (outbound) transactions. The functions of Distribution Services are performed asynchronously; therefore, the success of inbound or outbound transactions is unknown.

This conversation may be used to determine the status of inbound transactions. Each received transaction generates an audit record which is stored on the Inbound Transactions Table. The contents of this table are displayed in this conversation, including the sender's address, the receiver's address, the transaction data, and delivery status.

This conversation may be used to monitor and correct transactions and resubmit transactions for processing.

2. Outbound Error Correcting (TO30)

The Outbound Transaction Maintenance Conversation (TO30) may be used to monitor and maintain audit trail records that were created by outbound transactions from PROCESS/1. Outbound transactions are transactions sent to other PROCESS/1 systems that are located on separate computer nodes. An interface called Distribution Services connects these PROCESS/1 systems.

In addition to outbound transactions, Distribution Services also monitors received (inbound) transactions. The functions of Distribution Services are performed asynchronously; therefore, the success of outbound or inbound transactions is unknown.

This conversation is used to determine the status of outbound transactions. Each transaction sent generates an audit record which is stored on the Outbound Transactions Table. The contents of this table are displayed in this conversation, including the sender's address, the receiver's address, the transaction data, and delivery status.

This conversation may be used to monitor and correct transactions and resubmit transactions for processing.

What is claimed is:

1. A plant-level manufacturing system for integrating together an enterprise-level system, a process control system, and other sub-systems, the plant-level manufacturing system comprising:
   a) database means for storing and managing data in a common database describing material used and created in the manufacturing process, the database means comprising:
      i) item means for storing items, each of the items identifying physical properties of the material;
      ii) specification means for describing a plurality of sets of performance specifications of the material; and
      iii) database linking means for linking one or more of the sets of performance specifications to one of the items;
   b) interface means for linking the enterprise-level system and the process control system to the database means, the interface means comprising:
      i) means for transferring data between the enterprise-level system and the plant-level manufacturing system;
      ii) means for transferring data between the process control system and the plant-level manufacturing system; and
      iii) means for transferring data from the process control system to the enterprise system; and
   c) integration means for linking other sub-systems within the plant-level system to the items and the performance specifications in the common database and for allowing both the sub-systems and the plant-level system to utilize the same items and the same performance specifications in the common database.

2. The plant-level manufacturing processing system of claim 1 wherein the database means further comprises container means for specifying sets of containers in which the material is to be purchased, manufactured, or sold and for linking one or more of the sets of containers to one of the performance specifications.

3. The plant-level manufacturing processing system of claim 1 wherein the interface means further comprises means for linking a maintenance management system to the common database and for transferring data between the maintenance management system and the plant-level manufacturing system, the maintenance management system comprising means for scheduling preventive maintenance for equipment used in the manufacturing process.

4. The plant-level manufacturing processing system of claim 1 wherein the interface means further comprises means for linking a lab information management system to the common database and for transferring data between the lab information management system and the plant-level manufacturing system, the lab information management system comprising means for receiving a request for a lab test of material and for sending results of the lab test on the material.

5. The plant-level manufacturing processing system of claim 1 wherein the interface means further comprises means for linking a finite scheduling system to the common database and for transferring data between the finite scheduling system and the plant-level manufacturing system, the finite scheduling system comprising means for receiving a master schedule and for generating in response a finite schedule.

6. The plant-level manufacturing processing system of claim 1 wherein the interface means further comprises means for linking a process historian system to the common database and for transferring data between the process historian system and the plant-level manufacturing system, the process historian system comprising:
   a) means for gathering detail data describing events in the manufacturing process from the process control system
   b) means for summarizing the detail data; and
   c) means for transmitting the summarized data to the plant-level system.

7. The plant-level manufacturing processing system of claim 1 wherein the integration means further comprises means for linking a quality certification system to the items and the performance specifications, the quality certification system comprising:
   a) means for setting up tests to be performed on material defined by the items and their related performance specifications;
   b) means for creating a many-to-many relationship between the tests and combinations of the items and the related performance specifications; and
   c) means for storing results of the tests.

8. The plant-level manufacturing system of claim 7 wherein the quality certification system further comprises:
   a) means for generating a certificate of analysis based upon the results of the tests; and
   b) means for determining and reporting whether the results of the tests are within predefined limits.

9. The plant-level manufacturing processing system of claim 1 wherein the integration means further comprises means for linking a production management system to the items and the performance specifications, the production management system comprising means for scheduling and reporting production of material defined by the items and the performance specifications.

10. The plant-level manufacturing processing system of claim 1 wherein the integration means further comprises means for linking a purchasing system to the items and the performance specifications, the purchasing system comprising means for creating a first set purchase orders based upon the items and the performance specifications and for receiving a second set of purchase orders from the enterprise-level system.

11. The plant-level manufacturing processing system of claim 1 wherein the integration means further comprises means for linking a customer order system to the items and the performance specifications, the customer order system comprising means for creating a first set customer orders based upon the items and the performance specifications and for receiving a second set of customer orders from the enterprise-level system.

12. The plant-level manufacturing processing system of claim 1 wherein the integration means further comprises means for linking a material control system to the items and the performance specifications, the material control system comprising means for analyzing an inventory to perform inventory transactions.

13. The plant-level manufacturing processing system of claim 1 wherein the integration means further comprises means for linking a quality-based costing system to the items and the performance specifications, the quality-based costing system comprising means for calculating product costing, for financial reporting, and for operational analysis.

14. The plant-level manufacturing processing system of claim 1 wherein the integration means further comprises means for linking a financial and administrative management system to the items and the performance specifications, the financial and administrative management system comprising means for organizing and arranging financial data related to the manufacturing process.

15. A health, safety, and training system integrated to a plant-level manufacturing system for managing health, safety, and training aspects of a manufacturing process, the health, safety, and training system comprising:
 a) integration means for using a common data repository with the plant-level manufacturing system so that both the health, safety, and training system and the plant-level manufacturing system share the same item data within the repository, the item data describing material used and created in the manufacturing process;
 b) the common data repository comprising database means for storing and managing the item data, the database means comprising item means for storing items, each of the items identifying physical properties of the material and health, safety, and training information related to the material;
 c) human interface means for linking employee identification data with health and safety factors related to job requirements in order to determine preventive action for employees to alleviate effects of the health and safety factors, the human interface means comprising:
  i) means for storing sets of employee identification data in the common database;
  ii) means for storing sets of job requirements in the common database and for linking the sets of job requirements with the sets of employee identification data;
  iii) means for storing sets of health and safety factors in the common database and for linking the sets of health and safety factors with the sets of job requirements; and
  iv) means for storing sets of preventive action data in the database and for linking the sets of training data with the sets of health and safety factors; and
 d) means for linking the preventive action data with the employee identification data to determine a preventive action plan for a particular employee.

16. The health, safety, and training system of claim 15 wherein the means for storing sets of job requirements comprises:
 a) job location means for storing characteristics of job locations related to the health and safety factors; and
 b) job type means for storing characteristics of job functions related to the health and safety factors.

17. The health, safety, and training system of claim 15 wherein the means for storing sets of health and safety factors comprises:
 a) means for storing expected exposure to the items based upon the job requirements; and
 b) means for storing expected exposure to agents based upon the job requirements.

18. The health, safety, and training system of claim 17 wherein the means for storing expected exposure to agents comprises:
 a) means for storing expected exposure to noise;
 b) means for storing expected exposure to a particular machine which requires specialized training.

19. The health, safety, and training system of claim 15 wherein the means for storing preventive action data comprises:
 a) means for storing required medical exams based upon the health and safety factors; and
 b) means for storing required employee training based upon the health and safety factors.

20. An environmental system integrated to a plant-level manufacturing system for managing environmental aspects of a manufacturing process, the environmental system comprising:
 a) integration means for using a common data repository with the plant-level manufacturing system so that both the environmental system and the plant-level manufacturing system share the same item data within the repository, the item data describing material used and created in the manufacturing process;
 b) the common data repository comprising database means for storing and managing the item data, the database means comprising item means for storing items, each of the items identifying physical properties of the material and environmental information related to the material; and
 c) environmental means for managing physical properties of the material which are incidental to the environment, the environmental means comprising:
  i) identification means for storing environmental factors of the material in the common database;
  ii) tracking means for recording usage and production of the material in the common database; and
  iii) reporting means for outputting data from the common database related to the usage and production of the material.

21. The environmental system of claim 20 wherein the identification means comprises means for storing information relating the material which includes flammability, combustibility, or carcinogenic.

22. The environmental system of claim 20 wherein:
 a) the identification means comprises means for storing a CAS-level profile of the material;
 b) the tracking means comprises means for recording usage of particular hazardous elements of the material based upon the CAS-level profile; and
 c) the reporting means comprises means for outputting data related to the usage of the particular hazardous elements of the material based upon the CAS-level profile.

23. The environmental system of claim 20 wherein the identification means comprises means for storing a Material Safety Data Sheet related to the material.

24. The environmental system of claim 20 wherein the reporting means comprises means for generating a SARA report based upon the material.

25. A system integrated to a plant-level manufacturing processing system for managing the development of new products, the system comprising:
 a) integration means for utilizing a common database with the plant-level manufacturing system, the database comprising database means for storing and managing experimental data describing material to be used and created in the manufacturing process for the new product, the database means comprising:
  i) item means for storing experimental items, each of the items identifying physical properties of the material; and
  ii) specification means for describing a plurality of sets of experimental performance specifications of the material and for linking one or more of the sets of performance specifications to one of the items;
b) communication means for electronically directing work flow related to the development of the new product; and
c) commercialization means for converting the experimental data into product data for commercial production of the new product.

26. The system of claim 25 wherein the communication means comprises:
  a) means for providing electronic-mail notification of tasks in the development process to a person responsible for the task; and
  b) means for providing electronic-mail approval of the tasks in the development process.

27. The system of claim 25 wherein the communication means comprises means for generating and reporting checkpoints along the development process.

28. The system of claim 25 the commercialization means comprises means for changing the experimental item and the experimental specification into a commercial item and a commercial specification.

29. The system of claim 25 wherein:
  a) the communication means comprises:
    i) means for defining a sequence of events for completing the development process; and
    ii) means for defining tasks and necessary skills to complete the events; and
  b) the commercialization means comprises means for converting the experimental item and the experimental specification in the common database into a commercial item and a commercial specification to be utilized by the plant-level system in manufacturing the new product.

* * * * *

UNITED STATES PATENT AND TRADEMARK OFFICE
CERTIFICATE OF CORRECTION

PATENT NO. : 5,311,438

DATED : May 10, 1994

INVENTOR(S) : Sellers et al.

It is certified that error appears in the above-identified patent and that said Letters Patent is hereby corrected as shown below:

In column 2, line 40, "system" should read --systems--.

In column 2, line 52, insert --the-- after the word "within".

In column 6, lines 34 and 35, "Design Request (PDDR)" should be on line 35 as a heading.

In column 7, line 26, "QUALITY....(PSQC)" should be on line 27 as a heading.

In column 11, line 28, "2C-2H" should read --2C-2J--.

In column 11, line 39, insert --integrated-- after the word "an".

In column 14, line 58, insert --h. Process Line Maintenance (CS14)-- after the word "procedure".

In column 15, line 51, "tho" should read --the--.

In column 17, line 39, delete "Header." after the word "HEADER:".

In column 18, line 9, delete "Header." after the word "HEADER:".

In column 20, line 67, "BRSEXM" should read --BRWEXM--.

In column 21, lines 12 and 13, delete "Environmental" after the word "combination." and insert on line 13 before "Location".

In column 21, line 32, insert --Update-- after the letters "UPDEXM".

In column 22, line 64, ", Next" should read --'Next--.

In column 24, line 13, insert --.-- after the word "Exam".

In column 24, line 18, insert --Update-- after the letters "UPDEXM".

UNITED STATES PATENT AND TRADEMARK OFFICE
CERTIFICATE OF CORRECTION

PATENT NO. : 5,311,438

DATED : May 10, 1994

INVENTOR(S) : Sellers et al.

It is certified that error appears in the above-identified patent and that said Letters Patent is hereby corrected as shown below:

In column 25, line 61, "BRSCRS" should read --BRWCRS--.

In column 26, line 8, insert --line is not-- after the word "first".

In column 27, line 31, insert --type.-- after the word "and".

In column 29, line 62, ", Next Screen," should read --'Next Screen'--.

In column 30, line 34, "Find," should read --'Find'--.

In column 30, linea 47, insert --of-- after the word "use".

In column 31, line 9, insert --.-- after the word "List".

In column 31, line 10, "release" should read --released--.

In column 33, line 7, delete "key" after the word "combination".

In column 35, line 10, "of" should read --or--.

In column 35, line 31, "Item Spec" should read --Item/Spec--.

In column 41, line 52, "of" should read --or--.

In column 50, line 9, insert --of-- after the word "result".

In column 50, lines 32 and 55, "'BrmExm'" should read --'BrwExm'--.

In column 58, line 60, insert --type is not-- after the word "Employee".

In column 59, line 66, "Cody" should read --Body--.

UNITED STATES PATENT AND TRADEMARK OFFICE
CERTIFICATE OF CORRECTION

PATENT NO. : 5,311,438

DATED : May 10, 1994

INVENTOR(S) : Sellers et al.

It is certified that error appears in the above-identified patent and that said Letters Patent is hereby corrected as shown below:

In column 64, lines 58, 59 and 60, delete "BRW Browse Body Parts. To access body part information BPR: press the" after the word "combination" and insert on line 59.

In column 64, line 61, "BRWAU" should read --BRWCAU:--.

In column 64, line 65, "BRWCAU:" should read --BRWNAT:--.

In column 65, line 6, delete line 6 and insert on line 7. Delete "Incident Maintenance-Body Parts" after the word "nature". Insert --.-- after the word "nature".

In column 65, line 7, insert --Incident Maintenance-Body Parts--.

In column 65, line 47, insert --BRWNAT-- before the word "Browse".

In column 66, line 18, insert --injury nature-- after the word "causes".

In column 67, line 41 "Cody" should read --Body--.

In column 70, line 27, insert --D. MATERIALS MANAGEMENT (PSMM)-- after the word "combination".

In column 85, line 18, "test" should read --text--.

In column 85, line 21, "PROFILE:" should read --PROFIL:--.

In column 87, line 25, delete "TESTS: Test Specifications." on line 25 after the word "item."

In column 87, line 26, insert --TESTS: Test Specifications.-- before the word "To".

UNITED STATES PATENT AND TRADEMARK OFFICE
CERTIFICATE OF CORRECTION

PATENT NO. : 5,311,438

DATED : May 10, 1994

INVENTOR(S) : Sellers et al.

It is certified that error appears in the above-identified patent and that said Letters Patent is hereby corrected as shown below:

In column 88, line 30, "Date" should read --Data--.

In column 90, line 55, insert --.-- after the word "simulations".

In column 91, line 23, delete "d" after the word --project--.

In column 91, line 60, delete "(cont.)" after the word "Message".

In column 92, line 56, insert --.-- after the word "desired".

In column 94, lines 5 and 6, delete "To update to the 'reassign' status, enter a 'reject for rework' status" after the word "status."

In column 94, line 50, "Cement" should read --Comment--.

In column 95, line 47, insert --requests, press the 'Next Screen' key.-- after the word "design".

In column 96, line 38, ",Next Screen," should read --'Next Screen'--.

In column 98, line 24, insert --(PD08)-- after the word "conversation".

In column 100, line 67, "REFCMT" should read --REJCMT--.

In column 101, line 25, "COMPLETE" should read --COMPLETE STATUS:--.

In column 101, line 26, insert --Completed column next to the status.-- after the word "the".

In column 101, line 27, delete "STATUS: Completed column next to the status." after the word "the".

In column 101, line 35, ",reject for rework," should read --'reject for rework'--.

In column 102, line 39, insert --press the 'Next Screen' key.-- after the word "requests".

UNITED STATES PATENT AND TRADEMARK OFFICE
CERTIFICATE OF CORRECTION

PATENT NO. : 5,311,438

DATED : May 10, 1994

INVENTOR(S) : Sellers et al.

It is certified that error appears in the above-identified patent and that said Letters Patent is hereby corrected as shown below:

In column 113, lines 55 and 56, "re view" should read --re-view--.

In column 116, line 39, "Delete" should read --'Delete'--.

In column 116, line 44, delete "Design Request List" after the word --combination.-- on line 44 and insert on line 45 --Design Request List-- before the word "PURPOSE:"

In column 117, line 23, "Find'" should read --'Find'--.

In column 120, line 28, "EXSOLN" should read --XPSOLN--.

In column 120, line 42, insert --press the 'Find' key. To see additional design requests press the 'Next Screen' key.-- after the word "list,".

In column 120, lines 43, 44 and 45, delete "Design Request List SEARCH: press the 'Find' key. To see additional design requests, press the 'Next Screen' key." after the word "list,".

In column 120, line 45, insert --Design Request List-- after the word "key." on line 42.

In column 122, line 28, insert --.-- after the word "Specifications".

In column 124, line 29, insert --Item/Spec-Physical Specifications-- after the words "item/spec."

In column 124, line 59, insert --.-- after the word "Specifications".

In column 129, line 42, "solution" should read --solutions--.

In column 129, line 50, "Specs'" should read --'Specs'--.

UNITED STATES PATENT AND TRADEMARK OFFICE
CERTIFICATE OF CORRECTION

PATENT NO. : 5,311,438

DATED : May 10, 1994

INVENTOR(S) : Sellers et al.

It is certified that error appears in the above-identified patent and that said Letters Patent is hereby corrected as shown below:

In column 129, lines 66 and 67, line 66 should be on line 67. Delete "Design Request Experimental Prototype Solutions" after the word "specs." and insert --Design Request Experimental Prototype Solutions-- on line 67.

In column 131, line 19, line 19 should be on line 18 - does not start a new paragraph "Business...press".

In column 132, line 3, "Return'" should read --'Return'--.

In column 134, line 52, "Find'" should read --'Find'--.

In column 135, lines 67 and 68, delete "Report Type List" after the word "screen".

In column 135, line 68, insert --Report Type List-- on line 68.

In column 136, line 30, delete "Design Request List" after the word "screen" and insert before line 31

In column 136, line 38, "Find'" should read --'Find'--.

In column 136, lines 58 and 59, delete "Project Leader Priority Queue" after the word "listed" and insert on line 59.

In column 137, line 26, "If" does not start a new paragraph.

In column 137, line 32, "order" should read --ordered--.

In column 137, line 51, "PROFILE" should read --PROFIL--.

In column 138, lines 18 and 19, "Next Screen'" should read --'Next Screen'--.

Page 6 of 9

UNITED STATES PATENT AND TRADEMARK OFFICE
CERTIFICATE OF CORRECTION

PATENT NO. : 5,311,438
DATED : May 10, 1994
INVENTOR(S) : Sellers et al.

It is certified that error appears in the above-identified patent and that said Letters Patent is hereby corrected as shown below:

In column 138, line 67, "Find'" should read --'Find'--.

In column 141, line 61, "ENSUM" should read --ENVSUM--.

In column 143, line 52, insert --BROWSE:-- after the word "Maintenance".

In column 144, line 24, insert --in the creation of design-- after the word "used".

In column 147, line 8, delete "The" after the word "(PS18)".

In column 147, line 9, insert --The-- before the word "Business".

In column 147, line 44, "an" should read --in--.

In column 148, line 55, "Repor" should read --Report--.

In column 149, lines 49 and 50, delete "INSERT: Press the 'Insert' function key combination." and insert on line 50 after the word "List".

In column 150, line 35, "Next Screen'" should read --'Next Screen'--.

In column 150, line 55, "Pr cedure" should read --Procedure--.

In column 151, lines 17 and 18, delete "browse physical hazard and reactivity" after the word --Reactivity--.

In column 153, lines 56 and 57, "Remove" should read --'Remove'--.

In column 153, line 63, insert --.-- after the word "Text".

In column 156, lines 39 and 40, Delete "'PURPOSE: To insert, modify, or delete molecular components in an item." after the word --Component--.

UNITED STATES PATENT AND TRADEMARK OFFICE
CERTIFICATE OF CORRECTION

PATENT NO. : 5,311,438

DATED : May 10, 1994

INVENTOR(S) : Sellers et al.

It is certified that error appears in the above-identified patent and that said Letters Patent is hereby corrected as shown below:

In column 156, lines 40 insert --PURPOSE: To insert, modify, or delete molecular components in an item.-- after "Component"

In column 156, lines 62, "or" should read --on--.

In column 157, line 33, "or" should read --on--.

In column 157, line 52, insert --necessary when working with the item. This conversation-- after the word "procedures".

In column 157, lines 65 and 66, line 65 should be on line 66. Delete "BRTXT: Browse Text" To review" after the word --information.-- insert on line 66.

In column 160, line 19, insert --which they are entered.-- after the word "in".

In column 162, line 56, "BR:" should read --BRRQST:--.

In column 162, line 57, delete "RQST:" after the word "BrRqst".

In column 163, line 68, "screens" should read --fields--.

In column 167, line 20, "Next Screen'" should read --'Next Screen'--.

In column 168, line 5, "PRC" should read --PRCFRM:--.

In column 168, line 7, delete "FRM" after the word "formulas,".

In column 168, line 36, "Break Up" should read --Break-Up--.

In column 169, line 14, "NOTE" should read --NOTE:--.

In column 169, line 25, insert --'END' key.-- after the word "the".

UNITED STATES PATENT AND TRADEMARK OFFICE
CERTIFICATE OF CORRECTION

PATENT NO. : 5,311,438

DATED : May 10, 1994

INVENTOR(S) : Sellers et al.

It is certified that error appears in the above-identified patent and that said Letters Patent is hereby corrected as shown below:

In column 169, line 66, "LEVEL" should read --LEAVE--.

In column 171, line 18, "STP:" should read --STPBRK:--.

In column 171, line 20, delete "BRK:" after the word "break-up".

In column 171, lines 64 and 65, delete "SELECT: Place the cursor on" after the word "List" and insert on line 65 before the word "the".

In column 172, line 34, insert --or-- after the word "full".

In column 172, line 58, "q" should read --g--.

In column 174, line 55, "Distri'ution" should read --Distribution--.

In column 180, line 6 (Claim 28), insert --wherein-- after the numeral "25".

Signed and Sealed this

Thirtieth Day of July, 1996

Attest:

*Attesting Officer*

BRUCE LEHMAN

*Commissioner of Patents and Trademarks*